United States Patent
Ohgaru et al.

(10) Patent No.: US 7,695,780 B2
(45) Date of Patent: Apr. 13, 2010

(54) OPTICAL FILM, OPTICAL COMPENSATION SHEET, POLARIZING PLATE, AND LIQUID CRYSTAL DISPLAY DEVICE

(75) Inventors: Ikuko Ohgaru, Minami-ashigara (JP); Nobutaka Fukagawa, Minami-ashigara (JP); Terukazu Yanagi, Ebina (JP); Hiroshi Kawamoto, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 831 days.

(21) Appl. No.: 10/588,125

(22) PCT Filed: Feb. 25, 2005

(86) PCT No.: PCT/JP2005/003688
§ 371 (c)(1),
(2), (4) Date: Aug. 1, 2006

(87) PCT Pub. No.: WO2005/081642
PCT Pub. Date: Sep. 9, 2005

(65) Prior Publication Data
US 2009/0027599 A1    Jan. 29, 2009

(30) Foreign Application Priority Data

| Feb. 26, 2004 | (JP) | 2004-052562 |
| Mar. 3, 2004 | (JP) | 2004-058648 |
| Mar. 15, 2004 | (JP) | 2004-072478 |
| Jun. 11, 2004 | (JP) | 2004-174028 |
| Sep. 21, 2004 | (JP) | 2004-273996 |

(51) Int. Cl.
G02B 5/30 (2006.01)
G02F 1/1335 (2006.01)
G02F 1/13363 (2006.01)
F21V 9/14 (2006.01)

(52) U.S. Cl. ............... 428/1.31; 428/1.33; 428/1.54; 349/96; 349/117; 349/118; 349/122; 252/582

(58) Field of Classification Search ............ 428/1.31, 428/1.33, 1.54; 349/96, 117, 118, 122; 359/499, 359/500; 252/585, 586, 582
See application file for complete search history.

(56) References Cited

U.S. PATENT DOCUMENTS 7,166,339 B1 *    1/2007    Mori et al. ................. 428/1.33
(Continued)

FOREIGN PATENT DOCUMENTS

EP     0 911 656 A2    4/1999
(Continued)

OTHER PUBLICATIONS

English translation by computer for JP 2004-50516, http://www4.ipdl.inpit.go.jp/Tokujitu/PAJdetail.ipdl?N0000=60&N0120=01&N2001=2&N3001=2004-050516, 2004.*
(Continued)

*Primary Examiner*—Shean C Wu
(74) *Attorney, Agent, or Firm*—Buchanan Ingersoll & Rooney PC

(57) ABSTRACT

An optical film, which contains a cellulose acylate, at least one compound of formula (I) in an amount of 0.01 to 20 mass parts, and at least one cyclic compound having at least three substituents in an amount of 0.01 to 20 mass parts, to 100 mass parts of the cellulose acylate:

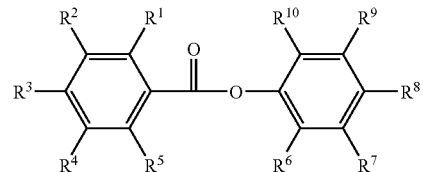

Formula (I)

wherein $R^1$ to $R^7$, $R^9$ and $R^{10}$ each independently is a hydrogen atom or a substituent; at least one of $R^1$ to $R^5$ is an electron-donating group; $R^8$ is a hydrogen atom, an alkyl group, an alkenyl group, an alkinyl group, an aryl group, an alkoxy group, an aryloxy group, an alkoxycarbonyl group, an acylamino group, an alkylcarbonyloxy group, a cyano group, or a halogen atom; and an optical compensation sheet, a polarizing plate, and a liquid crystal display device, each of which uses the optical film.

44 Claims, 2 Drawing Sheets

U.S. PATENT DOCUMENTS

| | | | |
|---|---|---|---|
| 2005/0105027 A1* | 5/2005 | Wada et al. | 349/117 |
| 2006/0286313 A1* | 12/2006 | Fukagawa et al. | 428/1.31 |
| 2007/0195226 A1* | 8/2007 | Aminaka et al. | 349/96 |
| 2008/0297703 A1* | 12/2008 | Kawanishi et al. | 349/96 |

FOREIGN PATENT DOCUMENTS

| | | |
|---|---|---|
| EP | 1 237 017 A1 | 9/2002 |
| JP | 7-11056 A | 1/1995 |
| JP | 2000-111914 A | 4/2000 |
| JP | 2001-116926 A | 4/2001 |
| JP | 2002-182215 A | 6/2002 |
| JP | 2002-192541 A | 7/2002 |
| JP | 2003-43250 A | 2/2003 |
| JP | 2003-73485 A | 3/2003 |
| JP | 2003-207630 A | 7/2003 |
| JP | 2003-294909 A | 10/2003 |
| JP | 2003-344655 * | 12/2003 |
| JP | 2004-50516 A | 2/2004 |

OTHER PUBLICATIONS

Official Action issued in corresponding Japanese Patent Application No. 2004-273996 on Oct. 27, 2009, together with an English language translation of the Official Action.

* cited by examiner (A)

(B)

OPTICAL FILM, OPTICAL COMPENSATION SHEET, POLARIZING PLATE, AND LIQUID CRYSTAL DISPLAY DEVICE

TECHNICAL FIELD

The present invention relates to an optical film, an optical compensation sheet, a polarizing plate, and a liquid crystal display device; and particularly to an optical compensation sheet made of only one cellulose acylate film, and a polarizing plate and a liquid crystal display device using the optical compensation sheet.

BACKGROUND ART

A cellulose acylate film has moderate moisture permeability and is easily processed. Among cellulose films, a cellulose acylate film has higher optical isotropy (a lower retardation value) than other polymer films. Therefore, it is common to use a cellulose acylate film in applications requiring optical isotropy, such as for a polarizing plate. On the other hand, it is demanded that optical compensation sheets (retardation films (or phase-contrast films or phase difference films)) for use, for example, in a liquid crystal display device, have optical anisotropy (high retardation value), on the contrary. Therefore, a synthetic polymer film, such as a polycarbonate film or polysulfone film, which has a high retardation value, is commonly used as the optical compensation sheet.

As described above, in the technical fields of optical materials, a synthetic polymer film is used when it is required for a polymer film to have optical anisotropy (high retardation value), and a cellulose acylate film is used when it is required for a polymer film to have optical isotropy (low retardation value), in general.

However, in these days, another-type of cellulose acylate film having a high retardation value is demanded, so that it can also be used in applications (for example, an optical compensation sheet) for which optical anisotropy is required. It is proposed that a cellulose acylate film be used as a phase-contrast film by imparting optical isotropy to the film, and technologies corresponding to this are proposed (for example, European Patent Application Publication (Laid-Open) No. 0911656A2). In the above European Patent Application Publication No. 0911656A2, an aromatic compound having at least two aromatic rings, and particularly a compound having a 1,3,5-triazine ring, is added, and orientation process is carried out, in order for a cellulose acylate film to have a high retardation value, in practice.

As measures to increase the retardation of a cellulose acylate film, known are, for example, (1) a method in which a cellulose acylate film is oriented, to increase the orientation of its molecular chain; and (2) a method in which a highly anisotropic low-molecular compound is added. For example, there is disclosed a method in which a cellulose acylate propionate film is oriented using a tenter, in JP-A-2003-73485 ("JP-A" means unexamined published Japanese patent application). Also, JP-A-2002-182215 discloses a method in which a cellulose acylate film, to which a disk-like compound is added, is oriented using a tenter. The above methods, however, have the problem that, if it is intended to obtain a high retardation value, variations in retardation and slow axis within the surface of the film are increased, and therefore the problem must be improved.

Generally, it is known that a cellulose triacetate is a high-molecular raw material that can be oriented with difficulty, and it is difficult to make the cellulose triacetate have a large birefringence. However, in the above European Patent Application Publication No. 0911656A2, additives are oriented at the same time by orientation process, thereby making it possible to increase birefringence and attaining a high retardation value. This film has such a merit that an inexpensive and thin-film liquid crystal display device can be obtained, because this film can double as a protective film of a polarizing plate.

It is essential, today, to develop a thin-layer liquid crystal cell to reduce the mass of a liquid crystal display device and production cost. The optical performance required for an optical compensation sheet is a higher Re retardation value, and it has become necessary to provide a film having a lower Rth retardation value.

However, the inventors of the present invention, having made earnest studies as to the method disclosed in European Patent Application Publication No. 0911656A2, have, as a result, clarified that this method has the problem that, if it is intended to attain a high Re value, the Rth value increases, and it is therefore difficult to attain a higher Re value and a lower Rth value, with the result that, in the case of setting the aforementioned Re retardation value and Rth retardation value individually, they cannot be set compatibly. There are, besides the above European patent publication, patent documents, for example JP-A-2001-116926, which disclose techniques concerning the optical performance of a VA phase-contrast film. In the publications, no method of making a desired Re value and a desired Rth value compatible with each other is clearly described.

Also, as mentioned above, a cellulose ester film is eventually used as an optical compensation sheet doubling as a polarizing plate protective film. Along with developments of products with high precision, there is a strong demand for a high-quality cellulose ester film.

In order to use a cellulose acetate film as an optical compensation sheet doubling as a polarizing plate protective film in a liquid crystal display, in particular, lubricity (scratch resistance) of the surface of a film is required. Specifically, when a polarizing plate is produced using a polarizing film and the above film, a treatment for saponification of the film (hydrophilic treatment), a process of adhering the polarizing film onto the film by using an adhesive, and further a conveying work(s) for performing these steps, are carried out. When the scratch resistance of the film surface is insufficient, and as a result the film surface is damaged during the above operations, a liquid crystal display into which a polarizing plate using such a film is incorporated has a fatal surface defect.

A cellulose acetate film may be obtained by a solvent film forming method comprising: casting a dope, obtained by dissolving cellulose triacetate having a bonded acetic acid amount (degree of acetylation) of 60 to 62% together with a plasticizer in a mixed solvent of methylene chloride and methanol, on a drum that is continuously rotated, or a moving band (support), and then vaporizing the solvent. Then, to improve scratch resistance, silicon dioxide, which is currently used, is dispersed in a solvent, or a mixed solution of a solvent and cellulose triacetate; the resulting dispersion is mixed with the above dope, and the resulting mixed solution is cast and dried, to thereby produce a cellulose triacetate film. By this processing, irregularities are formed on the surface of the film, to impart lubricity to the surface.

However, when silicon dioxide is used as a matting agent to improve the aforementioned lubricity, a large coagulate is generated in the film, posing the problem that the transparency of the film is deteriorated.

First, the reason a high Re/Rth ratio is not attained by the method disclosed in the European Patent Application Publication No. 0911656A2 will be explained.

In the case of considering that the thickness of a film is fixed, the retardation of the film is determined by the refractive index and amount of a raw material and the orientation state. In the method disclosed in the European Patent Application Publication No. 0911656A2, the retardation of the film is determined by the three-axis refractive indexes and orientation state of the cellulose triacetate, as well as the refractive index, amount to be added, and orientation state of the disk-like compound serving as an additive. Although other additives, such as a plasticizer, slightly affect the development of retardation, their effects are generally small and can be therefore omitted.

Cellulose triacetate is a raw material that can be oriented with difficulty, usually, and it is therefore difficult to increase the ratio of orientation. It is therefore difficult to accomplish a large retardation value. In the case of attaining high retardation by using cellulose triacetate in the manner as in European Patent Application Publication No. 0911656A2, the additives largely contribute to the developed retardation.

The Re retardation value and the Rth retardation value are both defined as refractive indexes in three-axis directions, and therefore the ratio Re/Rth is mostly determined by an additive that largely contributes to the development of retardation. By investigating the Re/Rth ratio vs the orientation ratio, it was found that both are proportional to each other, and the Re/Rth ratio is increased as the orienting ratio is increased. In the case of varying the amount to be added, the same proportional relation is also obtained: The Re/Rth ratio is increased as the amount to be added is increased. The gradient of the Re/Rth ratio to the orienting ratio is determined by the raw material to be added. It was found that, in the case of the disk-like compound described specifically in the European Patent Application Publication No. 0911656A2, the gradient is small.

The orientation states of cellulose triacetate and additives, which orientation determines the retardation value, differ depending on the orienting method. Generally, a roll orienting method and a tenter orienting method are known, as examples of a monoaxially orienting method. In the former method, the width of a film is shrunk, making ny small, and therefore the (nx−ny) value is easily made larger, so that Re tends to be developed. In the latter method, a film is oriented in the transverse direction in the condition that the carrying direction is limited, and the (nx−ny) value is therefore scarcely made large. Therefore, the Re/Rth ratio to the orienting ratio is smaller in the latter case than in the former case.

Because the tenter orienting method has a tendency to decrease the dispersions of film thickness and optical performances, it is suitable as a method of producing an optical compensation sheet for a liquid crystal display device. When this method is applied to the aforementioned disclosed example, the increment of the Re/Rth ratio is about 0.01 or less, per 1% of the orienting ratio. When the target value of Re is close to the target value of Rth and the Re/Rth ratio is about 0.5, the orienting ratio must be 50% or more. It is difficult to actually attain this orienting ratio stably in the case of cellulose triacetate film resistant to orienting.

Also, as to the amount to be added, it is difficult to attain the optical performances to be intended by a possible increase in the amount to be added.

Other and further features and advantages of the invention will appear more fully from the following description, taken in connection with the accompanying drawings.

DISCLOSURE OF INVENTION

Figure 1:
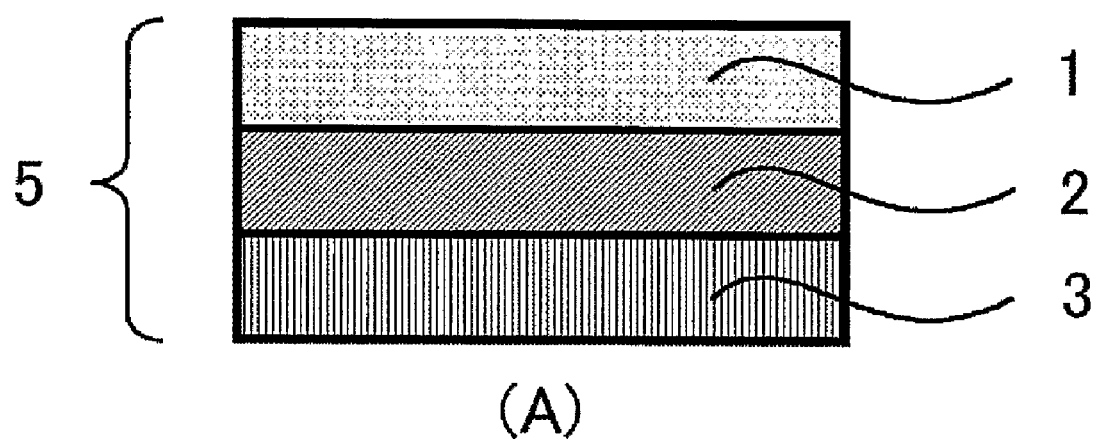
FIG. 1(A) and FIG. 1(B) are schematic views each showing an example of a structure in which a polarizing plate according to the present invention is combined with a functional optical film.
Figure 1:
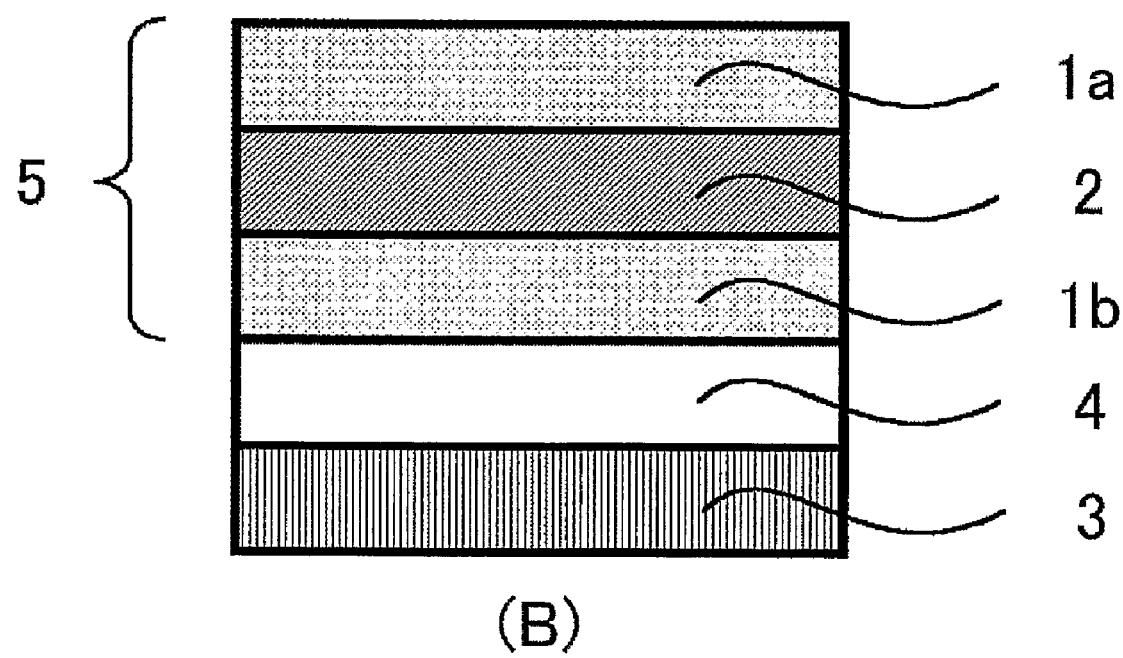

According to the present invention, there are provided the following means:

(1) An optical film, comprising a cellulose acylate, at least one compound represented by the following formula (I) in an amount of 0.01 to 20 mass parts to 100 mass parts of the cellulose acylate, and at least one cyclic compound having at least three substituents in an amount of 0.01 to 20 mass parts to 100 mass parts of the cellulose acylate:

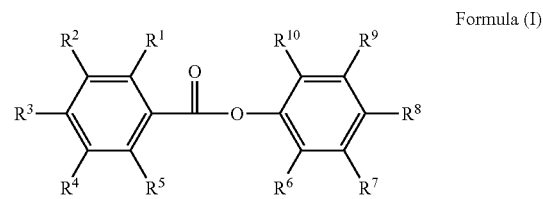

Formula (I)

wherein $R^1$, $R^2$, $R^3$, $R^4$, $R^5$, $R^6$, $R^7$, $R^9$ and $R^{10}$ each independently represent a hydrogen atom or a substituent, in which at least one of $R^1$, $R^2$, $R^3$, $R^4$ and $R^5$ represents an electron-donating group; $R^8$ represents a hydrogen atom, an alkyl group having 1 to 4 carbon atoms, an alkenyl group having 2 to 6 carbon atoms, an alkinyl group having 2 to 6 carbon atoms, an aryl group having 6 to 12 carbon atoms, an alkoxy group having 1 to 12 carbon atoms, an aryloxy group having 6 to 12 carbon atoms, an alkoxycarbonyl group having 2 to 12 carbon atoms, an acylamino group having 2 to 12 carbon atoms, an alkylcarbonyloxy group having 2 to 20 carbon atoms, a cyano group, or a halogen atom.

(2) The optical film according to the above (1), wherein the cyclic compound having at least three substituents is a compound represented by the following formula (II):

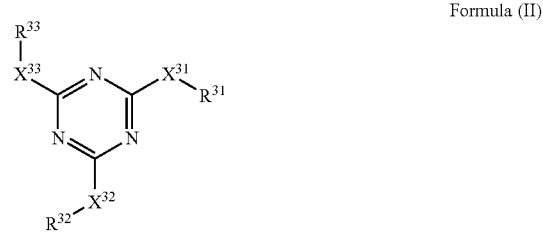

Formula (II)

wherein $X^{31}$ represents a single bond, —$NR^{34}$—, —O—, or —S—; $X^{32}$ represents a single bond, —$NR^{35}$—, —O—, or —S—; $X^{33}$ represents a single bond, —$NR^{36}$—, —O—, or —S—; $R^{31}$, $R^{32}$ and $R^{33}$ each independently represent an alkyl group, an alkenyl group, an aryl group, or a heterocyclic group; and $R^{34}$, $R^{35}$ and $R^{36}$ each independently represent a hydrogen atom, an alkyl group, an alkenyl group, an aryl group, or a heterocyclic group.

(3) An optical film, comprising a cellulose acylate, at least one compound represented by the following formula (I) in an amount of 0.01 to 20 mass parts and/or at least one compound having a 1,3,5-triazine ring in an amount of 0.01 to 20 mass parts, and at least one ultraviolet absorber in an amount of 0.1 to 20 mass parts, to 100 mass parts of the cellulose acylate:

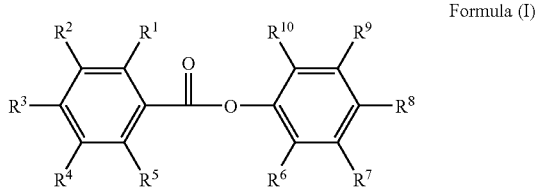

Formula (I)

wherein $R^1$, $R^2$, $R^3$, $R^4$, $R^5$, $R^6$, $R^7$, $R^9$ and $R^{10}$ each independently represent a hydrogen atom or a substituent, in which at least one of $R^1$, $R^2$, $R^3$, $R^4$ and $R^5$ represents an electron-donating group; $R^8$ represents a hydrogen atom, an alkyl group having 1 to 4 carbon atoms, an alkenyl group having 2 to 6 carbon atoms, an alkinyl group having 2 to 6 carbon atoms, an aryl group having 6 to 12 carbon atoms, an alkoxy group having 1 to 12 carbon atoms, an aryloxy group having 6 to 12 carbon atoms, an alkoxycarbonyl group having 2 to 12 carbon atoms, an acylamino group having 2 to 12 carbon atoms, an alkylcarbonyloxy group having 2 to 20 carbon atoms, a cyano group, or a halogen atom.

(4) The optical film according to the above (3), wherein the compound having a 1,3,5-triazine ring is a compound represented by formula (II):

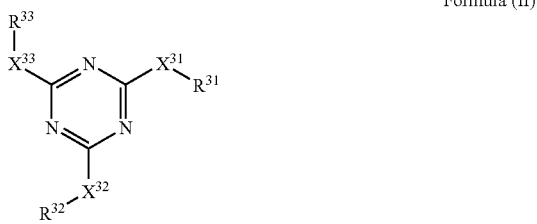

Formula (II)

wherein $X^{31}$ represents a single bond, —$NR^{34}$—, —O—, or —S—; $X^{32}$ represents a single bond, —$NR^{35}$—, —O—, or —S—; $X^{33}$ represents a single bond, —$NR^{10}$—, —O—, or —S—; $R^8$, $R^{32}$ and $R^{33}$ each independently represent an alkyl group, an alkenyl group, an aryl group, or a heterocyclic group; and $R^{34}$, $R^{35}$ and $R^{36}$ each independently represent a hydrogen atom, an alkyl group, an alkenyl group, an aryl group, or a heterocyclic group.

(5) The optical film according to the above (3) or (4), wherein the ultraviolet absorber is a compound represented by formula (III):

Formula (III)

wherein $Q_1$ and $Q_2$ each independently represent an aromatic ring; $X^{11}$ represents a substituent; $Y^{11}$ represents an oxygen atom, a sulfur atom, or a nitrogen atom; and $X^{11}Y^{11}$ may represent a hydrogen atom.

(6) The optical film according to the above (3) or (4), wherein the ultraviolet absorber is a compound represented by formula (IV):

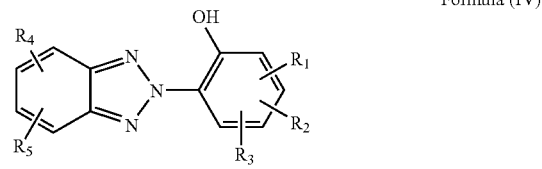

Formula (IV)

wherein $R_1$, $R_2$, $R_3$, $R_4$, and $R_5$ each independently represent a monovalent organic group or a halogen atom, and at least one of $R_1$, $R_2$, and $R_3$ is an unsubstituted, branched or straight-chain alkyl group having 10 to 20 carbon atoms in total.

(7) The optical film according to the above (3) or (4), which comprises an ultraviolet absorber represented by formula (V):

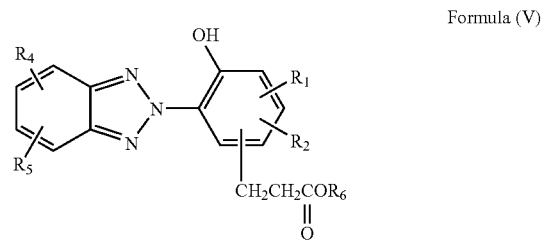

Formula (V)

wherein $R_1$, $R_2$, $R_4$, and $R_5$ each independently represent a monovalent organic group or a halogen atom, and $R_6$ represents a branched alkyl group.

(8) The optical film according to the above (6), wherein a ultraviolet absorber represented by the above formula (IV) in which at least one of $R_4$ and $R_5$ is a halogen atom, and a ultraviolet absorber represented by the above formula (IV) in which neither $R_4$ nor $R_5$ is a halogen atom are contained, and wherein the ratio by mass of the ultraviolet absorber having a halogen atom to the ultraviolet absorber having no halogen atom is in a range from 20:80 to 80:20.

(9) The optical film according to any one of the above (3) to (5), wherein the ultraviolet absorber is a benzophenone-series compound having a distribution coefficient of 3.0 or more.

(10) The optical film according to any one of the above (3) to (5) and (9), wherein the ultraviolet absorber is a benzophenone-series compound having a solidifying point of 20° C. or more.

(11) The optical film according to any one of the above (3), (4), and (6) to (8), wherein the ultraviolet absorber is a benzotriazole-series compound having a distribution coefficient of 9.2 or more.

(12) The optical film according to any one of the above (3), (4), (6) to (8), and (11), wherein the ultraviolet absorber is a benzotriazole-series compound having a solidifying point of less than 20° C.

(13) The optical film according to any one of the above (1) to (12), wherein the cellulose acylate is made of a cellulose acylate in which a hydroxyl group of the cellulose is partially substituted with an acetyl group or with an acyl group having 3 to 22 carbon atoms, and a substitution degree A of the acetyl group of the cellulose acylate and a substitution degree B of the acyl group having 3 to 22 carbon atoms of the cellulose acylate satisfy the following expression (3):

$2.0 \leq A+B \leq 3.0$      Expression (3)

(14) The optical film according to any one of the above (1) to (13), wherein the cellulose acylate is made of a cellulose acylate in which a hydroxyl group of the cellulose is partially substituted with an acetyl group or with an acyl group having 3 to 22 carbon atoms, and a substitution degree A of the acetyl group of the cellulose acylate and a substitution degree B of the acyl group having 3 to 22 carbon atoms of the cellulose acylate satisfy the following expressions (3) and (4):

$2.0 \leq A+B \leq 3.0$      Expression (3)

$0 < B$.      Expression (4)

(15) The optical film according to the above (13) or (14), wherein the acyl group having 3 to 22 carbon atoms is a butanoyl group or a propionyl group.

(16) The optical film according to any one of the above (1) to (15), wherein the cellulose acylate is one obtained by substituting a hydroxyl group of a glucose unit constituting the cellulose with an acyl group having 2 or more carbon atoms, and wherein when a degree of substitution of an acyl group for a hydroxyl group at the second position, a degree of substitution of an acyl group for a hydroxyl group at the third position, and a degree of substitution of an acyl group for a hydroxyl group at the sixth position in the glucose unit constituting the cellulose are designated to as DS2, DS3, and DS6, respectively, the following expressions (5) and (6) are satisfied:

$2.0 \leq DS2+DS3+DS6 \leq 3.0$      Expression (5)

$DS6/(DS2+DS3+DS6) \geq 0.315$      Expression (6)

(17) The optical film according to the above (16), wherein the acyl group is an acetyl group.

(18) A cellulose acetate film, comprising a cellulose acetate in which a substitution ratio at the sixth position which ratio is represented by the following expression (8) is 0.32 or more, and at least one retardation-increasing agent which has two or more aromatic rings and an octanol/water distribution factor of 1 or more and 6 or less, wherein the retardation-increasing agent is contained in an amount of 0.1% by mass to 20% by mass to the cellulose acetate:

(Substitution ratio at the sixth position)=(Degree of substitution at the sixth position)/{(Degree of substitution at the second position)+(Degree of substitution at the third position)+(Degree of substitution at the sixth position)}.      Expression (8)

(19) The cellulose acetate film according to the above (18), wherein the retardation-increasing agent is a compound represented by formula (I):

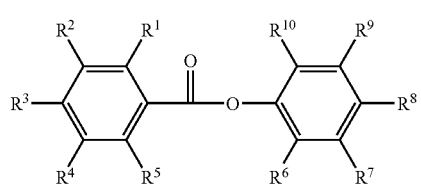

Formula (I)

wherein $R^1$, $R^2$, $R^3$, $R^4$, $R^5$, $R^6$, $R^7$, $R^9$ and $R^{10}$ each independently represent a hydrogen atom or a substituent, in which at least one of $R^1$, $R^2$, $R^3$, $R^4$ and $R^5$ represents an electron-donating group; $R^8$ represents a hydrogen atom, an alkyl group having 1 to 4 carbon atoms, an alkenyl group having 2 to 6 carbon atoms, an alkinyl group having 2 to 6 carbon atoms, an aryl group having 6 to 12 carbon atoms, an alkoxy group having 1 to 12 carbon atoms, an aryloxy group having 6 to 12 carbon atoms, an alkoxycarbonyl group having 2 to 12 carbon atoms, an acylamino group having 2 to 12 carbon atoms, an alkylcarbonyloxy group having 2 to 20 carbon atoms, a cyano group, or a halogen atom.

(20) The cellulose acetate film according to the above (19), wherein the electron-donating group in formula (I) is an alkoxy group.

(21) The cellulose acetate film according to the above (19), wherein the retardation-increasing agent represented by formula (I) is a retardation-increasing agent represented by the following formula (1-D):

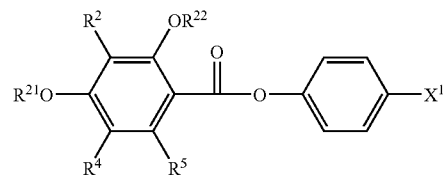

Formula (1-D)

wherein $R^2$, $R^4$, and $R^5$ each independently represent a hydrogen atom or a substituent; $R^{21}$ and $R^{22}$ each independently represent an alkyl group having 1 to 4 carbon atoms; and $X^1$ represents an aryl group having 6 to 12 carbon atoms, an alkoxycarbonyl group having 2 to 12 carbon atoms, an alkylcarbonyloxy group having 2 to 20 carbon atoms, or a cyano group.

(22) The optical film according to any one of the above (1) to (21), wherein a Re retardation value defined by the following expression (1) is 20 to 200 nm, and a Rth retardation value defined by the following expression (2) is 70 to 400 nm:

$Re=(nx-ny) \times d$      Expression (1)

$Rth=\{(nx+ny)/2-nz\} \times d$      Expression (2)

wherein nx is a refractive index in a direction of a slow axis (a phase retardation axis) within a surface of the film; ny is a refractive index in a direction of a fast axis (a phase advancing axis) within the surface of the film; nz is a refractive index in a direction of a thickness of the film; and d is the thickness of the film.

(23) The optical film according to any one of the above (1) to (22), wherein a ratio (Re/Rth) of the Re retardation value to the Rth retardation value is 0.1 to 0.8.

(24) The optical film according to the above (22), wherein the Re retardation value at a wavelength of 590 m is 20 to 200 nm, the Rth retardation value at a wavelength of 590 nm is 70 to 400 nm, and the ratio (Rth/Re) of the Rth retardation value to the Re retardation value is 1 to 10.

(25) The optical film according to any one of the above (1) to (24), wherein a difference (Re700−Re400) between the Re retardation value (Re700) at a wavelength of 700 nm and the Re retardation value (Re400) at a wavelength of 400 nm is −25 nm to 10 nm.

(26) The optical film according to any one of the above (1) to (25), wherein a difference (Rth700−Rth400) between the Rth retardation value (Rth700) at a wavelength of 700 nm and the Rth retardation value (Rth400) at a wavelength of 400 nm is −50 nm to 20 nm.

(27) The optical film according to any one of the above (1) to (26), wherein differences between the Re retardation value and the Rth retardation value measured in the circumstance of 25° C. and 10% RH and the Re retardation value and the Rth retardation value measured in the circumstance of 25° C. and 80% RH are within 25 nm and within 70 nm, respectively.

(28) The optical film according to any one of the above (1) to (27), wherein a variation of the above Re and Rth in the transverse direction each are within 5%.

(29) The optical film according to any one of the above (1) to (28), wherein the optical film is composed of only one cellulose acylate film having a film thickness of 20 μm to 160 μm.

(30) The optical film according to any one of the above (1) to (29), wherein a film thickness of the cellulose acetate film is 40 to 110 μm, and a variation of the film thickness in the transverse direction of the film is within 5%.

(31) The optical film according to any one of the above (1) to (30), which has a transmittance of 8% or less at a wavelength of 380 nm.

(32) The optical film according to any one of the above (1) to (31), which has a moisture permeability of 20 g/m$^2$·24 hr to 250 g/m$^2$·24 hr at 25° C. under 90% RH.

(33) The optical film according to any one of the above (1) to (32), which has a dimensional change within −0.15% in a 90° C. dry condition.

(34) The optical film according to any one of the above (1) to (33), which has a dimensional change in a range of −0.20% to +0.20% in conditions of 60° C. and 90% RH.

(35) The optical film according to any one of the above (1) to (34), which is composed of a cellulose acetate film having a surface energy of 55 to 75 mN/m.

(36) The optical film according to any one of the above (1) to (35), which has a reduction in polarization within 3% after lapse of time of 500 hours in an atmosphere of 60° C. and 95% RH, when the film is used as a polarizing plate protective film.

(37) The optical film according to any one of the above (1) to (36), which is composed of a cellulose acylate film produced by orienting at an orienting ratio of 3 to 100%.

(38) The optical film according to any one of the above (1) to (37), wherein the cellulose acylate is a cellulose acetate having a degree of acetylation of 59.0 to 61.5%, and wherein an amount of variation in Re/Rth is 0.01 to 0.1 per 1% of the orienting ratio.

(39) The optical film according to any one of the above (1) to (38), wherein a slow axis of the film forms an angle of 85° to 95° with a casting direction, and a variation in the above angle in the transverse direction is 5° or less.

(40) The optical film according to any one of the above (1) to (39), wherein the film is produced by orienting a cellulose acylate film in a direction perpendicular to the longitudinal direction with carrying the film in the longitudinal direction, wherein an amount of a residual solvent of the cellulose acylate film at the start of the orienting is 2% to 50%, and wherein a slow axis of the film is in a direction perpendicular to the lengthy direction of the film.

(41) The optical film according to any one of the above (1) to (40), wherein the number of foreign substances and/or coagulates is 0 to 50, when a film of the cellulose acylate is sampled to count the number of said foreign substances and/or coagulates 30 μm or more in size present in an area having a width of 30 cm and a length of 1 m on both sides of the resultant film.

(42) An optical compensation sheet, comprising the optical film according to any one of the above (1) to (41).

(43) A polarizing plate, comprising a polarizing film, and two transparent protective films disposed on both sides of the polarizing film, wherein at least one of the transparent protective films is the optical compensation sheet according to the above (42).

(44) The polarizing plate according to the above (43), which is provided with at least one layer selected from a hardcoat layer, an antiglare layer, and an antireflection layer, on a surface of the protective film formed on one side of the polarizing plate.

(45) A polarizing plate, comprising a polarizing film, and two transparent protective films disposed on both sides of the polarizing film, wherein at least one (preferably one) of the transparent protective films is the optical compensation sheet according to the above (42), and the transparent protective film on the opposite side of said optical compensation sheet is provided with an antireflection layer which is prepared by laminating at least a light scattering layer and a low-refractive-index layer and has a mirror reflectance of 2.5% or less.

(46) A polarizing plate, comprising a polarizing film, and two transparent protective films disposed on both sides of the polarizing film, wherein at least one (preferably one) of the transparent protective films is the optical compensation sheet according to the above (42), and the transparent protective film on the opposite side of the optical compensation sheet is provided with an antireflection layer which is prepared by laminating at least a middle-refractive index layer, a high-refractive index layer and a low-refractive index layer in this order and has a mirror reflectance of 0.5% or less.

(47) A liquid crystal display device, comprising a liquid crystal cell, and two polarizing plates disposed on both sides of the liquid crystal cell, wherein at least one of the polarizing plates is the polarizing plate according to any of the above (43) to (46).

(48) A liquid crystal display device according to the above (47), wherein a liquid crystal mode is an OCB or VA mode.

(49) A VA-mode liquid crystal display device, wherein the polarizing plate according to any one of the above (43) to (46) is used on the backside of a cell.

(50) A liquid crystal display device, comprising a liquid crystal cell, and two polarizing plates disposed on both sides of the liquid crystal cell, said polarizing plate comprising a polarizing film and two transparent protective films disposed on both sides of the polarizing film, wherein the optical compensation sheet according to the above (42) is disposed between the liquid crystal cell and at least one polarizing film, and a slow axis of the optical compensation sheet and a transmission axis of the polarizing film adjacent to the optical compensation sheet are arranged in substantially parallel to each other.

(51) A VA-mode liquid crystal display device, comprising a liquid crystal cell, and two polarizing plates disposed on both sides of the liquid crystal cell, said polarizing plate comprising a polarizing film and two transparent protective films disposed on both sides of the polarizing film, wherein the optical compensation sheet according to the above (42) is disposed between the liquid crystal cell and at least one polarizing film, and a slow axis of the optical compensation sheet and a transmission axis of the polarizing film adjacent to the optical compensation sheet are arranged in substantially parallel to each other.

(52) A VA-mode liquid crystal display device, comprising a liquid crystal cell, and two polarizing plates disposed on both sides of the liquid crystal cell, said polarizing plate comprising a polarizing film and two transparent protective films disposed on both sides of the polarizing film, wherein the optical compensation sheet according to the above (42) is disposed between the liquid crystal cell and the polarizing film of the back-light side, and a slow axis of the optical compensation sheet and a transmission axis of the polarizing film adjacent to the optical compensation sheet are arranged in substantially parallel to each other.

(53) A VA-mode liquid crystal display device, comprising a liquid crystal cell, and two polarizing plates disposed on both sides of the liquid crystal cell, said polarizing plate comprising a polarizing film and two transparent protective films disposed on both sides of the polarizing film, wherein the optical compensation sheet according to the above (42) is disposed between the liquid crystal cell and the polarizing film of the observer side and between the liquid crystal cell and the polarizing film of the back-light side, respectively, and a slow axis of the cellulose acylate film and a transmission axis of the polarizing film adjacent to the cellulose acylate film are arranged in substantially parallel to each other.

(54) A VA-mode liquid crystal display device, comprising a liquid crystal cell, and two polarizing plates disposed on both sides of the liquid crystal cell, said polarizing plate comprising a polarizing film and two transparent protective films disposed on both sides of the polarizing film, wherein the optical compensation sheet according to the above (42) is disposed either between the liquid crystal cell and the polarizing film of the observer side or between the liquid crystal cell and the polarizing film of the back-light side, and a slow axis of the cellulose acylate film and a transmission axis of the polarizing film adjacent to the cellulose acylate film are arranged in substantially parallel to each other.

Herein, the optical film referred to in the present invention means a film having an optical function. Examples of the optical film include a film having one or more layer(s) having an optical function, such as antireflection, selective reflection, light phase conversion, and optical compensation.

Hereinafter, a first embodiment of the present invention means to include the optical films described in the items (1) to (2) above and the items (13) to (17) and (22) to (41) depending therefrom.

A second embodiment of the present invention means to include the optical films described in the items (3) to (12) above and the items (13) to (17) and (22) to (41) depending therefrom.

A third embodiment of the present invention means to include the optical films described in the items (18) to (21) above and the items (22) to (41) depending therefrom.

A fourth embodiment of the present invention means to include the optical compensation sheet described in the item (42) above.

A fifth embodiment of the present invention means to include the polarizing plates described in the items (43) to (46) above.

A sixth embodiment of the present invention means to include the liquid crystal display devices described in the items (47) to (54) above.

Herein, the present invention means to include all of the above first, second, third, fort, fifth, and sixth embodiments, unless otherwise specified.

In the following description, the term "cellulose acetate" may be used in some cases in place of the term "cellulose acylate", as an example of a cellulose acylate, unless otherwise specified.

BEST MODE FOR CARRYING OUT THE INVENTION

The present invention is described below in more detail.

The inventors of the present invention have found that, to increase the increment of the Re/Rth value vs the orienting ratio in the case of attaining an optimum Re value and Rth value by a tenter orienting method as described above, the increment of the Re/Rth value vs the orienting ratio can be increased by using a disk-like compound, as described in the above European Patent Application Publication No. 0911656A2, and a compound represented by formula (I), together as additives. The inventors have also found that an optical compensation sheet having an optical performance that cannot be attained by conventional methods, can be obtained. The present invention was thus attained based on these findings.

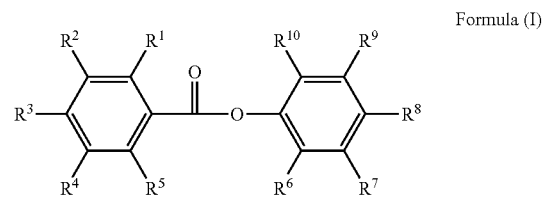

Formula (I)

In the formula, $R^1$, $R^2$, $R^3$, $R^4$, $R^5$, $R^6$, $R^7$, $R^9$ and $R^{10}$ each independently represent a hydrogen atom or a substituent, in which at least one of $R^1$, $R^2$, $R^3$, $R^4$ and $R^5$ represents an electron-donating group; $R^1$ represents a hydrogen atom, an alkyl group having 1 to 4 carbon atoms, an alkenyl group having 2 to 6 carbon atoms, an alkinyl group having 2 to 6 carbon atoms, an aryl group having 6 to 12 carbon atoms, an alkoxy group having 1 to 12 carbon atoms, an aryloxy group having 6 to 12 carbon atoms, an alkoxycarbonyl group having 2 to 12 carbon atoms, an acylamino group having 2 to 12 carbon atoms, an alkylcarbonyloxy group having 2 to 20 carbon atoms, a cyano group, or a halogen atom.

The inventors of the present invention, having made earnest studies, have, as a result, found that a uniform cellulose acetate film having a high retardation value can be obtained, by adding a highly anisotropic low-molecular compound that is highly hydrophilic and highly compatible with cellulose acetate, to a cellulose acetate having a fixed degree of acetyl substitution or below. Accordingly, the present invention relates to:

A cellulose acetate film, comprising: a cellulose acetate having an acetyl substitution degree at the sixth position, as represented by the following equation (1), of 0.32 or more; and at least one retardation-increasing agent having two or more aromatic rings, and having an octanol/water distribution coefficient of 1 or more and 6 or less, wherein the retardation-increasing agent is contained in an amount of 0.1% by mass or more and 20% by mass or less, to the cellulose acetate. The present invention also relates to a polarizing plate using the film, and to a liquid crystal display using the film.

(Substitution ratio at the sixth position)=(Degree of substitution at the sixth position)/{(Degree of substitution at the second position)+(Degree of substitution at the third position)+(Degree of substitution at the sixth position)}     Equation (I)

(Retardation of a Film)

In the present invention, the Re retardation value and Rth retardation value of the optical film (hereinafter, which may be referred to as a "cellulose acylate film," in some cases) containing a cellulose acylate, are defined by the following expressions (1) and (2), respectively.

$$Re=(nx-ny) \times d \qquad \text{Expression (1)}$$

$$Rth=\{(nx+ny)/2-nz\} \times d \qquad \text{Expression (2)}$$

In the expressions (1) and (2), nx is a refractive index in the direction of the slow axis, in which a maximum refractive index is obtained, within the surface of the film.

In the expressions (1) and (2), ny is a refractive index in the direction of the fast axis, in which a minimum refractive index is obtained, within the surface of the film.

In the expression (2), nz is a refractive index in the direction of the thickness of the film.

In the expressions (1) and (2), d is the thickness (unit: nm) of the film.

Herein, the Re($\lambda$) and the Rth($\lambda$) indicate the in-plane retardation and the retardation in the direction of the thickness at a wavelength $\lambda$, respectively. The Re($\lambda$) is measured by making light having a wavelength of $\lambda$ nm incident in the direction of the normal of the film in KOBRA 21ADH (trade name, manufactured by Oji Scientific Instruments). The Rth ($\lambda$) is calculated by KOBRA 21ADH based on the retardation values measured in total three directions, these retardation values including the above Re($\lambda$), the retardation value measured by allowing light having a wavelength of $\lambda$ nm to be incident from a direction inclined at an angle of +40° with the direction of the normal of the film by adopting the slow axis (which is determined by the KOBRA 21ADH) within the surface as a slant axis (rotation axis), and the retardation value measured by allowing light having a wavelength of $\lambda$ nm to be incident from a direction inclined at an angle of -40° with the direction of the normal of the film by adopting the slow axis within the surface as a slant axis (rotation axis). Herein, as the hypothetical value of the average refractive index, the values described in "Polymer Handbook" (JOHN WILEY & SONS, INC) and the values described in the catalogues of various optical films may be used. The average refractive index of cellulose acylate is 1.48. KOBRA 21ADH calculates nx, ny and nz, by inputting these hypothetical values of the average refractive index and the film thickness.

In the present invention, it is preferable that the Re retardation value of the cellulose acylate film be adjusted to 20 to 200 nm and the Rth retardation value be adjusted to 70 to 400 nm. Also, in the present invention, it is preferable that the Re/Rth ratio be adjusted to 0.1 to 0.8. The Re retardation value is more preferably 25 to 100 nm and still more preferably 30 to 80 nm. The Rth retardation value is more preferably 90 to 350 nm and still more preferably 110 to 320 nm. It is particularly preferable to adjust the Re retardation value to 20 to 70 nm, the Rth retardation value to 90 to 300 nm, and the Re/Rth ratio to 0.25 to 0.8. It is even more preferable to adjust the Re retardation value to 30 to 70 nm, the Rth retardation value to 90 to 200 nm, and the Re/Rth ratio to 0.25 to 0.6. Also, the Rth/Re ratio is preferably 1 or more and 10 or less and more preferably 2 or more and 9 or less. These adjustments may be accomplished by properly selecting the type and amount of the rod-like compound, the type and amount of the disk-like compound, and the orienting ratio.

In the present invention, it is possible to control a variation of Re/Rth per 1% of the orienting ratio to 0.01 to 0.1. Here, the variation in Re/Rth per 1% of the orienting ratio may be found from the gradient of the line obtained when each Re/Rth ratio vs at least three orienting ratios of each 5% or more is primarily approximated.

Variations in Re and Rth in the transverse direction of the film are respectively preferably within 5%.

Also, the slow axis of the film preferably forms an angle of 85° or more and 95° or less with a casting direction, and a variation in angle in the transverse direction is preferably 5° or less.

The birefringence index (nx-ny) of the cellulose acylate film is preferably in the range of 0.0002 to 0.0009, more preferably in the range of 0.00025 to 0.0009, and most preferably in the range of 0.00035 to 0.0009. The birefringence index {(nx+ny)/2-nz} of the cellulose acylate film in the thickness direction is preferably in the range of 0.0006 to 0.005, more preferably in the range of 0.0008 to 0.005, and most preferably in the range of 0.0012 to 0.005.

(Cellulose Acylate Film)

Next, the cellulose acylate that can be used in the present invention will be explained in detail. In the present invention, two or more cellulose acylates differing from each other may be mixed prior to use.

Further, the cellulose acylate preferably comprises a cellulose acylate in which a hydroxyl group in the cellulose is substituted with an acetyl group or an acyl group having 3 to 22 carbon atoms, and the degree A of substitution with the acetyl group and the degree B of substitution with the acyl group having 3 to 22 carbon atoms in the cellulose acylate preferably satisfy the following expression (3).

$$2.0 \leq A+B \leq 3.0 \qquad \text{Expression (3)}$$

The aforementioned cellulose acylate is preferably a mixed fatty acid ester of a cellulose obtained by substituting a hydroxyl group with an acetyl group and a cellulose obtained by substituting a hydroxyl group with an acyl group having 3 to 22 carbon atoms, and the degree of substitution for a hydroxyl group of the cellulose satisfies the following expressions (3) and (4).

$$2.0 \leq A+B \leq 3.0 \qquad \text{Expression (3)}$$

$$0<B \qquad \text{Expression (4)}$$

Here, A and B in the expressions represent the degree of substitution of an acyl group for a hydroxyl group of the cellulose, wherein A represents the degree of substitution of an acetyl group and B represents the degree of substitution of an acyl group having 3 to 22 carbon atoms.

Each of the glucose units, which constitute cellulose by bonding through $\beta$-1,4-glycoside bond, has free hydroxyl groups at the 2-, 3-, and 6-positions thereof. Cellulose acylate for use in the present invention is a polymer obtained by esterifying a part or the whole of these hydroxyl groups with acyl groups. Herein, a substitution degree means the rate of esterification at the 2-, 3-, or 6-positions in the cellulose, and the total substitution degree means the sum thereof. Specifically, the 100% esterification of any one of the 2-, 3-, and 6-positions is a substitution degree of 1.

In the invention, the sum (A+B) of the degrees A and B of substitution for a hydroxyl group is generally 2.0 to 3.0, preferably 2.2 to 2.9 and particularly preferably 2.40 to 2.85, as shown in the above expression (3). Also, the degree B of substitution is preferably 0 or more and more preferably 0.6 or more, as shown in the above expression (4).

When A+B is less than 2.0, the hydrophilic characteristics of the film are strengthened and the film tends to be affected by environmental moisture.

Moreover, it is preferable that 28% or more of B be the degree of substitution for a hydroxyl group at the sixth position. It is more preferable that 30% or more of B be the degree of substitution at the sixth position. It is still more preferable that 31% or more of B be the degree of substitution for a hydroxyl group at the sixth position. It is particularly preferable that 32% or more of B be the degree of substitution at the sixth position.

Also, the sum of the degrees A and B of substitutions at the sixth position of the cellulose acylate is preferably 0.75 or more, more preferably 0.80 or more and particularly preferably 0.85 or more. The cellulose acylate film ensures that it is possible to produce a solution for the preparation of a film which has good solubility and filterability and also to produce a solution having a low viscosity and hence good filterability in a non-chlorine type organic solvent.

Also, in the case where the cellulose acylate film is a protective film disposed on the liquid crystal cell side of the polarizing plate, when the degree of substitution of an acyl group for a lydroxyl group at the second position, the degree of substitution of an acyl group for a hydroxyl group at the third position, and the degree of substitution of an acyl group for a hydroxyl group at the sixth position in the glucose unit constituting the cellulose are DS2, DS3, and DS6, respectively, the following expressions (5) and (6) are preferably satisfied:

$$2.0 \leq DS2 + DS3 + DS6 \leq 3.0 \qquad \text{Expression (5)}$$

$$DS6/(DS2 + DS3 + DS6) \geq 0.315 \qquad \text{Expression (6)}$$

When the above expressions (5) and (6) are satisfied, it becomes easy to control the optical performances of the film in a preferable range and this is therefore preferable.

Further, the value of "DS2+DS3+DS6" may be referred to as an acetyl substitution degree, and the value of "DS6/(DS2+DS3+DS6)" may be referred to as a sixth position's substitution degree, according to the need.

When, in a film constituted of a cellulose acylate obtained by substituting an acyl group having 2 or more carbon atoms for a hydroxyl group of the cellulose, the degree of substitution of an acyl group at the second position is DS2, the degree of substitution of an acyl group at the third position is DS3, and the degree of substitution of an acyl group at the sixth position is DS6, the following expressions (5) and (7) are preferably fulfilled.

$$2.0 \leq DS2 + DS3 + DS6 \leq 3.0 \qquad \text{Expression (5)}$$

$$DS6/(DS2 + DS3 + DS6) \geq 0.320 \qquad \text{Expression (7)}$$

Next, the cellulose acylate that can be used in the present invention will be explained in detail.

In the present invention, as the cellulose acylate, a cellulose acetate is preferably used, and a cellulose acetate of which the degree of substitution at the sixth position, as represented by the following expression (8), is 0.32 or more is more preferable.

(Substitution ratio at the sixth position)=(Degree of
substitution at the sixth position)/{(Degree of
substitution at the second position)+(Degree of
substitution at the third position)+(Degree of
substitution at the sixth position)}     Expression (8)

The total acyl substitution degree, namely, D2+D3+D6, is preferably 2.00 to 3.00, more preferably 2.22 to 2.90, and particularly preferably 2.40 to 2.82. Also, D6/(D2+D3+D6) is preferably 0.32 or more, more preferably 0.322 or more, and particularly preferably 0.324 to 0.340.

In the present invention, the sum of the degrees A and B of substitution for a hydroxyl group is more preferably 2.2 to 2.86 and particularly preferably 2.40 to 2.80. The degree B of substitution is generally 1.50 or more and particularly preferably 1.7 or more. Further, 28% or more of B is preferably the degree of substitution at the sixth position, 30% or more of B is more preferably the degree of substitution at the sixth position, 31% of B is still more preferably the degree of substitution at the sixth position, and 32% or more of B is particularly preferably the degree of substitution at the sixth position. Also, a cellulose acylate film in which the sum of the degrees A and B of substitution at the sixth position of a cellulose acylate is generally 0.75 or more, preferably 0.8 or more and particularly 0.85 or more may be exemplified. The cellulose acylate film ensures that it is possible to produce a solution for the preparation of a film which film has good solubility and also to produce a solution having a low viscosity and hence good filterability in the case of, particularly, non-chlorine type organic solvents.

The substituent on the hydroxyl group on the cellulose is preferably an acetyl group. Further, the acyl group having 2 or more carbon atoms which substitutes the hydroxyl group in the cellulose, is not particularly limited, and may be an aliphatic group or an aryl group. Examples of the cellulose acylate having the acyl group include alkylcarbonyl esters, alkenylcarbonyl esters, aromatic carbonyl esters, and aromatic alkylcarbonyl esters of cellulose. These may further have a substituent. Preferable examples of the acyl group having 3 to 22 carbon atoms include propionyl, butanoyl, heptanoyl, hexanoyl, octanoyl, decanoyl, dodecanoyl, tridecanoyl, tetradecanoyl, hexadecanoyl, octadecanoyl, iso-butanoyl, t-butanoyl, cyclohexanecarbonyl, oleoyl, benzoyl, naphthylcarbonyl, and cinnamoyl groups. Of these groups, propionyl, butanoyl, dodecanoyl, octadecanoyl, t-butanoyl, oleoyl, benzoyl, naphthylcarbonyl, and cinnamoyl groups are more preferred. Propionyl and butanoyl are particularly preferred. When a propionyl group is employed as the acyl group having 3 to 22 carbon atoms, the substitution degree B is preferably 1.3 or more.

As the above mixed aliphatic acid cellulose acylate, specifically, cellulose acetate propionate, and cellulose acetate butylate can be mentioned.

(Synthetic Method of a Cellulose Acylate)

A basic principle of the synthesis method of cellulose acylate is described in Migita et al., "Wood Chemistry", pages 180-190 (published by Kyoritsu Shuppan Co., Ltd. in 1968). A typical synthesis method thereof is a liquid-phase acetylating method by use of carboxylic acid anhydride/acetic acid/a sulfuric acid catalyst.

Specifically, to obtain the cellulose acylate, a cellulose material such as cotton linter or wood pulp is subjected to pre-treatment with an appropriate amount of acetic acid, and then a carboxylic acid mixed liquid which is beforehand cooled is poured into the pre-treated solution to esterify the cellulose, thereby synthesizing complete cellulose acylate (the total of the acyl substitution degrees at the 2-, 3- and 6-positions is about 3.00). The carboxylic acid mixed liquid generally contains acetic acid as a solvent, carboxylic acid anhydride as an esterification agent, and sulfuric acid as a catalyst. The carboxylic acid anhydride is usually used in a stoichiometrically excessive amount over the total amount of cellulose which reacts with the anhydride and water present in the present system. After the completion of esterification reaction, an aqueous solution of a neutralizing agent (such as a carbonate, an acetate or an oxide of calcium, magnesium, iron, aluminum or zinc) is added to the system, to hydrolyze excessive carboxylic acid anhydride which remains in the system and neutralize a part of the esterifying catalyst which remains in the system. Then, the resultant complete cellulose acylate is kept at 50 to 90° C., in the presence of a small amount of an acetylation reaction catalyst, which is generally a remaining sulfuric acid. In this way, the cellulose acylate is saponified and ripened so as to be converted to a cellulose acylate having a desired acyl substitution degree and a desired polymerization degree. When the desired cellulose acylate is obtained, the cellulose acylate solution is poured into water or dilute sulfuric acid (or water or dilute sulfuric acid is poured into the cellulose acylate solution) with or without neutralizing the catalyst remaining in the system with a neutralizing agent as described above, thereby separating the cellulose acylate. This is washed and subjected to stabilizing treatment, to yield the specific cellulose acylate as mentioned in the above.

Preferably, the cellulose acylate film is composed substantially of the specific cellulose acylate above, as a polymer component to constitute the film. The term "substantially" referred to herein means that generally 55% or more, preferably 70% or more, more preferably 80% or more by mass of the polymer components is composed of the cellulose acylate above.

The cellulose acylate is preferably used in the form of particles. It is preferable that 90% or more by mass of the particles has a particle diameter of 0.5 to 5 mm, and 50% or more by mass of the particles has a particle diameter of 1 to 4 mm. The shapes of the cellulose acylate particles are preferably made as completely spherical as possible.

The polymerization degree (viscosity average) of a cellulose acylate that can be preferably used in the present invention is generally from 200 to 700, preferably from 250 to 550, further preferably from 250 to 500, further more preferably from 250 to 400, and particularly preferably from 250 to 350. The average polymerization degree can be measured by a limiting viscosity method by Uda et al., (Kazuo Uda and Hideo Saito, "The Journal of the Society of Fiber Science and Technology, Japan", vol. 18, No. 1, pp. 105-120, 1962). The method is also described in detail in JP-A-9-95538.

If low molecular mass components are removed from the cellulose acylate, the average molecular mass (polymerization degree) thereof becomes higher. However, the viscosity thereof becomes lower than that of ordinary cellulose acylate. Thus, the removal is useful. Cellulose acylate containing low molecular mass components at a small ratio can be obtained by removing the low molecular mass components from cellulose acylate synthesized by an ordinary method. The removal of the low molecular mass components can be carried out by washing the cellulose acylate with an appropriate organic solvent. When the cellulose acylate containing a small amount of the low molecular mass components is produced, the amount of the sulfuric acid catalyst in the acetylation reaction is preferably adjusted to 0.5 to 25 parts by mass to 100 parts by mass of the cellulose acylate. When the amount of the sulfuric acid catalyst is set into this range, cellulose acylate having a preferable molecular mass distribution (uniform molecular mass distribution) can be synthesized. In the case that the cellulose acylate is used when the cellulose acylate film of the present invention is produced, the percentage of water content in the cellulose acylate is preferably 2% or less, more preferably 1% or less, even more preferably 0.7% or less by mass. It is known that cellulose acylate generally contains 2.5 to 5% by mass of water. Thus, in order to set the percentage of water content in the cellulose acylate in the present invention within this range, it is necessary to dry ordinary cellulose acylate. The method for the drying is not particularly limited as far as the target percentage of water content can be obtained.

About the cellulose acylate used in the present invention, the starting cotton thereof, and the synthesis method thereof are described in detail in "Kokai Giho of Japan Institute of Invention & Innovation" (Kogi No. 2001-1745, published on Mar. 15, 2001), pp. 7-12.

The cellulose ester for use in the present invention preferably has a narrow molecular mass distribution in terms of Mw/Mn (Mw is a mass average molecular mass and Mn is a number average molecular mass) as measured by gel permeation chromatography. Specifically, the value of Mw/Mn is preferably from 1.5 to 5.0, more preferably from 2.0 to 4.5, and most preferably from 3.0 to 4.0.

As the acyl group of the cellulose acylate film, an acetyl group, propionyl group or butyryl group is preferably used, and an acetyl group is particularly preferably used, though there is no particular limitation to the acyl group. The degree of substitution of all acyl groups is preferably 1.5 to 3.0, more preferably 2.7 to 3.0 and particularly preferably 2.8 to 2.95. Herein, the degree of substitution of an acyl group is a value calculated according to ASTM D817.

It is most preferable that the acyl group be an acetyl group. When a cellulose acetate containing an acetyl group as the acyl group is used, the degree of acetylation is preferably 59.0 to 62.5% and more preferably 59.0 to 61.5%. When the degree of acetylation is in this range, the Re is not larger than a desired value by a conveyance tension at the time of casting, the in-plane dispersion of Re is decreased, and a variation in retardation value as a function of temperature and humidity is not increased.

The degree of substitution of an acyl group at the sixth position is preferably 0.9 or more, from the viewpoint of suppressing the dispersions of Re and Rth.

The cellulose acylate film according to the present invention may be obtained by forming a film using a solution prepared by dissolving the aforementioned specific cellulose acylate and, as required, an additive(s), in an organic solvent.

(Retardation-controlling Agent)

In the present invention, the compound represented by formula (I) and the cyclic compound having at least three substituents are generally used in combination, and added to a cellulose ester film. The cyclic compound having at least three substituents, and the compound represented by formula (I) can each have a function as a retardation-increasing agent for a cellulose ester film.

Herein, as the cyclic compound having at least three substituents, aromatic compounds having at least two aromatic rings are preferable, and a compound having 1,3,5-triazine ring represented by formula (II) can be preferably used. Alternately, a compound having a porphyrin skeleton may be preferably used. Particularly, the compounds described in JP-A-2001-166144 are preferably used.

Alternately, in the present invention, at least one of the compound represented by formula (I) or the compound having a 1,3,5-triazine ring can be added in an amount of 0.01 to 20 mass parts to 100 mass parts of the cellulose acylate. The compound represented by formula (I) or the compound having a 1,3,5-triazine ring is added in an amount of more preferably 0.1 to 20 mass parts, and particularly preferably 0.5 to 20 mass parts, to 100 mass parts of the cellulose acylate. Both the compound represented by formula (I) and the compound having a 1,3,5-triazine ring can function as a retardation-increasing agent for a cellulose acylate film.

Herein, as the compound having a 1,3,5-trizine ring, particularly the compounds described in JP-A-2001-166144 are preferably used.

The retardation-increasing agent used in the present invention is preferably one having at least two aromatic rings and an octanol/water distribution factor (hereinafter referred to as "log P") of 1 or more and 6 or less.

As the retardation-increasing agent used in the present invention, a compound which has high compatibility with the cellulose acetate and a large polarization anisotropy is preferable.

Specifically, the log P is generally 1 or more and 6 or less, and preferably 2 or more and 5 or less. When the log P is too high, there is a problem as to the in-plane uniformity of retardation because the compatibility of the agent with the cellulose acetate is insufficient. On the other hand, when the log P is too low, the retentivity under high humidity is decreased.

In the present invention, the octanol/water distribution factor (log P) may be defined by the following expression:

$$\log P = \Sigma(mi \times \log Pi)$$

wherein:

mi: a mass percentage of an ith low molecular compound, based on the total amount of the low-molecular compounds to be added;

log Pi: log P of the ith low-molecular compound.

As the log P value in the present invention, besides the actually measured distribution factor between water/butanol, a value calculated based on the retention time of liquid chromatography, or a calculated value by a commercially available electronic computer program may be used. As the log P value of a low-molecular compound in the present invention, the value calculated using the log P calculating program developed by Daylight Information System may be used.

As the retardation-increasing agent for use in the present invention, a compound represented by the following formula (I) is particularly preferable.

The compound represented by formula (I) will be explained in detail below.

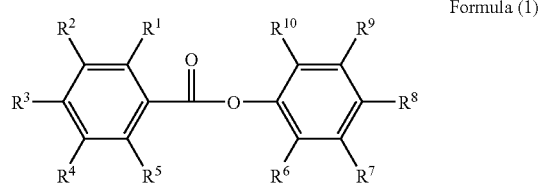

Formula (1)

In the formula, $R^1$, $R^2$, $R^3$, $R^4$, $R^5$, $R^6$, $R^7$, $R^9$, and $R^{10}$ each independently represent a hydrogen atom or a substituent, and at least one of $R^1$, $R^2$, $R^3$, $R^4$ and $R^5$ represents an electron-donating group. $R^8$ represents a hydrogen atom, an alkyl group having 1 to 4 carbon atoms, an alkynyl group having 2 to 6 carbon atoms, an aryl group having 6 to 12 carbon atoms, an alkoxy group having 1 to 12 carbon atoms, an aryloxy group having 6 to 12 carbon atoms, an alkoxycarbonyl group having 2 to 12 carbon atoms, an acylamino group having 2 to 12 carbon atoms, an alkylcarbonyloxy group having 2 to 20 carbon atoms, a cyano group, or a halogen atom.

In formula (I), $R^1$, $R^2$, $R^3$, $R^4$, $R^5$, $R^6$, $R^7$, $R^9$, and $R^{10}$ each independently represent a hydrogen atom, or a substituent; as the substituent, examples enumerated for the substituent T, which will be described later, can be used.

At least one of $R^1$, $R^2$, $R^3$, $R^4$, and $R^5$ represents an electron-donating group. Preferably, at least one of $R^1$, $R^3$, and $R^5$ represents an electron-donating group, and more preferably $R^3$ represents an electron-donating group.

The term "electron-donating group" means a group having a Hammet's $\sigma_p$ value of 0 or less, and used can be made preferably of a group having a Hammet's $\sigma_p$ value of 0 or less, as described in Chem. Rev., 91, 165 (1991), more preferably those having −0.85 to 0. For example, an alkyl group, an alkoxy group, an amino group, and a hydroxyl group can be enumerated.

The electron-donating group is preferably an alkyl group, or an alkoxy group, more preferably an alkoxy group (preferably an alkoxy group having 1 to 12 carbon atoms, more preferably having 1 to 8 carbon atoms, further more preferably having 1 to 6 carbon atoms, and particularly preferably having 1 to 4 carbon atoms).

$R^1$ is preferably a hydrogen atom or an electron-donating group, more preferably an alkyl group, an alkoxy group, an amino group, or a hydroxyl group, more preferably an alkyl group having 1 to 4 carbon atoms, or an alkoxy group having 1 to 12 carbon atoms, further preferably an alkoxy group (an alkoxy group having 1 to 12 carbon atoms, more preferably having 1 to 8 carbon atoms, further preferably having 1 to 6 carbon atoms, and particularly preferably having 1 to 4 carbon atoms), and most preferably a methoxy group.

$R^2$ is preferably a hydrogen atom, an alkyl group, an alkoxy group, an amino group, or a hydroxy group; more preferably a hydrogen atom, an alkyl group, or an alkoxy group; further more preferably a hydrogen atom, an alkyl group (preferably an alkyl group having 1 to 4 carbon atoms, more preferably a methyl group), or an alkoxy group (preferably an alkoxy group having 1 to 12 carbon atoms, more preferably having 1 to 8 carbon atoms, further more preferably 1 to 6 carbon atoms, and particularly preferably 1 to 4 carbon atoms). $R^2$ is particularly preferably a hydrogen atom, a methyl group, or a methoxy group.

$R^3$ is preferably a hydrogen atom or an electron-donating group, more preferably a hydrogen atom, an alkyl group, an alkoxy group, an amino group, or a hydroxyl group, further more preferably an alkyl group, or an alkoxy group, particularly preferably an alkoxy group (preferably an alkoxy group having 1 to 12 carbon atoms, more preferably having 1 to 8 carbon atoms, further more preferably having 1 to 6 carbon atoms, and particularly preferably 1 to 4 carbon atoms). $R^3$ is particularly preferably a n-propoxy group, an ethoxy group, or a methoxy group.

$R^4$ is preferably a hydrogen atom or an electron-donating group, more preferably a hydrogen atom, an alkyl group, an alkoxy group, an amino group, or a hydroxyl group, further more preferably a hydrogen atom, an alkyl group having 1 to 4 carbon atoms, an alkoxy group having 1 to 12 carbon atoms (preferably an alkoxy group having 1 to 12 carbon atoms, more preferably having 1 to 8 carbon atoms, further more preferably having 1 to 6 carbon atoms, and particularly preferably 1 to 4 carbon atoms), particularly preferably a hydrogen atom, an alkyl group having 1 to 4 carbon atoms, an alkoxy group having 1 to 4 carbon atoms, and most preferably a hydrogen atom, a methyl group, or a methoxy group.

$R^5$ is preferably a hydrogen atom, an alkyl group, an alkoxy group, an amino group, or a hydroxyl group, more preferably a hydrogen atom, an alkyl group, or an alkoxy group, further more preferably a hydrogen atom, an alkyl group (preferably an alkyl group having 1 to 4 carbon atoms, and more preferably a methyl group), an alkoxy group (preferably an alkoxy group having 1 to 12 carbon atoms, more preferably having 1 to 8 carbon atoms, further more preferably having 1 to 6 carbon atoms, and particularly preferably having 1 to 4 carbon atoms). $R^5$ is particularly preferably a hydrogen atom, a methyl group, or a methoxy group.

$R^6$, $R^7$, $R^9$, and $R^{10}$ each independently represent preferably a hydrogen atom, an alkyl group having 1 to 12 carbon atoms, an alkoxy group having 1 to 12 carbon atoms, or a halogen atom, more preferably a hydrogen atom, or a halogen atom (e.g. chlorine, bromine, or iodine atom), further more preferably a hydrogen atom.

$R^8$ is a hydrogen atom, an alkyl group having 1 to 4 carbon atoms, an alkenyl group having 2 to 6 carbon atoms, an alkynyl group having 2 to 6 carbon atoms, an aryl group having 6 to 12 carbon atoms, an alkoxy group having 1 to 12 carbon atoms, an aryloxy group having 6 to 12 carbon atoms, an alkoxycarbonyl group having 2 to 12 carbon atoms, an acylamino group having 2 to 12 carbon atoms, an alkylcarbonyloxy group having 2 to 20 carbon atoms (preferably an alkylcarbonyloxy group having 2 to 10 carbon atoms and further preferably having 2 to 5 carbon atoms), a cyano group, or a halogen atom, each may optionally have a substituent if its structure allows; as the substituent, examples enumerated for the substituent T, which will be explained later, can be used.

$R^8$ is preferably an alkyl group having 1 to 4 carbon atoms, an alkynyl group having 2 to 6 carbon atoms, an aryl group having 6 to 12 carbon atoms, an alkoxy group having 1 to 12 carbon atoms, or an aryloxy group having 6 to 12 carbon atoms, more preferably an aryl group having 6 to 12 carbon atoms, an alkoxy group having 1 to 12 carbon atoms, or an aryloxy group having 6 to 12 carbon atoms, further preferably an alkoxy group having 1 to 12 carbon atoms (preferably an alkoxy group having 1 to 12 carbon atoms, more preferably having 1 to 8 carbon atoms, further more preferably having 1 to 6 carbon atoms, and particularly preferably having 1 to 4 carbon atoms), and particularly preferably a methoxy group, an ethoxy group, an n-propoxy group, an iso-propoxy group, or an n-butoxy group.

The compound represented by formula (I) is preferably a compound represented by formula (1-A):

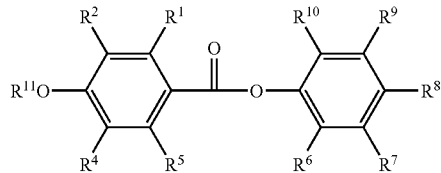

Formula (1-A)

wherein, $R^{11}$ represents an alkyl group. $R^1$, $R^2$, $R^4$, $R^5$, $R^6$, $R^7$, $R^9$, and $R^{10}$ each independently represent a hydrogen atom, or a substituent. $R^1$ represents a hydrogen atom, an alkyl group having 1 to 4 carbon atoms, an alkenyl group having 2 to 6 carbon atoms, an alkynyl group having 2 to 6 carbon atoms, an aryl group having 6 to 12 carbon atoms, an alkoxy group having 1 to 12 carbon atoms, an aryloxy group having 6 to 12 carbon atoms, an alkoxycarbonyl group having 2 to 12 carbon atoms, an acylamino group having 2 to 12 carbon atoms, an alkylcarbonyloxy group having 2 to 20 carbon atoms, a cyano group, or a halogen atom.

$R^1$, $R^2$, $R^4$, $R^5$, $R^6$, $R^7$, $R^8$, $R^9$ and $R^{10}$ in the formula (1-A) have the same meanings as those in the formula (I), and the preferable ranges thereof are also the same.

In formula (1-A), $R^{11}$ preferably represents an alkyl group having 1 to 12 carbon atoms; the alkyl group represented by $R^{11}$ may be a straight chain or have a branched chain and may have a substituent; and $R^{11}$ is preferably an alkyl group having 1 to 12 carbon atoms, more preferably an alkyl group having 1 to 8 carbon atoms, further more preferably an alkyl group having 1 to 6 carbon atoms, and particularly preferably an alkyl group having 1 to 4 carbon atoms (e.g., a methyl group, an ethyl group, a n-propyl group, an iso-propyl group, a n-butyl group, an iso-butyl group, a tert-butyl group).

The compound represented by formula (I) is preferably a compound represented by formula (1-B):

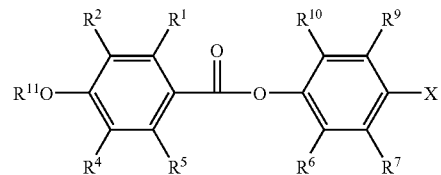

Formula (1-B)

wherein, $R^1$, $R^2$, $R^5$, $R^6$, $R^7$, $R^8$, $R^9$, and $R^{10}$ each independently represent a hydrogen atom, or a substituent. $R^{11}$ represents an alkyl group having 1 to 12 carbon atoms. X represents an alkyl group having 1 to 4 carbon atoms, an alkynyl group having 2 to 6 carbon atoms, an aryl group having 6 to 12 carbon atoms, an alkoxy group having 1 to 12 carbon atoms, an aryloxy group having 6 to 12 carbon atoms, an alkoxycarbonyl group having 2 to 12 carbon atoms, an acylamino group having 2 to 12 carbon atoms, a cyano group, or a halogen atom.

$R^1$, $R^2$, $R^4$, $R^5$, $R^6$, $R^7$, $R^9$ and $R^{10}$ in the formula (1-B) have the same meanings as those in the formula (I), and the preferable ranges thereof are also the same.

$R^{11}$ in the formula (1-B) has the same meaning as that in the formula (1-A), and its preferable range is also the same.

In formula (1-B), X represents an alkyl group having 1 to 4 carbon atoms, an alkynyl group having 2 to 6 carbon atoms, an aryl group having 6 to 12 carbon atoms, an alkoxy group having 1 to 12 carbon atoms, an aryloxy group having 6 to 12 carbon atoms, an alkoxycarbonyl group having 2 to 12 carbon atoms, an acylamino group having 2 to 12 carbon atoms, a cyano group, or a halogen atom.

When $R^1$, $R^2$, $R^4$, and $R^5$ each are a hydrogen atom, X is preferably an alkyl group, an alkynyl group, an aryl group, an alkoxy group, or an aryloxy group, more preferably an aryl group, an alkoxy group, or an aryloxy group, further more preferably an alkoxy group (preferably an alkoxy group having 1 to 12 carbon atoms, more preferably having 1 to 8 carbon atoms, further more preferably having 1 to 6 carbon atoms, and particularly preferably 1 to 4 carbon atoms), and particularly preferably a methoxy group, an ethoxy group, a n-propoxy group, an iso-propoxy group, or a n-butoxy group.

When at least one of $R^1$, $R^2$, $R^4$, and $R^5$ is a substituent, X is preferably an alkynyl group, an aryl group, an alkoxycarbonyl group, or a cyano group, more preferably an aryl group (preferably an aryl group having 6 to 12 carbon atoms), a cyano group, or an alkoxycarbonyl group (preferably an alkoxycarbonyl group having 2 to 12 carbon atoms), further more preferably an aryl group (preferably an aryl group having 6 to 12 carbon atoms, more preferably a phenyl group, a p-cyanophenyl group, or a p-methoxyphenyl group), an alkoxycarbonyl group (preferably an alkoxycarbonyl group having 2 to 12 carbon atoms, more preferably having 2 to 6 carbon atoms, further more preferably having 2 to 4 carbon atoms, and particularly preferably methoxycarbonyl, ethoxycarbonyl, or n-propoxycarbonyl), or a cyano group, and particularly preferably a phenyl group, a methoxycarbonyl group, an ethoxycarbonyl group, a n-propoxycarbonyl group, or a cyano group.

The compound represented by formula (I) is more preferably a compound represented by formula (1-C):

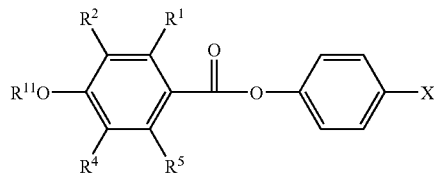

Formula (1-C)

wherein $R^1$, $R^2$, $R^4$, $R^5$, $R^{11}$, and X in the formula (1C) have the same meanings as those in the formula (1-B), and the preferable ranges thereof are also the same.

The compound represented by formula (I) is particularly preferably a compound represented by formula (1-D).

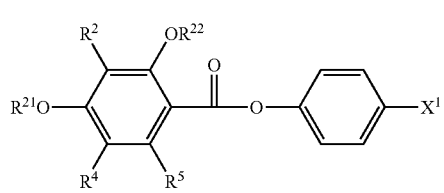

Formula (1-D)

In formula, $R^2$, $R^4$, and $R^5$ in the formula (1-D) have the same meanings as those in the formula (1-C), and the preferable ranges thereof are also the same. $R^{21}$ and $R^{22}$ each independently represent an alkyl group having 1 to 4 carbon atoms. $X^1$ represents an aryl group having 6 to 12 carbon atoms, an alkoxycarbonyl group having 2 to 12 carbon atoms, an alkylcarbonyloxy group having 2 to 20 carbon atoms, or a cyano group.

$R^{21}$ represents an alkyl group having 1 to 4 carbon atoms, preferably an alkyl group having 1 to 3 carbon atoms, and more preferably an ethyl group, or a methyl group.

$R^{22}$ represents an alkyl group having 1 to 4 carbon atoms, preferably an alkyl group having 1 to 3 carbon atoms, more preferably an ethyl group, or a methyl group, and further preferably a methyl group.

$X^1$ represents an aryl group having 6 to 12 carbon atoms, an alkoxycarbonyl group having 2 to 12 carbon atoms, an alkylcarbonyloxy group having 2 to 20 carbon atoms, or a cyano group, preferably an aryl group having 6 to 10 carbon atoms, an alkoxycarbonyl group having 2 to 6 carbon atoms, or a cyano group, more preferably a phenyl group, a p-cyanophenyl group, a p-methoxyphenyl group, a methoxycarbonyl group, an ethoxycarbonyl group, a n-propoxycarbonyl group, or a cyano group, and further more preferably a phenyl group, a methoxycarbonyl group, an ethoxycarbonyl group, a n-propoxycarbonyl group, or a cyano group.

The compound represented by formula (I) is most preferably a compound represented by formula (1-E).

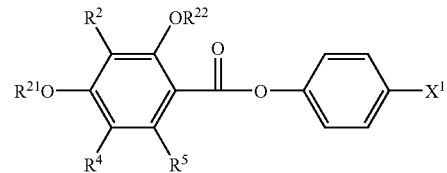

Formula (1-E)

In the formula, $R^2$, $R^4$ and $R^5$ have the same meanings as those in the formula (1-D), the preferable ranges thereof are also the same, but at least one of $R^2$, $R^4$ and $R^5$ is a group represented by —$OR^{13}$ (in which $R^{13}$ is an alkyl group having 1 to 4 carbon atoms). $R^{21}$, $R^{22}$ and $X^1$ have the same meanings as those in the formula (1-D), and the preferable ranges thereof are also the same.

In the formula (1-E), $R^2$, $R^4$ and $R^5$ have the same meanings as those in the formula (1-D), and the preferable ranges thereof are also the same, but at least one of $R^2$, $R^4$ and $R^5$ is a group represented by —$OR^{13}$ ($R^{13}$ is an alkyl group having 1 to 4 carbon atoms), preferably $R^4$ and/or $R^5$ is a group represented by —$OR^{13}$, and more preferably $R^4$ is a group represented by —$OR^{13}$.

$R^{13}$ represents an alkyl group having 1 to 4 carbon atoms, preferably an alkyl group having 1 to 3 carbon atoms, more preferably an ethyl group, or a methyl group, and further more preferably a methyl group.

The substituent T is explained below.

Examples of the substituent T include an alkyl group (preferably an alkyl group having from 1 to 20, more preferably from 1 to 12, and particularly preferably from 1 to 8 carbon atoms, e.g., methyl, ethyl, iso-propyl, tert-butyl, n-octyl, n-decyl, n-hexadecyl, cyclopropyl, cyclopentyl, cyclohexyl), an alkenyl group (preferably an alkenyl group having from 2 to 20, more preferably from 2 to 12, and particularly preferably from 2 to 8 carbon atoms, e.g., vinyl, alkyl, 2-butenyl, 3-pentenyl), an alkynyl group (preferably an alkynyl group having from 2 to 20, more preferably from 2 to 12, and particularly preferably from 2 to 8 carbon atoms, e.g., propargyl, 3-pentynyl), an aryl group (preferably an aryl group having from 6 to 30, more preferably from 6 to 20, and particularly preferably from 6 to 12 carbon atoms, e.g., phenyl, p-methylphenyl, naphthyl), a substituted or unsubstituted amino group (preferably an amino group having from 0 to 20, more preferably from 0 to 10, and particularly preferably from 0 to 6 carbon atoms, e.g., amino, methylamino, dimethylamino, diethylamino, dibenzylamino), an alkoxy group (preferably an alkoxy group having from 1 to 20, more preferably from 1 to 12, and particularly preferably from 1 to 8 carbon atoms, e.g., methoxy, ethoxy, butoxy), an aryloxy group (preferably an aryloxy group having from 6 to 20, more preferably from 6 to 16, and particularly preferably from 6 to 12 carbon atoms, e.g., phenyloxy, 2-naphthyloxy), an acyl group (preferably an acyl group having from 1 to 20, more preferably from 1 to 16, and particularly preferably from 1 to 12 carbon atoms, e.g., acetyl, benzoyl, formyl, pivaloyl), an alkoxycarbonyl group (preferably an alkoxycarbonyl group having from 2 to 20, more preferably from 2 to 16, and particularly preferably from 2 to 12 carbon atoms, e.g., methoxycarbonyl, ethoxycarbonyl), an aryloxycarbonyl group (preferably an aryloxycarbonyl group having from 7 to 20, more preferably from 7 to 16, and particularly preferably from 7 to 10 carbon atoms, e.g., phenyloxycarbonyl), an acyloxy group (preferably an acyloxy group having from 2 to 20, more preferably from 2 to 16, and particularly preferably from 2 to 10 carbon atoms, e.g., acetoxy, benzoyloxy), an acylamino group (preferably an acylamino group having from 2 to 20, more preferably from 2 to 16, and particularly preferably from 2 to 10 carbon atoms, e.g., acetylamino, benzoylamino), an alkoxycarbonylamino group (preferably an alkoxycarbonylamino group having from 2 to 20, more preferably from 2 to 16, and particularly preferably from 2 to 12 carbon atoms, e.g., methoxycarbonylamino), an aryloxycarbonylamino group (preferably an aryloxycarbonylamino group having from 7 to 20, more preferably from 7 to 16, and particularly preferably from 7 to 12 carbon atoms, e.g., phenyloxycarbonylamino), a sulfonylamino group (preferably a sulfonylamino group having from 1 to 20, more preferably from 1 to 16, and particularly preferably from 1 to 12 carbon atoms, e.g., methanesulfonylamino, benzenesulfonylamino), a sulfamoyl group (preferably a sulfamoyl group having from 0 to 20, more preferably from 0 to 16, and particularly preferably from 0 to 12 carbon atoms, e.g., sulfamoyl, methylsulfamoyl, dimethylsulfamoyl, phenylsulfamoyl), a carbamoyl group (preferably a carbamoyl group having from 1, to 20, more preferably from 1 to 16, and particularly preferably from 1 to 12 carbon atoms, e.g., carbamoyl, methylcarbamoyl, diethylcarbamoyl, phenylcarbamoyl), an alkylthio group (preferably an alkylthio group having from 1 to 20, more preferably from 1 to 16, and particularly preferably from 1 to 12 carbon atoms, e.g., methylthio, ethylthio), an arylthio group (preferably an arylthio group having from 6 to 20, more preferably from 6 to 16, and particularly preferably from 6 to 12 carbon atoms, e.g., phenylthio), a sulfonyl group (preferably a sulfonyl group having from 1 to 20, more preferably from 1 to 16, and particularly preferably from 1 to 12 carbon atoms, e.g., mesyl, tosyl), a sulfinyl group (preferably a sulfinyl group having from 1 to 20, more preferably from 1 to 16, and particularly preferably from 1 to 12 carbon atoms, e.g., methanesulfinyl, benzenesulfinyl), a ureido group (preferably a ureido group having from 1 to 20, more preferably from 1 to 16, and particularly preferably from 1 to 12 carbon atoms, e.g., ureido, methylureido, phenylureido), a phosphoric acid amido group (preferably a phosphoric acid amido group having from 1 to 20, more preferably from 1 to 16, and particularly preferably from 1 to 12 carbon atoms, e.g., diethylphosphoric acid amido, phenylphosphoric acid amido), a hydroxy group, a mercapto group, a halogen atom (e.g., fluorine, chlorine, bromine, or iodine atom), a cyano group, a sulfo group, a carboxyl group, a nitro group, a hydroxamic acid group, a sulfino group, a hydrazino group, an imino group, a heterocyclic group (preferably a heterocyclic group having from 1 to 30, and more preferably from 1 to 12 carbon atoms; containing, as a hetero atom(s), for example, a nitrogen atom, an oxygen atom, or a sulfur atom, and specifically, e.g., imidazolyl, pyridyl, quinolyl, furyl, piperidyl, morpholino, benzoxazolyl, benzimidazolyl, benzothiazolyl can be exemplified), and a silyl group (preferably a silyl group having 3 to 40, more preferably 3 to 30, and particularly preferably 3 to 24 carbon atoms, e.g. trimethylsilyl, triphenylsilyl). These substituents may further be substituted.

When there are two or more substituents, they may be the same or different. The substituents may bond together, to form a ring, if possible.

In the following, the compounds represented by formula (I) will be explained in detail with reference to the specific examples, but the present invention is not limited by these examples.

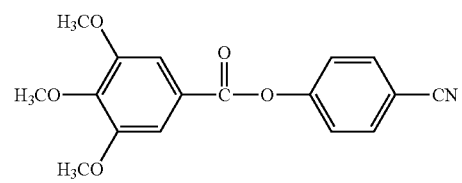
A-1

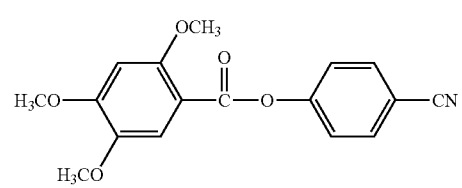
A-2

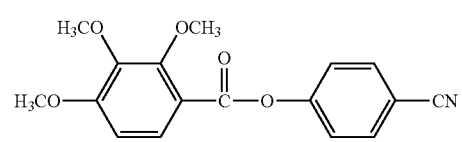
A-3

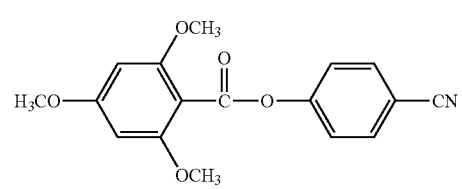
A-4

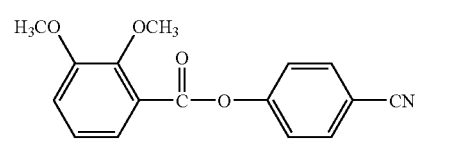
A-5

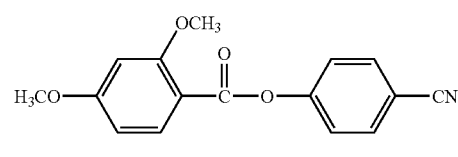
A-6

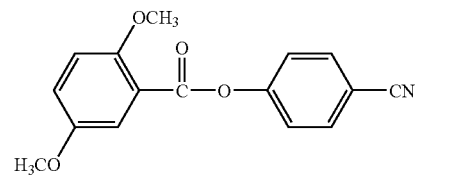
A-7

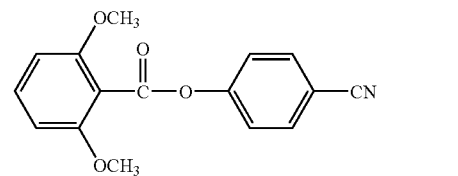
A-8

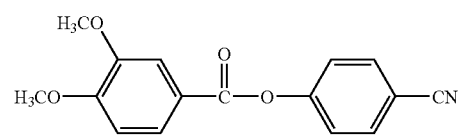
A-9

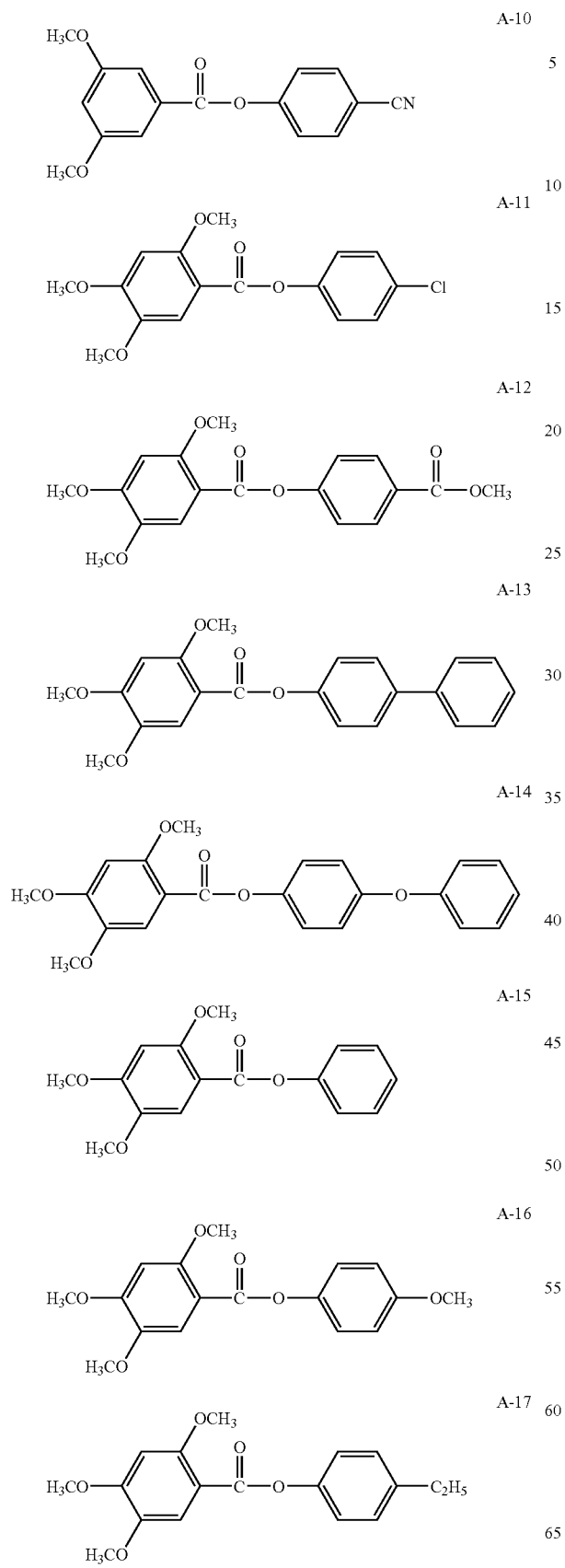
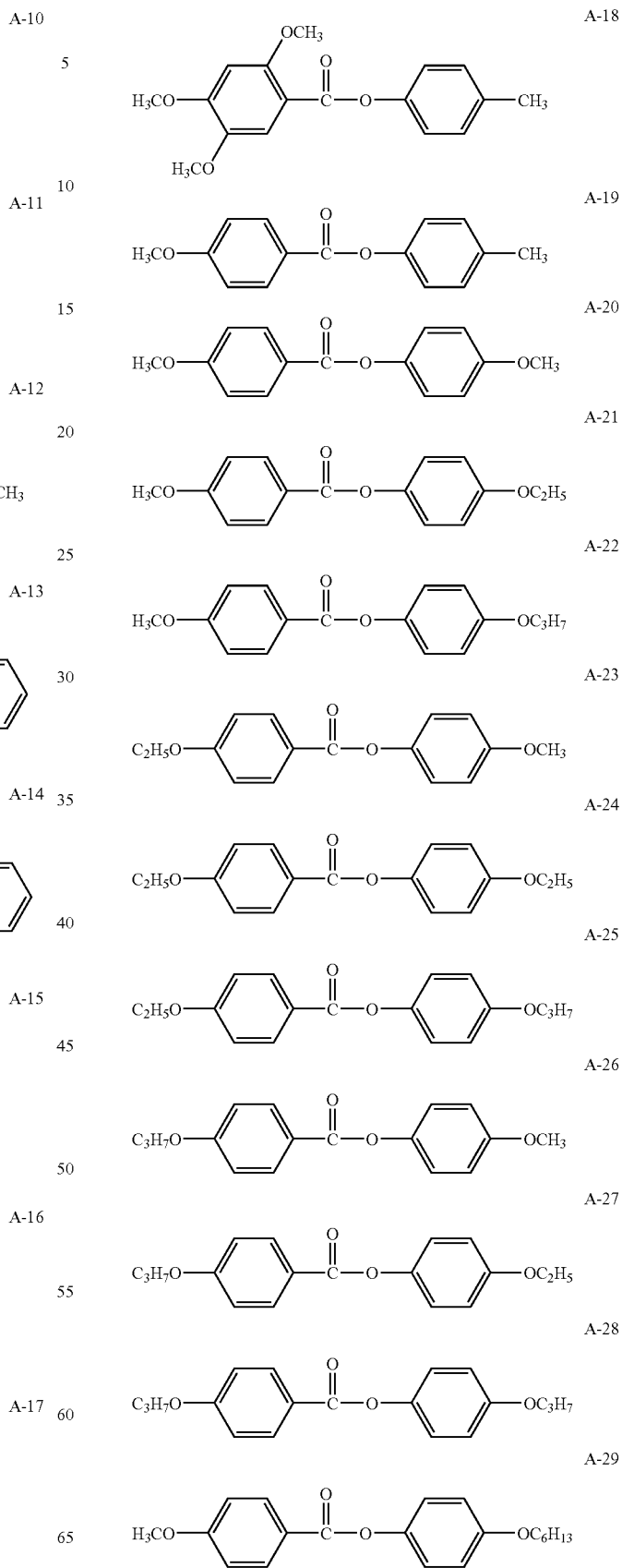

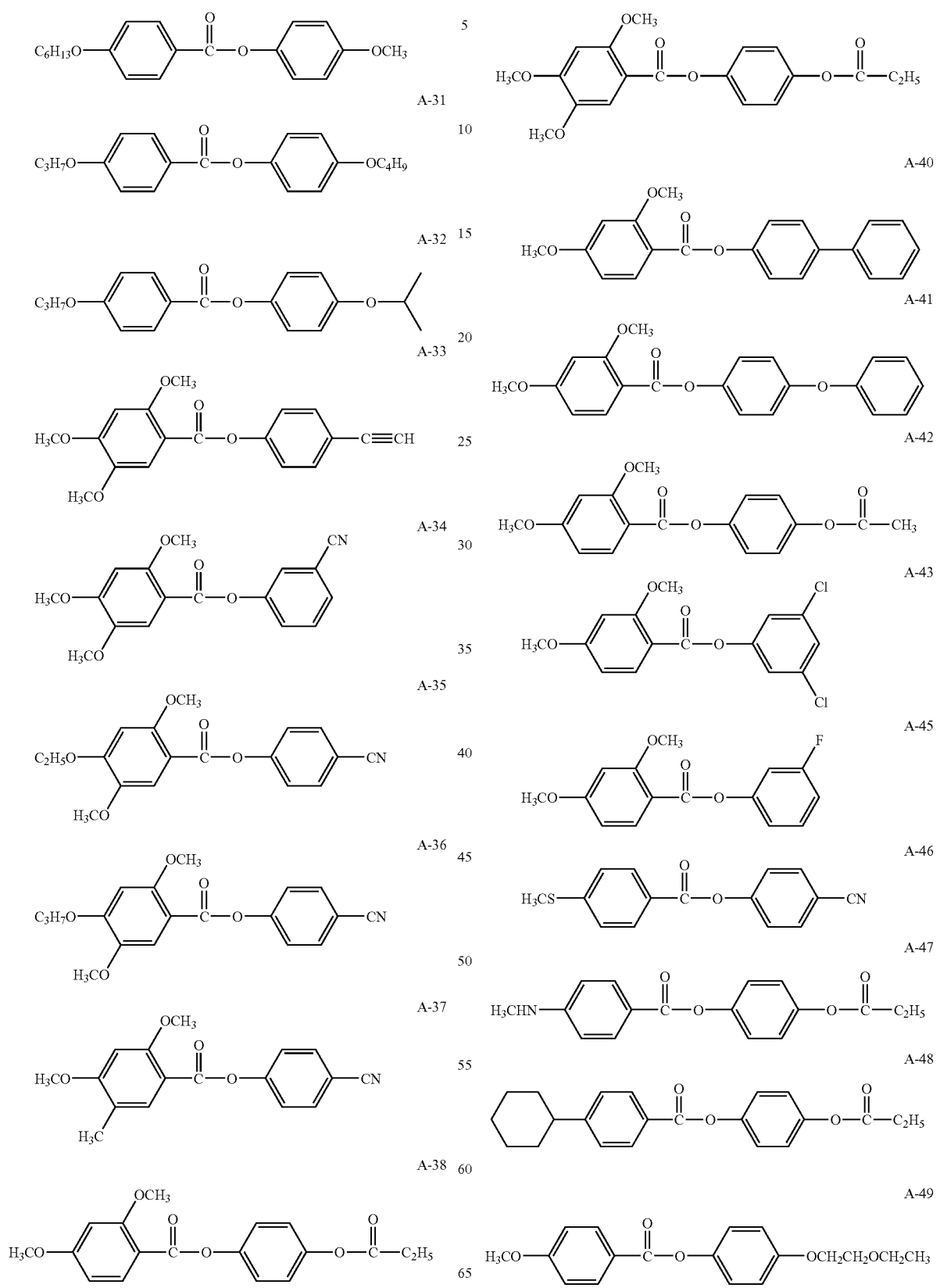

-continued

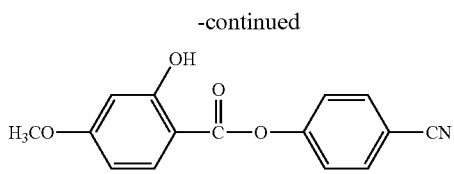

A-50

The compound represented by formula (I) that can be used in the present invention may be synthesized by a usual ester reaction between a substituted benzoic acid and a phenol derivative. Any reaction may be utilized insofar as it is an ester bond forming reaction. Examples of the method include a method in which a functional group of a substituted benzoic acid is converted into an acid halide, followed by condensation with a phenol derivative (e.g. phenol); and a method in which a substituted benzoic acid and a phenol derivative are subjected to dehydration condensation, by using a condensation agent or a catalyst.

The method in which a functional group of a substituted benzoic acid is converted into an acid halide, followed by condensation with a phenol derivative (preferably phenol) is preferable, in consideration of a production process and the like.

As a solvent to be used in the reaction, hydrocarbon type solvents (preferably toluene and xylene), ether type solvents (preferably dimethyl ether, tetrahydrofuran and dioxane), ketone type solvents, ester type solvents, acetonitrile, dimethylformamide, and dimethylacetamide may be used. These solvents may be used either singly or by mixing several types. The reaction solvent is preferably toluene, acetonitrile, dimethylformamide, and dimethylacetamide.

The reaction temperature is preferably 0 to 150° C., more preferably 0 to 100° C., still more preferably 0 to 90° C., and particularly preferably 20 to 90° C.

It is not preferable to use a base in this reaction. However, when a base is used, any of an organic base and an inorganic base may be used. The organic base is preferable, and pyridine or/and a tertiary alkylamine (preferable examples include triethylamine and ethyldiisopropylamine) may be preferably used.

Some examples of the method of synthesizing the compound that can be used in the present invention will be described in detail below, but the following specific examples are not intended to be limiting of the present invention.

Synthetic Example 1

Synthesis of the Exemplified Compound A-1

24.6 g (0.116 mol) of 3,4,5-trimethoxybenzoic acid, 100 mL of toluene, and 1 mL of N-N-dimethylformamide were heated to 60° C. Then, 15.2 g (0.127 mol) of thionyl chloride was slowly added dropwise to the mixture, and the mixture was heated at 60° C. for 2 hours. Then, thereto, a solution prepared in advance by dissolving 15.1 g (0.127 mol) of 4-cyanophenol in 50 mL of acetonitrile, was slowly added, dropwise. After the drop-wise addition was finished, the mixture was heated at 60° C. for 3 hours under stirring. After the reaction liquid was cooled to the room temperature, ethyl acetate and water were used, to carry out a separating operation. From the obtained organic phase, water was removed using sodium sulfate, and then the solvents were distilled off under a reduced pressure, to obtain a solid product, to which 100 mL of acetonitrile was added, followed by a recrystallization operation. The acetonitrile solution was cooled to the room temperature, to precipitate crystals, which were then collected by filtration, to obtain 11.0 g (yield: 11%) of a target compound as white crystals. The compound was identified by $^1$H-NMR (400 MHz) and mass spectrum.

$^1$H-NMR (CDCl$_3$) δ 3.50 (br, 9H), 7.37 (D, 2H), 7.45 (s, 2H), 7.77 (s, 2H) Mass spectrum: m/z 314 (M+H)$^+$The melting point of the thus-obtained compound was 172 to 173° C.

Synthetic Example 2

Synthesis of the Exemplified Compound A-2

106.1 g (0.5 mol) of 2,4,5-trimethoxybenzoic acid, 340 mL of toluene, and 1 mL of dimethylformamide were heated to 60° C. Then, 65.4 g (0.55 mol) of thionyl chloride was slowly added dropwise to the mixture, and the mixture was heated to 65 to 70° C. for 2 hours. Then, thereto, a solution prepared in advance by dissolving 71.5 g (0.6 mol) of 4-cyanophenol in 150 mL of acetonitrile, was slowly added dropwise. After the drop-wise addition was finished, the mixture was heated at 80 to 85° C. for 2 hours under stirring. After the reaction liquid was cooled to the room temperature, ethyl acetate (1 L) and water were used, to carry out a separating operation. From the obtained organic phase, water was removed using magnesium sulfate, and then about 500 ml of the solvents were distilled off under a reduced pressure, then 1 L of methanol was added thereto, followed by a recrystallization operation. The precipitate crystals were then collected by filtration, to obtain 125.4 g (yield: 80%) of a target compound as white crystals. The compound was identified by $^1$H-NMR (400 MHz) and mass spectrum.

$^1$H-NMR (CDCl$_3$) δ 3.91 (s, 3H), 3.93 (s, 3H), 3.98 (s, 3H), 6.59 (s, 1H), 7.35 (d, 2H), 7.58 (s, 1H), 7.74 (d, 2H) Mass spectrum: m/z 314 (M+H)$^+$The melting point of the thus-obtained compound was 116° C.

Synthetic Example 3

Synthesis of the Exemplified Compound A-3

10.1 g (47.5 mmol) of 2,3,4-trimethoxybenzoic acid, 40 mL of toluene, and 0.5 mL of dimethylformamide were heated to 80° C. Then, 6.22 g (52.3 mmol) of thionyl chloride was slowly added dropwise to the mixture, and the mixture was stirred at 80° C. for 2 hours under heating. Then, thereto, a solution prepared in advance by dissolving 6.2 g (25.3 mmol) of 4-cyanophenol in 20 mL of acetonitrile, was slowly added, dropwise. After the drop-wise addition was finished, the mixture was heated at 80 to 85° C. for 2 hours under stirring. After the reaction liquid was cooled to the room temperature, ethyl acetate and water were used to carry out a separating operation. From the obtained organic phase, water was removed using sodium sulfate, and then the solvents were distilled off under a reduced pressure. To the residue, 50 mL of methanol was added, followed by recrystallization. The precipitate crystals were collected by filtration, to obtain 11.9 g (yield: 80%) of a target compound as white crystals. The compound was identified by $^1$H-NMR (400 MHz) and mass spectrum.

$^1$H-NMR (CDCl$_3$): δ 3.50 (br, 9H), 7.37 (d, 2), 7.45 (s, 2H), 7.77 (s, 2H) Mass spectrum: m/z 314 (M+H)$^+$The melting point of the thus-obtained compound was 102 to 103° C.

Synthetic Example 4

Synthesis of the Exemplified Compound A-4

25.0 g (118 mmol) of 2,4,6-trimethoxybenzoic acid, 100 mL of toluene, and 1 mL of N—N-dimethylformamide were heated to 60° C. Then, 15.4 g (129 mmol) of thionyl chloride was slowly added dropwise to the mixture, and the mixture was stirred at 60° C. for 2 hours under heating. Then, thereto, a solution prepared in advance by dissolving 15.4 g (129 mmol) of 4-cyanophenol in 50 mL of acetonitrile, was slowly added, dropwise. After the drop-wise addition was finished, the mixture was heated at 80 to 85° C. for 4.5 hours under stirring. After the reaction liquid was cooled to the room temperature, ethyl acetate and water were used to carry out a separating operation. From the obtained organic phase, water was removed using sodium sulfate, and then the solvents were distilled off under a reduced pressure. To the residue, 500 mL of methanol and 100 mL of acetonitrile were added, followed by a recrystallization operation. The precipitate crystals were then collected by filtration, to obtain 10.0 g (yield: 27%) of a target compound as white crystals. The compound was identified by mass spectrum.

Mass spectrum: m/z 314 (M+H)$^+$ The melting point of the thus-obtained compound was 172 to 173° C.

Synthetic Example 5

Synthesis of the Exemplified Compound A-5

15.0 g (82.3 mmol) of 2,3-dimethoxybenzoic acid, 60 mL of toluene, and 0.5 mL of dimethylformamide were heated to 60° C. Then, 10.7 g (90.5 mmol) of thionyl chloride was slowly added dropwise to the mixture, and the mixture was heated to 60° C. for 2 hours under stirring. Then, thereto, a solution prepared in advance by dissolving 10.8 g (90.5 mmol) of 4-cyanophenol in 30 mL of acetonitrile, was slowly added, dropwise. After the drop-wise addition was finished, the mixture was heated at 70 to 80° C. for 7 hours under stirring. After the reaction liquid was cooled to the room temperature, 90 mL if iso-propyl alcohol was added. The precipitate crystals were then collected by filtration, to obtain 12.3 g (yield: 53%) of a target compound as white crystals. The compound was identified by mass spectrum.

Mass spectrum: m/z 284 (M+H)$^+$ The melting point of the thus-obtained compound was 104° C.

Synthetic Example 6

Synthesis of the Exemplified Compound A-6

The target compound was synthesized in the same manner as in the above, except that 2,3-dimethoxybenzoic acid in A-5 was changed to 2,4-dimethoxybenzoic acid. The compound was identified by mass spectrum.

Mass spectrum: m/z 284 (M+H)$^+$ The melting point of the thus-obtained compound was 134 to 136° C.

Synthetic Example 7

Synthesis of the Exemplified Compound A-7

25.0 g (137 mmol) of 2,5-dimethoxybenzoic acid, 100 mL of toluene, and 1.0 mL of dimethylformamide were heated to 60° C. Then, 18.0 g (151 m mol) of thionyl chloride was slowly added dropwise to the mixture, and the mixture was stirred at 60° C. for 2 hours under heating. Then, thereto, a solution prepared in advance by dissolving 18.0 g (151 mmol) of 4-cyanophenol in 50 mL of acetonitrile, was slowly added, dropwise. After the drop-wise addition was finished, the mixture was heated at 70 to 80° C. for 7.5 hours under stirring. After the reaction liquid was cooled to the room temperature, ethyl acetate and saturated brine were used to carry out a separating operation. From the obtained organic phase, water was removed using sodium sulfate, and then the solvents were distilled off under a reduced pressure. Using silica gel column chromatography (hexane/ethyl acetate (9/1, V/V), a refining operation was carried out, to obtain 18.8 g (yield: 48%) of a target compound as white crystals. The compound was identified by mass spectrum.

Mass spectrum: m/z 284 (M+H)$^+$ The melting point of the thus-obtained compound was 79 to 80° C.

Synthetic Example 8

Synthesis of the Exemplified Compound A-8

The target compound was synthesized in the same manner as in the above, except that 2,3-dimethoxybenzoic acid in A-5 was changed to 2,6-dimethoxybenzoic acid. The compound was identified by mass spectrum.

Mass spectrum: m/z 284 (M+H)$^+$ The melting point of the thus-obtained compound was 130 to 131° C.

Synthetic Example 9

Synthesis of the Exemplified Compound A-11

The target compound was synthesized in the same manner as in the above, except that 71.5 g of 4-cyanophenol in A-2 was changed to 76.9 g of 4-chlorophenol. The compound was identified by $^1$H-NMR (400 MHz) and mass spectrum.

$^1$H-NMR (CDCl$_3$) δ 3.90 (s, 3H), 3.94 (s, 3H), 3.99 (s, 3H), 6.58 (s, 1H), 7.15 (d, 2H), 7.37 (d, 2H), 7.56 (s, 1H) Mass spectrum: m/z 323 (M+H)$^+$ The melting point of the thus-obtained compound was 127 to 129° C.

Synthetic Example 10

Synthesis of the Exemplified Compound A-12

45.0 g (212 mmol) of 2,4,5-trimethoxybenzoic acid, 180 mL of toluene, and 1.8 mL of dimethylformamide were heated to 60° C. Then, 27.8 g (233 mmol) of thionyl chloride was slowly added dropwise to the mixture, and the mixture was stirred at 60° C. for 2.5 hours under heating. Then, thereto, a solution prepared in advance by dissolving 35.4 g (233 mmol) of methyl 4-hydroxybenzoate in 27 mL of dimethylformamide, was slowly added. Then, the mixture was heated at 80° C. for 3 hours under stirring. After the reaction liquid was cooled to the room temperature, 270 mL of methanol was added. The precipitate crystals were then collected by filtration, to obtain 64.5 g (yield: 88%) of a target compound as white crystals. The compound was identified by $^1$H-NMR (400 MHz) and mass spectrum.

$^1$H-NMR (CDCl$_3$) δ 3.95 (m, 9H), 3.99 (s, 3H), 6.57 (s, 1H), 7.28 (d, 2H), 7.57 (s, 1H) 8.11 (d, 2H) Mass spectrum: m/z 347 (M+H)$^+$ The melting point of the thus-obtained compound was 121 to 123° C.

Synthetic Example 11

Synthesis of the Exemplified Compound A-13

20.0 g (94.3 mmol) of 2,4,5-trimethoxybenzoic acid, 100 mL of toluene, and 1 mL of dimethylformamide were heated to 60° C. Then, 12.3 g (104 mmol) of thionyl chloride was slowly added dropwise to the mixture, and the mixture was stirred at 60° C. for 3.5 hours under heating. Then, thereto, a solution prepared in advance by dissolving 17.7 g (104 mmol) of 4-phenylphenol in 150 mL of toluene was slowly added. Then, the mixture was heated at 80° C. for 3 hours under stirring. After the reaction liquid was cooled to the room temperature, 250 mL of methanol was added. The precipitate crystals were then collected by filtration, to obtain 21.2 g (yield: 62%) of a target compound as white crystals. The compound was identified by $^1$H-NMR (400 MHz) and mass spectrum.

$^1$H-NMR (CDCl$_3$) δ 3.93 (s, 3H), 3.96 (s, 3H), 3.99 (s, 3H), 6.59 (s, 1H), 7.26-7.75 (m, 10H) Mass spectrum: m/z 365 (M+H)$^+$The melting point of the thus-obtained compound was 131 to 132° C.

Synthetic Example 12

Synthesis of the Exemplified Compound A-14

12.9 g (61 mmol) of 2,4,5-trimethoxybenzoic acid, 50 mL of toluene, and 0.6 mL of dimethylformamide were heated to 60° C. Then, 8.0 g (67 mmol) of thionyl chloride was slowly added dropwise to the mixture, and the mixture was stirred at 60° C. for 3.5 hours under heating. Then, thereto, a solution prepared in advance by dissolving 17.7 g (104 mmol) of 4-phenylphenol in 25 mL of acetonitrile, was slowly added. Then, the mixture was heated at 80° C. for 3 hours under stirring. After the reaction liquid was cooled to the room temperature, 100 mL of methanol was added. The precipitate crystals were then collected by filtration, to obtain 21.6 g (yield: 93%) of a target compound as white crystals. The compound was identified by mass spectrum.

Mass spectrum: m/z 381 (M+H)$^+$The melting point of the thus-obtained compound was 91 to 92° C.

Synthetic Example 13

Synthesis of the Exemplified Compound A-15

The target compound was synthesized in the same manner as in the above, except that 71.5 g of 4-cyanophenol in A-2 was changed to 56.4 g of phenol. The compound was identified by $^1$H-NMR (400 MHz) and mass spectrum.

$^1$H-NMR (CDCl$_3$) δ 3.91 (s, 3H), 3.93 (s, 3H), 3.99 (s, 3H), 6.58 (s, 1H), 7.19-7.27 (m, 3H), 7.42 (m, 2H), 7.58 (s, 1H) Mass spectrum: m/z 365 (M+H)$^+$The melting point of the thus-obtained compound was 105 to 108° C. Mass spectrum: m/z 289 (M+H)$^+$ Synthetic Example 14

Synthesis of the Exemplified Compound A-16

The target compound was synthesized in the same manner as in the above, except that 71.5 g of 4-cyanophenol in A-2 was changed to 74.4 g of 4-methoxyphenol. The compound was identified by $^1$H-NMR (400 MHz) and mass spectrum.

$^1$H-NMR (CDCl$_3$) δ3.84 (s, 3H), 3.92 (s, 3H), 3.93 (s, 3H), 3.99 (s, 3H), 6.58 (s, 1H), 6.92 (d, 2H), 7.12 (d, 2H), 7.58 (s, 1H) Mass spectrum: m/z 319 (M+H)$^+$The melting point of the thus-obtained compound was 102 to 103° C.

Synthetic Example 15

Synthesis of the Exemplified Compound A-17

The target compound was synthesized in the same manner as in the above, except that 71.5 g of 4-cyanophenol in A-2 was changed to 73.3 g of 4-ethylphenol. The compound was identified by $^1$H-NMR (400 MHz) and mass spectrum.

Mass spectrum: m/z 317 (M+H)$^+$The melting point of the thus-obtained compound was 70 to 71° C.

Synthetic Example 16

Synthesis of the exemplified compound A-24

27.3 g (164 mmol) of 4-ethoxybenzoic acid, 108 mL of toluene, and 1 mL of dimethylformamide were heated to 60° C. Then, 21.5 g (181 mmol) of thionyl chloride was slowly added dropwise to the mixture, and the mixture was stirred at 60° C. for 2 hours under heating. Then, thereto, a solution prepared in advance by dissolving 25.0 g (181 mmol) of 4-ethoxyphenol in 50 mL of acetonitrile, was slowly added. Then, the mixture was heated at 80° C. for 4 hours under stirring. After the reaction liquid was cooled to the room temperature, 100 mL of methanol was added. The precipitate crystals were then collected by filtration, to obtain 30.6 g (yield: 65%) of a target compound as white crystals. The compound was identified by $^1$H-NMR (400 MHz) and mass spectrum.

$^1$H-NMR (CDCl$_3$) δ 1.48-1.59 (m, 6H), 4.05 (q, 2H), 4.10 (q, 2H), 6.89-7.00 (m, 4H), 7.10 (d, 2H), 8.12 (d, 2H) Mass spectrum: m/z 287 (M+H)$^+$The melting point of the thus-obtained compound was 113 to 114° C.

Synthetic Example 17

Synthesis of the Exemplified Compound A-25

24.7 g (149 mmol) of 4-ethoxybenzoic acid, 100 mL of toluene, and 1 mL of dimethylformamide were heated to 60° C. Then, 19.5 g (164 mmol) of thionyl chloride was slowly added dropwise to the mixture, and the mixture was stirred at 60° C. for 2 hours under heating. Then, thereto, a solution prepared in advance by dissolving 25.0 g (165 mmol) of 4-propoxyphenol in 50 mL of acetonitrile, was slowly added. Then, the mixture was heated at 80° C. for 4 hours under stirring. After the reaction liquid was cooled to the room temperature, 100 mL of methanol was added. The precipitate crystals were then collected by filtration. To the resultant solid, was added 100 mL of methanol, followed by recrystallization. The precipitate crystals were then collected by filtration, to obtain 33.9 g (yield: 76%) of a target compound as white crystals. The compound was identified by $^1$H-NMR (400 MHz) and mass spectrum.

$^1$H-NMR (CDCl$_3$) δ 1.04 (t, 3H), 1.45 (t, 3H), 1.82 (q, 2H), 3.93 (q, 2H), 4.04 (q, 2H), 6.89-7.00 (m, 4H), 7.10 (d, 2H), 8.12 (d, 2H) Mass spectrum: m/z 301 (M+H)$^+$The melting point of the thus-obtained compound was 107° C.

Synthetic Example 18

Synthesis of the Exemplified Compound A-27

The target compound was synthesized in the same manner as in the above, except that 27.3 g of 4-ethoxybenzoic acid in A-24 was changed to 29.5 g of 4-propoxybenzoic acid. The compound was identified by mass spectrum.

Mass spectrum: m/z 301 (M+H)$^+$The melting point of the thus-obtained compound was 88 to 89° C.

Synthetic Example 19

Synthesis of the Exemplified Compound A-28

The target compound was synthesized in the same manner as in the above, except that 24.7 g of 4-ethoxybenzoic acid in A-25 was changed to 26.8 g of 4-propoxybenzoic acid. The compound was identified by mass spectrum.

Mass spectrum: m/z 315 (M+H)$^+$The melting point of the thus-obtained compound was 92° C.

Synthetic Example 20

Synthesis of the Exemplified Compound A-40

20.0 g (109 mmol) of 2,4-dimethoxybenzoic acid, 80 mL of toluene, and 0.8 mL of dimethylformamide were heated to 60° C. Then, 14.4 g (121 mmol) of thionyl chloride was slowly added dropwise to the mixture, and the mixture was stirred at 60° C. for 3.5 hours under heating. Then, thereto, a solution prepared in advance by dissolving 20.5 g (121 mmol) of 4-phenylphenol in 50 mL of dimethylformamide was slowly added. Then, the mixture was heated at 80° C. for 6 hours under stirring. After the reaction liquid was cooled to the room temperature, 100 mL of methanol was added. The precipitate crystals were then collected by filtration, to obtain 31.7 g (yield: 86%) of a target compound as white crystals. The compound was identified by mass spectrum.

Mass spectrum: m/z 335 (M+H)$^+$The melting point of the thus-obtained compound was 161 to 162° C.

Synthetic Example 21

Synthesis of the Exemplified Compound A-42

30.0 g (165 mmol) of 2,4-dimethoxybenzoic acid, 120 mL of toluene, and 1.2 mL of dimethylformamide were heated to 60° C. Then, 21.6 g (181 mmol) of thionyl chloride was slowly added dropwise to the mixture, and the mixture was stirred at 60° C. for 2 hours under heating. Then, thereto, a solution prepared in advance by dissolving 27.6 g (181 mmol) of methyl 4-hydroxybenzoate in 40 mL of dimethylformamide, was slowly, added. Then, the mixture was heated at 80° C. for 6 hours under stirring. After the reaction liquid was cooled to the room temperature, 140 mL of methanol was added. The precipitate crystals were then collected by filtration, to obtain 24.4 g (yield: 47%) of a target compound as white crystals. The compound was identified by $^1$H-NMR (400 MHz) and mass spectrum.

$^1$H-NMR (CDCl$_3$) δ 3.92 (m, 9H), 6.56 (m, 2H), 7.27 (m, 2H), 8.09 (m, 3H) Mass spectrum: m/z 317 (M+H)$^+$The melting point of the thus-obtained compound was 122 to 123° C.

In the first embodiment of the present invention, the compound represented by formula (I) and the cyclic compound having at least three substituents each are used in an amount ranging from 0.01 to 20 mass parts, to 100 mass parts of the cellulose acetate. The compound represented the formula (I) and the cyclic compound having at least three substituents each are used preferably in an amount ranging from 0.05 to 15 mass parts, more preferably 0.1 to 10 mass parts, to 100 mass parts of the cellulose acetate. The compound represented by formula (I) and the cyclic compound having at least three substituents each may be used in two or more compounds thereof, in combination.

In the second embodiment of the present invention, the compound represented by formula (I) or the compound having a 1,3,5-triazine ring is used in an amount range from 0.01 to 20 mass parts, to 100 mass parts of the cellulose acylate. The compound represented by formula (I) or the compound having a 1,3,5-triazine ring is used in an amount range from preferably 0.05 to 15 mass parts, more preferably 0.1 to 10 mass parts, to 100 mass parts of the cellulose acylate. The rod-like compound and the disk-like compound each may be used in two or more compounds thereof, in combination.

The content of the retardation-increasing agent represented by the formula (I) according to the present invention is generally 0.1 to 20 mass %, preferably 1 to 15 mass %, and more preferably 2 to 10 mass %, based on 100 mass parts of the cellulose acetate.

The retardation-increasing agent according to the present invention may be added to a cellulose acetate solution (dope) after it is dissolved in an organic solvent, such as an alcohol, methylene chloride, or dioxolan; or it may be directly added in a dope composition.

As clearly described in JP-A-2001-166144, a disk-like compound is generally superior in the retardation-increasing effect to a rod-like compound, and it can raise the retardation of the cellulose ester film even if it is used in a relatively small amount. However, it raises not only the Re retardation value but also the Rth retardation value, and it is therefore difficult to produce a cellulose ester film having a high Re retardation value and a low Rth retardation value, as intended in the present invention, by using only a disk-like compound.

Further, if a rod-like compound is used, a cellulose acetate film having a high Re/Rth ratio can be produced. However, in order to attain a high Re retardation value as intended in the present invention by using only a rod-like compound, it is necessary to add the rod-like compound in a large amount. An increase in the amount of the rod-like compound not only is disadvantageous in the production cost but also tends to cause precipitation (bleeding out) on the surface of the cellulose ester film, which is not preferable in its production. It is therefore difficult to produce a cellulose ester film having the optical performance as intended in the present invention by using only a rod-like compound.

The inventors of the present invention, having made earnest studies, found, as a result, that a combination use of a disk-like compound and a rod-like compound (the compound represented by formula (I)) makes it possible not only to exhibit a mere add-up effect but also to attain unexpected and preferable optical performance (a high Re retardation value and a low Rth retardation value).

(Ultraviolet Absorber)

The ultraviolet absorber that can be used for the cellulose acylate film in the second embodiment of the present invention, will be explained. The ultraviolet absorber is, preferably, used for a film used as a polarizing plate protective film to protect a liquid crystal cell from ultraviolet light. In the present invention, only a Rth value is reduced with keeping a high Re, by using the ultraviolet absorber. Also, the use of the ultraviolet absorber makes it possible to prevent coagulation of a matting agent and to manufacture a highly transparent film.

The ultraviolet absorber is generally added in an a mount of 0.1 to 20 mass parts, preferably 0.1 to 15 mass parts, and more preferably 0.1 to 10 mass parts, based on 100 mass parts of the cellulose acylate.

As the ultraviolet absorber, those which have high ability of absorbing ultraviolet rays having a wavelength of 370 nm or less and are reduced in the absorption of visible light having a wavelength of 400 nm or more, are preferably used, from the viewpoint of good liquid crystal display characteristics; and the ultraviolet absorber preferably has a transmittance of 8% or less for light having a wavelength of 380 nm.

As specific examples of the ultraviolet absorber that can be used preferably in the present invention, compounds represented by any of the formulae (III) to (V) are preferable; and a compound represented by the formula (IV) in which at least one substituent of $R_4$ and $R_5$ is a halogen atom and a compound represented by the formula (IV) in which both the substituents $R_4$ and $R_5$ are not a halogen atom, are particularly preferable. Also it is preferable to use the above ultraviolet absorber having a halogen atom and the above ultraviolet absorber having no halogen atom in a ratio by mass of 20:80 to 80:20.

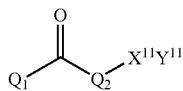

Formula (III)

In the formula, $Q_1$ and $Q_2$ each independently represent an aromatic ring; $X^{11}$ represents a substituent; $Y^{11}$ represents an oxygen atom, a sulfur atom, or a nitrogen atom; and $X^{11}Y^{11}$ may represent a hydrogen atom.

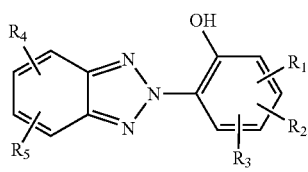

Formula (IV)

In the formula, $R_1$, $R_2$, $R_3$, $R_4$, and $R_5$ each independently represent a monovalent organic group or a halogen atom, and at least one of $R_1$, $R_2$, and $R_3$ is an unsubstituted, branched or straight-chain alkyl group having 10 to 20 total carbon atoms.

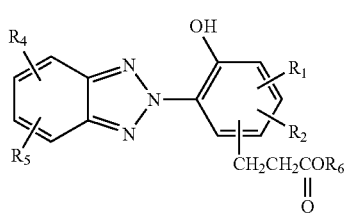

Formula (V)

In the formula, $R_1$, $R_2$, $R_4$, and $R_5$ each independently represent a monovalent organic group or a halogen atom, and $R_6$ represents a branched alkyl group.

Also, a compound represented by formula (VI), as described in JP-A-2003-315549, may be preferably used.

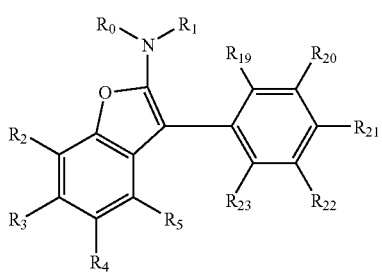

Formula (VI)

In the formula, $R_0$ and $R_1$ each represent a hydrogen atom, an alkyl group having 1 to 25 carbon atoms, a phenylalkyl group having 7 to 9 carbon atoms, an unsubstituted phenyl group, a phenyl group substituted with an alkyl group having 1 to 4 carbon atoms, a substituted or unsubstituted oxycarbonyl group, or a substituted or unsubstituted aminocarbonyl group; and $R_2$ to $R_5$ and $R_{19}$ to $R_{23}$ each represent a hydrogen atom, or a substituted or unsubstituted alkyl group having 2 to 20 carbon atoms.

Moreover, examples of the ultraviolet absorber include oxybenzophenone-series compounds, benzotriazole-series compounds, salicylate-series compounds, cyanoacrylate-series compounds, and nickel complex-series compounds.

Examples of the compound represented by formula (III) include benzophenone-series compounds.

Also, specific examples of the benzotriazole-series ultraviolet absorber will be listed below, but the present invention is not limited by these examples.

The examples include 2-(2'-hydroxy-5'-methylphenyl) benzotriazole, 2-(2'-hydroxy-3',5'-di-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole, 2-(2'-hydroxy-3'-(3",4",5",6"-tetrahydrophthalimidomethyl)-5'-methylphenyl) benzotriazole, 2,2-methylene-bis(4-(1,1,3,3-tetramethylbutyl)-6-(2H-benzotriazole-2-yl)phenol), 2-(2'-hydroxy-3'-tert-butyl-5'-methylphenyl)-5-chlorobenzotriazole, 2,4-dihydroxybenzophenone, 2,2'-dihydroxy-4-methoxybenzophenone, 2-hydroxy-4-methoxy-5-sulfobenzophenone, bis(2-methoxy-4-hydroxy-5-benzoylphenylmethan), (2,4-bis-(n-octylthio)-6-(4-hydroxy-3,5-di-tert-butylanilino)-1,3,5-triazine, 2(2'-hydroxy-3',5'-di-tert-butylphenyl)-5-chlorobenzotriazole, (2(2'-hydroxy-3',5'-di-tert-amylphenyl)-5-chlorobenzotriazole, 2,6-di-tert-butyl-p-cresol, pentaerythrityl-tetrakis[3-(3,5-di-tert-butyl-4-hydroxyphenyl)propionate], triethyleneglycol-bis[3-(3 tert-butyl-5-methyl-4-hydroxyphenyl) propionate], 1,6-hexanediol-bis[3-(3,5-di-tert-butyl-4-hydroxyphenyl)propionate], 2,4-bis-(n-octylthio)-6-(4-hydroxy-3,5-di-tert-butylanilino)-1,3,5-triazine, 2,2-thiodiethylene-bis[3-(3,5-di-tert-butyl-4-hydroxyphenyl) propionate], octadecyl-3-(3,5-di-tert-butyl-4-hydroxyphenyl)propionate, N,N'-hexamethylene-bis(3,5-di-tert-butyl-4-hydroxy-hydrocinnamide), 1,3,5-trimethyl-2,4,6-tris(3,5-di-tert-butyl-4-hydroxybenzyl)benzene, tris-(3,5-di-tert-butyl-4-hydroxybenzyl)-isocyanurate. Particularly preferred examples include (2,4-bis-(n-octylthio)-6-(4-hydroxy-3,5-di-tert-butylanilino)-1,3,5-triazine, 2(2'-hydroxy-3',5'-di-tert-butylphenyl)-5-chlorobenzotriazole, (2(2'-hydroxy-3',5'-di-tert-amylphenyl)-5-chlorobenzotriazole, 2,6-di-tert-butyl-p-cresol, pentaerythrityl-tetrakis[3-(3,5-di-tert-butyl-4-hydroxyphenyl)propionate], triethyleneglycol-bis[3-(3-tert-butyl-5-methyl-4-hydroxyphenyl)propionate]. Also, for example, a hydrazine-series metal deactivator, such as N,N'-bis[3-(3,5-di-tert-butyl-4-hydroxyphenyl)propionyl] hydrazine, or a phosphorous-series processing stabilizer, such as tris(2,4-di-tert-butylphenyl)phosphite, may be used in combination. The amount by mass of any of these compounds to be added is preferably 1 ppm to 1.0%, more preferably 10 to 1,000 ppm, to the cellulose acylate.

As well as to the above compounds, a photo-stabilizer, as described in a catalogue of "ADECASTAB" (Outline of plastic additives), Asahi Denka, may also be used. A photo-stabilizer and an ultraviolet absorber, as described in TINUBIN PRODUCT of Ciba Speciality Chemicals Inc., may also be used. SEESORB, SEENOX, SEETEC (all are trade names), and the like, as described in a catalogue of SHIPROKASEI KAISHA, may also be used. A UV absorber and an antioxidant, manufactured by Johoku Chemical Co., Ltd., may also be used. Also, VIOSORB (trade name) manufactured by Kyodo Yakuhin, and an ultraviolet absorber manufactured by Yoshitomi Pharmaceutical Industries, Ltd., may be used.

Moreover, as described in JP-A-2001-187825, it is also preferable to use an ultraviolet absorbing compound which is of a benzotriazole type and has a melting point of 20° C. or less, an ultraviolet absorbing compound having an ester group in the molecule, a combination use of an ultraviolet absorbing compound having a melting point of 20° C. or less and an ultraviolet absorbing compound having a melting point of higher than 20° C., and an ultraviolet absorber which is of a benzotriazole type and has a distribution coefficient of 9.2 or more.

Among these, when the ultraviolet absorbing compound having a melting point of 20° C. or less or the ultraviolet absorber having a distribution coefficient of 9.2 or more is used, the effect of decreasing a Rth value is large, which is preferable. Also, the use of the ultraviolet absorber having a distribution coefficient of 9.2 or more is preferable, because the ultraviolet absorber has high hydrophobic characteristics so that it has the effect of suppressing bleed-out during filming. The distribution coefficient is more preferably 9.3 or more.

The distribution coefficient represents the distribution ratio of octanol to water, which can be defined by the following expression:

$$\text{Log } Po/wPo/w = So/Sw$$

wherein:

So: solubility of an organic compound in n-octanol at 25° C.;

Sw: solubility of the organic compound in pure water at 25° C.

Each solubility of these can be measured using n-octanol and water. In the present invention, these distribution coefficients may be found as estimates by using a log P value estimating program (CLOGP program incorporated in PC Models from Daylight Chemical Information System).

It is also preferable to use an ultraviolet absorber having a spectral absorption spectrum whose wavelength as defined below is in a range from 392 to 420 nm; said wavelength being one at which the transmittance is 50%, when the spectral absorption spectrum is measured after said UV absorber is dissolved in a concentration of 0.1 g/L in a solvent and placed in a cell of 1-cm square, as compared to the case using only the solvent as a sample for comparison. It is also preferable to use an ultraviolet absorber having a spectral absorption spectrum in which the aforementioned wavelength is in a range from 360 to 390 nm.

The ultraviolet absorber may be added in advance when a mixed solution of the cellulose acylate is produced, but a dope of the cellulose acylate is produced in advance and the ultraviolet absorber may be added to the dope at any stage on the way to a casting process. In the latter case, an inline mixer, for example, a static mixer (manufactured by Toray Engineering Co., Ltd.) or SWJ (trade name: High Mixer, Toray static type inline mixer) can be preferably used, to add the dope solution prepared by dissolving the cellulose acylate in a solvent to the solution prepared by dissolving the ultraviolet absorber and a small amount of the cellulose acylate and to mix the both in an inline system. The ultraviolet absorber to be post-added may be admixed with a matting agent, and also may be mixed with such an additive(s) as a retardation-controlling agent, a plasticizer, a deterioration preventive, and a releasing-accelerator. When an inline mixer is used, the additive is preferably concentrated and dissolved under a high pressure. In this case, there is no restriction on the type of a pressure container. It is only required for the pressure container to be able to stand a given pressure and to enable heating and stirring under pressure. The pressure container may be provided with a necessary instrument, such as a pressure gauge and a temperature gauge. Pressure may be applied either using a method in which inert gas such as nitrogen gas is forced in the container or by heating to raise the vapor pressure of a solvent. The heating is preferably carried out from the outside. For example, a jacket type heater is preferable because its temperature is easily controlled. The heating temperature when a solvent is added, is preferably designed to be in a range from a temperature higher than the boiling point of the solvent to be used to a temperature at which the solvent is not boiled, for example, in a range from 30 to 150° C. Also, the pressure is set such that the solvent is not boiled at the set temperature. After dissolved, the solution is taken out from the container with cooling, or is withdrawn from the container by using a pump or the like, followed by cooling in a heat exchanger and the resulting solution is subjected to the formation of a film. As to the cooling temperature at this time, the solution may be cooled to normal temperature, and more preferably the solution may be cooled to a temperature lower by 5 to 10° C. than the boiling point and to cast the solution at this temperature, from the viewpoint of reducing the viscosity of the resultant dope.

(Production of a Cellulose Acylate Film)

The cellulose acetate film is preferably prepared according to a solvent cast method. In the solvent cast method, a solution (dope) in which a cellulose acetate is dissolved in an organic solvent is used, to prepare a film.

The organic solvent is preferably comprised of a solvent selected from an ether having 3 to 12 carbon atoms, a ketone having 3 to 12 carbon atoms, an ester having 3 to 12 carbon atoms, and a halogenated hydrocarbon having 1 to 6 carbon atoms.

The ether, the ketone, or the ester may have a cyclic structure. A compound having two or more functional groups of ether, ketone or ester (i.e. —O—, —CO— or —COO—) is also usable as the solvent. The organic solvent may have another functional group such as an alcoholic hydroxyl group. If the organic solvent is a compound having two or more functional groups, the number of carbon atoms is in any of the above ranges defined for the compound having any of the functional groups.

Examples of the ether having 3 to 12 carbon atoms include diisopropyl ether, dimethoxymethane, dimethoxyethane, 1,4-dioxane, 1,3-dioxolane, tetrahydrofuran, anisole, and phenetole.

Examples of the ketone having 3 to 12 carbon atoms include acetone, methyl ethyl ketone, diethyl ketone, diisobutyl ketone, cyclohexanone, and methylcyclohexane.

Examples of the ester having 3 to 12 carbon atoms include ethyl formate, propyl formate, pentyl formate, methyl acetate, ethyl acetate, and pentyl acetate.

Examples of the organic solvent having two or more kinds of functional groups include 2-ethoxyethyl acetate, 2-methoxyethanol, and 2-butoxyethanol.

The halogenated hydrocarbon preferably has one or two carbon atoms, more preferably one carbon atom. The halogen in the halogenated hydrocarbon is preferably chlorine. The hydrogen atom in the halogenated hydrocarbon is substituted with a halogen in an amount of preferably 25 to 75 mol %, more preferably 30 to 70 mol %, further preferably 35 to 65 mol %, most preferably 40 to 60 mol %. A typical halogenated hydrocarbon is methylene chloride.

Two or more kinds of the organic solvents may be mixed to use in combination.

As the organic solvent in the present invention, it is preferable to use a mixture of methylene chloride and an alcohol. The ratio of the alcohol to methylene chloride is preferably 1 mass % or more and 50 mass % or less, more preferably 10 mass % or more and 40 mass % or less, and most preferably 12 mass % or more and 30 mass % or less. As the alcohol, methanol, ethanol or n-butanol is preferable, and two or more of these alcohols may be mixed for combination use.

The cellulose acylate solution can be prepared in an ordinary manner. The term "ordinary manner" means that the preparation is carried out at a temperature of 0° C. or more (room temperature or elevated temperature). The cellulose acylate solution (dope) can be prepared through a usual process by means of a usual apparatus in the solvent cast method. In the usual process, a halogenated hydrocarbon (particularly, methylene chloride) is preferably used as the organic solvent.

The amount of cellulose acylate in the solution is preferably in the range of 10 to 40 mass %, more preferably in the range of 10 to 30 mass %. To the organic solvent (primary or main solvent) solvent, any of additives described later may be optionally added.

Cellulose acylate and the organic solvent are mixed and stirred at a normal temperature (0 to 40° C.), to prepare the solution. For preparing a concentrated solution, the preparation may be carried out at an elevated temperature under a high pressure. In that case, the cellulose acylate and the organic solvent are placed in a vessel resisting pressure. After the vessel is sealed, the mixture is stirred under an increased pressure at an elevated temperature. The temperature is controlled so that it may be higher than the boiling point of the solvent at atmospheric pressure but so that the solvent may not boil. The temperature is generally in the range of 40° C. or more, preferably in the range of 60 to 200° C., more preferably in the range of 80 to 110° C.

Before placed in the vessel, the components of the solution may be roughly mixed. Alternately, the components may be added one by one into the vessel. The vessel must be equipped with a stirring means. An inactive gas such as nitrogen gas may be charged in the vessel, to increase the inner pressure. Otherwise, the vessel may be heated to elevate the vapor pressure of the solvent so that the inner pressure may increase. After the vessel is sealed, each component may be added under an elevated pressure.

When heating, the vessel is preferably heated from the outside. For example, a jacket-type heater is preferably used. Alternately, a liquid heated with a plate heater placed outside of the vessel may be made to flow through a pipe wound around the vessel, to heat the whole vessel.

The mixture is preferably stirred with a propeller mixer provided in the vessel. The wing of the propeller preferably has a length reaching the inside wall of the vessel. Further, at the tip of the wing, a scratching mean is preferably provided to scratch and renew a liquid layer attached on the inside wall.

In the vessel, various meters such as pressure gauge and thermometer may be provided. The components are dissolved in the solvent in the vessel. The thus prepared dope may be cooled and then taken out of the vessel, or may be taken out and then cooled with a heat exchanger, or the like.

The solution can be prepared, according a cooling dissolution method. The cooling dissolution method makes it possible to dissolve a cellulose acetate in an organic solvent which hardly dissolves said cellulose acetate in a usual process. Further, according to that method, a cellulose acetate can be rapidly and homogeneously dissolved even in a solvent which can dissolve said cellulose acetate in a usual process.

In the process of the cooling (or chilling) dissolution method, first, the cellulose acetate is gradually added, with stirring, into an organic solvent, at room temperature.

The amount of cellulose acetate in the mixture is preferably in the range of 10 to 40 mass %, more preferably in the range of 10 to 30 mass %. Any of various additives described later may be added in the mixture.

Then, the prepared mixture is cooled to a temperature of −100 to −10° C., preferably −80 to −10° C., more preferably −50 to −20° C., most preferably −50 to −30° C. The cooling procedure can be carried out, for example, with a dry ice/methanol bath (−75° C.) or with a cooled diethylene glycol solution (−30 to −20° C.). Through the cooling procedure, the mixture of the cellulose acylate and the organic solvent is solidified.

The cooling speed is preferably 4° C./minute or more, more preferably 8° C./minute or more, and most preferably 12° C./minute or more. The cooling speed is preferably as fast as possible. However, a theoretical upper limit of the cooling rate is 10,000° C. per second, a technical upper limit is 1,000° C. per second, and a practical upper limit is, 100° C. per second. The cooling rate means the change of temperature at the cooling step per the time taken to complete the cooling step. The change of temperature means the difference between the temperature at which the cooling step is started and the temperature at which the cooling step is completed. The time taken to complete the cooling step means the period of time from the start of the cooling step to the end of the cooling at which the final cooling temperature is attained.

The cooled mixture is then warmed to a temperature of generally 0 to 200° C., preferably 0 to 150° C., more preferably 0 to 120° C., and most preferably 0 to 50° C. Through the warming procedure, the cellulose acetate is dissolved in the organic solvent. For warming, the mixture may be left at room temperature or may be heated in a warm bath.

The warming speed is preferably 4° C./minute or more, more preferably 8° C./minute or more, and most preferably 12° C./minute or more. The warming rate is preferably as fast as possible. However, a theoretical upper limit of the warming rate is 10,000° C. per second, a technical upper limit is 1,000° C. per second, and a practical upper limit is 100° C. per second. The warming rate means the change of temperature at the warming step per the time taken to complete the warming step. The change of temperature means the difference between the temperature at which the warming step is started and the temperature at which the warming step is completed. The time taken to complete the warming step means the period of time from the start of the warming step to the end of the warming at which the final warming temperature is attained.

Thus, a homogeneous solution can be prepared. If the cellulose acetate is not sufficiently dissolved, the cooling and warming procedures may be repeated. It can be judged by observation of the outer appearance of the solution with the naked eye, whether the cellulose acetate is sufficiently dissolved or not.

In the chilling dissolving method, use of a closed vessel is preferred to prevent inclusion of moisture that is caused owing to dew formation at the time of cooling. In the operations of cooling and warming, pressurization at the time of cooling and decompression at the time of warming may shorten the dissolution time period. In order to practice pressurization or decompression, use of a pressure-resistant vessel is preferred.

According to differential scanning calorimetric measurement (DSC), a 20 mass % solution prepared by dissolving a cellulose acylate (acetylation degree: 60.9%, viscosity average polymerization degree: 299) in methyl acetate through the cooling dissolution process, has a pseudo-phase transition point between gel and sol at about 33° C. Below that temperature, the solution is in the form of homogeneous gel. The solution, therefore, must be kept at a temperature above the pseudo-phase transition point, preferably at a temperature higher by about 10° C. than the pseudo-phase transition point. The pseudo-phase transition point varies, depending upon various conditions, such as the organic solvent to be used, and the acetylation degree, the viscosity average polymerization degree, or the concentration, of the cellulose acylate to be used.

The acetylation degree means the amount of an acetic acid component bonded per the unit mass of cellulose. The acetylation degree is determined according to the Measurement and Calculation of Acetylation Degree described in ASTM D-817-91 (Test Method of Cellulose acetate, etc.).

The cellulose acylate film is preferably produced, by preparing a cellulose acylate solution (dope) and forming a film from the solution according to a solvent casting method.

The dope is cast on a drum or a band, and the solvent is evaporated to form a film. The concentration of the dope before casting is preferably adjusted to give a solid content of 18 to 35%. The surface of the drum or band is preferably finished to provide a mirror state. The casting and drying methods in the solvent casting method are described in U.S. Pat. Nos. 2,336,310, 2,367,603, 2,492,078, 2,492,977, 2,492,978, 2,607,704, 2,739,069, and 2,739,070, British Patent Nos. 640,731 and 736,892, JP-B-45-4554 (the term "JP-B" as used herein means an "examined Japanese patent publication"), JP-B-49-5614, JP-A-60-176834, JP-A-60-203430, and JP-A-62-115035.

The dope is preferably cast on a drum or band having a surface temperature of 10° C. or less.

The drying on a band or a drum may be accomplished by blowing an inert gas such as the air or nitrogen. After casting, the dope is preferably dried with the blowing of the air for 2 seconds or more. The obtained film is peeled off from the drum or band, and the film may be further dried with hot air by sequentially varying the temperature from 100° C. to 160° C. to remove the residual solvent by distilling off. This method is described in JP-B-5-17844. According to this method, the period of time from casting to peeling can be shortened. For practicing this method, it is necessary that the dope be gelled at the surface temperature of the drum or band on casting.

The ratio of methylene chloride to an alcohol contained in a residual solvent when peeling off the film, is preferably 15% or more and 90% or less, more preferably 25% or more and 85% or less, and most preferably 35% or more and 80% or less.

From the prepared cellulose acetate solution (dope), a film having two or more layers can be formed via casting. Also in that case, the cellulose acetate film is preferably formed by a solvent cast method. The dope is cast over a drum or a band, and then the solvent is removed therefrom by vaporization, thereby forming a film. The solid-component concentration of the dope before casting is preferably adjusted to the range of 10 to 40 mass %. The drum or band surface is preferably subjected in advance to a mirror-smooth finish.

When casting two or more cellulose acetates solutions, the cellulose acetates solutions may be cast, while the cellulose acetate-containing solutions are cast successively from their respective casting dies disposed at an interval in the direction of progress of the support, to prepare a lamination to form a film. For example, the methods disclosed in JP-A-61-158414, JP-A-1-122419, and JP-A-11-198285 can be adopted. The film formation by casting cellulose acetate solutions from two casting dies may be employed, and this can be conducted by the methods disclosed, for example, in JP-B-60-27562, JP-A-61-94724, JP-A-61-947245, JP-A-61-104813, JP-A-61-158413, and JP-A-6-134933. Further, the casting method disclosed in JP-A-56-162617 may also be adopted, wherein the flow of a high-viscosity cellulose acetate solution is enveloped in a low-viscosity cellulose acetate solution and both of the high- and low-viscosity cellulose acetate solutions are extruded simultaneously, to form a cellulose acetate film.

Alternatively, the film may be produced by a method of using two casting dies (cast openings), which method comprises the steps of: peeling a film formed on a support from the first casting die; and then conducting the second casting using the second casting die on the side of the film contacted with the support surface. This method is described in, for example, JP-B-44-20235.

The cellulose acetate solutions to be cast may be the same or different from each other, and they are not restricted. To nave a plural of cellulose acetate layers functions different from each other, the cellulose acetate solutions corresponding to the respective functions may be extruded from different casting dies respectively. The cellulose acetate solution for use in the present invention may be cast simultaneously together with another functional layer(s) (for example, an adhesive layer, a dye layer, an antistatic layer, an antihalation layer, a UV absorbing layer, a polarizing layer).

Referring to a conventional single layer solution, extrusion of a cellulose acetate solution with a high concentration and high viscosity was necessary to obtain a desired film thickness. In this case, often caused were problems such as inferior flatness, and spot (granular structure) failure due to solid substances occurred due to poor stability of the cellulose acetate solution. A measure to solve these problems is to cast two or more cellulose acetate solutions from casting dies. By this method, high viscosity solutions can be co-extruded on a support, and a film with a good flatness and an excellent face quality can be prepared. In addition, a drying load can be reduced by use of a concentrated cellulose acetate solution, so that a production speed of the film can, be enhanced.

In the cellulose acylate film, a plasticizer may be added so as to improve the mechanical properties or increase the drying speed. As the plasticizer, a phosphoric acid ester or a carboxylic acid ester can be used. Examples of the phosphate ester include triphenyl phosphate (TPP) and tricresyl phosphate (TCP).

Representative examples of the carboxylate ester include a phthalate and a citrate. Examples of the phthalate include dimethyl phthalate (DW), diethyl phthalate (DEP), dibutyl phthalate (DBP), dioctyl phthalate (DOP), diphenyl phthalate (DPP), and diethylhexyl phthalate (DEHP). Examples of the citrate include triethyl O-acetylcitrate (OACTE), and tributyl O-acetylcitrate (OACTB). Typical examples of other carboxylate ester include butyl oleate, methyl acetyl ricinoleate, dibutyl sebacate, and various trimellitic acid esters. A phthalate-series plasticizer (DMP, DEP, DBP, DOP, DPP, or DEHP) can be preferably used, and DEP and DPP are particularly preferred.

The amount of the plasticizer to be added is preferably from 0.1 to 25 mass %, more preferably from 1 to 20 mass %, and most preferably 3 to 15 mass %, based on the amount of the cellulose ester.

To the cellulose acetate film, a deterioration inhibitor (for example, an antioxidant, a peroxide decomposer, a radical inhibitor, a metal deactivator, an acid trapping agent, an amine) may be added. The deterioration inhibitor is described in JP-A-3-199201, JP-A-5-197073, JP-A-5-194789, JP-A-5-271471, and JP-A-6-107854. The amount of the deterioration inhibitor to be added is preferably from 0.01 to 1 mass %, more preferably from 0.01 to 0.2 mass %, based on the solution (dope) to be prepared, from the viewpoint of exhibiting the effect of deterioration inhibitor or preventing the deterioration inhibitor from bleeding out onto the film surface. Example of a particularly preferable deterioration inhibitor include butylated hydroxytoluene (BHT), and tribenzyl amines (TBA).

[Orientation (Stretching) of a Cellulose Acylate Film]

The cellulose acetate film may be subjected to a stretching treatment to adjust the retardation.

Further, a method of positively stretching a film in the transverse direction may also be used, as described, for example, in JP-A-62-115035, JP-A-4-152125, JP-A-4-284211, JP-A-4-298310, and JP-A-11-48271. This is a method of stretching the produced cellulose acylate film, to increase a value of an in-plane retardation of the film.

Stretching of the film is carried out under the condition of the room temperature or an elevated temperature. The elevated temperature is preferably below the glass transition temperature of the film. The stretching of the film may be carried out by uniaxial stretching only in the longitudinal or transverse direction, or biaxial stretching in a simultaneous or successive manner. The stretching is preferably in the range of from 1 to 200%, more preferably in the range of from 1 to 100%, further more preferably in the range of from 3 to 100%, and particularly preferably in the range of from 1 to 50%. As to the birefringence of an optical film, it is preferable that the refractive index in the transverse direction be larger than that in the longitudinal direction. It is therefore preferable that the optical film be stretched much in the transverse direction.

As the orienting method, any method may be used within the scope of the present invention, but, in particular, a tenter orienting is preferably used from the viewpoint of in-plane uniformity. The width of the cellulose acylate film of the present invention is preferably at least 1,000 mm or more, more preferably 1,200 mm or more, and particularly preferably 1,450 mm or more. The dispersion (scattering) of a Re value in the total width is preferably ±5 nm, and more preferably ±3 nm. Also, the distribution of a Rth value is preferably ±10 nm, and more preferably ±5 nm. Also, each distribution of Re value and Rth value in a longitudinal direction is preferably within the range of the distribution in the transverse direction.

The film thickness is preferably 20 to 160 μm, more preferably 25 to 150 μm, and particularly preferably 30 to 140 μm.

Also, the orienting treatment may be carried out during the course of forming a film, or a roll of a raw film wound after forming a film may be oriented. In the former case, the raw film may be oriented in the state of the film including residual solvents. The amount of the residual solvent at the start of the orientation is preferably 2 to 50% and more preferably 2 to 40%. The amount of the residual solvent at the start of the orientation means the amount of residual solvents when both ends of a web (half-dried dope) starts to be fastened with a clip in the tenter stretching method. It is more preferable to start orientation when the amount of residual solvents is 5 to 50%, and it is particularly preferable to start orientation when the amount of residual solvents is 10 to 45%. The amount of residual solvents is calculated according to the following expression:

(Amount of residual solvents)=100×{(Amount of solvents in the web)/(Total amount of the web)}

At this time, preferably, the film is oriented in a direction perpendicular to the longitudinal direction with carrying the film in the longitudinal direction so that the slow axis of the film is perpendicular to the longitudinal direction of the film.

As to the orienting temperature, a proper condition may be selected according to the amount of residual solvents at the time of orientation and the film thickness.

In the case of orienting in the state that the film contain residual solvents, it is preferable to dry the film after oriented.

As to a method of drying, the film may be dried according to the method described in the aforementioned methods for forming a film.

The thickness (dry thickness) of the cellulose acetate film after oriented is preferably 20 to 160 μm, more preferably 40 to 110 μm, still more preferably 50 to 100 m, even more preferably 60 to 110 μm, and most preferably 80 to 110 μm. This film thickness corresponds to the film thickness of the optical compensation sheet of the present invention.

(Matting Agent Fine-particles)

Fine-particles are preferably added as a matting agent, to the cellulose acetate film of the present invention. Examples of the fine-particles that can be used in the present invention may include silicon dioxide, titanium dioxide, aluminum oxide, zirconium oxide, calcium carbonate, talc, clay, calcined kaolin, calcined calcium silicate, hydrated calcium silicate, aluminum silicate, magnesium silicate, and calcium phosphate. The fine-particles are preferably those containing silicon with the viewpoint of obtaining low turbidity, and particularly silicon dioxide is preferable. Fine-particles of silicon dioxide are preferably those having a primary average particle diameter of 20 nm or less and an apparent specific gravity of 70 g/L or more. Particles having a primary average particle diameter as small as 5 to 16 nm are able to reduce the haze of the film, and are hence more preferable. The apparent specific gravity is preferably 90 to 200 g/L or more and more preferably 100 to 200 g/L or more. A larger apparent specific gravity makes it possible to prepare a high concentration dispersion, to thereby better haze and coagulation and is therefore preferable.

These fine-particles usually form secondary particles having an average particle diameter of 0.1 to 3.0 μm, and these fine-particles exist in the form of a coagulate of primary particles in the film to form irregularities 0.1 to 3.0 μm in size on the surface of the film. The secondary average particle diameter is preferably 0.2 μm or more and 1.5 μm or less, more preferably 0.4 μm or more and 1.2 μm or less, and most preferably 0.6 μm or more and 1.1 μm or less. The primary particle diameter and the secondary particle diameter are determined in the following manner: Particles in the film are observed by a scanning type electron microscope to measure the diameter of a circumscribed circle of a particle as a particle diameter. Also, 200 particles each in a different place are observed, to calculate an average of the diameters of these particles to determine an average particle diameter.

As the fine-particles of silicon dioxide, for example, commercially available products under such trade names as Aerosil R972, R972V, R974, R812, 200, 200V, 300, R202, OX50, TT600 (manufactured by Nippon Aerosil Co., Ltd.) may be used. As the fine-particles of zirconium oxide, for example, commercially available products under such trade names as Aerosil R976 and R811 (manufactured by Nippon Aerosil Co., Ltd.) may be used.

Among these, Aerosil 200V and Aerosil R972V, are particularly preferable, since they are fine-particles of silicon dioxide having an average primary particle diameter of 20 nm or less and an apparent specific gravity of 70 g/L or more, and having a large effect of dropping friction coefficient, while maintaining the low turbidity of a resulting optical film.

In the present invention, to obtain a cellulose acetate film containing particles having a small secondary average particle diameter, several methods are considered in the process of preparing a dispersion of fine-particles. For example, in one method, a fine-particle dispersion obtained by mixing and stirring a solvent and fine-particles, is produced in advance. This fine-particle dispersion is added into a small amount of a cellulose acetate solution which is separately prepared, and the mixture is dissolved with stirring. Then, the obtained mixture is further mixed in a main cellulose acetate dope solution. This method is a preferable preparation method in the point that the silicon dioxide fine-particles are well dispersed and are scarcely re-coagulated. Besides the above method, there is a method in which a small amount of a cellulose ester is added to a solvent, dissolved with stirring, fine-particles are added thereto and dispersed by a dispersing apparatus, to obtain a fine-particle addition solution, which is sufficiently mixed with a dope solution by using an inline mixer. Although the present invention is not limited by these methods, the concentration of silicon dioxide when silicon dioxide fine-particles are mixed with and dispersed in a solvent is preferably 5 to 30 mass/, more preferably 10 to 25 mass %, and most preferably 15 to 20 mass %. The higher the concentration of the dispersion is, the lower the liquid turbidity is as a function of the amount to be added and the more greatly the haze and coagulate are bettered. Therefore, the higher concentration of silicon dioxide is preferable. The amount of the matting agent to be added in the final dope solution of the cellulose acetate is preferably 0.01 to 1.0 g/m$^2$, more preferably 0.03 to 0.3 g/m$^2$, and most preferably 0.08 to 0.16 g/m$^2$.

Preferable examples of lower alcohols to be used as the solvent include methyl alcohol, ethyl alcohol, propyl alcohol, isopropyl alcohol, and butyl alcohol. As solvents other than the lower alcohols, solvents which are usually used for forming cellulose ester films are preferably used though not particularly limited to these solvents.

A winding machine used for the production of the cellulose acetate film used in the present invention may be one which is usually used. The film can be wound using a winding method such as a constant tension method, constant torque method, taper tension method, or program tension control method carried out under a constant internal stress.

(Glass Transition Temperature of the Cellulose Acetate Film)

The glass transition temperature of the cellulose acetate film may be measured according to the method described in JIS K7121.

The glass transition temperature of the cellulose acetate film of the present invention is preferably 80° C. or more and 200° C. or less, and more preferably 100° C. or more and 170° C. or less. The glass transition temperature can be dropped by containing a low-molecular compound(s), such as a plasticizer or a solvent.

(Transmittance at a Wavelength of 380 Nm)

The cellulose acylate film of the present invention has a transmittance of preferably 8% or less, more preferably 5% or less, for a light having a wavelength of 380 nm. An optical film having a low transmittance for the light having a wavelength of 380 nm, imparts high light-fastness to a polarizing plate, when the polarizing plate is produced using this film; and it is therefore preferable.

The transmittance at a wavelength of 380 nm can be found using, for example, an automatic spectrophotometer UV3100 (trade name, manufactured by Shimadzu Corporation), to measure the spectral absorption spectrum of the film.

(Transparency)

As to the transparency of the cellulose acylate film of the present invention, it preferably has a transparency of 91 to 100, when measured using, for example, a sample of the film cut into a size of 20 mm×70 mm, by a transparency measuring device (AKA Photoelectric Colorimeter, trade name, manufactured by KOTAKI Seisakusho) using a visible light (615 nm) in the conditions of 25° C. and 60% RH.

(Haze)

The cellulose acylate film of the present invention has a haze value of preferably 0 to 1.2 and more preferably 0 to 1.0, when measured using, for example, a haze meter (trade name: 1001DP model, manufactured by Nippon Denshoku Industries Co., Ltd.)

(Surface Deficiency)

The cellulose acylate film of the present invention preferably has the following surface state: For example, when the cellulose ester film is sampled to count the number of foreign substances and/or coagulates 30 μm or more in size present in an area having a width of 30 cm and a length of 1 m on both sides of the resulting film, the number of these foreign substances and/or coagulates is preferably 0 to 50, more preferably 0 to 40, and particularly preferably 0 to 30.

(Wavelength Dispersion of a Cellulose Acylate Film)

An example of performance required for an optical compensation sheet, can be mentioned forms of the wavelength dispersion of a Re retardation value and Rth retardation value. Because the optical compensation sheet works as a negative retarder to compensate a liquid crystal, which is a positive retarder, it is necessary that the Rth retardation value wavelength dispersion form of the optical compensation sheet be similar to the wavelength dispersion form of the liquid crystal, to compensate a polarizing light in the whole wavelength region of the visible light. At present, it is known that most of the wavelength dispersion form of a liquid crystal sealed in a liquid crystal cell is forward dispersion, and It is preferable that the Re retardation value and Rth retardation value wavelength dispersion forms of the optical compensation sheet be, respectively, a forward dispersion form. Specifically, a difference (Re700–Re400) between the Re retardation value (Re700) at a wavelength of 700 nm and the Re retardation value (Re400) at a wavelength of 400 nm is preferably −25 nm to 10 nm, more preferably −25 nm to 5 nm. Also, a difference (Rth700 Rth400) between the Rth retardation value (Rth700) at a wavelength of 700 nm and the Rth retardation value (Rth400) at a wavelength of 400 nm is preferably −50 nm to 20 nm, particularly preferably −50 μm to 10 nm.

The values (Re700–Re 400) and (Rth700–Rth400) are found by measuring the Re, Rth retardation values of the produced cellulose acetate film at wavelengths of 700 nm and 400 nm, by using Elipsometer (trade name: M-150, manufactured by JASCO Corporation).

(Humidity Dependency of Re Retardation Value and Rth Retardation Value)

The Re Retardation value and the Rth retardation value are preferably those whose change is small by the environmental humidity.

A difference between the Re retardation value and Rth retardation value measured in the environment of 25° C. and 10% RH and the Re retardation value and Rth retardation value measured in the environment of 25° C. and 80% RH, namely (Re10%–Re80% (25° C.)) and (Rth10%–Rth80% (25° C.)) are also preferably small, and these values are preferably within 25 nm and within 70 mm, respectively. Also, it is more preferable that (Re10%–Re80% (25° C.)) be within 15 nm, and (Rth10%–Rth80% (25° C.)) be within 50 nm, and it is particularly preferable that (Re10%–Re80% (25° C.)) be within 10 mm, and (Rth10%–Rth80% (25° C.)) be within 40 nm.

(Water Content of the Cellulose Acetate Film)

The water content of the cellulose acetate film may be evaluated by measuring an equilibrium water content at a fixed temperature and humidity. The equilibrium water content may be determined, by allowing the film sample to stand at the fixed temperature and humidity for 24 hours, and then by measuring the amount of water of the sample which reaches the equilibrium, by a Karl Fisher's method, to divide the amount (g) of water by the mass (g) of the sample.

The equilibrium water content of the cellulose acetate film of the present invention at 25° C. under a humidity of 80% is preferably 3% by mass or less, more preferably 2.5% by mass or less, and most preferably 2% by mass or less.

(Moisture Permeability)

The moisture permeability of the cellulose acylate film of the present invention may be found in the following manner: For example, the humidity of a 70-mm$\phi$ sample is controlled in the condition of 25° C. and 90% RH for 24 hours, and the sample is then subjected to a moisture permeability tester (trade name: KK-709007, manufactured by Toyo Seiki Seisaku-sho, Ltd.), to calculate a water content per unit area (g/m$^2$), according to JIS Z-0208 by using the following expression.

(Moisture permeability)=(14 as after moisture conditioning)−(Mass before moisture conditioning)

The moisture permeability of the cellulose acetate film of the present invention which permeability is measured according to JIS Z 0208, Condition A, is preferably 20 g/m$^2$ or more and 250 g/m$^2$ or less, more preferably 40 g/m$^2$ or more and 225 g/m$^2$ or less, and most preferably 100 g/m$^2$ or more and 200 g/m$^2$ or less.

The moisture permeability of the cellulose acetate film can be controlled by various methods.

A hydrophobic compound is added to the cellulose acetate film to thereby drop the water absorption of the film, thereby the moisture permeability of the cellulose acetate film can be dropped.

The moisture permeability of the film at 25° C. under a humidity of 90%/RH is preferably 20 g/m$^2$·24-hr to 250 g/m$^2$·24-hr, and particularly preferably 20 g/m$^2$·24-hr to 230 g/m$^2$·24-hr.

When a ultraviolet absorber having a large distribution coefficient (highly hydrophobic) is used, the moisture permeability tends to decrease. This is assumed to be based on the fact that the hydrophobic characteristics of the entire film be increased. It is assumed that when the moisture permeability is small, the environmental moisture causes a small change in optical characteristics, which is a preferable tendency.

(Coefficient of Hygroscopic Swelling)

The coefficient of hygroscopic swelling indicates an amount of change in the length of a sample when relative humidity is changed under a fixed temperature condition.

The coefficient of hygroscopic swelling of the cellulose acetate film is designed to be preferably 30×10$^{-5}$/% RH or less, more preferably 15×10$^{-5}$/% RH or less, and most preferably 10×10$^{-5}$/% RH or less, to prevent a frame-like rise in transmittance. Further, the coefficient of hygroscopic swelling is preferably as small as possible, but it is generally 1.0×10$^{-5}$/% RH or more.

A method of measuring the coefficient of hygroscopic swelling will be described below. A sample having width 5 nm and length 20 mm is cut out of a produced polymer film (a phase-difference or retardant plate), and the resultant sample was hung with one end thereof being fixed, under an atmosphere of 25° C. and 20% RH (R0). A 0.5 g mass is hung from another end of the sample, which is then allowed to stand for 10 minutes, to measure the length (L0) of the sample. Then, the temperature is kept at 25° C. and the moisture is increased to 80% RH (R1), to measure the length (L1) of the sample under this condition. The coefficient of hygroscopic swelling is calculated according to the following expression. Measurement is made using 10 samples every film, and an average of values of these samples is taken as the coefficient of hygroscopic swelling.

Coefficient of hygroscopic swelling [/% $RH$]={($L1$−$L0$)/$L0$}/($R1$−$R0$)

In order to reduce a dimensional change caused by the above moisture absorption, it is preferable to reduce the amount of residual solvents during the formation of a film, to thereby reduce free volume in the polymer film.

In a general method of decreasing the residual solvents, the film is dried at a high temperature for a long period of time. However, if the drying time is too long, productivity is, of course, dropped. Accordingly, the amount of the residual solvents is preferably in a range from 0.01 to 1 mass % to the cellulose acetate film, more preferably in a range from 0.02 to 0.07 mass %, and most preferably in a range from 0.03 to 0.05 mass %.

A polarizing plate having an optical compensating ability can be produced with high productivity in a low cost, by controlling the amount of the residual solvents.

The amount of the residual solvents is measured by dissolving a fixed amount of a sample in chloroform and by subjecting the sample to gas chromatography (trade name: GC18A, manufactured by Shimadzu Corporation).

In the solvent casting method, a polymer material is dissolved in an organic solvent to prepare a solution (dope), which is used to form a film. Drying in the solution casting method is largely divided into drying on a drum (or band) plane and drying when the film is conveyed, as will be mentioned later. When the film is dried on the drum (or band), it is preferable to dry the film slowly at a temperature not exceeding the boiling point of the solvent to be used (when exceeding the boiling point, the solvent becomes bubble). Also, the drying during conveyance of the film is preferably carried out in a range of preferably ±30° C., more preferably ±20° C. of the glass transition temperature of the polymer material.

Further, it is preferable to add a compound having a hydrophobic group, in another method of reducing dimensional change due to the aforementioned moisture absorption. As the raw material having a hydrophobic group, any material may be used without any particular limitation insofar as it is a raw material having a hydrophobic group such as an alkyl group or phenyl group in the molecule. Among the aforementioned plasticizers and deterioration preventives to be added to the cellulose acetate film, raw materials fitted to this purpose are particularly preferably used. Preferable examples of the raw material include triphenyl phosphate (TPP) and tribenzylamine (TBA).

The amount of the compound having a hydrophobic group is preferably in a range from 0.01 to 30 mass % and more preferably in a range from 0.1 to 20 mass %, based on the prepared solution (dope).

(Rate of Dimensional Change)

The rate of dimensional change may be found, for example, in the following manner. Each three test pieces having width 30 mm and length 120 mm are cut from a sample, in the longitudinal (MD) and transverse (TD) directions of said sample, respectively. A 6 mm$\phi$ hole is opened in each end of the test piece at an interval of 100 mm by using a punch. The humidity of the test piece is controlled in a room kept at a temperature of 23±3° C. under a relative humidity of 65±5% for 2 hours or more. The full scale (L1) of the distance between these punched holes is measured using an automatic pin gauge (manufactured by Shinto Scientific Co., Ltd.) to the minimum scale of the order of $1/1000$ mm. Then, the test piece is hung in a thermostat kept at 90° C.±1° C. to carry out heat treatment for 24 hours. The humidity of the test piece is controlled in a room kept at 23±3° C. under a relative humidity of 65±5% for 2 hours or more. Then, the distance (L2) between the punched holes after the heat treatment is measured by the automatic pin gauge, to calculate a dimensional change according to the following expression.

Rate of dimensional change=$\{(L2-L1)/L1\}\times 100$

The rate of dimensional change of the cellulose acetate film of the present invention after it is treated at 90° C. for 24 hrs, is preferably −0.5% or more and 0.5% or less, more preferably −0.3% or more and 0.3% or less, and most preferably −0.2% or more and 0.2% or less.

(Rate of Dimensional Change Under a High Humidity)

The rate of dimensional change under a high humidity may be found in the following manner. Each three test pieces having width 30 mm and length 120 mm are cut from a sample, in each of the longitudinal (MD) and transverse (TD) directions of said sample. A 6-mmϕ hole is opened in each end of the test piece at an interval of 100 mm by using a punch. The humidity of the test piece is controlled in a room kept at a temperature of 23±3° C. under a relative humidity of 65±5% for 2 hours or more. The full scale (L1) of the distance between these punched holes is measured using an automatic pin gauge (manufactured by Shinto Scientific Co., Ltd.) to the minimum scale of the order of $1/1000$ mm. Then, the test piece is hung in a thermohygrostat kept at 60° C.±1° C. under a relative humidity of 90±5%, to carry out heat treatment for 24 hours. The humidity of the test piece is controlled in a room kept at 23±3° C. under a relative humidity of 65±5% for 2 hours or more. Then, the distance (L3) between the punched holes after the heat treatment is measured by the automatic pin gauge, to calculate a dimensional change according to the following expression.

Rate of dimensional change=$\{(L3-L1)/L1\}\times 100$

The dimensional changes in a 90° C. dry environment and in a 60° C. and 90% RH environment are both preferably to be small. The dimensional change in a 90° C. dry environment is preferably within a range of −0.20% to +0.20%, more preferably within a range of −0.15% to +0.15%, further preferably within a range of −0.12% to 0.12%. The dimensional change in a 60° C. and 90% RH environment is preferably in a range of −0.20% to +0.20%, more preferably in a range of −0.15% to +0.15%.

(Elastic Modulus of the Cellulose Acylate Film)

The elastic modulus of the cellulose acylate film may be found by a tensile test. The elastic modulus of the cellulose acylate film of the present invention is preferably 1.0 GPa or more and 6.0 GPa or less, more preferably 2.0 GPa or more and 5.5 GPa or less, and particularly preferably 2.5 GPa or more and 5.0 GPa or less, in at least one of the transverse direction and a casting direction.

(Photoelasticity)

The photoelasticity coefficient of the cellulose acylate film of the present invention is preferably $60\times 10^{-8}$ cm$^2$/N or less, and more preferably $20\times 10^{-8}$ cm$^2$/N or less. The photoelasticity coefficient can be determined, by using an elipsometer.

(Surface Treatment of the Cellulose Acylate Film)

The surface energy of the cellulose acylate film is preferably 55 to 75 mN/m. In order to attain this, it is preferable to carry out a surface treatment. Examples of the surface treatment include a saponification treatment, a plasma treatment, a flame treatment, and an ultraviolet radiation treatment. The saponification treatment includes an acid saponification treatment and an alkali saponification treatment. The plasma treatment include a corona discharge treatment and a glow discharge treatment. Also it is preferable to provide an undercoat layer, as described in JP-A-7-333433. In order to retain the flatness of the film, the temperature of the cellulose acylate film in the surface treatment is preferably lower than the glass transition temperature (Tg), specifically 150° C. or less. The surface energy of the cellulose acetate film after the surface treatment is preferably 55 to 75 mN/m, and more preferably 60 mN/m or more and 75 mN/m or less.

The glow discharge treatment referred to herein may be a treatment with low-temperature plasma (thermal plasma) generated in a low-pressure gas having a pressure of $10^{-3}$ to 20 Torr. A treatment with plasma under the atmospheric pressure is also preferable. A plasma excitation gas is a gas which can be excited to plasma under conditions as described above, and examples thereof include argon, helium, neon, krypton, xenon, nitrogen, carbon dioxide, frons such as tetrafluoromethane, and a mixture thereof. Details thereof are described in "Kokai Giho of Japan Institute of Invention & Innovation" (Kogi No. 2001-1745, published on Mar. 15, 2001), pp. 30-32. In the plasma treatment under the atmospheric pressure, to which attention has been paid in recent years, for example, a radiating energy of 20 to 500 kGy is used under a condition of 10 to 1,000 keV, and preferably a radiating energy of 20 to 300 kGy is used under a condition of 30 to 500 keV.

When the cellulose acylate film of the present invention is used as a transparent protective film of a polarizing plate, it is particularly preferable to carry out an acid treatment or alkali treatment, namely a saponification treatment of the cellulose acylate, from the viewpoint of the adhesion of the polarizer. Of these treatments, an alkali saponifying treatment is particularly preferable, which treatment is quite effective as the surface treatment for the cellulose acylate film.

In the following, the surface treatment is specifically explained, taking the alkali saponifying treatment as an example.

The alkali saponifying treatment is preferably conducted, by directly immersing the cellulose acylate film into a bath of a saponifying solution, or by applying a saponifying solution onto the cellulose acylate film. Examples of the application method include a dip coating method, a curtain coating method, an extrusion coating method, a bar coating method, and an E-type coating method. As the solvent in the alkali saponifying treatment coating solution, it is preferable to employ a solvent which has an excellent wettability appropriate for applying the saponifying solution to a transparent support and which can hold a favorable surface state without forming any irregularity on the transparent support surface. More specifically speaking, it is preferable to use an alcoholic solvent, and isopropyl alcohol is particularly preferable therefor. It is also possible to employ an aqueous solution of a surfactant as the solvent. As the alkali in the alkali saponifying solution, it is preferable to use an alkali soluble in the above-described solvent, and KOH or/and NaOH is further preferable therefor. The normality concentration of hydroxide ion is preferably in the range of 0.1N to 3.0N, and preferably in the range of 0.5N to 2.0N. It is preferable that the saponifying solution has a pH value of 10 or more, still preferably 12 or more. The temperature of the alkaline solution is preferably in the range from the room temperature to 90° C., and more preferably in the range of 40 to 70° C. Concerning the reaction conditions, it is preferable to perform the alkali saponification at room temperature for 1 second or longer but 5 minutes or shorter, still preferably for 5 seconds or longer but 5 minute or shorter, and particularly preferably for 20 seconds or longer but 3 minutes or shorter. After the completion of the alkali saponification reaction, it is preferable to wash with water; or wash with an acid and then wash with water, the face coated with the saponifying solution.

The surface energy of the solid obtained by these methods can be measured by the contact angle method, the wet heating method, or the adsorption method (these methods are described in "The basic theory and application of wetting", published by Realize Co., Ltd, Dec. 10, 1989). In the case of the cellulose acylate film of the present invention, the contact angle method is preferred. In that method, specifically, two solutions having known surface energies are dropped onto the cellulose acylate film. The contact angle of each drop is measured, and the surface energy of the film can be determined by calculation from the measured contact angles. The contact angle is defined to be an angle which is formed by a tangent line and the film surface, the tangent line being a line tangent to the curve of the droplet which line is drawn at the point where the droplet surface intersects the film surface, and the contact angle being the angle at the droplet side.

It is possible to obtain a cellulose acylate film having a surface energy of 55 to 75 mN/m, by carrying out the above surface treatment of the film. If this cellulose acylate film is used as a transparent protective film of a polarizing plate, the adhesion of a polarizing film to the cellulose acylate film can be improved. Also, when the cellulose acylate film of the present invention is used in an OCB mode liquid crystal display device, the optical compensation sheet of the present invention may be provided with an oriented film formed on the cellulose acylate film and with an optically anisotropic layer containing a disk-like compound or a rod-like liquid crystal compound on the oriented film. The optically anisotropic layer is formed by orienting the disk-like compound (or the rod-like liquid crystal compound) on the oriented film, to fix the orientation state. When the optically anisotropic layer is formed on the cellulose acylate film in this manner, it is conventionally necessary to form a gelatin undercoat layer between the cellulose acylate film and the oriented film to secure the adhesion between the both. However, it is unnecessary to form the gelatin undercoat layer, by using the cellulose acylate film of the present invention which has a surface energy of 55 to 75 mN/m.

The aforementioned cellulose acylate film containing at least one compound represented by formula (I) and at least one cyclic compound that has at least three substituents, being oriented, satisfying the aforementioned conditions on the Re and Rth retardation values and the Re/Rth ratio, and having a film thickness of 20 μm to 160 μm, functions as an optical compensation sheet even if it is used singly.

The aforementioned cellulose acylate film containing at least one rod-like compound and at least one disk-like compound, being oriented, satisfying the aforementioned conditions on the Re and Rth retardation values and the Re/Rth ratio, and having a film thickness of 40 μm to 110 μm, functions as an optical compensation sheet even if it is used singly.

The cellulose acylate film of the present invention can be preferably used as an optical compensation sheet.

Also, the cellulose acylate film of the present invention is preferably a cellulose acetate film.

(Polarizing Plate)

First, a protective film and a polarizer which constitute the polarizing plate of the present invention will be explained.

The polarizing plate comprises a polarizer (polarizing film) and two protective films (transparent protective films) disposed on the both sides of the polarizer. At least one of the protective films is preferably the cellulose acylate film of the present invention. When an optical compensation sheet constituted by using the aforementioned cellulose acylate film is used as one of the protective films, a usual cellulose acetate film may be used as the other protective film.

The polarizing plate may have, besides the polarizer and the protective film, an adhesive layer, a separate film, and a protective film, as structural elements. Moreover, it is preferable to provide, for example, a hardcoat layer, an antiglare layer, and an anti-reflecting layer, on the surface of the protective film. These layers will be described in detail later.

(1) Protective Film

The polarizing plate of the present invention has the total two protective films on the both sides of the polarizer, in which each side of the polarizer is provided with one protective film, and in which at least one of the protective films is the cellulose acylate (preferably cellulose acetate) film of the present invention. Also, at least one of these two protective films preferably has a function as a retardation film. When the polarizing plate of the present invention is used in a liquid crystal display device, at least one polarizing plate among two polarizing plates disposed on the both sides of the liquid crystal cell is preferably the polarizing plate of the present invention.

The protective film that can be used in the present invention is preferably a polymer film which is produced, for example, from a norbornane resin, polyethylene terephthalate, polyethylene naphthalate, polycarbonate, polystyrene, polyarylate, polysulfone, or cellulose acetate, and most preferably a cellulose acylate film.

(2) Polarizer

The polarizer for use in the present invention is preferably constituted of a polyvinyl alcohol (PVA) and a dichroic molecule. As described in JP-A-11-248937, a polyvinylene type polarizer obtained by subjecting a PVA or polyvinyl chloride to dehydration or dechlorination to form a polyene structure and then orienting the polyene structure, may also be used.

PVA is generally a polymer material obtained by saponifying polyvinyl acetate, but it may contain such a component copolymerizable with vinyl acetate as an unsaturated carboxylic acid, an unsaturated sulfonic acid, an olefin, or an vinyl ether. Modified PVA containing an acetoacetyl group, a sulfonic acid group, a carboxyl group, and/or an oxyalkylene group, can also be used.

The saponification degree of PVA is not particularly limited, but it is preferably from 80 to 100 mole %, particularly preferably from 90 to 100 mole %, from the viewpoint of solubility. Also, the polymerization degree of PVA is not particularly limited, but it is preferably from 1,000 to 10,000, particularly preferably from 1,500 to 5,000.

The syndiotacticity of the PVA is preferably 55% or more, to improve durability, as described in Japanese Patent No. 2,978,219, and PVAs having a syndiotacticity of 45 to 52.5%, as described in Japanese Patent No. 3,317,494, may also be preferably used.

The PVA is preferably made into a film and then a dichroic molecule is introduced thereinto, to constitute a polarizer. As a method of producing a PVA film, a method in which a law liquid prepared by dissolving a PVA type resin in water or an organic solvent is cast to form a film is preferably used in general. The concentration of the polyvinyl alcohol type resin in the raw liquid is generally 5 to 20 mass %. A PVA film having a film thickness of 10 to 200 μm can be produced by applying this raw liquid to a casting method. The PVA film may be produced with reference to Japanese Patent No. 3,342,516, JP-A-09-328593, JP-A-2001-302817 and JP-A-2002-144401.

There is no particular limitation to the degree of crystallization of the PVA film, and use may be made of the PVA film having an average degree of crystallization (Xc) of 50 to 75 mass %, as described in Japanese Patent No. 3,251,073, and a PVA film having a degree of crystallization of 38% or less to reduce the in-plane dispersion of a hue, as described in JP-A-2002-236214.

The birefringence (Δn) of the PVA film is preferably small, and a PVA film having a birefringence of $1.0 \times 10^{-3}$ or less, as described in Japanese Patent No. 3,342,516, can be preferably used. Alternately, the birefringence of the PVA film may be designed to be 0.02 or more and 0.01 or less, to obtain high polarization while preventing the PVA film from being cut during orientation, as described in JP-A-2002-228835; or the value of $\{(nx+ny)/2-nz\}$ may be designed to be 0.0003 or more and 0.01 or less, as described in JP-A-2002-060505. The retardation (in-plane) of the PVA film is preferably 0 nm or more and 100 nm or less, more preferably 0 nm or more and 50 nm or less. Also, the Rth (in the direction of the film thickness) of the PVA film is preferably 0 nm or more and 500 nm or less, more preferably 0 nm or more and 300 nm or less.

In addition to the above, in the polarizing plate of the present invention, use may be preferably made, for example, of a PVA film having 1.5 mol % or less of a 1,2-glycol component to be bonded therein, as described in Japanese Patent No. 3,021,494; a PVA film in which the number of optical foreign substances 5 μm or more in size is 500 or less per 100 cm$^2$, as described in JP-A-2001-316492; a PVA film of which the hydrothermal cutting temperature spot of the film in the TD direction of the film is 1.5° C. or less, as described in JP-A-2002-030163; and a PVA film formed from a solution containing 1 to 100 mass parts of a polyvalent alcohol of three to six valences such as glycerin or a solution containing 15 mass % or more of a plasticizer, as described in JP-A-06-289225.

There is no particular limitation to the film thickness of the PVA film before orienting or stretching, and the thickness is preferably 1 μm to 1 nm, particularly preferably 20 to 200 μm, from the viewpoint of film retaining stability and orienting uniformity. Use may be made of a thin PVA film having such characteristics that the stress applied when it is oriented four to six times the original length in water is 10 N or less, as described in JP-A-2002-236212.

As the dichroic molecule, a high order iodine ion, such as $I_3^-$ and $I_5^-$, or a dichroic dye, may be preferably used. In the present invention, the high order iodine ion is particularly preferably used. The high order iodine ions may be produced in the condition that these ions are adsorbed to and oriented on a PVA, by dipping the PVA in a solution obtained by dissolving iodine in an aqueous potassium iodide solution and/or in an aqueous boric acid solution, as described in "Application of Polarizing Plate", edited by Ryo NAGATA (CMC Shuppan) and in "Industrial Materials", Vol. 28, No. 7, pp. 39-45.

When the dichroic dye is used as the dichroic molecule, an azo type dye is preferable, and a bisazo type or trisazo type dye is particularly preferable. The dichroic dye is preferably one soluble in water. Therefore, a hydrophilic substituent, such as a sulfonic acid group, an amino group, or a hydroxyl group, is introduced into the dichroic molecule, and the resultant may be preferably used as any of free acids, alkali metal salts, ammonium salts, or salts of amines.

Specific examples of the dichromatic dye include, for example, benzidine-series dyes, such as C.I.Direct Red 37, Congo Red (C.I. Direct Red 28), C.I.Direct Violet 12, C.I.Direct Blue 90, C.I.Direct Blue 22, C.I.Direct Blue 1, C.I.Direct Blue 151, C.I.Direct Green 1; diphenylurea-series dyes, such as C.I.Direct Yellow 44, C.I.Direct Red 23, C.I.Direct Red 79; stilbene-series dyes, such as C.I.Direct Yellow 12; dinaphthylamine-series dyes, such as C.I.Direct Red 31; J acid-series dyes, such as C.I.Direct Red 81, C.I.Direct Violet 9, C.I.Direct Blue 78.

Besides these compounds, use can be preferably made, for example, of dichromatic dyes, such as C.I.Direct Yellow 8, C.I.Direct Yellow 28, C.I.Direct Yellow 86, C.I.Direct Yellow 87, C.I.Direct Yellow 142, C.I.Direct Orange 26, C.I.Direct Orange 39, C.I.Direct Orange 72, C.I.Direct Orange 106, C.I.Direct Orange 107, C.I.Direct Red 2, C.I.Direct Red 39, C.I.Direct Red 83, C.I.Direct Red 89, C.I.Direct Red 240, C.I.Direct Red 242, C.I.Direct Red 247, C.I.Direct Violet 48, C.I.Direct Violet 51, C.I.Direct Violet 98, C.I.Direct Blue 15, C.I.Direct Blue 67, C.I.Direct Blue 71, C.I.Direct Blue 98, C.I.Direct Blue 168, C.I.Direct Blue 202, C.I.Direct Blue 236, C.I.Direct Blue 249, C.I.Direct Blue 270, C.I.Direct Green 59, C.I.Direct Green 85, C.I.Direct Brown 44, C.I.Direct Brown 106, C.I.Direct Brown 195, C.I.Direct Brown 0.210, C.I.Direct Brown 223, C.I.Direct Brown 224, C.I.Direct Black 1, C.I.Direct Black 17, C.I.Direct Black 19, C.I.Direct Black 54, and the like; further, those described in JP-A-62-70802, JP-A-1-161202, JP-A-1-172906, JP-A-1-172907, JP-A-1-183602, JP-A-1-248105, JP-A-1-265205, JP-A-7-261024. These dichroic dyes may be blended in combination of two or more, to produce dichroic molecules having various hues. When the dichroic dye is used, the adsorbed thickness may be 4 μm or more, as described in JP-A-2002-082222.

The content of the dichroic molecule in the film is generally regulated in a range from 0.01 mass % to 5 mass %, based on a polyvinyl alcohol type polymer constituting the matrix of the film. This is because if the content is too small, the polarity of the film is low, and if the content is too high, the transmittance of a single plate is dropped.

The film thickness of the polarizer is preferably 5 μm to 40 μm and more preferably 10 μm to 30 μm. It is also preferable that the ratio of the thickness of the polarizer to the thickness of the protective film (which will be explained in the below) be designed to be in the following range: $0.01 \leq A$(i.e. Film thickness of a polarizer)/B(i.e. Film thickness of a protective layer)$\leq 0.16$, as described in JP-A-2002-174727.

Although the angle at which the slow axis of the protective film intersects with the absorbing axis (transmission axis) of the polarizer may be optional, the both axes may be preferably arranged in substantially parallel to each other, and it is preferable that the both be in parallel or intersect with each other at an angle of 45±20°.

(Process of the Production of the Polarizing Plate)

Next, the process of producing the polarizing plate of the present invention will be explained.

The process of producing the polarizing plate of the present invention is preferably constituted of a swelling step, a dyeing step, a film hardening step, an orienting step, a drying step, a step of laminating a protective film, and a post-drying step after the laminating step. The order of the dyeing step, film hardening step, and the orienting step may be changed arbitrarily, or several steps may be combined and carried out simultaneously. Washing may be preferably carried out after the film hardening step, as described in Japanese Patent No. 3,331,615.

In the present invention, a swelling step, a dyeing step, a film hardening step, an orienting step, a drying step, a step of laminating a protective film, and a post-drying step after the laminating step, are particularly preferably carried out in this order one by one. Also, an online surface condition inspection step may be provided during or after the above process.

The swelling step is preferably carried out by using only water. It is possible to swell a base material of the polarizing plate with an aqueous boric acid solution, to control the degree of swelling of the base material of the polarizing plate, thereby to stabilize optical performance and to avoid occurrence of wrinkles on the base material of the polarizing plate in the production line, as described in JP-A-10-153709.

Also, the temperature and the period of time in the swelling step may be arbitrarily determined, but a temperature of 10° C. or more and 60° C. or less and a period of time of 5 seconds or more and 2,000 seconds or less are preferable.

As the dyeing step, use may be made of the method described in JP-A-2002-86554. Also, as a dyeing method, not only dipping but also any means such as coating with or spraying of an iodine or dye solution, may be used. Also, as described in JP-A-2002-290025, a dyeing method may be used in which the concentration of iodine, the temperature of a dyeing bath, and the magnification to be oriented in the bath are changed and the solution in the bath is stirred to carrying out dyeing.

When high order iodine ions are used as the dichroic molecule, it is preferable to use a solution prepared by dissolving iodine in an aqueous potassium iodide solution in the dyeing step, to obtain a high contrast polarizing plate. In the iodine-aqueous potassium iodide solution in this case, the content of iodine is preferably in a range from 0.05 to 20 g/L, the content of potassium iodine is preferably in a range from 3 to 200 g/L and the ratio by mass of iodine to potassium iodide is in a range from 1 to 2,000. The period of dyeing time is preferably 10 to 1,200 seconds, and the liquid temperature is preferably 10 to 60° C. It is more preferable that the content of iodine be 0.5 to 2 g/L, the content of potassium iodide be 30 to 120 g/L, the ratio by mass of iodine to potassium iodide be 30 to 120, the dyeing time be 30 to 600 seconds, and the liquid temperature be 20 to 50° C.

Also, as described in Japanese Patent No. 3,145,747, a boron-series compound, such as boric acid and borax, may be added to the dye solution.

In the film hardening step, the film is preferably impregnated with a crosslinking agent by dipping the film in a crosslinking agent solution or by applying the solution. Also, the film hardening step may be divided into several steps which are then carried out one by one, as described in JP-A-11-52130.

As the crosslinking agent, those described in U.S. Reissued Pat. No. 232,897 may be used; and a polyvalent aldehyde may also be used as the crosslinking agent, to improve dimensional stability, as described in Japanese Patent No. 3,357, 109. Among these compounds, a boric acid may be most preferably used. When a boric acid is used as the crosslinking agent to be used in the film hardening step, a metal ion may be added to the aqueous boric acid-potassium iodide solution. As the metal ion, zinc chloride is preferable; but a zinc halide such as zinc iodide, and zinc salt, such as zinc sulfate or zinc acetate, may be used in place of zinc chloride, as described in JP-A-2000-35512.

In the present invention, the following method is preferably carried out, in which an aqueous boric acid-potassium-iodide solution to which zinc chloride is added is prepared, and then the PVA film is dipped in the aqueous solution, to harden the resultant film. Preferably, boric acid is added in an amount of 1 to 100 g/L, potassium iodide is added in an amount of 1 to 120 g/L, zinc chloride is added in an amount of 0.01 to 10 g/L, the film hardening time is 10 to 1,200 seconds, and the liquid temperature is 10 to 60° C. It is more preferable that boric acid is added in an amount of 10 to 80 g/L, potassium iodide is added in an amount of 5 to 100 g/L, zinc chloride is added in an amount of 0.02 to 8 g/L, the film hardening time is 30 to 600 seconds, and the liquid temperature is 20 to 50° C.

In the orienting step, a vertical single axis orienting system as described in U.S. Pat. No. 2,454,515, or a tenter system as described in JP-A-2002-86554, may be preferably used. The orienting ratio (stretching magnification) is preferably 2 to 12, more preferably 3 to 10. Also, the relationship among the orienting ratio, the thickness of the raw film, and thickness of the polarizer may be preferably made to satisfy: {(Film thickness of the polarizer after the protective film is laminated)/ (Film thickness of the raw film)}×(Total orienting ratio)>0.17, as described in JP-A-2002-040256; or, the relationship between the width of the polarizer when it is taken out from a final bath and the width of the polarizer when the protective film is laminated may be preferably made to satisfy: 0.80≦{(The width of the polarizer when the protective film is laminated)/(The width of the polarizer when it is taken out of a final bath)}≦0.95, as described in JP-A-2002-040247.

In the drying step, a known method as described in JP-A-2002-86554 may be used, wherein the temperature is preferably in a range from 30° C. to 100° C., the drying time is preferably 30 seconds to 60 minutes. It is also preferable to carry out such heat treatment as to raise an in-water fading temperature to 50° C. or more, as described in Japanese Patent No. 3,148,513; and it is also preferable to carry out aging in an atmosphere in which the temperature and humidity are controlled, as described in JP-A-07-325215 and JP-A-07-325218.

The step of laminating the protective film is a step of laminating two protective films to both sides of the polarizer discharged from the drying step. A method is preferably used in which an adhesive liquid is supplied just before the lamination is started, and then the protective films are laminated to the polarizer, by using a pair of rolls. Also, it is preferable to adjust the water content of the polarizer when it is laminated, to suppress record groove-like irregularities which may be caused by orienting the polarizer, as described in JP-A-2001-296426 and JP-A-2002-86554. In the present invention, a water content of 0.1% to 30% may be preferably used.

There is no particular limitation to the adhesive to be applied to the protective film and the polarizer, and examples of the adhesive include PVA resins (including modified PVA resins containing an acetoacetyl group, sulfonic acid group, carboxyl group or oxyalkylene group), and aqueous boron compound solutions. Among these, PVA type resins are preferable. The thickness of the adhesive layer is preferably 0.01 to 5 μm and more preferably 0.05 to 3 μm, after the adhesive layer is dried.

Also, it is preferable to adhere the polarizer to the protective film after the protective film is made hydrophilic by a surface treatment, to improve the adhesion of the polarizer to the protective film. There is no particular limitation to the surface-treating method, and any known method such as a method of carrying out saponification using an alkali solution and a corona treatment method may be used. Also, an adhesive layer such as a gelatin undercoat layer may be provided after surface treatment. The contact angle of the surface of the protective film with water is preferably 50' or less, as described in JP-A-2002-267839.

Drying condition after the protective layer is laminated to the polarizer accords to that in the method described in JP-A-2002-86554. The temperature is preferably in a range from 30° C. to 100° C. and the drying time is preferably 30 seconds to 60 minutes. It is also preferable to carry out aging in an atmosphere in which the temperature and humidity are controlled, as described in JP-A-07-325220.

Each content of elements in the polarizer is preferably as follows: iodine 0.1 to 3.0 g/m², boron 0.1 to 5.0 g/m², potassium 0.1 to 2.00 g/m², and zinc 0 to 2.00 g/m². The content of potassium may be 0.2 mass % or less as described in JP-A-2001-166143, and the content of zinc in the polarizer may be designed to be 0.04 mass % to 0.5 mass % as described in JP-A-2000-035512.

As described in Japanese Patent No. 3,323,255, in order to improve the dimensional stability of the polarizing plate, an organic titanium compound and/or an organic zirconium compound are added and used in any one of the dyeing step, orienting step and film hardening step, to allow the polarizing plate to contain at least one compound selected from an organic titanium compound and an organic zirconium compound. Also, a dichroic dye may be added to regulate the hue of the polarizing plate.

(Characteristics of the Polarizing Plate)

(1) Transmittance and the Degree of Polarization

The single plate transmittance of the polarizing plate of the present invention is preferably 42.5% or more and 49.5% or less, more preferably 42.8% or more and 49.0% or less. The degree of polarization defined by the following expression (10) is preferably 99.900% or more and 99.999% or less, more preferably 99.940% or more and 99.995% or less. The parallel transmittance is preferably 36% or more and 42% or less, and the orthogonal transmittance is preferably 0.001% or more and 0.05% or less. The dichroic ratio defined by the following expression (11) is preferably 48 or more and 1,215 or less, more preferably 53 or more and 525 or less.

The aforementioned transmittance (T) is defined according to JIS Z 8701.

$$T = K \int S(\lambda) y(\lambda) \tau(\lambda) d\lambda$$

Herein, K, S($\lambda$), y($\lambda$), and $\tau(\lambda)$ are as follows.

$$K = \frac{100}{\int S(\lambda) y(\lambda) d\lambda} \quad \text{(Expression 9)}$$

S($\lambda$): Spectral distribution of a standard light to be used for color display;
y($\lambda$): Color equation function in a XYZ system; and
$\tau(\lambda)$: Spectral transmittance.

The degree of polarization is defined by expression (10).

(Degree of polarization)(%)=100×[{(Parallel transmittance)−(Orthogonal transmittance)}/{(Parallel transmittance)+(Orthogonal transmittance)}]$^{1/2}$ (Expression 10)

The parallel transmittance and the orthogonal transmittance are defined by the above expression (9), similar to the above-mentioned single plate transmittance.

Also, the dichroic ratio is defined by expression (11).

(Dichroic ratio)(Rd)=log[{(Single plate transmittance)/100} {1−(Degree of polarization)/100}]/log[{(Single plate transmittance)/100} {1+(Degree of polarization)/100}] (Expression 11)

The concentration of iodine and the single plate transmittance may be, respectively, in the ranges, as described in JP-A-2002-258051.

The wavelength dependency of the parallel transmittance may be small, as described in JP-A-2001-083328 and JP-A-2002-022950. The optical characteristics when the polarizing plates are arranged in a cross nicol position, may be in the ranges, as described in JP-A-2000-091736. The relationship between the parallel transmittance and the orthogonal transmittance may also be within the range as described in JP-A-2002-174728.

As described in JP-A-2002-221618, the standard deviation of the parallel transmittance at each wavelength interval of 10 nm in the wavelengths of light ranging from 420 to 700 nm, may be 3 or less; and the minimum value of {(parallel transmittance)/(orthogonal transmittance)} at each wavelength interval of 10 nm in the wavelengths of light ranging from 420 to 700 nm, may be 300 or more.

The parallel transmittances and orthogonal transmittances of the polarizing plate at wavelengths of 440 nm, 550 nm, and 610 nm are preferably made to fall in the ranges, respectively, as described in JP-A-2002-258042 and JP-A-2002-258043.

(2) Hue

The hue of the polarizing plate of the present invention is preferably evaluated using a luminosity index L* and a chromaticness indexes a and b* in a L*a*b* color indication system, which is recommended as the CIE uniform perceptual space.

L*, a*, and b* are defined by expression (12), by using the aforementioned X, Y, and Z:

$$L^* = 116(Y/Y_0)^{\frac{1}{3}} - 16 \quad \text{(Expression 12)}$$
$$a^* = 500\left[(X/X_0)^{\frac{1}{3}} - (Y/Y_0)^{\frac{1}{3}}\right]$$
$$b^* = 200\left[(Y/Y_0)^{\frac{1}{3}} - (Z/Z_0)^{\frac{1}{3}}\right]$$

wherein $X_0$, $Y_0$, and $Z_0$ represent three stimulation values of a light source, in the case of a standard light C, $X_0$=98.072, $Y_0$=100, and $Z_0$=118.225, and in the case of a standard light D65, $X_0$=95.045, $Y_0$=100, and $Z_0$=108.8.92.

The value a* of a single polarizing plate is preferably −2.5 or more and 0.2 or less, and more preferably −2.0 or more and 0 or less. The value b* of a single polarizing plate is preferably 1.5 or more and 5 or less, and more preferably 2 or more and 4.5 or less. The value a* of two polarizing plates for parallel transmitting light is preferably −4.0 or more and 0 or less, and more preferably −3.5 or more and −0.5 or less. The value b* of two polarizing plates for parallel transmitting light is preferably 2.0 or more and 8 or less, and more preferably 2.5 or more and 7 or less. The value a* of two polarizing plates for orthogonal transmitting light is preferably −0.5 or more and 1.0 or less, and more preferably 0 or more and 2 or less. The value b* of two polarizing plates for orthogonal transmitting light is preferably −2.0 or more and 2 or less, and more preferably −1.5 or more and 0.5 or less.

The hue may be evaluated by a chromaticity coordinate (x, y) calculated from the above X, Y, and Z. For example, The chromaticity ($x_p$, $y_p$) of two polarizing plates for parallel transmitting light and the chromaticity ($x_c$, $y_c$) of two polarizing plates for orthogonal transmitting light may be preferably designed to fall in the ranges described in JP-A-2002-214436, JP-A-2001-166136 and JP-A-2002-169024; and the relationship between the hue and the absorbance may be preferably designed to fall in the range described in JP-A-2001-311827.

(3) Viewing Angle Characteristics

When the polarizing plates are arranged as a cross nicol and a light of wavelength 550 nm is incident, both the transmittance ratio and the xy chromaticity difference, between the case where the light is incident vertically and the case where the light is incident at an angle of 40° to the normal line from a direction inclined at an angle of 45° to the polarizing axis, are preferably designed to fall in the ranges, as described in JP-A-2001-166135 and JP-A-2001-166137. Also, the ratio $(T_{60}/T_0)$ which is a ratio of the light transmittance $(T_0)$ in a direction perpendicular to a laminate of the polarizing plate arranged as a cross nicol to the light transmittance $(T_{60})$ in a direction inclined at an angle of 60° with the normal line of the laminate, may be preferably designed to be 10,000 or less, as described in JP-A-10-068817. When natural light is incident on the polarizing plate at any angle ranging from the normal line to an elevation angle 80°, a difference in transmittance for a transmitting light within a 20-nm wavelength region in the wavelength ranging from 520 to 640 nm in the transmission spectrum, is preferably designed t be 6% or less, as described in JP-A-2002-139625. Also, a difference in luminescence of a transmitting light between optional places apart in 1-cm from each other on the film, is preferably designed to be within 30%, as described in JP-A-08-248201.

(4) Durability (4-1) Durability Under High Humidity and Temperature

A polarizing plate is necessary being less in the change of polarization degree even if it is allowed to stand under a high-humidity condition, thereby to stand use in a high-humidity condition. In the present invention, the degrees of polarization before and after the polarizing plate is allowed to stand in a 60° C. and 95% RH atmosphere for 500 hrs are measured, to find a change in the degree of polarization according to the following expression (13). Each transmittance is measured using an automatic spectrophotometer UV3100 (trade name) manufactured by Shimadzu Corporation.

(Change in the degree of polarization)=(Degree of polarization of a sample after the lapse of time)−(Degree of polarization of the sample before the lapse of time)     Expression (13)

In the present invention, each change (absolute value) in the degrees of polarization and light transmittance before and after the polarizing plate is allowed to stand in a 60° C. and 90% RH atmosphere for 500 hrs is preferably 3% or less, and more preferably within 2%, as described in JP-A-2001-116922. Particularly, the change (absolute value) in transmittance is preferably 2% or less, and the change (absolute value) in the degree of polarization is preferably 1.0% or less, and more preferably 0.1% or less. Also, the degree of polarization and the single plate transmission after the polarizing plate is allowed to stand at 80° C. under 90% RH for 500 hrs are preferably 95% or more and 38% or more, respectively, as described in JP-A-07-077608.

(4-2) Durability in a Dry Circumstance

Each change (absolute value) in transmittance and the degrees of polarization before and after the polarizing plate is allowed to stand in a 80° C. and dry atmosphere for 500 hrs is also preferably 3% or less. Particularly, the change (absolute value) in transmittance is preferably 2% or less, and the change (absolute value) in the degree of polarization is preferably 1.0% or less and more preferably 0.1% or less.

(4-3) Other Durability

Further, the shrinkage factor after the polarizing plate is allowed to stand at 80° C. for 2 hrs is designed to be preferably 0.5% or less as described in JP-A-06-167611. The x value and y value obtained after a laminate of the polarizing plates arranged as a cross nicol on the both sides of a glass plate is allowed to stand in a 69° C. atmosphere for 750 hrs is preferably designed to be in the ranges described in JP-A-10-068818. A change in the ratio of spectrum intensities at 105 $cm^{-1}$ and 157 $cm^{-1}$ in a Raman spectral method after the polarizing plate is allowed to stand in a 80° C. and 90% RH atmosphere for 200 hrs is preferably designed to be in the ranges described in JP-A-08-094834 or JP-A-09-197127.

(5) Degree of Orientation

A better polarizing performance is obtained as the degree of orientation of the PVA increases. The degree of orientation of the PVA is preferably in a range from 0.2 to 1.0, as an order parameter value calculated by means of, for example, polarization Raman scattering or polarization FT-IR. The difference between the orientation factor of a high-molecular segment in all amorphous region of the polarizer and the orientation factor (0.75 or more) of occupied molecules is preferably designed to be at least 0.15 as described in JP-A-59-133509. Also, the orientation factor in an amorphous region of the polarizer may be preferably designed to be 0.65 to 0.85, and the degree of orientation of high-order iodine ions such as $I_3^-$ or $I_5^-$ may be preferably designed to be 0.8 to 1.0 as an order parameter value, as described in JP-A-04-204907.

(6) Other Characteristics

The shrinking force per unit width in the direction of the absorption axis when the polarizing plate is heated at 80° C. for 30 minutes, may be preferably designed to be 4.0 N/cm or less, as described in JP-A-2002-006133. It is also preferable that when the polarizing plate is allowed to stand under heating at 70° C. for 120 hours, the rate of change in the dimension of the polarizing plate in the direction of the absorption axis and the rate of change in the dimension of the polarizing plate in the direction of the polarization axis be respectively designed to be within +0.6% as described in JP-A-2002-236213. Also, the water content of the polarizing plate is preferably designed to be 3 mass % or less as described in JP-A-2002-090546. Moreover, the surface roughness of the polarizing plate in the direction perpendicular to the orienting axis is preferably designed to be 0.04 μm or less based on an centerline average roughness, as described in JP-A-2000-249832. The refractive index no of the polarizing plate in the direction of the transmission axis is preferably designed to be 1.6 or more as described in JP-A-10-268294. Also, the relationship between the thickness of the polarizing plate and the thickness of the protective film is designed to fall in the range described in JP-A-10-111411.

(Functionalizing of the Polarizing Plate)

The polarizing plate of the present invention is preferably used as a functional polarizing plate 144 combined with an optical film having a functional layer, such as a hardcoat layer, a forward scattering layer, or an antiglare layer; a film expanding a viewing angle for LCDs; a retardation film, such as a λ/4 plate to be applied to reflection type LCDs; an antireflection film improving the visibility of a display, a luminescence improving film.

An embodiment of a structure in which the polarizing plate of the present invention is combined with the aforementioned functional optical film is shown in FIG. 1. As a protective film on one side of a polarizing plate 5, a functional optical film 3 may be adhered to a polarizer 2 through an adhesive layer (FIG. 1(A)). The functional optical film 3 may be adhere to the polarizing plate 5 provided with protective films 1a and 1b on both sides of the polarizer 2, through an adhesive layer 4 (FIG. 1(B)). In the former case, an optional transparent protective film may be used as the other protective film 1. Also, in the polarizing plate of the present invention, an optical functional layer is preferably laminated onto the protective film through an adhesive layer, to form the functional optical film 3, thereby to make a structure as shown in FIG. 1(A). The peeling strength between such layers as the functional layer and the protective film, are preferably designed to be 4.0 N/25 mm or more, as described in JP-A-2002-311238. The functional optical film is preferably arranged on the liquid crystal module side or on the side opposite to the liquid crystal module, namely, on the display side or the back-light side, according to the function to be intended.

A variety of functional optical films each of which can be used in combination with the polarizing plate of the present invention, will be explained below.

(1) Film Expanding a Viewing Angle

The polarizing plate of the present invention may be used in combination with a film expanding a viewing angle, which film is proposed for use in such a display mode as TN (Twisted Nematic), IPS (In-Plane Switching), OCB (Optically Compensatory Bend), VA (Vertically Aligned), and ECB (Electrically Controlled Birefringence).

As a film expanding a viewing angle for TN mode, the polarizing plate is preferably combined and used with WV Film (trade name, manufactured by Fuji Photo Film Co., Ltd.), as described, for example, in J. Printing Society Japan, Vol. 36, No. 3 (1999), pp. 40-44; "Monthly Display," August Issue (2002), pp. 20-24; JP-A-4-229828, JP-A-6-75115, JP-A-6-214116 and JP-A-8-50206.

The film expanding a viewing angle for TN mode preferably has a structure in which an oriented layer and an optically anisotropic layer are formed in this order on the aforementioned transparent polymer film. The film expanding a viewing angle may be laminated to the polarizing plate through an adhesive prior to use, and it is particularly preferably used so as to double as one of the aforementioned protective films used for the polarizer, from the viewpoint of making thin the functional optical film, as described in SID'00 Dig., p. 551 (2000).

The oriented layer can be provided by rubbing an organic compound (preferably a polymer), oblique evaporation of an inorganic compound, or forming a layer having a micro group. Furthermore, there have been known oriented layers having orientation function imparted thereto by applying an electrical field, applying a magnetic field, or irradiating with light. It is preferable to form the oriented layer by subjecting a polymer to rubbing treatment. The rubbing treatment can be preferably performed by rubbing the surface of the polymer layer with paper or cloth several times along a certain direction. The direction of the absorption axis of the polarizer is preferably substantially parallel to a rubbing direction. As to the type of polymer to be used for the oriented layer, a polyimide, a polyvinyl alcohol, or a polymer having a polymerizable group, as described in JP-A-9-152509, can be preferably used. The thickness of the oriented layer is preferably from 0.01 to 5 μm, more preferably from 0.05 to 2 μm.

The optically anisotropic layer preferably contains a liquid crystalline compound. It is particularly preferable that the liquid crystal compound used in the present invention contain a discotic compound (discotic liquid crystal). The discotic liquid crystal molecule has a structure in which it has a disk-like core portion like a triphenylene derivative of the following D-1 and a side chain(s) is extended radially from the core portion. Also, it is preferable to further introduce a group reactive under heat or light, into the liquid crystal molecule, to impart stability with the lapse of time. Preferable examples of the above discotic liquid crystal are described, for example, in JP-A-8-50206.

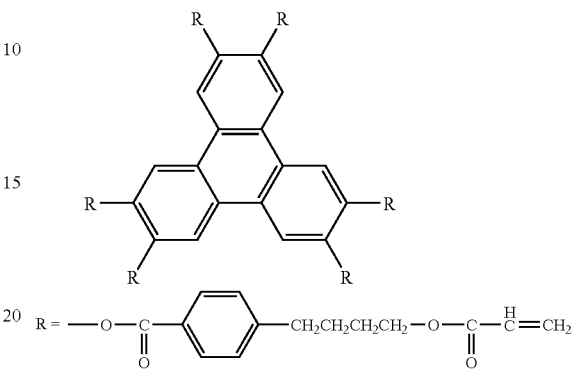

The discotic liquid crystal molecules are oriented at a pretilt angle with a rubbing direction in almost parallel to the plane of the film in the vicinity of the oriented layer. On the opposite side exposed to the air, the discotic liquid crystal molecules are oriented in a manner that they are standing or being almost perpendicular to the plane of the film. The discotic liquid crystal layer takes the form of hybrid orientation as a whole, and this layer structure makes it possible to achieve a wide viewing angle of a TN mode TFT-LCD.

The aforementioned optically anisotropic layer may be generally obtained in the following manner: A solution prepared by dissolving a discotic compound and other compound(s) (further, for example, a polymerizable monomer, a photoinitiator) in a solvent is applied onto the oriented layer, followed by drying and then heating to the temperature at which a discotic nematic phase is formed, further followed by irradiating UV light to polymerize and then cooling. The discotic nematic liquid crystal phase-solid phase transition temperature of the discotic liquid crystal compound that can be used in the present invention is preferably 70 to 300° C. and particularly preferably 70 to 170° C.

Also, as a compound which may be added to the above optically anisotropic layer other than the discotic compound, any compound may be used insofar as it is compatible with the discotic compound and it can give a preferable change in slanting angle to the liquid crystal discotic compound or it does not inhibit the orientation of the discotic compound. Among these, examples include additive for orientation control on the side exposed to air, such as polymerizable monomers (for example, compounds having a vinyl group, vinyloxy group, acryloyl group, or methacryloyl group), and fluorine-containing triazine compounds; polymers, such as cellulose acetate, cellulose acetate propionate, hydroxypropylcellulose, and cellulose acetate butyrate. Any of these compounds may be used in an addition amount of generally 0.1 to 50 mass % and preferably 0.1 to 30 mass % based on the discotic compound.

The thickness of the optically anisotropic layer is preferably 0.1 to 10 μm and more preferably 0.5 to 5 μm.

A preferred embodiment of the film expanding a viewing angle is constituted of a cellulose acylate film as a transparent base material film, an oriented layer formed on the film, and an optically anisotropic layer which is formed on the oriented layer and is composed of a discotic liquid crystal, the optically anisotropic layer being crosslinked by irradiation with UV light.

Also, in the case of combining the film expanding a viewing angle with the polarizing plate of the present invention besides the above cases, for example, the combined product is further laminated on a phase difference plate which has an optical axis in the direction crossing the plate surface and has anisotropy to birefringence, as described in JP-A-07-198942. Also, the rates of the dimensional changes of the protective film and the optically anisotropic layer are preferably made to be substantively equal to each other, as described in JP-A-2002-258052. Also, the water content of the polarizing plate to be laminated to the film expanding a viewing angle is preferably designed to be 2.4% or less, as described in JP-A-12-258632. Moreover, the contact angle of the surface of the film expanding a viewing angle with water is preferably made to be 70° or less, as described in JP-A-2002-267839.

The film expanding a viewing angle for an IPS mode liquid crystal cell is used for optically compensating a liquid crystal molecule oriented in parallel to the surface of a substrate and for improving viewing angle characteristics of the perpendicular (cross) transmittance of the polarizing plate, when the display displays black in the state where no electrical field is applied. In the EPS mode, black is displayed and the transmission axes of a pair of upper and lower polarizing plates intersect perpendicularly with each other in the state where no field is applied. However, when viewed from a slant direction, the cross angle of the transmission axes is not 90°, causing light to leak, resulting in reduction in contrast. When the polarizing plate of the present invention is used in the IPS mode liquid crystal cell, it is preferably used in combination with a film expanding a viewing angle which film has an in-plane phase difference close to 0 and a phase difference in the direction of the thickness, to decrease light leakage, as described in JP-A-10-54982.

The film expanding a viewing angle for an OCB mode liquid crystal cell may be utilized to optically compensate a liquid crystal layer which is oriented vertically in the center part of the liquid crystal layer by applying electric field and which is oriented in an inclined state in the vicinity of the boundary of the substrate, thereby to improve the viewing angle characteristics when displaying black. When the polarizing plate of the present invention is used in the OCB mode liquid crystal cell, it is preferably used in combination with a film expanding a viewing angle which film is obtained by orienting a disk-like liquid crystal compound in a hybrid state, as described in U.S. Pat. No. 5,805,253.

The film expanding a viewing angle for a VA mode liquid crystal cell improves viewing angle characteristics of a black display when a liquid crystal molecule is oriented in the state vertical to the surface of the substrate when no electrical field is applied. A film expanding a viewing angle like this is preferably used in combination with one obtained by laminating a film constituted of a rod-like compound such as a liquid crystal molecule to prevent deterioration of cross transmittance in the slanting direction of the polarizing plate, a film in which a disk-like compound is oriented in parallel to a substrate, a film in which oriented films having the same in-line retardation values are laminated such that the slow axes intersect perpendicularly with each other, and a film which has an in-plane phase difference close to 0 and which has a phase difference in the thickness direction, as described in Japanese Patent No. 2,866,372. Also, a norbornane type resin film or polycarbonate resin which is provided with a phase difference by orienting, is preferably used as the film expanding a viewing angle or a part thereof.

(2) Retardation Film

The polarizing plate of the present invention preferably has a phase difference layer (retardation layer). The phase difference layer in the present invention is preferably a λ/4 plate. If the polarizing plate of the present invention is laminated on the λ/4 plate, the resulting laminate may be used as a circular polarization plate. The circular polarization plate has the ability to convert incident light into circularly polarized light, and it is preferably utilized in reflection type liquid crystal display devices, semi-transmission type liquid crystal display devices such as ECB mode, and organic EL devices.

The λ/4 plate that can be used in the present invention is preferably a retardation film having a retardation (Re) about ¼ the wavelength of visible light in the wavelength range of visible light to obtain almost complete circularly polarized light. Herein, the terminology "a retardation (Re) about ¼ the wavelength of visible light in the wavelength range of visible light" means a retardation within a range in which the retardation value becomes larger as in a longer wavelength side in the range of wavelength 400 to 700 nm, and in which the following relationship is satisfied: that a retardation value (Re450) measured at a wavelength of 450 nm is 80 to 125 nm and a retardation value (Re590) measured at a wavelength of 590 nm is 120 to 160 nm. It is more preferable that (Re590−Re450)≧5 nm and it is particularly preferable that (Re590−Re 450)≧10 nm.

There is no particular limitation to the λ/4 plate to be used in the present invention insofar as it satisfies the above conditions, and any known λ/4 plates may be used, for example, said λ/4 plates including a λ/4 plate obtained by laminating plural polymer films, as described in JP-A-5-27118, JP-A-10-68816 and JP-A-10-90521; a λ/4 plate obtained by orienting one polymer film, as described in WO00/65384 and WO00/26705; and a λ/4 plate obtained by providing at least one optically anisotropic layer on a polymer film, as described in JP-A-2000-284126 and JP-A-2002-31717. Also, the direction of the slow axis of the polymer film and the direction of the orientation of the optically anisotropic layer may be designed to be optional, according to the liquid crystal cell to which any of these layers be laminated.

In the circular polarizing plate, the slow axis of the λ/4 plate and the transmitting axis of the aforementioned polarizer intersect with each other at any angle, and these axes may intersect with each other preferably at an angle within the range of 45°±20°. Alternately, the slow axis of the λ/4 plate and the transmitting axis of the aforementioned polarizer may intersect with each other at an angle other than the above range.

When the λ/4 plate is structured by laminating a λ/4 plate and a λ/2 plate, these plates are preferably laminated such that the angles formed between each in-plane slow axis of the λ/4 plate and λ/2 plate and the transmission axis of the polarizing plate is substantially 75° and 15°, respectively, as described in Japanese Patent No. 3,236,304 and JP-A-10-68816.

(3) Antireflection Film

The polarizing plate of the present invention may be used in combination with an antireflection film. As the antireflection film, use may be made of any of a film having a reflectance of about 1.5%, which is obtained by providing only one layer of a low-refractive index material such as a fluorine type polymer; and a film having a reflectance of 1% or less, by utilizing multilayer interference of thin films. In the present invention, use may be preferably made of a structure in which a low-refractive index layer and at least one layer (namely, a high-refractive index layer, or a middle-refractive index layer) having a higher refractive index than the low-refractive index layer are laminated on a transparent support. Also, an antireflection film, as described in Nitto Giho, vol. 38, No. 1, May, 2000, pp. 26-28; and JP-A-2002-301783, may be preferably used.

It is preferable that the transparent protective film disposed on the side opposite to the liquid crystal cell in the polarizing plate be provided with an antireflection layer. Particularly, in the present invention, an antireflection film obtained by laminating at least a light scattering layer and a low-refractive index layer in this order on a transparent protective film; or an antireflection layer obtained by laminating a middle-refractive index layer, a high-refractive index layer and a low-refractive index in this order on a transparent protective film, is preferably used. Preferable examples of these will be explained below.

Preferable examples of the antireflection film provided with a light scattering layer and a low-refractive index layer on a transparent protective film will be explained.

In the light-scattering layer used in the present invention, matt particles are dispersed, and the refractive index of base materials of the parts other than matt particles of the light-scattering layer is preferably in a range from 1.50 to 2.00. The refractive index of the low-refractive index layer is preferably in a range from 1.35 to 1.49. In the present invention, the light scattering layer is provided with a combination of antiglare characteristics and hardcoat characteristics, and may be constituted of a single layer or multilayer, for example, two layers to four layers.

It is preferable to design the antireflection layer to have the following surface irregularity conditions: the center line average roughness Ra being 0.08 to 0.40 μm, the ten-point-average roughness Rz being 10 times or less the value of Ra, the average distance Sm between the top of the convex and the bottom of the concave next to the convex being 1 to 100 μm, a standard deviation in the height from the deepest bottom of the concave portion to each top of the convex portion being 0.5 μm or less, a standard deviation of the average distance Sm between the top of the convex and the bottom of the concave based on the center line being 20 μm or less, and a plane of which the angle of inclination is 0 to 50 being 10% or more; and such an antireflection layer makes it possible to attain sufficient antiglare characteristics and visually uniform matte texture, which are preferable. Also, it is preferable that the chromaticness of reflecting light under a C light source satisfies the following conditions: a value $a^*$ being −2 to 2; a value $b^*$ being −3 to 3; and a ratio of the minimum value to the maximum value of the reflectance in the range of 380 nm to 780 nm being within a range of 0.5 to 0.99. This allows the chromaticness of the reflecting light to be neutral, which is preferable. The value $b^*$ of transmission light under a C light source is preferably designed to be 0 to 3, which is preferable because yellowish of a white display is reduced when the antireflection layer is applied to a display device. Also, it is preferable that a standard deviation of the distribution of luminescence is 20 or less, when a grating of 120 μm×40 μm is inserted between a plane light source and the antireflection film used in the present invention to measure the distribution of luminescence on the film. This is because glaring when the film of the present invention is applied to a high precision panel is reduced, which is preferable.

The antireflection layer that can be applied to the present invention is preferably designed to have the following optical characteristics: a mirror reflectance 2.5% or less, a transmittance 90% or more, and a 60-degree glossiness 70% or less, thereby the reflection of external light can be suppressed to improve visibility. In particular, the mirror reflectance is more preferably 1% or less, and most preferably 0.5% or less. Also, the antireflection layer preferably has the following characteristics: a haze 20% to 50%, a ratio of (an internal haze)/(the total haze) 0.3 to 1; a reduction in the haze value obtained after the formation of the low-refractive index layer, from the haze value obtained from layers including the light scattering layer, being within 15%; a transmission image sharpness in a comb width 0.5 mm, being 20% to 50%; and a ratio of (a transmittance of a vertical transmission light)/(a transmittance of a transmission light incident at a slanting angle of 2° with the vertical direction) being 1.5 to 5.0, to thereby attain prevention of glaring on a high precision LCD panel and reduction in blurring of a character or the like, from occurrence.

(Low-refractive-index Layer)

The low-refractive-index layer is generally laminated on the high-refractive-index layer.

The refractive index of the low-refractive-index layer in the anti-reflection film of the present invention is generally in the range of 1.20 to 1.49, preferably 1.30 to 1.44. Further, the low refractive index layer preferably satisfies the following expression (14), in view of low reflectance.

$$(m\lambda/4)\times 0.7 < n1d1 < (m\lambda/4)\times 1.3 \qquad \text{Expression (14)}$$

In the expression, m is a positive odd number, n1 is a refractive index of the low refractive index layer, and d1 is a thickness (nm) of the low refractive index layer. Further, λ is a wavelength having a value in the range of 500 to 550 nm.

The materials to form the low-refractive index layer that can be used in the present invention will be explained.

The low-refractive index layer that can be used in the present invention generally contains a fluorine-containing polymer as a low-refractive index binder. The fluorine-containing polymer is preferably one which has a dynamic friction coefficient of 0.03 to 0.20, a contact angle of 90 to 1200 with water, and a pure water slip-off angle of 70° or less, and which is crosslinkable by heat or ionizing radiation. It is preferable that when the antireflection film of the present invention is set to an image display device, the peeling strength of the antireflection film from a commercially available adhesive tape be lower, because seals or memos are easily peeled off after they are applied. The peeling strength is preferably 500 gf or less, more preferably 300 gf or less, and most preferably 100 gf or less. As the surface hardness of the antireflection film is higher when measured by a micro-hardness meter, the low-refractive index layer is damaged easily, and the surface hardness is preferably 0.3 GPa or more, more preferably 0.5 GPa or more.

Examples of the fluorine-containing polymer that can be used in the low refractive index layer, include hydrolysates or dehydrocondensates of a perfluoroalkyl group-containing silane compound (for example, (heptadecafluoro-1,1,2,2-tetrahydrodecyl)triethoxysilane), and in addition, fluorine-containing copolymers derived from a fluorine-containing monomer and a constitutional unit for imparting crosslinking reactivity, as constituents.

Specific examples of the fluorine-containing monomer unit include, for example, fluoroolefins (for example, fluoroethylene, vinylidene fluoride, tetrafluoroethylene, perfluorooctylethylene, hexafluoropropylene, perfluoro-2,2-dimethyl-1, 3-dioxol), partially or completely fluorinated alkyl ester derivatives of (meth)acrylic acid (for example, BISCOAT 6FM (trade name), manufactured by Osaka Organic Chemical Industry, Ltd., and M-2020 (trade name), manufactured by Daikin Industries, Ltd.), and completely or partially fluorinated vinyl ethers, or the like. Among these, a perfluoroolefin is preferred. From the viewpoints of refractive index, solubility, transparency, and availability, hexafluoropropylene is particularly preferable.

Examples of the constituting unit for imparting crosslinking reactivity include, for example, the constituting unit obtained by polymerization of a monomer already having a self-crosslinking functional group in the molecule, such as glycidyl (meth)acrylate and glycidyl vinyl ether; the constituting unit obtained by polymerization of a monomer having a carboxyl group, a hydroxyl group, an amino group, a sulfo group, or the like (for example, (meth)acrylic acid, methylol (meth)acrylate, hydroxyalkyl (meth)acrylate, alkyl acrylate, hydroxyethyl vinyl ether, hydroxybutyl vinyl ether, maleic acid, crotonic acid, etc.); and the constituting unit comprised of the above-mentioned unit(s) to which a crosslinking reactive group such as (meth)acryloyl group has been introduced by a polymer reaction (for example, an acryloyl group can be introduced by a technique in which acrylic chloride is allowed to act on a hydroxyl group in the above-mentioned unit).

Further, besides the above-mentioned fluorine-containing monomer unit and the constituting unit for imparting crosslinking reactivity, a monomer containing no fluorine atom may be copolymerized therewith, in some cases appropriately, from the viewpoints of solubility in a solvent, transparency of the resulting film, and the like. The monomer unit that can be used in combination is not particularly limited, and examples of the monomer unit include olefins (e.g., ethylene, propylene, isoprene, vinyl chloride, vinylidene chloride), acrylic esters (e.g., methyl acrylate, ethyl acrylate, 2-ethylhexyl acrylate), methacrylic esters (e.g., methyl methacrylate, ethyl methacrylate, butyl methacrylate, ethyleneglycol dimethacrylate), styrene and derivatives thereof (e.g., styrene, divinylbenzene, vinyltoluene, α-methylstyrene), vinyl ethers (e.g., methyl vinyl ether, ethyl vinyl ether, cyclohexyl vinyl ether), vinyl esters (e.g., vinyl acetate, vinyl propionate, vinyl cinnamate), acrylamides (e.g., N-tert-butylacrylamide, N-cyclohexylacrylamide), methacrylamides, and acrylonitrile derivatives.

A curing agent may be used in combination with the above-mentioned polymer(s) appropriately, as disclosed in JP-A-10-25388 and JP-A-10-147739.

(Light Scattering Layer)

The light scattering layer is formed for imparting, to the film, light scattering characteristics resulting from surface scattering and/or internal scattering and hardcoat characteristics to improve scratch resistance of the film. The light scattering layer is generally formed to contain a binder, which imparts hardcoat characteristics; matt particles, which impart light scattering characteristics; and, if necessary, inorganic fillers, which raise refractive index, prevent crosslinking shrinkage from occur, and enhance mechanical strength.

The film thickness of the light scattering layer is preferably 1 to 10 μm and more preferably 1.2 to 6 μm, to impart the hardcoat characteristics. When the light scattering layer is too thin, the hard characteristics are insufficient, and on the other hand when too thick, the resultant film becomes poor due to its curling and brittle characteristics, thereby resulting poor treating or processing suitability.

As the compound (a binder polymer) used in the light scattering layer, a polymer having a saturated hydrocarbon chain or a polyether chain, as a main chain, is preferred. Among them, a polymer having a saturated hydrocarbon chain is more preferred. Further, it is preferred that the binder polymer has a cross-linking structure. As the binder polymer having a saturated hydrocarbon chain as a main chain, polymers of ethylenically unsaturated monomers are preferred. As the binder polymer having a saturated hydrocarbon chain as a main chain and in addition a cross-linking structure, (co)polymers of monomers having at least two ethylenically unsaturated groups are preferred. In order to produce a binder polymer having a high refractive index, it is possible to incorporate an aromatic ring, or at least one atom selected from a group consisting of halogen (except for fluorine), sulfur, phosphorus, and nitrogen atoms, into the structure of the foregoing monomer.

Examples of the monomer having two or more ethylenically unsaturated groups include esters of a polyhydric alcohol and a (meth)acrylic acid (e.g., ethyleneglycol di(meth)acrylate, butanediol di(meth)acrylate, hexanediol di(meth)acrylate, 1,4-cyclohexane di(meth)acrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetra(meth)acrylate, polyurethane poly(meth)acrylate, polyester poly(meth)acrylate), the aforementioned modified ethylene oxide, vinyl benzene and its derivatives (e.g., 1,4-divinylbenzene, 4-vinylbenzoic acid-2-acryloylethylester, 1,4-divinylcyclohexanone), vinylsulfones (e.g., divinylsulfone), acrylamides (e.g., methylene-bis-acrylamide), and methacrylamides. These monomers may be used singly or in combination of two or more of these.

Specific examples of the high-refractive-index monomer include bis(4-methacryloylthiophenyl)sulfide, vinylnaphthalene, vinylphenylsulfide, and 4-methacryloxyphenyl-4'-methoxyphenyl thioether. These monomers may also be used singly or in combination of two or more kinds of these.

Polymerization of any of these monomers having ethylenically unsaturated groups can be conducted by irradiation of ionization radiation or heat, in the presence of a photo radical initiator or a thermal radical initiator.

Accordingly, an anti-reflection film can be formed by the steps of: preparing a coating solution containing a monomer having ethylenically unsaturated groups, a photo radical initiator or a thermal radical initiator, matt particles, and an inorganic filler; applying said coating solution onto a transparent support; and then curing the same by a polymerization reaction by ionization radiation or heat. As the initiator, e.g. a photo radical initiator, any initiator may be used.

The polymer having polyether as a main chain is preferably a ring-opened polymer of a polyfunctional epoxy compound. The ring-opening polymerization of a multi-functional epoxy compound can be performed by irradiation of ionization radiation or heat, in the presence of a light-induced acid-generating agent or a heat-induced acid-generating agent.

Accordingly, an anti-reflection film may be formed by a method comprising the steps of: preparing a coating solution containing a multi-functional epoxy compound, a light-induced acid-generating agent or a heat-induced acid-generating agent, matt particles, and an inorganic filler; applying said coating solution on a transparent support; and then hardening the resultant coating by a polymerization reaction by ionization radiation or heat.

Using a monomer having a cross-linking functional group in place of, or in addition to, the monomer having 2 or more ethylenically unsaturated groups, cross-linking functional groups may be introduced into a polymer so that a cross-linking structure can be introduced into a binder polymer by the reaction of said cross-linking functional groups.

Examples of the cross-linking functional group include an isocyanato group, an epoxy group, an aziridine group, an oxazoline group, an aldehyde group, a carbonyl group, a hydrazine group, a carboxyl group, a methylol group, and an active methylene group. Vinyl sulfonic acid, acid arhydride, cyanoacrylate derivatives, melamine, etherificated methylol, ester and urethane, and also metal alkoxides such as tetramethoxysilane may be used as a monomer to introduce a cross-linking structure. It is also possible to use a functional group capable of exerting a cross-linking performance as a result of a decomposition reaction, such as a blocked isocyanate group. In other words, the term "cross-linking functional group" referred to herein embraces those exerting a cross-linking reaction as a result of decomposition even though they do not react instantly.

In a binder polymer having these cross-linking functional groups, a cross-linking structure can be formed by coating the binder polymer on a base, followed by heating.

In order to give anti-glare property to a light-scattering layer, the light-scattering layer may contain matt particles (such as inorganic compound particles or resin particles) having an average particle size of generally 1 to 10 μm (preferably 1.5 to 7.0 μm) that is larger than the filler-particle size.

Preferable specific examples of the afore-mentioned matt particles include inorganic compound particles, such as silica particles, and $TiO_2$ particles; and resin particles, such as acrylic particles, cross-linking acrylic particles, polystyrene particles, cross-linking styrene particles, melamine resin particles, and benzoguanamine resin particles. Among them, cross-linking styrene particles, cross-linking acryl particles, cross-linking acrylstyrene particles, and silica particles are preferred.

The shape of matt particles to be used may be any of a spherical form or an amorphous form.

Further, 2 or more kinds of the matt particles different in particle diameter may be used in combination. It is possible to impart antiglare characteristics using matt particles having a larger particle diameter and to impart other optical characteristics using matt particles having a smaller particle diameter.

The particle size distribution of the above-mentioned matt particles is preferably mono-disperse, and it is more preferable that the particle sizes of individual particles are almost same as much as possible. For example, assuming that particles having a larger particle size by 20% or more than the average particle size are designated as coarse particles, the content of said coarse particles is preferably 1% or less, more preferably 0.1% or less, and further more preferably 0.01% or less, to the total number of particles. The matt particles having the above-mentioned particle size distribution can be obtained according to a usual synthetic reaction followed by classification. Matt particles with a more preferable particle size distribution can be obtained by increasing the number of times of the classification or by advancing the degree of the classification.

The above matt particles are incorporated in a light-scattering layer so that the amount of matt particles in the formed light-scattering layer becomes preferably in the range of 10 to 1,000 mg/m², more preferably in the range of 100 to 700 mg/m².

Herein, the particle size distribution of matt particles may be measured by a Coulter counter method, and the measured distribution may be converted into a particle number distribution.

The light scattering layer preferably contains, in addition to the above-mentioned matt particles, an inorganic filler, which is composed of an oxide of at least one metal selected from titanium, zirconium, aluminum, indium, zinc, tin, and antimony, and which has an average particle diameter of 0.2 μm or less, preferably 0.1 μm or less, and more preferably 0.06 μm or less, in order to increase the refractive index of the layer.

On the contrary, in a light scattering layer containing high-refractive-index matt particles, in order to increase a difference in refractive index between the layer and the matt particles, it is preferred to use an oxide of silicon for maintaining the refractive index of the layer at a low level. A preferred particle size of the matt particles is the same as that of the above-mentioned inorganic filler.

Specific examples of the inorganic filler used in the light scattering layer include $TiO_2$, $ZrO_2$, $Al_2O_3$, $In_2O_3$, $ZnO$, $SnO_2$, $Sb_2O_3$, ITO (indium-tin oxide), and $SiO_2$. $TiO_2$ and $ZrO_2$ are particularly preferable in view of increasing a refractive index. It is also preferable that the surface of the inorganic filler is subjected to a silane coupling treatment or a titanium coupling treatinent. For this purpose, a surface treating agent having a functional group capable of reacting with the binder species is preferably used on the surface of the filler.

The addition amount of the inorganic filler is preferably 10 to 90 mass %, more preferably 20 to 80 mass %, and particularly preferably 30 to 75 mass %, to the total mass of the light scattering layer.

Note that such a filler has a sufficiently small particle size as compared with the wavelength of light so that it causes no scattering of light, and a dispersion of the filler dispersed in a binder polymer behaves as an optically uniform substance.

The mixture of the binder and the inorganic filler in the light scattering layer has a refractive index in the bulk thereof of preferably 1.48 to 2.00, more preferably 1.50 to 1.80. The refractive index can be set within the above-mentioned range, by appropriately selecting the kinds of the binder and the inorganic filler and the ratio of addition amounts thereof. By preliminary conducting experiments, such a selection can be known in a simple manner.

To secure surface state uniformity by particularly suppressing surface deficiency, such as coating unevenness, drying unevenness, and spot defects, the light-scattering layer may be formed from a coating composition for an antiglare layer that contains a fluorine-containing surfactant, a silicone-series surfactant, or both therein. In particular, the fluorine-containing surfactant is preferably used, since it exhibits, even with a smaller addition amount, the effect of obviating the surface deficiency, such as coating unevenness, drying unevenness or spot defects of the antireflection film according to the present invention. Such a surfactant is to be used, for improving productivity by imparting high-speed coatability with improving surface state uniformity.

Next, will be explained the antireflection layer which is produced by laminating a middle-refractive index layer, a high-refractive index layer, and a low-refractive index layer in this order on a transparent protective film.

An antireflection film at least having a layer structure obtained by forming, on a substrate, a middle refractive index layer, a high refractive index layer, and a low refractive index layer (the outermost layer) in this order, is preferably designed to have refractive indexes satisfying the following relationship.

(The refractive index of the high refractive index layer)>(the refractive index of the middle refractive index layer)>(the refractive index of the transparent substrate)>(the refractive index of the low refractive index layer)

As the transparent support that can be used in the antireflection film, use may be preferably made of a transparent polymer film that can be used as the protective film of the aforementioned polarizer.

A hard coat layer may be formed between the transparent substrate and the middle refractive index layer. The antireflection film may be composed of a middle refractive index hard coat layer, a high refractive index layer, and a low refractive index layer. Examples thereof are described in JP-A-8-122504, JP-A-8-110401, JP-A-10-300902, JP-A-2002-243906, and JP-A-2000-111706. A different function may be given to each of the layers. Examples thereof include a low refractive index layer having antifouling property, and a high refractive index layer having antistatic property (described in JP-A-10-206603, JP-A-2002-243906, and the like).

(High-refractive Index Layer and Middle-refractive Index Layer)

The middle-refractive index layer and the high-refractive index layer each preferably have a structure in which high-refractive index inorganic compound superfine particles having an average particle diameter of 100 nm or less are dispersed in a matrix material. The high refractive index, inorganic compound superfine particles may be made of an inorganic compound having a refractive index of 1.65 or more. Examples of the inorganic compound to be preferably used, include oxides of Ti, Zn, Sb, Sn, Zr, Ce, Ta, La, In, and the like; and composite oxides containing two or more out of these metal atoms.

Examples of the embodiment of such superfine particles to be used, include the particles whose surface is treated with a surface-treating agent (such as a silane coupling agent, as described in JP-A-11-295503, JP-A-11-153703, and JP-A-2000-9908, or an anionic compound or an organometallic coupling agent, as described in JP-A-2001-310432, and the like), the particles in which a core-shell structure is formed to have high refractive index particles be a core (as described in JP-A-2001-166104 and the like), and the particles to be used in combination with a specific dispersing agent (as described in JP-A-11-153703, JP-A-2002-2776069, U.S. Pat. No. 6,210,858B1, and the like).

The material which forms the matrix may be any of thermoplastic resins and thermosetting resins. The material is preferably at least one composition selected from a composition comprising a polyfunctional compound containing at least two radical polymerizable groups and/or cation polymerizable groups, a composition comprising an organometallic compound containing a hydrolyzable group, and a composition comprising a partial condensate thereof. Examples of the material to be used include polyfunctional materials described in JP-A-2000-47004, JP-A-2001-315242, JP-A-2001-31871, and JP-A-2001-296401; a curable film obtained from a metal alkoxide composition, as described in JP-A-2001-293818.

The refractive index of the high-refractive-index layer is preferably in the range of 1.70 to 2.20. The thickness of the high-refractive-index layer is preferably from 5 nm to 10 µm, more preferably from 10 nm to 1 µm.

The refractive index of the middle-refractive-index layer is adjusted so as to become a value (magnitude) between the refractive index of the low-refractive-index layer and the refractive index of the high-refractive-index layer. The refractive index of the middle-refractive-index layer is preferably in the range of 1.50 to 1.70. The thickness of the middle-refractive-index layer is preferably from 5 nm to 10 µm, more preferably from 10 nm to 1 µm.

[Low-refractive-index Layer]

The low-refractive-index layer has a refractive index generally in the range of 1.20 to 1.55, preferably in the range of 1.30 to 1.50. The low-refractive-index layer is preferably formed as the outermost layer having scratch resistance and antifouling property.

In order to improve the scratch resistance largely, it is preferably conducted to give lubricity to the surface, with using a material having a silicone group or with using a fluorine-containing material. The refractive index of the fluorine-containing compound is preferably 1.35 to 1.50, more preferably 1.36 to 1.47. The fluorine-containing compound is preferably a compound which contains a cross-linkable or polimerizable functional group and which contains fluorine atoms in an amount of 35 to 80% by mass.

As the fluorine-containing compound, for example, the following compounds can be preferably used: compounds described in JP-A-9-222503, paragraphs [0018] to [0026]; JP-A-11-38202, paragraphs to [0030]; JP-A-2001-40284, paragraphs [0027] to [0028]; and JP-A-2000-284102.

The silicone-containing compound is preferably a compound which has a polysiloxane structure; and more preferably a compound which contains, in the polymer chain thereof, a curable functional group or polymerizable functional group so as to have a crosslinked structure in the film to be formed. Examples thereof include reactive silicones (such as "Silaplane" (trade name), manufactured by Chisso Corporation), and polysiloxane containing at both ends thereof silanol groups (described in JP-A-11-258403), and the like.

It is preferable to conduct the crosslinking or polymerizing reaction of the fluorine-containing polymer and/or the siloxane polymer having a crosslinkable or polymerizable group, by radiation of light or heating at the same time of or after applying a coating solution for forming an outermost layer containing a polymerization initiator, a sensitizer, and others.

Preferable is also a sol-gel cured film obtained by curing an organometallic compound, such as a silane coupling agent, and a silane coupling agent which contains a specific fluorine-containing hydrocarbon group, in the presence of a catalyst, by condensation reaction. Examples thereof include silane compounds which contain a polyfluoroalkyl group, or partially-hydrolyzed condensates (such as those described in JP-A-58-142958, JP-A-58-147483, JP-A-58-147484, JP-A-9-157582 and JP-A-11-106704), and silyl compounds which contains a poly(perfluoroalkyl ether) group, which is a long chain group containing fluorine (such as compounds described in JP-A-2000-117902, JP-A-2001-48590, and JP-A-2002-53804).

It is also preferable that the low refractive index layer is made to contain, as an additive other than the above, a filler {such as silicon dioxide (silica); low refractive index inorganic compound particles having a primary average particle size of 1 to 150 nm made, for example, of fluorine-containing particles (e.g. magnesium fluoride, calcium fluoride, barium fluoride); organic fine particles, as described in JP-A-11-3820, paragraphs [0020] to [0038]}, a silane coupling agent, a lubricant, a surfactant; and the like.

In the case that the low refractive index layer is positioned beneath the outermost layer, the low refractive index layer may be formed by a gas phase method (such as a vacuum vapor deposition, a sputtering method, an ion plating method, or a plasma CVD method). The low refractive index layer is preferably formed by a coating method, since the layer can be formed at low costs. Examples of the coating method that can be preferably used, include a dip coating method, an air knife coating method, a curtain coating method, a roller coating method, a wire bar coating method, a gravure coating method, and a micro gravure coating method.

The thickness of the low-refractive-index layer is preferably from 30 to 200 nm, more preferably from 50 to 150 nm, and most preferably from 60 to 120 nm.

The haze of the antireflection film is preferably 5% or less, more preferably 3% or less. The mechanical strength of the film is preferably H or harder, further preferably 2H or harder, and most preferably 3H or harder, in terms of the pensile hardness test, according to JIS K5400.

(4) Luminescence Improving Film

The polarizing plate of the present invention may be used in combination with a luminescence improving film. The luminescence improving film has the ability to separate circularly polarized light or linearly polarized light, it is disposed between the polarizing plate and the back light, to reflect one of the circularly polarized light or the linearly polarized light backward to the back light side or scatter one of these lights backward. The light re-reflected from the back light section is partially changed in polarized state, and it partially transmits when it is incident again on the luminescence improving film and the polarizing plate. Therefore, when this process is repeated, the utilization of light is improved and forward luminescence is improved about 1.4 times the original value. As the luminescence improving film, an anisotropic reflection system and an anisotropic scattering system are known and any of these systems may be combined with the polarizing plate of the present invention.

In the anisotropic reflection system, a luminescence improving film is known which has anisotropic characteristics as to reflectance and transmittance by multi-laminating an uniaxially-oriented film and a non-oriented film to thereby increase a difference in refractive index in the direction of orientation or stretching. A multilayer film system using the principle of a dielectric mirror (described in WO95/17691, WO95/17692 and WO95/17699) and a cholesteric liquid crystal system (described in European Patent Application No. 606940A2 and JP-A-8-271731) are also known. In the present invention, use may be preferably made of, as the film for improving luminescence of the multilayer system which uses the principle of a dielectric mirror, DBEF-E, DBEF-D, and DBEF-M (trade names, all these products are manufactured by Sumitomo 3M Ltd.); and as the film for improving luminescence of the cholesteric liquid crystal system, NIPOCS (trade name, manufactured by Nitto Denko Corp.). As to NIPOCS, for example, Nitto Giho, vol. 38, No. 1, May, 2000, pp. 19-21, may be referred to as a reference.

Also, in the present invention, it is preferable to use the polarizing plate in combination with an anisotropic scattering system luminescence improving film which is obtained by blending a positive specific birefringence polymer with a negative specific birefringence polymer, followed by subjecting to uniaxial-stretching, as described in WO97/32223, WO97/32224, WO97/32225, WO97/32226, JP-A-9-274108, and JP-A-11-174231. As the anisotropic scattering system luminescence improving film, DRPF-H (trade name, manufactured by Sumitomo 3M Ltd.) is preferable.

The polarizing plate of the present invention and the luminescence improving film are preferably used in such a manner that the both are laminated through an adhesive, or that they are integrated in which one of the protective films of the polarizing plate is formed as the luminescence improving film.

(5) Other Functional Optical Film

Further, the polarizing plate of the present invention is also preferably used in combination with a functional optical film provided with a hardcoat layer, a forward scattering layer, an antiglare layer, a gas barrier layer, a slip layer, a primer layer, an antistatic layer, an undercoat layer, or a protective layer. Any of these functional layers may also be preferably used, by making the functional layer to composite with the antireflection layer in the aforementioned antireflection film or with the optically anisotropic layer in the aforementioned film for compensating a viewing angle, in the identical layer. The functional layer may be used by forming it either on one of the polarizer side or the opposite side (closer to the side exposed to air), or on the both sides of the polarizer.

(5-1) Hardcoat Layer

The polarizing plate of the present invention is preferably combined with a functional optical film provided with a hardcoat layer on the surface of a transparent support, to provide a sufficient mechanical strength for such as scratching resistance. When the hardcoat layer is used by applying it to the aforementioned antireflection film, in particular, the hardcoat layer is preferably disposed between the transparent support and the high-refractive index layer.

The hard coat layer is preferably formed by crosslinking reaction or polymerizing reaction of a curable compound through light and/or heat. The curable functional group thereof is preferably a photopolymerizable functional group. An organometallic compound which contains a hydrolyzable functional group is preferably an organic alkoxysilyl compound. Specific examples of these compounds are the same as exemplified as the high refractive index layer. Specific examples of the composition which constitutes the hard coat layer to be preferably used, include compositions described in JP-A-2002-144913, JP-A-2000-9908, and WO 02/46617.

The high refractive index layer can function as a hard coat layer also. In this case, it is preferable to use the manner described about on the high refractive index layer, to disperse particles finely to be incorporated into the hard coat layer to be formed.

The hard coat layer may contain particles having an average particle size of 0.2 to 10 μm, so as to be caused to function as an anti-glare layer also. The anti-glare layer has an anti-glare function (which will be detailed in the below).

The film thickness of the hard coat layer, which may be appropriately set according to the application thereof, is preferably from 0.2 to 10 μm, more preferably from 0.2 to 10 μm, further preferably from 0.5 to 7 μm.

The mechanical strength of the hard coat layer is preferably H or harder, further preferably 2H or harder, and most preferably 3H or harder, in terms of the pensile hardness, according to JIS K5400 test. The hard coat layer is preferably one which is less in an abraded amount in a taber test according to JIS K5400, which means a test piece made of said hardcoat layer is less in the abraded amount after the test.

As a material to form the hardcoat layer, a compound containing an ethylenically unsaturated group or a compound containing a ring opening polymerizable group, may be used. These compounds may be used either singly or in combinations of two or more. Preferable examples of the compound containing an ethylenically unsaturated group include polyacrylates of polyols, such as ethyleneglycol diacrylate, trimethylolpropane triacrylate, ditrimethylolpropane tetraacrylate, pentaerythritol triacrylate, pentaerythritol tetraacrylate, dipentaerythritol pentaacrylate, and dipentaerythritol hexacrylate; epoxyacrylates, such as diacrylates of bisphenol A diglycidyl ether, and diacrylates of hexanediol diglycidyl ether; and urethane acrylates obtained by reacting polyisocyanates with hydroxyl group-containing acrylates, such as a hydroxyethyl acrylate.

Examples of commercially available compounds include EB-600, EB-40, EB-140, EB-1150, EB-1290K, IRR214, EB-2220, TMPTA, and TMPTMA (all trade names, manufactured by Daicel UCB Co., Ltd.); and UV-6300, and UV-1700B (all trade names, manufactured by The Nippon Synthetic Chemical Industry Co., Ltd.).

Also, preferable examples of the compound containing a ring opening polymerizable group include glycidyl ethers, such as ethylene glycol diglycidyl ether, bisphenol A diglycidyl ether, trimethylolethane triglycidyl ether, trimethylolpropane triglycidyl ether, glycerol triglycidyl ether, triglycidyl trishydroxyethylisocyanurate, sorbitol tetraglycidyl ether, pentaerythritol tetraglycidyl ether, polyglycidyl ether of a cresol novolac resin, and polyglycidyl ether of a phenol novolac resin; alicyclic epoxy compounds, such as Ceroxide 2021P, Ceroxide 2081, Epolead GT-301, Epolead GT-401, and EHPE3150CE (all trade names, manufactured by Daicel Chemical Industries, Ltd.), and polycyclohexyl epoxymethyl ether of a phenol novolac resin; and oxetanes, such as OXT-121, OXT-221, OX-SQ, and PNOX-1009 (all trade names, manufactured by Toagosei Co., Ltd.). Besides the above, polymers of glycidyl (meth)acrylate, or copolymers of glycidyl (meth)acrylate and a monomer that can be copolymerized with the glycidyl (meth)acrylate, may also be used for the hardcoat layer.

The hardcoat layer may be preferably formed by adding to the above base polymer, crosslinking fine-particles, such as organic fine-particles, such as crosslinking fine-particles of rubber, for example, of SBR, NBR, or the like; crosslinking particles, such as polyethylene, polystyrene, poly(meth)acrylate, or polydimethylsiloxane; or oxide fine-particles, such as silicon, titanium, zirconium or aluminum, from the viewpoint of reducing the curing shrinkage of the hardcoat layer, improving adhesion to a base material, and reducing the curling of hardcoat-treated products according to the present invention. The average particle diameter of these crosslinking fine-particles is preferably 1 nm to 20,000 nm. Also, as the shape of these crosslinking fine-particles, any of a sphere, bar, needle, plate and the like may be used, without any particular limitation. The amount of these fine-particles to be added is preferably 60 vol % or less and more preferably 40 vol % or less, based on the cured hardcoat layer.

In the case of adding inorganic fine-particles described above, it is also preferable to carry out surface treatment using a surface treating agent having a metal such as silicon, aluminum or titanium and a functional group such as an alkoxide group, carboxylic acid group, sulfonic acid group or phosphonic acid group, because these inorganic fine-particles usually have poor affinity to the binder polymer.

The hardcoat layer is preferably cured using heat or activated energy rays. Among these activated energy rays, it is more preferable to use a radiation, gamma ray, alpha ray, electron ray, or ultraviolet ray, and it is particularly preferable to use an electron ray or ultraviolet ray, in consideration of safety and productivity. When the hardcoat layer is cured by heat, the heating temperature is preferably 140° C. or less, more preferably 100° C. or less, in consideration of the heat resistance of the plastic itself.

(5-2) Forward Scattering Layer

The forward scattering layer is used to improve the viewing angle characteristics (hue and distribution of luminescence) in vertical and horizontal directions, when the polarizing plate of the present invention is used in a liquid crystal display device. In the present invention, a structure in which fine-particles different in refractive index are dispersed in a binder is preferable. For example, any of the following structures may be used, which are described in JP-A-11-38208 in which the forward scattering coefficient is specified, in JP-A-2000-199809 in which the relative refractive indexes of a transparent resin and fine-particles are made to fall in the specific ranges, respectively, and in JP-A-2002-107512 in which the haze value is made to be 40% or more. Also, the polarizing plate of the present invention may be preferably used in combination with "Lumisty," as described in "Optically Functional Films," Technical Report of Sumitomo Chemical Co., Ltd., pp. 31-39, to control the characteristics as to the viewing angle of haze.

(5-3) Antiglare Layer

The antiglare layer is used to prevent the reflection of an image from the outer side from occurring, by scattering a reflected light. An antiglare function is obtained by forming irregularities on the outermost surface (display side) of a liquid crystal display device. The haze of an optical film having an antiglare function is preferably 3 to 30%, more preferably 5 to 20%, and most preferably 7 to 20%.

As a method of forming irregularities on the surface of the film, use may be preferably made of a method of forming irregularities on the surface of the film by adding fine-particles (e.g. JP-A-2000-271878), a method of forming a surface irregular film by adding a small amount (0.1 to 50 mass %) of relatively large particles (particle diameter 0.05 to 2 μm) (e.g. JP-A-2000-281410, JP-A-2000-95893, JP-A-2001-100004 and JP-A-2001-281407), and a method of transferring an irregular pattern to the surface of the film by means of physical measures (e.g., described, as an embossing method, in JP-A-63-278839, JP-A-11-183710 and JP-A-2000-275401).

(Antistatic Layer)

When an antistatic layer is to be formed, the antistatic layer is preferably provided with such conductivity that the volume resistance is $10^{-8}$ ($\Omega cm^{-3}$) or less. Although the antistatic layer may be made to have a volume resistance of $10^{-8}$ ($\Omega cm^{-3}$) or less, by using a hygroscopic material, water-soluble inorganic salt, certain type surfactant, cationic polymer, anionic polymer or colloidal silica, these materials have the problem that they have large dependency on temperature and humidity and they cannot ensure sufficient conductivity under low humidity. Accordingly, a metal oxide is preferable as a conductive layer material. There is a metal oxide colored. If the colored metal oxide is used as the conductive layer raw material, the entire film is colored, which is not preferable. Examples of metal capable of forming uncolored metal oxide include Zn, Ti, Al, In, Si, Mg, Ba, Mo, W or V. Any of metal oxides using the metal as a major component is preferably used. Specific examples of the metal oxide that can be preferably used, include ZnO, $TiO_2$, $SnO_2$, $Al_2O_3$, $In2O_3$, $SiO_2$, MgO, BaO, $MoO_2$, $V_2O_5$, or a composite oxide of these metals. In particular, ZnO, $TiO_2$, and $SnO_2$ are preferable. As examples of the metal oxide containing a foreign atom, an addition product of Al, In or the like to ZnO; an addition product of Sb, Nb, a halogen element or the like to $SnO_2$; and an addition product of Nb, Ta or the like to $TiO_2$ are effective. Moreover, raw materials obtained by adhering the aforementioned metal oxide to other crystalline metal particles or fibrous material (e.g., titanium oxide), as described in JP-B-59-6235, may be used. In this case, the volume resistance and the surface resistance are different properties and are not simply compared with each other. To ensure a conductivity of $10^{-8}$ ($\Omega cm^{-3}$) or less in terms of volume resistance, it is only required that the conductive layer has a surface resistance of generally about $10^{-10}$ ($\Omega cm^{-3}$) or less, preferably $10^{-8}$ ($\Omega cm^{-3}$) or less. It is necessary that the surface resistance of the conductive layer is measured as a value obtained when the antistatic layer is formed as the outermost layer, and the surface resistance may be measured in the stage during the course of forming a laminated film as described in this patent.

(Adhesive)

Next, an adhesive that can be used preferably in the present invention will be explained.

As the adhesive, any of adhesives using an acrylic acid type, methacrylic acid type, butyl rubber type, or silicone type base polymer, may be used. There is no particular limitation to the type of adhesive, and it is preferable to use a base polymer of (meth)acrylate type, such as butyl (meth)acrylate, ethyl (meth)acrylate, isooctyl (meth)acrylate, or 2-ethylhexyl (meth)acrylate; or a copolymer type base polymer obtained by using two or more of these (meth)acrylates. In a usual adhesive, a polar monomer is copolymerized in the base polymer. Examples of the polar monomer include a monomer having a carboxylic group, hydroxyl group, amido group, amino group, epoxy group or the like, for example, (meth)acrylic acid, 2-hydroxyethyl (meth)acrylate, 2-hydroxypropyl (meth)acrylate, (meth)acrylamide, N,N-dimethylaminoethyl (meth)acrylate, and glycidyl (meth)acrylate.

The adhesive generally contains a crosslinking agent. Examples of the crosslinking agent include those producing a metal carboxylate in combination with a divalent or polyvalent metal ion, those forming an amide bond in combination with a polyamine compound, those forming an ester bond in combination with a polyepoxy compound or polyol, and those forming an amide bond in combination with a polyisocyanate compound. Any of these compounds may be used as the crosslinking agent by blending either singly or two or more of these in a base polymer.

The thickness of the adhesive layer in the present invention is preferably 2 to 50 μm. In a usual structure, a separate film is laminated onto the surface of the adhesive layer on the side opposite to the polarizing plate, to protect the adhesive layer. As the separate film, for example, a polyester film which has been processed by releasable treatment using a silicone resin or the like is used. This separate film is peeled off and removed away when a liquid crystal cell or other optically functional film is laminated to the polarizing plate.

(Liquid Crystal Display Device)

Next, a liquid crystal display device using the polarizing plate of the present invention will be explained. In the liquid crystal display device of the present invention, two polarizing plates are arranged on both sides of a liquid crystal cell, wherein at least one of these polarizing plates is the polarizing plate of the present invention.

Figure 2:
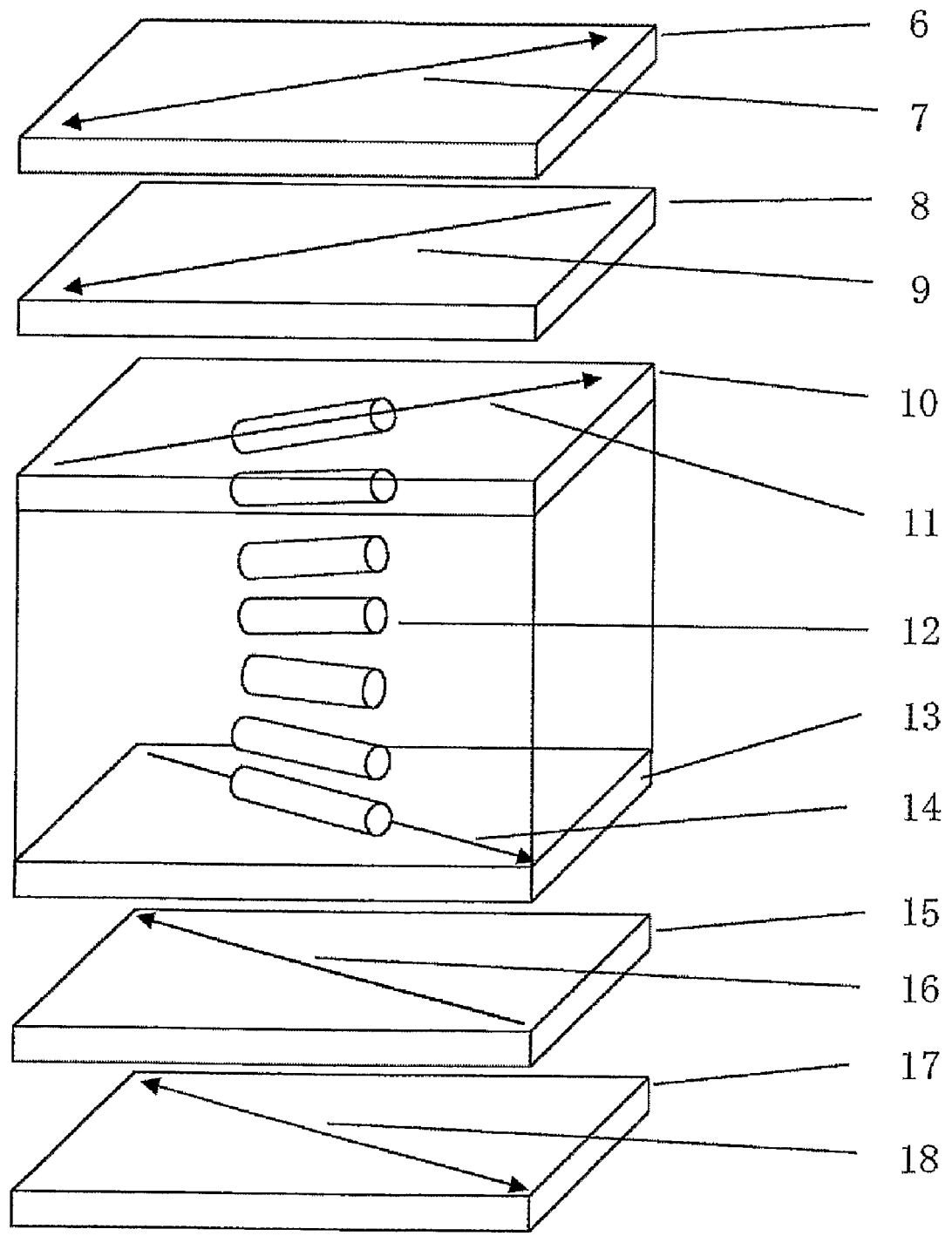
FIG. 2 is a schematic view showing an example of a liquid crystal display device in which a polarizing plate according to the present invention is used.

FIG. 2 shows an example of a liquid crystal display device using the polarizing plate of the present invention.

In FIG. 2, the reference numeral 6 represents an upper polarizing plate. 7 represents an upper polarizing plate absorption axis. 8 represents an upper optically anisotropic layer. 9 represents an orientation control direction of the upper optically anisotropic layer. 10 represents an upper electrode substrate for a liquid crystal cell. 11 represents an orientation control direction of the upper substrate. 12 represents a liquid crystal molecule. 13 represents a lower electrode substrate for the liquid crystal cell. 14 represents an orientation control direction of the lower substrate. 15 represents a lower optically anisotropic layer. 16 represents an orientation control direction of the lower optically anisotropic layer. 17 represents a lower polarizing plate. 18 represents a lower polarizing plate absorption axis.

The liquid crystal display device of the present invention, as shown in FIG. 2, is provided with liquid crystal cells (10 to 13), and the upper polarizing plate 6 and the lower polarizing plate 17 which are disposed so as to sandwich the liquid crystal cells (10 to 13). The polarizing plate is supported by a polarizer and a pair of transparent protective films, but it is shown as an integrated polarizing plate in FIG. 2 and the details of the structure are omitted. The liquid crystal cell comprises a liquid crystal layer formed from the upper electrode substrate 10, the lower electrode substrate 13, and the liquid crystal molecule 12 sandwiched by these.

The polarizing plate using the cellulose acylate film according to the present invention can be used advantageously in a liquid crystal display device. The polarizing plate of the present invention may be used in liquid crystal cells driven in various displaying modes irrespective of a transmission or reflection type. As for the display modes, proposed are TN (Twisted Nematic), IPS (In-Plane Switching), FLC (Ferroelectric Liquid Crystal), AFLC (Anti-ferroelectric Liquid Crystal), OCB (Optically Compensatory Bend), STN (Supper Twisted Nematic), VA (Vertically Aligned), HAN (Hybrid Aligned Nematic), and ECB (Electrically Controlled Birefringence); and the present invention can be applied to any of the above display modes. Among these, the present invention may be preferably applied to OCB-mode or VA-mode.

An oriented film (not shown) is formed on each of the surfaces (hereinafter referred to as "internal surface," if necessary) of the electrode substrates 10 and 13 which are brought into contact with the liquid crystal molecule 12. The orientation of the liquid crystal molecule 12 in the state where no electric field is applied or in the state where a low electric field is applied is controlled by, for example, rubbing treatment performed to the oriented film. Also, on the internal surface of the substrates 10 and 13, a transparent electrode (not shown) which can apply an electric field to the liquid crystal layer comprising the liquid crystal molecule 12 is formed.

The directions of rubbing in a TN mode on the upper and lower substrates are made to intersect perpendicularly with each other, and the strength of rubbing and the number of rubbing treatments to be conducted may be changed to control the magnitude of a tilt angle. The oriented film is formed by applying a polyimide film, followed by baking. The magnitude of the twist angle of the liquid crystal layer is determined by a crossing angle of the rubbing directions of the upper and lower substrates and a chiral agent to be added to a liquid crystal material. Herein, a chiral agent having a pitch of about 60 μm is added, to control the twist angle to 90°.

The twist angle is set to the vicinity of 90° (85 to 95°) in the case of notebook type personal computers or monitors of desktop type personal computers and television liquid crystal display devices, and to 0 to 70° in the case of being used as reflection type display devices of cell phones and the like. The twist angle is 0° in an IPS mode and ECB mode. In the IPS mode, the electrode is only the lower substrate 8, to be applied an electric field parallel to the substrate plane. Also, there is no twist angle in the OCB mode, and the magnitude of the tilt angle is large. In the VA mode, the liquid crystal molecule 12 is oriented in a direction perpendicular to the upper and lower electrodes.

Herein, the magnitude of the product Δnd of the thickness d of the liquid crystal layer and the refractive index anisotropy Δn changes the brightness at the time of white displaying. Accordingly, the range of the product is set every display mode, to obtain the maximum brightness.

The upper polarizing plate 6 and the lower polarizing plate 17 are generally laminated such that the crossing angle between the absorption axis 7 of the upper polarizing plate 6 and the absorption axis 18 of the lower polarizing plate 17 is made to be almost right angle, to thereby obtain high contrast. The cross angle between the absorption axis 7 of the upper polarizing plate 6 and the rubbing direction of the upper substrate 10 of the liquid crystal cell differs depending on the type of liquid crystal display mode. In a TN or EPS mode, the cross angle is usually set to 0 (parallel) or right angle (perpendicular). In an OCB or ECB mode, the cross angle is often set to 45°. However, the optimum value differs in each display mode to regulate the hue of display colors and the viewing angle, and therefore the cross angle is not limited to the above range.

In an OCB mode liquid crystal display device, the liquid crystal cell of OCB mode is a liquid crystal cell of bend orientation mode in which rod-like liquid crystal molecules in a upper part and a lower part in the liquid crystal cell are substantially reversely (symmetrically) oriented. The liquid crystal cell of OCB mode is disclosed in U.S. Pat. Nos. 4,583,825 and 5,410,422. Since rod-like liquid crystal molecules in the upper part and the lower part of the liquid crystal cell are symmetrically oriented, the liquid crystal cell of bend orientation mode has self-optical compensatory function. Therefore, this mode is referred to as OCB (optically compensatory bend) mode. The liquid crystal display of bend orientation mode has such an advantage that a responding speed is fast.

In a liquid crystal cell of VA mode, rod-like liquid crystal molecules are substantially vertically oriented, while no voltage is applied.

Examples of the liquid crystal cell of VA mode includes:
(1) a liquid crystal cell of VA mode in a narrow sense (as described in JP-A-2-176625), in which rod-like liquid crystal molecules are substantially vertically oriented while no voltage is applied, and the molecules are substantially horizontally oriented while a voltage is applied;
(2) a liquid crystal cell of MVA mode (as described in SID97, Digest of tech. Papers (Synopsis), 28 (1997), 845), in which the VA mode is modified to be multi-domain type so as to enlarge the viewing angle;
(3) a liquid crystal cell of n-ASM mode (as described in Nippon Ekisho Toronkai (Liquid Crystal Forum of Japan), Digest of tech. Papers (1998), 58-59), in which rod-like liquid crystal molecules are substantially vertically oriented while no voltage is applied, and the molecules are oriented in twisted multi-domain orientation while a voltage is applied; and
(4) a liquid crystal cell of SURVIVAL mode (as presented in LCD International 98).

In liquid crystal display devices driven in an OCB mode or VA mode, a liquid crystal cell may be disposed and two polarizing plates of the present invention may be disposed on both sides of the liquid crystal cell. In the VA mode, the polarizing plate of the present invention may be disposed in the back light side of the cell. In any case, it is preferable to dispose the cellulose acylate film of the present invention on the liquid crystal cell side. The liquid crystal cell supports a liquid crystal between two electrode substrates.

The liquid crystal display device to which the polarizing plate of the present invention is applied is not limited to the structure as shown in FIG. 2, and it may have other member(s). For example, a color filter may be disposed between the liquid crystal cell and the polarizer. Also, separately, the aforementioned film expanding a viewing angle may be disposed between the liquid crystal cell and the polarizing plate. The polarizing plates 6 and 17, and the optically anisotropic layers (films expanding the viewing angle) 8 and 15 may be arranged in a laminated form obtained by laminating these layers using an adhesive; or they may be arranged in the form of a so-called integrated ellipsoidal polarizing plate, which is obtained by using one of the liquid crystal cell side protective films for expanding a viewing angle.

Also, when the liquid crystal display device using the polarizing plate of the present invention is used as a transmission type, a back light using, as a light source, a cold cathode or hot cathode fluorescent tube, an light-emitting diode, a field emission element, or an electroluminescent element, may be arranged on the backside. Also, the liquid crystal display device using the polarizing plate of the present invention may be a reflection type. In this case, only one polarizing plate may be disposed on the observer side, and a reflection film is disposed on the backside of the liquid crystal cell or on the inside surface of the lower substrate of the liquid crystal cell. Of course, a front light using the aforementioned light source may be disposed on the observer side of the liquid crystal cell. The liquid crystal display device of the present invention is preferably a VA mode liquid crystal display device in which the polarizing plate of the present invention is used on the back light side of the cell.

The optical compensation sheet of the present invention is capable of compensating a liquid crystal cell optically even if it is composed only of a cellulose acetate film.

By using an aromatic compound having at least two aromatic rings (specifically, a compound having a 1,3,5-triazine ring) in combination with a compound represented by formula (I), in preparation of a cellulose acetate film, it is possible to obtain a cellulose acetate film having a Re retardation value of 20 to 200 nm, a Rth retardation value of 70 to 400 nm, and a Re/Rth ratio of 0.1 to 0.8. This cellulose acetate film has optical anisotropy enough to optically compensate a liquid crystal cell. Accordingly, an optical compensation sheet which is composed of only one cellulose acetate film can be obtained.

A protective film of a polarizing plate is usually constituted of a cellulose acetate film. If the aforementioned cellulose acetate film of the present invention is used as one of the protective films of the polarizing plate, it is possible to add an optical compensation function to the polarizing plate without increasing the number of the structural elements of the polarizing plate.

The optical compensation sheet composed only of the cellulose acetate film, and the polarizing plate that uses the cellulose acetate film as a protective film, may be particularly advantageously used in VA mode or OCB mode liquid crystal display devices.

In the present invention, it is possible to obtain an optical film having excellent transparency and optical anisotropy enough to optically compensate a liquid crystal cell, by incorporating at least one selected from the compound represented by formula (I) and the compound having a 1,3,5-triazine ring in an amount of 0.01 to 20 mass parts, and at least one ultraviolet absorber in an amount of 0.01 to 10 mass parts, into 100 mass parts of a cellulose acylate. Also, an optical compensation sheet composed of one sheet of the optical film can be obtained. Further, the addition of the ultraviolet absorber makes it possible to reduce only the Rth value while keeping a high Re value. Further, coagulation of a matting agent can be prevented to thereby obtain a highly transparent optical compensation film.

Protective films of a polarizing plate usually constituted of cellulose acetate films. When the optical film of the present invention is used as at least one of the protective films of the polarizing plate, it is possible to add an optical compensation function to the polarizing plate without increasing the number of the structural elements of the polarizing plate.

The optical compensation sheet of the present invention and/or the polarizing plate of the present invention using the optical compensation sheet as a protective film may be particularly advantageously used in VA mode or OCB mode liquid crystal display devices.

According to the present invention, a cellulose acylate film which is uniform and has a high retardation value and a polarizing plate using the film can be manufactured.

The aforementioned polarizing plate having an optical compensation function may be particularly advantageously used in an OCB (optically compensated bend) type and a VA (vertically aligned) type liquid crystal display devices.

EXAMPLES

The present invention will be described in more detail based on the following examples, but the invention is not intended to be limited thereto.

First, the examples relating to the first embodiment and the fourth to sixth embodiments based on the first embodiment, will be shown.

Example 1-1

(Preparation of Cellulose Acylate Film A1)

The following components of a cellulose acetate solution composition were poured into a mixing tank and the resultant was stirred under heating, to dissolve the components each other. Thus, a cellulose acetate solution was prepared.

(Composition of a Cellulose Acetate Solution)

| | |
|---|---|
| Cellulose acetate (acetylation degree: 60.9%) | 100 mass parts |
| Triphenyl phosphate (plasticizer) | 7.8 mass parts |
| Biphenyldiphenyl phosphate (plasticizer) | 3.9 mass parts |
| Methylene chloride (first solvent) | 318 mass parts |
| Methanol (second solvent) | 47 mass parts |
| Silica (particle diameter: 0.2 μm) | 0.1 mass parts |

Another mixing tank was charged with 10 mass parts of a retardation controlling agent A shown below, 10 mass parts of a retardation controlling agent B shown below, 87 mass parts of methylene chloride, and 13 mass parts of methanol, and the resultant mixture was stirred under heating, to prepare a retardation controlling agent solution 01.

36.2 mass parts of the retardation controlling (increasing) agent solution 01 was mixed with 474 mass parts of the cellulose acetate solution, and the resultant mixture was thoroughly stirred, to prepare a dope. The amounts of the retardation controlling agents A and B to be added each were 3 mass parts, to 100 mass parts of the cellulose acetate.

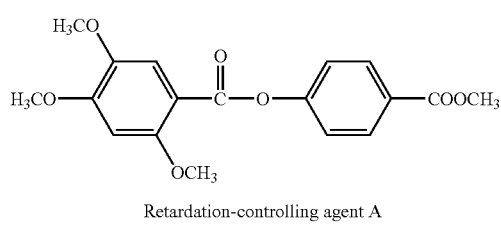

Retardation-controlling agent A

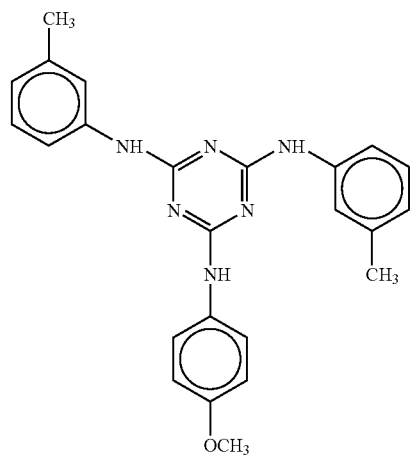

Retardation-controlling agent B

The obtained dope was cast using a band casting machine. The resultant film in which the residual solvent amount was 32 mass % at the start of orienting, was laterally oriented using a tenter under the conditions of 130° C., at an orientation ratio of 26%, to prepare a cellulose acetate film (thickness: 92 μm, width: 1,340 mm). The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Example 1-2

(Preparation of Cellulose Acylate Film A2)

A cellulose acetate film (thickness: 90 μm, width: 1,450 mm) was prepared in the same manner as in Example 1-1, except that the orientation ratio was changed to 30%. The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Example 1-3

(Preparation of Cellulose Acylate Film A3)

A cellulose acetate film (thickness: 80 μm, width: 1,340 mm) was prepared in the same manner as in Example 1-1, except that the film thickness after oriented was changed to 80 μm. The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Example 1-4

(Preparation of Cellulose Acylate Film A4)

A cellulose acetate film (thickness: 92 μm, width: 1,550 mm) was prepared in the same manner as in Example 1-1, except that 31.3 mass parts of the retardation controlling (increasing) agent solution 01 was mixed in 474 mass parts of the cellulose acetate solution. The amounts of the retardation controlling agents A and B to be added in the dope each were 2.6 mass parts, to 100 mass parts of the cellulose acetate.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Example 1-5

(Preparation of Cellulose Acylate Film A5)

A mixing tank was charged with 2.9 mass parts of the aforementioned retardation controlling agent A, 17.1 mass parts of the aforementioned retardation controlling agent B, 87 mass parts of methylene chloride, and 13 mass parts of methanol, and the resultant mixture was stirred under heating, to prepare a retardation controlling agent solution 02.

42.2 mass parts of the retardation controlling (increasing) agent solution 02 was mixed with 474 mass parts of the cellulose acetate solution as prepared in Example 1-1, and the resultant mixture was thoroughly stirred, to prepare a dope. The amounts of the retardation controlling agents A and B to be added were 1 mass part and 6 mass parts, respectively, to 100 mass parts of the cellulose acetate.

A cellulose acetate film (thickness: 92 μm, width: 1,850 mm) was prepared in the same manner as in Example 1-1, except that after the dope was cast on a band, the formed film was peeled off, and the resultant film in which the residual solvent amount was 18 mass % at the start of orienting, was laterally oriented using a tenter at an orientation ratio of 25%.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Example 1-6

(Preparation of Cellulose Acylate Film A6)

A mixing tank was charged with 8 mass parts of the aforementioned retardation controlling agent A, 12 mass parts of the aforementioned retardation controlling agent B, 87 mass parts of methylene chloride, and 13 mass parts of methanol, and the resultant mixture was stirred under heating, to prepare a retardation controlling agent solution 03.

30.1 mass parts of the retardation controlling (increasing) agent solution 03 was mixed with 474 mass parts of the cellulose acetate solution as prepared in Example 1-1, and the resultant mixture was thoroughly stirred, to prepare a dope. The amounts of the retardation controlling agents A and B to be added were 2 mass parts and 3 mass parts, respectively, to 100 mass parts of the cellulose acetate.

A cellulose acetate film (thickness: 93 μm, width: 1,450 mm) was prepared in the same manner as in Example 1-1, except that after the dope was cast on a band, the formed film was peeled off, and the resultant film in which the residual solvent amount was 34 mass % at the start of orienting, was laterally oriented using a tenter at an orientation ratio of 26%.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Example 1-7

Preparation of Cellulose Acylate Film A7)

A mixing tank was charged with 14.3 mass parts of the aforementioned retardation controlling agent A, 5.7 mass parts of the aforementioned retardation controlling agent B, 87 mass parts of methylene chloride, and 13 mass parts of methanol, and the resultant mixture was stirred under heating, to prepare a retardation controlling agent solution 04.

42.2 mass parts of the retardation controlling (increasing) agent solution 04 was mixed with 474 mass parts of the cellulose acetate solution as prepared in Example 1-1, and the resultant mixture was thoroughly stirred, to prepare a dope. The amounts of the retardation controlling agents A and B to be added were 5 mass parts and 2 mass parts, respectively, to 100 mass parts of the cellulose acetate.

A cellulose acetate film (thickness: 91 μm, width: 1,340 nm) was prepared in the same manner as in Example 1-1, except that after the dope was cast on a band, the formed film was peeled off, and the resultant film in which the residual solvent amount was 30 mass % at the start of orienting, was laterally oriented using a tenter at an orientation ratio of 26%.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Example 1-8

(Preparation of Cellulose Acylate Film A8)

A mixing tank was charged with 5 mass parts of the aforementioned retardation controlling agent A, 5 mass parts of the following retardation controlling agent C, 10 mass parts of the aforementioned retardation controlling agent B, 87 mass parts of methylene chloride, and 13 mass parts of methanol, and the resultant mixture was stirred under heating, to prepare a retardation controlling agent solution 05.

36.2 mass parts of the retardation controlling (increasing) agent solution 05 was mixed with 474 mass parts of the cellulose acetate solution as prepared in Example 1-1, and the resultant mixture was thoroughly stirred, to prepare a dope. The amounts of the retardation controlling agents A, C, and B to be added were 1.5 mass parts, 1.5 mass parts, and 3 mass parts, respectively, to 100 mass parts of the cellulose acetate.

A cellulose acetate film (thickness: 90 μm, width: 1,850 mm) was prepared in the same manner as in Example 1-1, except that after the dope was cast on a band, the formed film was peeled off, and the resultant film in which the residual solvent amount was 32 mass % at the start of orienting, was laterally oriented using a tenter at an orientation ratio of 26%.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

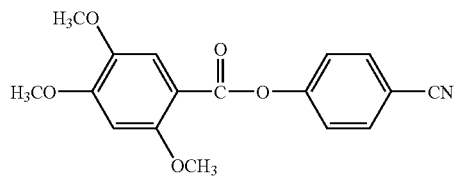

Retardation-controlling agent C

Example 1-9

(Preparation of Cellulose Acylate Film A9)

A mixing tank was charged with 10 mass parts of the aforementioned retardation controlling agent A, 5 mass parts of the aforementioned retardation controlling agent B, 5 mass parts of the following retardation controlling agent D, 87 mass parts of methylene chloride, and 13 mass parts of methanol, and the resultant mixture was stirred under heating, to prepare a retardation controlling agent solution 06.

36.2 mass parts of the retardation controlling (increasing) agent solution 06 was mixed with 474 mass parts of the cellulose acetate solution as prepared in Example 1-1, and the resultant mixture was thoroughly stirred, to prepare a dope. The amounts of the retardation controlling agents A, B, and D to be added were 3 mass parts, 1.5 mass parts, and 1.5 mass parts, respectively, to 100 mass parts of the cellulose acetate.

A cellulose acetate film (thickness: 93 μm, width: 1,550 mm) was prepared in the same manner as in Example 1-1, except that after the dope was cast on a band, the formed film was peeled off, and the resultant film in which the residual solvent amount was 33 mass % at the start of orienting, was laterally oriented using a tenter at an orientation ratio of 26%.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

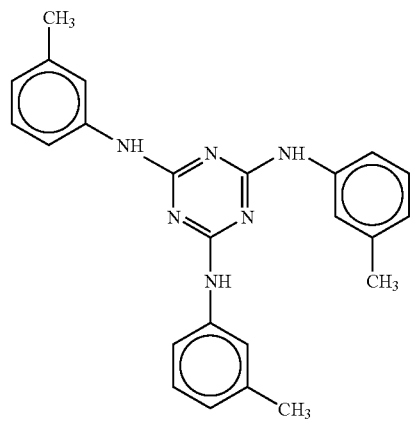

Retardation-controlling agent D

Example 1-10

(Preparation of Cellulose Acylate Film A10)

A mixing tank was charged with 10 mass parts of the aforementioned retardation controlling agent C, 10 mass parts of the aforementioned retardation controlling agent B, 87 mass parts of methylene chloride, and 13 mass parts of methanol, and the resultant mixture was stirred under heating, to prepare a retardation controlling agent solution 07.

36.2 mass parts of the retardation controlling (increasing) agent solution 07 was mixed with 474 mass parts of the cellulose acetate solution as prepared in Example 1-1, and the resultant mixture was thoroughly stirred, to prepare a dope. The amounts of the retardation controlling agents C and B to be added each were 3 mass parts, to 100 mass parts of the cellulose acetate.

A cellulose acetate film (thickness: 92 μm, width: 1,850 mm) was prepared in the same manner as in Example 1-1, except that after the dope was cast on a band, the formed film was peeled off, and the resultant film in which the residual solvent amount was 31 mass % at the start of orienting, was laterally oriented using a tenter at an orientation ratio of 26%.

The Re retardation value and Rth retardation value of the produced cellulose acetate film at wavelength 590 nm were measured, using KOBRA 21ADH (trade name, manufactured by Oji Scientific Instruments). Further, a wavelength-dispersion shape, a moisture dependency of optical characteristics at 25° C., a moisture permeability, and a rate of dimensional change were measured. The results are shown in Table 1.

Example 1-11

(Preparation of Cellulose Acylate Film A11)

The following components of a cellulose acetate solution composition were poured into a mixing tank, and the resultant was stirred under heating, to dissolve the components each other. Thus, a cellulose acylate solution was prepared.

(Composition of Cellulose Acylate Solution)

| | |
|---|---|
| Cellulose acetate propionate (substitution degree of acetyl group, 1.90; substitution | 100 mass parts |

-continued

| | |
|---|---|
| degree of propionyl group, 0.80) | |
| Triphenyl phosphate | 8.5 mass parts |
| Ethylphthalylethylglycolate | 2.0 mass parts |
| Methylene chloride | 290 mass parts |
| Ethanol | 60 mass parts |

A separate mixing tank was charged with 5 mass parts of cellulose acetate propionate, 6 mass parts of Tinubin 326 (trade name: manufactured by Ciba Specialty Chemicals), 4 mass parts of Tinubin 109 (trade name, manufactured by Ciba Specialty Chemicals), 5 mass parts of Tinubin 171 (trade name, manufactured by Ciba Specialty Chemicals), 8.3 mass parts of the aforementioned retardation controlling agent A, 8.3 mass parts of the aforementioned retardation agent B, 94 mass parts of methylene chloride, and 8 mass parts of ethanol, and the mixture was stirred under heating, to prepare an additive solution 1.

73 mass parts of the additive solution 1 was mixed with 474 mass parts of the cellulose acetate solution, and the resultant mixture was thoroughly stirred, to prepare a dope.

A cellulose acetate film (thickness: 80 μm, width: 1,450 mm) was prepared in the same manner as in Example 1-1, except that after the dope was cast on a band, the formed film was peeled off, and the resultant film in which the residual solvent amount was 32 mass % at the start of orienting, was laterally oriented using a tenter at an orientation ratio of 26%.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Example 1-12

(Preparation of Cellulose Acylate Film A12)

The following components of a cellulose acetate solution composition were poured into a mixing tank and the resultant was stirred under heating, to dissolve the components each other. Thus, a cellulose acylate solution was prepared.

(Composition of Cellulose Acylate Solution)

| | |
|---|---|
| Cellulose acetate propionate (substitution degree of acetyl group, 0.18; substitution degree of propionyl group 2.47) | 100 mass parts |
| Triphenyl phosphate | 8.0 mass parts |
| Ethylphthalylethylglycolate | 4.0 mass parts |
| Methylene chloride | 403 mass parts |
| Ethanol | 60.3 mass parts |

Another mixing tank was charged with 12.0 mass parts of the aforementioned retardation controlling agent A, 8.0 mass parts of the aforementioned retardation controlling agent B, 87 mass parts of methylene chloride, and 13 mass parts of ethanol, and the resultant mixture was stirred under heating, to prepare an additive solution 2.

9.9 mass parts of the additive solution 2 was mixed with 474 mass parts of the cellulose acetate solution, and the resultant mixture was thoroughly stirred, to prepare a dope.

A cellulose acetate film (thickness: 80 μm, width: 1,340 nm) was prepared in the same manner as in Example 1-1, except that after the dope was cast on a band, the formed film was peeled off, and the resultant film in which the residual solvent amount was 32 mass % at the start of orienting, was laterally oriented using a tenter at an orientation ratio of 23%.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Example 1-13

(Preparation of Cellulose Acylate Film A13)

The following components of a cellulose acetate solution composition were poured into a mixing tank, and the resultant was stirred under heating, to dissolve the components each other. Thus, a cellulose acylate solution was prepared.

(Composition of Cellulose Acylate Solution)

| | |
|---|---|
| Cellulose acetate butylate (substitution degree of acetyl group, 1.40; substitution degree of butylyl group, 1.30) | 100 mass parts |
| Triphenyl phosphate | 8.5 mass parts |
| Ethylphthalylethylglycolate | 2.0 mass parts |
| Methylene chloride | 290 mass parts |
| Ethanol | 60 mass parts |

A separate mixing tank was charged with 5 mass parts of cellulose acetate butylate, 6 mass parts of Tinubin 326 (trade name: manufactured by Ciba Specialty Chemicals), 4 mass parts of Tinubin 109 (trade name, manufactured by Ciba Specialty Chemicals), 5 mass parts of Tinubin 171 (trade name, manufactured by Ciba Specialty Chemicals), 10.0 mass parts of the aforementioned retardation controlling agent A, 6.6 mass parts of the aforementioned retardation controlling agent B, 94 mass parts of methylene chloride, and 8 mass parts of ethanol, and the mixture was stirred under heating, to prepare an additive solution 3.

43.5 mass parts of the additive solution 3 was mixed with 474 mass parts of the cellulose acetate solution, and the resultant mixture was thoroughly stirred, to prepare a dope.

A cellulose acetate film (thickness: 80 μm, width: 1,340 mm) was prepared in the same manner as in Example 1-1, except that after the dope was cast on a band, the formed film was peeled off, and the resultant film in which the residual solvent amount was 28 mass % at the start of orienting, was laterally oriented using a tenter at an orientation ratio of 18%.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Example 1-14

(Preparation of Cellulose Acylate Film A14)

The following components of a cellulose acetate solution composition were poured into a mixing tank, and the resultant was stirred under heating, to dissolve the components each other. Thus, a cellulose acylate solution was prepared.

(Composition of Cellulose Acylate Solution)

| | |
|---|---|
| Cellulose acetate butylate (substitution degree of acetyl group, 0.30; substitution degree of butylyl group, 2.50) | 100 mass parts |
| Triphenyl phosphate | 8.0 mass parts |
| Ethylphthalylethylglycolate | 4.0 mass parts |
| Methylene chloride | 403 mass parts |
| Ethanol | 60.3 mass parts |

Another mixing tank was charged with 12.9 mass parts of the aforementioned retardation controlling agent A, 7.1 mass parts of the aforementioned retardation controlling agent B, 87 mass parts of methylene chloride, and 13 mass parts of ethanol, and the resultant mixture was stirred under heating, to prepare an additive solution 4.

22.3 mass parts of the additive solution 4 was mixed with 474 mass parts of the cellulose acetate solution, and the resultant mixture was thoroughly stirred, to prepare a dope.

A cellulose acetate film (thickness: 70 μm, width: 1,850 mm) was prepared in the same manner as in Example 1-1, except that after the dope was cast on a band, the formed film was peeled off, and the resultant film in which the residual solvent amount was 34 mass % at the start of orienting, was laterally oriented using a tenter at an orientation ratio of 30%.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Example 1-15

(Preparation of Cellulose Acylate Film A15)

The following components of a cellulose acetate solution composition were poured into a mixing tank and the resultant was stirred under heating, to dissolve the components each other. Thus, a cellulose acetate solution was prepared.

(Composition of Cellulose Acetate Solution)

| | |
|---|---|
| Cellulose acetate (substitution degree of acetyl group, 2.78; substitution degree of acetyl group at 6-position/total substitution degree, 0.33) | 100 mass parts |
| Triphenyl phosphate (plasticizer) | 8.0 mass parts |
| Biphenyldiphenyl phosphate (plasticizer) | 4.0 mass parts |
| Methylene chloride (first solvent) | 403 mass parts |
| Methanol (second solvent) | 60.2 mass parts |
| Silica (particle diameter: 0.2 μm) | 0.1 mass parts |

Herein, the (total) substitution degree of an acetyl group means (DS2+DS3+DS6); the ratio of (the substitution degree of an acetyl group at 6-position)/(the total substitution degree) means {DS6/(DS2+DS3+DS6)}; and DS2, DS3, and DS6 mean the substitution degrees of an acyl group for a hydroxyl group at the second position, the third position, and the sixth position of a glucose unit constituting the cellulose, respectively.

Another mixing tank Was charged with 13.1 mass parts of the aforementioned retardation controlling agent A, 6.9 mass parts of the aforementioned retardation controlling agent B, 87 mass parts of methylene chloride, and 13 mass parts of methanol, and the resultant mixture was stirred under heating, to prepare a retardation controlling agent solution 08.

17.3 mass parts of the retardation controlling (increasing) agent solution 08 was mixed with 474 mass parts of the cellulose acetate solution, and the resultant mixture was thoroughly stirred, to prepare a dope. The amounts of the retardation controlling agents A and B to be added were 2.3 mass parts and 1.2 mass parts, respectively, to 100 mass parts of the cellulose acetate.

A cellulose acetate film (thickness: 70 nm, width: 1,850 mm) was prepared in the same manner as in Example 1-1, except that after the dope was cast on a band, the formed film was peeled off, and the resultant film in which the residual solvent amount was 32 mass % at the start of orienting, was laterally oriented using a tenter at an orientation ratio of 28%.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Example 1-16

(Preparation of Cellulose Acylate Film A16)

The following components of a cellulose acetate solution composition were poured into a mixing tank, and the resultant was stirred under heating, to dissolve the components each other. Thus, a cellulose acetate solution was prepared.

(Composition of Cellulose Acetate Solution)

| | |
|---|---|
| Cellulose acetate (substitution degree of acetyl group, 2.75; substitution degree of acetyl group at 6-position/total substitution degree, 0.35) | 100 mass parts |
| Triphenyl phosphate (plasticizer) | 8.0 mass parts |
| Biphenyldiphenyl phosphate (plasticizer) | 4.0 mass parts |
| Methylene chloride (first solvent) | 403 mass parts |
| Methanol (second solvent) | 60.2 mass parts |
| Silica (particle diameter: 0.2 μm) | 0.1 mass parts |

Another mixing tank was charged with 12.0 mass parts of the aforementioned retardation controlling agent A, 8.0 mass parts of the aforementioned retardation controlling agent B, 87 mass parts of methylene chloride, and 13 mass parts of methanol, and the resultant mixture was stirred under heating, to prepare a retardation controlling agent solution 09.

9.9 mass parts of the retardation controlling (increasing) agent solution 09 was mixed with 474 mass parts of the cellulose acetate solution, and the resultant mixture was thoroughly stirred, to prepare a dope. The amounts of the retardation controlling agents A and B to be added were 1.2 mass parts and 0.8 mass parts, respectively, to 100 mass parts of the cellulose acetate.

A cellulose acetate film (thickness: 90 μm, width: 1,450 mm) was prepared in the same manner as in Example 1-1, except that after the dope was cast on a band, the formed film was peeled off, and the resultant film in which the residual solvent amount was 30 mass % at the start of orienting, was laterally oriented using a tenter at an orientation ratio of 30%.

The Re retardation value and Rth retardation value of the produced cellulose acetate film at wavelength 590 μm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Example 1-17

(Preparation of Cellulose Acylate Film A17)

The following components of a cellulose acetate solution composition were poured into a mixing tank, and the resultant was stirred under heating, to dissolve the components each other. Thus, a cellulose acetate solution was prepared.

(Composition of Cellulose Acetate Solution)

| | |
|---|---|
| Cellulose acetate (substitution degree of acetyl group, 2.78; substitution degree of acetyl group at 6-position/total substitution degree, 0.33) | 100 mass parts |
| Triphenyl phosphate (plasticizer) | 8.0 mass parts |
| Biphenyldiphenyl phosphate (plasticizer) | 4.0 mass parts |
| Methylene chloride (first solvent) | 403 mass parts |
| Methanol (second solvent) | 60.2 mass parts |
| Silica (particle diameter: 0.2 μm) | 0.1 mass parts |

Another mixing tank was charged with 12.0 mass parts of the aforementioned retardation controlling agent A, 8.0 mass parts of the aforementioned retardation controlling agent B, 87 mass parts of methylene chloride, and 13 mass parts of methanol, and the resultant mixture was stirred under heating, to prepare a retardation controlling agent solution 10.

19.8 mass parts of the retardation controlling (increasing) agent solution 10 was mixed with 474 mass parts of the cellulose acetate solution, and the resultant mixture was thoroughly stirred, to prepare a dope. The amounts of the retardation controlling agents A and B to be added were 2.4 mass parts and 1.6 mass parts, respectively, to 100 mass parts of the cellulose acetate.

A cellulose acetate film (thickness: 80 μm, width: 1,550 mm) was prepared in the same manner as in Example 1-1, except that after the dope was cast on a band, the formed film was peeled off, and the resultant film in which the residual solvent amount was 28 mass % at the start of orienting, was laterally oriented using a tenter at an orientation ratio of 25%.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Example 1-18

(Preparation of Cellulose Acylate Film A18)

The following components of a cellulose acetate solution composition were poured into a mixing tank and the resultant was stirred under heating, to dissolve the components each other. Thus, a cellulose acetate solution was prepared.

(Composition of Cellulose Acetate Solution)

| | |
|---|---|
| Cellulose acetate (substitution degree of acetyl group, 2.75; substitution degree of acetyl group at 6-position/total substitution degree, 0.35) | 100 mass parts |
| Triphenyl phosphate (plasticizer) | 8.0 mass parts |
| Biphenyldiphenyl phosphate (plasticizer) | 4.0 mass parts |
| Methylene chloride (first solvent) | 403 mass parts |
| Methanol (second solvent) | 60.2 mass parts |
| Silica (particle diameter: 0.2 μm) | 0.1 mass parts |

Another mixing tank was charged with 10.7 mass parts of the retardation controlling agent A, 9.3 mass parts of the retardation controlling agent B, 87 mass parts of methylene chloride, and 13 mass parts of methanol, and the resultant mixture was stirred under heating, to prepare a retardation controlling agent solution 11.

14.8 mass parts of the retardation controlling agent solution 11 was mixed with 474 mass parts of the cellulose acetate solution, and the resultant mixture was thoroughly stirred, to prepare a dope. The amounts of the retardation controlling agents A and B to be added were 1.6 mass parts and 1.4 mass parts, respectively, to 100 mass parts of the cellulose acetate.

A cellulose acetate film (thickness: 90 μm, width: 1,340 nm) was prepared in the same manner as in Example 1-1, except that after the dope was cast on a band, the formed film was peeled off, and the resultant film in which the residual solvent amount was 31 mass % at the start of orienting, was laterally oriented using a tenter at an orientation ratio of 20%.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Example 1-19

Preparation of Cellulose Acylate Film A19

24.7 mass parts of the retardation controlling (increasing) agent solution 01 was mixed with 474 mass parts of the cellulose acetate solution, as prepared in Example 1-1, and the resultant mixture was thoroughly stirred, to prepare a dope. The amounts of the retardation controlling agents A and B to be added each were 2.5 mass parts, to 100 mass parts of the cellulose acetate.

A cellulose acetate film (thickness: 110 μm, width: 1,550 mm) was manufactured in the same manner as in Example 1-1, except that the residual solvent amount was 30% and the orientation ratio was changed to 25%. The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Example 1-20

(Preparation of Cellulose Acylate Film A20)

The following components of a cellulose acetate solution composition were poured into a mixing tank, and the resultant was stirred under heating, to dissolve the components each other. Thus, a cellulose acylate solution was prepared.

(Composition of Cellulose Acylate Solution)

| | |
|---|---|
| Cellulose acetate propionate (substitution degree of acetyl group, 1.90; substitution degree of propionyl group 0.80) | 100 mass parts |
| Triphenyl phosphate | 8.0 mass parts |
| Ethylphthalylethylglycolate | 4.0 mass parts |
| Methylene chloride | 403 mass parts |
| Ethanol | 60.3 mass parts |

Another mixing tank was charged with 12.0 mass parts of the aforementioned retardation controlling agent A, 8.0 mass parts of the aforementioned retardation controlling agent B, 87 mass parts of methylene chloride, and 13 mass parts of ethanol, and the resultant mixture was stirred under heating, to prepare an additive solution 5.

24.7 mass parts of the additive solution 5 was mixed with 474 mass parts of the cellulose acetate solution, and the resultant mixture was thoroughly stirred, to prepare a dope.

A cellulose acetate film (thickness: 80 μm, width: 1,850 mm) was prepared in the same manner as in Example 1-1, except that after the dope was cast on a band, the formed film was peeled off, and the resultant film in which the residual solvent amount was 34 mass % at the start of orienting, was laterally oriented using a tenter at an orientation ratio of 21%.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Example 1-21

(Preparation of Cellulose Acylate Film A21)

The following components of a cellulose acetate solution composition were poured into a mixing tank, and the resultant was stirred under heating, to dissolve the components each other. Thus, a cellulose acylate solution was prepared.

(Composition of Cellulose Acylate Solution)

| | |
|---|---|
| Cellulose acetate propionate (substitution degree of acetyl group, 0.18; substitution degree of propionyl group 2.47) | 100 mass parts |
| Triphenyl phosphate | 8.5 mass parts |
| Ethylphthalylethylglycolate | 2.0 mass parts |
| Methylene chloride | 290 mass parts |
| Ethanol | 60 mass parts |

A separate mixing tank was charged with 5 mass parts of cellulose acetate propionate, 6 mass parts of Tinubin 326 (trade name: manufactured by Ciba Specialty Chemicals), 4 mass parts of Tinubin 109 (trade name, manufactured by Ciba Specialty Chemicals), 5 mass parts of Tinubin 171 (trade name, manufactured by Ciba Specialty Chemicals), 11.6 mass parts of the aforementioned retardation controlling agent A, 5.0 mass parts of the aforementioned retardation agent B, 94 mass parts of methylene chloride, and 8 mass parts of ethanol, and the mixture was stirred under heating, to prepare an additive solution 6.

28.8 mass parts of the additive solution 6 was mixed with 474 mass parts of the cellulose acetate solution, and the resultant mixture was thoroughly stirred, to prepare a dope.

A cellulose acetate film (thickness: 70 μm, width: 1,450 mm) was prepared in the same manner as in Example 1-1, except that after the dope was cast on a band, the formed film was peeled off, and the resultant film in which the residual solvent amount was 30 mass % at the start of orienting, was laterally oriented using a tenter at an orientation ratio of 25%.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Example 1-22

(Preparation of Cellulose Acylate Film A22)

The following components of a cellulose acetate solution composition were poured into a mixing tank and the resultant was stirred under heating, to dissolve the components each other. Thus, a cellulose acylate solution was prepared.

(Composition of Cellulose Acylate Solution)

| | |
|---|---|
| Cellulose acetate butylate (substitution degree of acetyl group, 1.40; substitution degree of butylyl group 1.30) | 100 mass parts |
| Triphenyl phosphate | 8.0 mass parts |
| Ethylphthalylethylglycolate | 4.0 mass parts |
| Methylene chloride | 403 mass parts |
| Ethanol | 60.3 mass parts |

Another mixing tank was charged with 8.0 mass parts of the aforementioned retardation controlling agent A, 12.0 mass parts of the aforementioned retardation controlling agent B, 87 mass parts of methylene chloride, and 13 mass parts of ethanol, and the resultant mixture was stirred under heating, to prepare an additive solution 7.

19.8 mass parts of the additive solution 7 was mixed with 474 mass parts of the cellulose acetate solution, and the resultant mixture was thoroughly stirred, to prepare a dope.

A cellulose acetate film (thickness: 80 μm, width: 1,340 nm) was prepared in the same manner as in Example 1-1, except that after the dope was cast on a band, the formed film was peeled off, and the resultant film in which the residual solvent amount was 28 mass % at the start of orienting, was laterally oriented using a tenter at an orientation ratio of 28%.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Example 1-23

(Preparation of Cellulose Acylate Film A23)

The following components of a cellulose acetate solution composition were poured into a mixing tank, and the resultant was stirred under heating, to dissolve the components each other. Thus, a cellulose acylate solution was prepared.

(Composition of Cellulose Acylate Solution)

| | |
|---|---|
| Cellulose acetate butylate (substitution degree of acetyl group, 0.30; substitution degree of butylyl group 2.50) | 100 mass parts |
| Triphenyl phosphate | 8.5 mass parts |
| Ethylphthalylethylglycolate | 2.0 mass parts |
| Methylene chloride | 290 mass parts |
| Ethanol | 60 mass parts |

A separate mixing tank was charged with 5 mass parts of cellulose acetate butylate, 6 mass parts of Tinubin 326 (trade name: manufactured by Ciba Specialty Chemicals), 4 mass parts of Tinubin 109 (trade name, manufactured by Ciba Specialty Chemicals), 5 mass parts of Tinubin 171 (trade name, manufactured by Ciba Specialty Chemicals), 10.0 mass parts of the aforementioned retardation controlling agent A, 6.6 mass parts of the aforementioned retardation agent B, 94 mass parts of methylene chloride, and 8 mass parts of ethanol, and the mixture was stirred under heating, to prepare an additive solution 8.

43.5 mass parts of the additive solution 8 was mixed with 474 mass parts of the cellulose acetate solution, and the resultant mixture was thoroughly stirred, to prepare a dope.

A cellulose acetate film (thickness: 90 μm, width: 1,450 mm) was prepared in the same manner as in Example 1-1, except that after the dope was cast on a band, the formed film was peeled off, and the resultant film in which the residual solvent amount was 32 mass % at the start of orienting, was laterally oriented using a tenter at an orientation ratio of 25%.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Example 1-24

(Preparation of Cellulose Acylate Film A24)

The following components of a cellulose acetate solution composition were poured into a mixing tank, and the resultant was stirred under heating, to dissolve the components each other. Thus, a cellulose acetate solution was prepared.

(Composition of Cellulose Acetate Solution)

| | |
|---|---|
| Cellulose acetate (substitution degree of acetyl group, 2.78; substitution degree of acetyl group at 6-position/total substitution degree, 0.33) | 100 mass parts |
| Triphenyl phosphate (plasticizer) | 8.0 mass parts |
| Biphenyldiphenyl phosphate (plasticizer) | 4.0 mass parts |
| Methylene chloride (first solvent) | 403 mass parts |
| Methanol (second solvent) | 60.2 mass parts |
| Silica (particle diameter: 0.2 μm) | 0.1 mass parts |

Another mixing tank was charged with 12.0 mass parts of the retardation controlling agent A, 8.0 mass parts of the retardation controlling agent B, 87 mass parts of methylene chloride, and 13 mass parts of methanol, and the resultant mixture was stirred under heating, to prepare a retardation controlling agent solution 12.

24.7 mass parts of the retardation controlling agent solution 12 was mixed with 474 mass parts of the cellulose acetate solution, and the resultant mixture was thoroughly stirred, to prepare a dope. The amounts of the retardation controlling agents A and B to be added were 3.0 mass parts and 2.0 mass parts, respectively, to 100 mass parts of the cellulose acetate.

A cellulose acetate film (thickness: 100 μm, width: 1,550 mm) was prepared in the same manner as in Example 1-1, except that after the dope was cast on a band, the formed film was peeled off, and the resultant film in which the residual solvent amount was 28 mass % at the start of orienting, was laterally oriented using a tenter at an orientation ratio of 23%.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Example 1-25

(Preparation of Cellulose Acylate Film A25)

A cellulose acetate film (thickness: 110 μm, width: 1,840 mm) was manufactured in the same manner as in Example 1-24, except that the orientation ratio was changed to 26%.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Example 1-26

(Preparation of Cellulose Acylate Film A26)

The following components of a cellulose acetate solution composition were poured into a mixing tank, and the resultant was stirred under heating, to dissolve the components each other. Thus, a cellulose acetate solution was prepared.

(Composition of Cellulose Acetate Solution)

| | |
|---|---|
| Cellulose acetate (substitution degree of acetyl group, 2.75; substitution degree of acetyl group at 6-position/total substitution degree, 0.35) | 100 mass parts |
| Triphenyl phosphate (plasticizer) | 8.0 mass parts |
| Biphenyldiphenyl phosphate (plasticizer) | 4.0 mass parts |
| Methylene chloride (first solvent) | 403 mass parts |
| Methanol (second solvent) | 60.2 mass parts |
| Silica (particle diameter: 0.2 μm) | 0.1 mass parts |

Another mixing tank was charged with 10.0 mass parts of the retardation controlling agent A, 10.0 mass parts of the retardation controlling agent B, 87 mass parts of methylene chloride, and 13 mass parts of methanol, and the resultant mixture was stirred under heating, to prepare a retardation controlling agent solution 13.

29.2 mass parts of the retardation controlling agent solution 13 was mixed with 474 mass parts of the cellulose acetate solution, and the resultant mixture was thoroughly stirred, to prepare a dope. The amounts of the retardation controlling agents A and B to be added were 3.0 mass parts and 3.0 mass parts, respectively, to 100 mass parts of the cellulose acetate.

A cellulose acetate film (thickness: 80 μm, width: 1,550 mm) was prepared in the same manner as in Example 1-1, except that after the dope was cast on a band, the formed film was peeled off, and the resultant film in which the residual solvent amount was 34 mass % at the start of orienting, was laterally oriented using a tenter at an orientation ratio of 32%.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Example 1-27

(Preparation of Cellulose Acylate Film A27)

The following components of a cellulose acetate solution composition were poured into a mixing tank and the resultant was stirred under heating, to dissolve the components each other. Thus, a cellulose acetate solution was prepared.

(Composition of Cellulose Acetate Solution)

| | |
|---|---|
| Cellulose acetate (substitution degree of acetyl group, 2.82; substitution degree of acetyl group at 6-position/total substitution degree, 0.32) | 100 mass parts |
| Triphenyl phosphate (plasticizer) | 8.0 mass parts |
| Biphenyldiphenyl phosphate (plasticizer) | 4.0 mass parts |
| Methylene chloride (first solvent) | 403 mass parts |
| Methanol (second solvent) | 60.2 mass parts |
| Silica (particle diameter: 0.2 μm) | 0.1 mass parts |

Anther mixing tank was charged with 10.0 mass parts of the retardation controlling agent A, 10.0 mass parts of the retardation controlling agent B, 87 mass parts of methylene chloride, and 13 mass parts of methanol, and the resultant mixture was stirred under heating, to prepare a retardation controlling agent solution 14.

31.1 mass parts of the retardation controlling agent solution 14 was mixed with 474 mass parts of the cellulose acetate solution, and the resultant mixture was thoroughly stirred, to prepare a dope. The amounts of the retardation controlling agents A and B to be added were 3.8 mass parts and 2.5 mass parts, respectively, to 100 mass parts of the cellulose acetate.

A cellulose acetate film (thickness: 90 μm, width: 1,850 mm) was prepared in the same manner as in Example 1-1, except that after the dope was cast on a band, the formed film was peeled off, and the resultant film in which the residual solvent amount was 30 mass % at the start of orienting, was laterally oriented using a tenter at an orientation ratio of 25%.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Example 1-28

(Preparation of Cellulose Acylate Film A28)

The following components of a cellulose acetate solution composition were poured into a mixing tank and the resultant was stirred under heating, to dissolve the components each other. Thus, a cellulose acetate solution was prepared.

(Composition of Cellulose Acetate Solution)

| | |
|---|---|
| Cellulose acetate (substitution degree of acetyl group, 2.80; substitution degree of acetyl group at 6-position/total substitution degree, 0.32) | 100 mass parts |
| Triphenyl phosphate (plasticizer) | 8.0 mass parts |
| Biphenyldiphenyl phosphate (plasticizer) | 4.0 mass parts |
| Methylene chloride (first solvent) | 403 mass parts |
| Methanol (second solvent) | 60.2 mass parts |
| Silica (particle diameter: 0.2 μm) | 0.1 mass parts |

Another mixing tank was charged with 14.0 mass parts of the retardation controlling agent A, 6.0 mass parts of the retardation controlling agent B, 87 mass parts of methylene chloride, and 13 mass parts of methanol, and the resultant mixture was stirred under heating, to prepare a retardation controlling agent solution 15.

32.6 mass parts of the retardation controlling agent solution 15 was mixed with 474 mass parts of the cellulose acetate solution, and the resultant mixture was thoroughly stirred, to prepare a dope. The amounts of the retardation controlling agents A and B to be added were 4.6 mass parts and 2.0 mass parts, respectively, to 100 mass parts of the cellulose acetate.

A cellulose acetate film (thickness: 60 μm, width: 1,340 mm) was prepared in the same manner as in Example 1-1, except that after the dope was cast on a band, the formed film was peeled off, and the resultant film in which the residual solvent amount was 32 mass % at the start of orienting, was laterally oriented using a tenter at an orientation ratio of 20%.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Example 1-29

(Preparation of Cellulose Acylate Film A29)

The following components of a cellulose acetate solution composition were poured into a mixing tank and the resultant was stirred under heating, to dissolve the components each other. Thus, a cellulose acetate solution was prepared.

(Composition of a Cellulose Acetate Solution)

| | |
|---|---|
| Cellulose acetate (substitution degree of acetyl group, 2.80; substitution degree of acetyl group at 6-position/total substitution degree, 0.32) | 100 mass parts |
| Triphenyl phosphate (plasticizer) | 8.0 mass parts |
| Biphenyldiphenyl phosphate (plasticizer) | 4.0 mass parts |
| Methylene chloride (first solvent) | 403 mass parts |
| Methanol (second solvent) | 60.2 mass parts |
| Silica (particle diameter: 0.2 μm) | 0.1 mass parts |

Another mixing tank was charged with 12.0 mass parts of the retardation controlling agent A, 8.0 mass parts of the retardation controlling agent B, 87 mass parts of methylene chloride, and 13 mass parts of methanol, and the resultant mixture was stirred under heating, to prepare a retardation controlling agent solution 16.

22.25 mass parts of the retardation controlling agent solution 16 was mixed with 474 mass parts of the cellulose acetate solution, and the resultant mixture was thoroughly stirred, to prepare a dope. The amounts of the retardation controlling agents A and B to be added were 2.7 mass parts and 1.8 mass parts, respectively, to 100 mass parts of the cellulose acetate.

A cellulose acetate film (thickness: 90 µm, width: 1,450 mm) was prepared in the same manner as in Example 1-1, except that after the dope was cast on a band, the formed film was peeled off, and the resultant film in which the residual solvent amount was 31 mass % at the start of orienting, was laterally oriented using a tenter at an orientation ratio of 20%.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Example 1-30

(Preparation of Cellulose Acylate Film A30)

A cellulose acetate film (thickness: 40 µm, width: 1,850 nm) was prepared in the same manner as in Example 1-29, except that 27.2 mass parts of the retardation controlling agent solution 16 was mixed with 474 mass parts of the cellulose acetate solution, and that the film in which the residual solvent amount was 30 mass % at the start of orienting, was laterally oriented using a tenter at an orientation ratio of 30%.

The amounts of the retardation controlling agents A and B to be added were 3.3 mass parts and 2.2 mass parts, respectively, to 100 mass parts of the cellulose acetate.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Example 1-31

(Preparation of Cellulose Acylate Film A31)

A cellulose acetate film (thickness: 50 µm, width: 1,550 mm) was prepared in the same manner as in Example 1-29, except that 24.7 mass parts of the retardation controlling agent solution 16 was mixed with 474 mass parts of the cellulose acetate solution and that the film in which the residual solvent amount was 30 mass % at the start of orienting, was laterally oriented using a tenter at an orientation ratio of 25%.

The amounts of the retardation controlling agents A and B to be added were 3.0 mass parts and 2.0 mass parts, respectively, to 100 mass parts of the cellulose acetate.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Comparative Example 1-1

(Preparation of Cellulose Acylate Film B1)

A mixing tank was charged with 20 mass parts of the aforementioned retardation controlling agent A, 87 mass parts of methylene chloride, and 13 mass parts of methanol, and the resultant mixture was stirred under heating, to prepare a retardation controlling agent solution 16.

36.2 mass parts of the retardation controlling (increasing) agent solution 16 was mixed with 474 mass parts of the cellulose acetate solution as prepared in Example 1-1, and the resultant mixture was thoroughly stirred, to prepare a dope. The amount of the retardation controlling agent A to be added was 6 mass parts, to 100 mass parts of the cellulose acetate.

A cellulose acetate film (thickness: 93 µm, width: 1,450 mm) was prepared in the same manner as in Example 1-1, except that after the dope was cast on a band, the formed film was peeled off, and the resultant film in which the residual solvent amount was 28 mass % at the start of orienting, was laterally oriented using a tenter at an orientation ratio of 26%.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Comparative Example 1-2

(Preparation of Cellulose Acylate Film B2)

45.2 mass parts of the retardation controlling (increasing) agent solution 16 was mixed with 474 mass parts of the cellulose acetate solution as prepared in Example 1-1, and the resultant mixture was thoroughly stirred, to prepare a dope. The amount of the retardation controlling agent A to be added was 7.5 mass parts, to 100 mass parts of the cellulose acetate.

A cellulose acetate film (thickness: 90 µm, width: 1,350 mm) was prepared in the same manner as in Example 1-1, except that after the dope was cast on a band, the formed film was peeled off, and the resultant film in which the residual solvent amount was 26 mass % at the start of orienting, was laterally oriented using a tenter at an orientation ratio of 26%.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Comparative Example 1-3

(Preparation of Cellulose Acylate Film B3)

A cellulose acetate film (thickness: 89 µm, width: 1,850 mm) was prepared in the same manner as in Comparative Example 1-2, except that the orientation ratio was changed to 30%.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Comparative Example 1-4

(Preparation of Cellulose Acylate Film B4)

60.3 mass parts of the retardation controlling (increasing) agent solution 16 was mixed with 474 mass parts of the cellulose acetate solution as prepared in Example 1-1, and the resultant mixture was thoroughly stirred, to prepare a dope. The amount of the retardation controlling agent A to be added was 10 mass parts, to 100 mass parts of the cellulose acetate.

When the dope was cast on a band, a whitish crystalline compound started precipitating on the surface of the film, along with the progress of drying, and the production of the film was stopped.

Comparative Example 1-5

(Preparation of Cellulose Acylate Film B5)

A mixing tank was charged with 20 mass parts of the aforementioned retardation controlling agent B, 87 mass parts of methylene chloride, and 13 mass parts of methanol, and the resultant mixture was stirred under heating, to prepare a retardation controlling agent solution 17.

12.1 mass parts of the retardation controlling (increasing) agent solution 17 was mixed with 474 mass parts of the cellulose acetate solution as prepared in Example 1-1, and the resultant mixture was thoroughly stirred, to prepare a dope. The amount of the retardation controlling agent B to be added was 2 mass parts, to 100 mass parts of the cellulose acetate.

A cellulose acetate film (thickness: 92 μm, width: 1,850 mm) was prepared in the same manner as in Example 1-1, except that after the dope was cast on a band, the formed film was peeled off, and the resultant film in which the residual solvent amount was 32 mass % at the start of orienting, was laterally oriented using a tenter at an orientation ratio of 26%.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Comparative Example 1-6

(Preparation of Cellulose Acylate Film B6)

A cellulose acetate film (thickness: 90 μm, width: 1,550 mm) was manufactured in the same manner as in Comparative Example 1-5, except that the orientation ratio was changed to 30%. The Re retardation value and Rth retardation value of the produced cellulose acetate film at wavelength 590 nm were measured, using KOBRA 21ADH (tradename, manufactured by Oji Scientific Instruments). Further, a wavelength dispersion shape, a moisture dependency of optical characteristics at 25° C., a moisture permeability, and a rate of dimensional change were measured. The results are shown in Table 1.

Comparative Example 1-7

(Preparation of Cellulose Acylate Film B7)

36.2 mass parts of the retardation controlling (increasing) agent solution 17 was mixed with 474 mass parts of the cellulose acetate solution as prepared in Example 1-1, and the resultant mixture was thoroughly stirred, to prepare a dope. The amount of the retardation controlling agent B to be added was 6 mass parts, to 100 mass parts of the cellulose acetate.

A cellulose acetate film (thickness: 93 μm, width: 1,450 mm) was prepared in the same manner as in Example 1-1, except that after the dope was cast on a band, the formed film was peeled off, and the resultant film in which the residual solvent amount was 34 mass % at the start of orienting, was laterally oriented using a tenter at an orientation ratio of 26%.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Comparative Example 1-8

(Preparation of Cellulose Acylate Film B8)

A cellulose acetate film (thickness: 91 μm, width: 1,340 mm) was manufactured in the same manner as in Comparative Example 1-7, except that the orientation ratio was changed to 30%. The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Comparative Example 1-9

(Preparation of Cellulose Acylate Film B9)

A mixing tank was charged with 10 mass parts of the aforementioned retardation controlling agent A, 10 mass parts of the aforementioned retardation controlling agent C, 87 mass parts of methylene chloride, and 13 mass parts of methanol, and the resultant mixture was stirred under heating, to prepare a retardation controlling agent solution 18.

45.2 mass parts of the retardation controlling (increasing) agent solution 18 was mixed with 474 mass parts of the cellulose acetate solution as prepared in Example 1-1, and the resultant mixture was thoroughly stirred, to prepare a dope. The amounts of the retardation controlling agents A and C to be added were 3.75 mass parts and 3.75 mass parts, respectively, to 100 mass parts of the cellulose acetate.

A cellulose acetate film (thickness: 91 μm, width: 1,550 mm) was prepared in the same manner as in Example 1-1, except that after the dope was cast on a band, the formed film was peeled off, and the resultant film in which the residual solvent amount was 28 mass % at the start of orienting, was laterally oriented using a tenter at an orientation ratio of 26%.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

Comparative Example 1-10

(Preparation of Cellulose Acylate Film B10)

A mixing tank was charged with 10 mass parts of the aforementioned retardation controlling agent B, 10 mass parts of the aforementioned retardation controlling agent D, 87 mass parts of methylene chloride, and 13 mass parts of methanol, and the resultant mixture was stirred under heating, to prepare a retardation controlling agent solution 19.

36.2 mass parts of the retardation controlling (increasing) agent solution 19 was mixed with 474 mass parts of the cellulose acetate solution as prepared in Example 1-1, and the resultant mixture was thoroughly stirred, to prepare a dope. The amounts of the retardation controlling agents B and D to be added were 3 mass parts and 3 mass parts, respectively, to 100 mass parts of the cellulose acetate.

A cellulose acetate film (thickness: 92 μm, width: 1,450 nm) was prepared in the same manner as in Example 1-1, except that after the dope was cast on a band, the formed film was peeled off, and the resultant film in which the residual solvent amount was 33 mass % at the start of orienting, was laterally oriented using a tenter at an orientation ratio of 26%.

The Re retardation value and Rth retardation value of the produced cellulose acetate film at wavelength 590 nm were measured, using KOBRA 21ADH (trade name, manufactured by Oji Scientific Instruments). Further, a wavelength dispersion shape, a moisture dependency of optical characteristics at 25° C., a moisture permeability, and a rate of dimensional change were measured. The results are shown in Table 1.

TABLE 1

| | Amount of retardation-controlling agent to be added (per cellulose) | | | | Oriented ratio (times) | Amount of residual solvent when starting orienting (%) | Film thickness after orienting (μm) | Film width (mm) |
| --- | --- | --- | --- | --- | --- | --- | --- | --- |
| | Retardation-controlling agent A | Retardation-controlling agent B | Retardation-controlling agent C | Retardation-controlling agent D | | | | |
| Example 1-1 | 3.0% | 3.0% | — | — | 26 | 32 | 92 | 1340 |
| Example 1-2 | 3.0% | 3.0% | — | — | 30 | 32 | 90 | 1450 |
| Example 1-3 | 3.0% | 3.0% | — | — | 26 | 32 | 80 | 1340 |
| Example 1-4 | 2.6% | 2.6% | — | — | 26 | 32 | 92 | 1550 |
| Example 1-5 | 1.0% | 6.0% | — | — | 25 | 18 | 92 | 1850 |
| Example 1-6 | 2.0% | 3.0% | — | — | 26 | 34 | 93 | 1450 |
| Example 1-7 | 5.0% | 2.0% | — | — | 26 | 30 | 91 | 1340 |
| Example 1-8 | 1.5% | 3.0% | 1.5% | — | 26 | 32 | 90 | 1850 |
| Example 1-9 | 3.0% | 1.5% | — | 1.5% | 26 | 33 | 93 | 1550 |
| Example 1-10 | — | 3.0% | 3.0% | — | 26 | 31 | 92 | 1850 |
| Example 1-11 | 2.5% | 2.5% | — | — | 26 | 32 | 80 | 1450 |
| Example 1-12 | 1.2% | 0.8% | — | — | 23 | 32 | 80 | 1340 |
| Example 1-13 | 1.8% | 1.2% | — | — | 18 | 28 | 80 | 1340 |
| Example 1-14 | 2.9% | 1.6% | — | — | 30 | 34 | 70 | 1850 |
| Example 1-15 | 2.3% | 1.2% | — | — | 28 | 32 | 70 | 1850 |
| Example 1-16 | 1.2% | 0.8% | — | — | 30 | 30 | 90 | 1450 |
| Example 1-17 | 2.4% | 1.6% | — | — | 25 | 28 | 80 | 1550 |
| Example 1-18 | 1.6% | 1.4% | — | — | 20 | 31 | 90 | 1340 |
| Example 1-19 | 2.5% | 2.5% | — | — | 25 | 30 | 110 | 1550 |
| Example 1-20 | 3.0% | 2.0% | — | — | 21 | 34 | 80 | 1850 |
| Example 1-21 | 1.4% | 0.6% | — | — | 25 | 30 | 70 | 1450 |
| Example 1-22 | 1.6% | 2.4% | — | — | 28 | 28 | 80 | 1340 |
| Example 1-23 | 1.8% | 1.2% | — | — | 25 | 32 | 90 | 1450 |
| Example 1-24 | 3.0% | 2.0% | — | — | 23 | 28 | 100 | 1550 |
| Example 1-25 | 3.0% | 2.0% | — | — | 26 | 28 | 100 | 1840 |
| Example 1-26 | 3.0% | 3.0% | — | — | 32 | 34 | 80 | 1550 |
| Example 1-27 | 3.8% | 2.5% | — | — | 25 | 30 | 90 | 1850 |
| Example 1-28 | 4.6% | 2.0% | — | — | 20 | 32 | 60 | 1340 |
| Example 1-29 | 2.7% | 1.8% | — | — | 20 | 31 | 90 | 1450 |
| Example 1-30 | 3.3% | 2.2% | — | — | 30 | 30 | 40 | 1850 |
| Example 1-31 | 3.0% | 2.0% | — | — | 25 | 30 | 50 | 1550 |
| Comparative example 1-1 | 6.0% | — | — | — | 26 | 28 | 93 | 1450 |
| Comparative example 1-2 | 7.5% | — | — | — | 26 | 26 | 90 | 1350 |
| Comparative example 1-3 | 7.5% | — | — | — | 30 | 26 | 89 | 1850 |
| Comparative example 1-4 | 10.0% | — | — | — | ND | ND | ND | ND |
| Comparative example 1-5 | — | 2.0% | — | — | 26 | 32 | 92 | 1850 |
| Comparative example 1-6 | — | 2.0% | — | — | 30 | 32 | 90 | 1550 |
| Comparative example 1-7 | — | 6.0% | — | — | 26 | 34 | 93 | 1450 |

TABLE 1-continued

| | | | | | | | |
|---|---|---|---|---|---|---|---|
| Comparative example 1-8 | — | 6.0% | — | — | 30 | 34 | 91 | 1340 |
| Comparative example 1-9 | 3.75% | — | 3.75% | — | 26 | 28 | 91 | 1550 |
| Comparative example 1-10 | — | 3.0% | — | 3.0% | 26 | 33 | 92 | 1450 |

| | Re (nm) | Rth (nm) | Re/Rth | Amount of change in Re/Rth (per 1% of orienting) | Rth wavelength dispersion Re700−Re400 (nm) | Rth700−Rth400 (nm) | Humidity dependency at 25° C. Re10%−Re80% (nm) | Rth10%−Rth80% (nm) | Moisture permeability at 25° C. 90% (g/m², 24 hrs) | Dimensional change (%) 90° C. Dry (MD) | 90° C. Dry (TD) | 60° C. 90% (MD) | 60° C. 90% (TD) |
|---|---|---|---|---|---|---|---|---|---|---|---|---|---|
| Example 1-1 | 51 | 129 | 0.40 | 0.013 | −3 | −10 | 5 | 28 | 185 | −0.07 | −0.05 | −0.02 | 0.01 |
| Example 1-2 | 59 | 131 | 0.45 | 0.013 | −5 | −12 | 6 | 30 | 180 | −0.09 | −0.07 | −0.03 | −0.01 |
| Example 1-3 | 45 | 112 | 0.40 | 0.013 | −2 | −8 | 5 | 26 | 195 | −0.08 | −0.07 | −0.03 | 0.01 |
| Example 1-4 | 40 | 141 | 0.28 | 0.012 | −2 | −8 | 5 | 25 | 190 | −0.07 | −0.06 | 0.02 | 0.05 |
| Example 1-5 | 40 | 241 | 0.17 | 0.011 | −8 | −20 | 6 | 35 | 200 | −0.07 | −0.04 | −0.04 | −0.02 |
| Example 1-6 | 58 | 128 | 0.45 | 0.014 | −6 | −15 | 5 | 39 | 190 | −0.07 | −0.05 | −0.03 | 0.01 |
| Example 1-7 | 45 | 138 | 0.33 | 0.012 | −1 | −3 | 4 | 21 | 180 | −0.10 | −0.08 | −0.04 | 0.02 |
| Example 1-8 | 52 | 132 | 0.39 | 0.013 | −3 | −10 | 5 | 24 | 185 | −0.08 | −0.04 | −0.03 | 0.01 |
| Example 1-9 | 49 | 128 | 0.38 | 0.013 | −2 | −9 | 6 | 40 | 190 | −0.08 | −0.06 | 0.03 | 0.06 |
| Example 1-10 | 54 | 138 | 0.39 | 0.013 | −4 | −12 | 5 | 23 | 185 | −0.09 | −0.07 | −0.05 | −0.03 |
| Example 1-11 | 52 | 130 | 0.40 | 0.013 | −5 | −15 | 5 | 25 | 185 | −0.08 | −0.08 | −0.03 | 0.01 |
| Example 1-12 | 45 | 125 | 0.36 | 0.013 | −3 | −7 | 6 | 28 | 200 | −0.13 | −0.11 | −0.08 | 0.08 |
| Example 1-13 | 40 | 120 | 0.33 | 0.012 | −2 | −8 | 3 | 25 | 180 | −0.1 | −0.09 | −0.05 | 0.04 |
| Example 1-14 | 60 | 155 | 0.39 | 0.013 | −4 | −12 | 12 | 45 | 195 | −0.06 | −0.04 | −0.12 | 0.09 |
| Example 1-15 | 50 | 115 | 0.43 | 0.013 | −3 | −6 | 5 | 25 | 180 | −0.07 | −0.07 | −0.05 | 0.04 |
| Example 1-16 | 35 | 130 | 0.27 | 0.012 | −1 | −10 | 2 | 19 | 190 | −0.12 | −0.11 | −0.03 | 0.02 |
| Example 1-17 | 50 | 130 | 0.38 | 0.013 | −3 | −11 | 8 | 35 | 195 | −0.08 | −0.06 | −0.12 | 0.1 |
| Example 1-18 | 35 | 162 | 0.22 | 0.011 | −1 | −13 | 3 | 22 | 185 | −0.02 | −0.01 | −0.1 | 0.09 |
| Example 1-19 | 50 | 260 | 0.19 | 0.011 | −18 | −30 | 22 | 43 | 200 | −0.1 | −0.1 | −0.07 | 0.08 |
| Example 1-20 | 60 | 220 | 0.27 | 0.012 | −20 | −43 | 6 | 12 | 220 | −0.06 | −0.04 | −0.05 | 0.01 |
| Example 1-21 | 74 | 260 | 0.28 | 0.012 | −6 | −16 | 18 | 33 | 180 | −0.13 | −0.08 | −0.09 | 0.06 |
| Example 1-22 | 50 | 240 | 0.21 | 0.011 | −22 | −46 | 13 | 25 | 196 | −0.11 | −0.1 | −0.05 | 0.03 |
| Example 1-23 | 60 | 260 | 0.23 | 0.012 | −2 | −5 | 9 | 18 | 220 | −0.04 | −0.03 | −0.12 | 0.08 |
| Example 1-24 | 70 | 240 | 0.29 | 0.012 | −15 | −35 | 5 | 8 | 210 | −0.08 | −0.04 | −0.03 | 0 |
| Example 1-25 | 80 | 246 | 0.33 | 0.013 | −14 | −32 | 6 | 9 | 210 | −0.08 | −0.07 | −0.03 | 0.01 |
| Example 1-26 | 60 | 240 | 0.25 | 0.012 | −13 | −25 | 16 | 38 | 180 | −0.1 | −0.08 | −0.06 | 0.05 |
| Example 1-27 | 70 | 220 | 0.32 | 0.012 | −8 | −18 | 20 | 56 | 196 | −0.06 | −0.03 | −0.11 | 0.07 |
| Example 1-28 | 50 | 220 | 0.23 | 0.012 | −5 | −10 | 12 | 24 | 185 | −0.04 | −0.02 | −0.09 | 0.05 |
| Example 1-29 | 60 | 200 | 0.30 | 0.014 | −12 | −22 | 15 | 32 | 185 | −0.09 | −0.07 | −0.09 | 0.05 |
| Example 1-30 | 65 | 210 | 0.31 | 0.011 | −13 | −23 | 16 | 33 | 185 | −0.1 | −0.08 | −0.11 | 0.06 |
| Example 1-31 | 70 | 220 | 0.32 | 0.012 | −14 | −26 | 16 | 33 | 180 | −0.09 | −0.08 | −0.1 | 0.06 |
| Comparative example 1-1 | 27 | 138 | 0.20 | 0.007 | 0.2 | 2 | 6 | 22 | 160 | −0.09 | −0.09 | −0.04 | 0.02 |
| Comparative example 1-2 | 34 | 145 | 0.23 | 0.008 | 0.5 | 4 | 6 | 24 | 155 | −0.10 | −0.05 | −0.05 | 0.03 |
| Comparative example 1-3 | 38 | 149 | 0.26 | 0.008 | 0.6 | 5 | 7 | 24 | 155 | −0.11 | −0.1 | −0.06 | 0.05 |
| Comparative example 1-4 | ND | ND | ND | ND | ND | ND | ND | ND | ND | ND | ND | ND | ND |
| Comparative example 1-5 | 22 | 111 | 0.20 | 0.004 | −2 | −8 | 7 | 34 | 190 | −0.07 | −0.06 | −0.02 | 0.01 |
| Comparative example 1-6 | 26 | 120 | 0.22 | 0.004 | −2 | −9 | 8 | 36 | 185 | −0.08 | −0.08 | −0.03 | 0.01 |
| Comparative example 1-7 | 38 | 190 | 0.20 | 0.005 | −5 | −13 | 10 | 35 | 205 | −0.08 | −0.07 | −0.03 | 0.01 |
| Comparative example 1-8 | 43 | 198 | 0.22 | 0.005 | −6 | −15 | 10 | 39 | 200 | −0.09 | −0.08 | −0.04 | 0.02 |
| Comparative example 1-9 | 32 | 148 | 0.22 | 0.008 | −0.2 | −1 | 5 | 25 | 190 | −0.09 | −0.05 | −0.05 | 0.03 |
| Comparative example 1-10 | 38 | 192 | 0.20 | 0.005 | −5 | −12 | 10 | 38 | 200 | −0.08 | −0.07 | −0.03 | 0.01 |

Note:
"—" not added,
"ND" not determined

Example 1-32

(Preparation of Polarizing Plates A1 to A31)

Iodine was adsorbed to an oriented polyvinyl alcohol film, to produce a polarizing film.

The manufactured cellulose acylate film A1 was saponified, and then it was laminated to one surface of the polarizing film by using a polyvinyl alcohol type adhesive. The saponification treatment was carried out in the following conditions.

A 1.5N aqueous sodium hydroxide solution was prepared, and kept at 55° C. A 0.01N aqueous dilute sulfuric acid solution was prepared, and kept at 35° C. The produced cellulose acylate film A1 was dipped in the above aqueous sodium hydroxide solution for 2 minutes, and then dipped in water, to wash away the aqueous sodium hydroxide solution thoroughly. Then, the resultant cellulose acylate film A1 was dipped in the above aqueous dilute sulfuric acid solution for 1 minute, and then dipped in water, to wash away the aqueous dilute sulfuric acid solution thoroughly. Finally, the sample was dried sufficiently at 120° C.

Surface energy of the cellulose acetate film after saponified was measured. The result is shown in Table 2.

A commercially available cellulose triacetate film (trade name: FUJITAC TD80UF, manufactured by Fuji Photo Film Co., Ltd.) was subjected to saponification in the same manner, and the resultant film was laminated to the polarizing film on the side opposite to the produced cellulose acetate film A1, by using a polyvinyl alcohol type adhesive.

The thus-prepared cellulose acetate film was arranged such that the transmission axis of the polarizing film was parallel to the slow axis of the cellulose acetate film. Also, the commercially available cellulose triacetate film was arranged such that the transmission axis of the polarizing film intersects at right angle with the slow axis of the cellulose triacetate film.

A polarizing plate A1 was manufactured in this manner. Polarizing plates A2 to A31 were likewise manufactured using the cellulose acylate films 2 to A31, respectively. With respect to the cellulose acylate films A2 to A31, each surface energy of the cellulose acetate films after saponified was measured. The results are shown in Table 2.

The optical performances (the single plate transmittance, and the degree of polarization) of the manufactured polarizing plates were measured with an automatic spectrophotometer UV3100 (trade name) manufactured by Shimadzu Corporation. Then, the polarizing plates were allowed to stand in a thermohygrostat kept at 60° C./90% RH, for 500 hours. The optical performances of the stored cellulose acetate films were measured in the same manner, to find a change in the degree of polarization. The results are shown in Table 3.

Comparative Example 1-11

(Preparation of polarizing plates B1 to B10)

Polarizing plates B1 to B10 were manufactured using the cellulose acylate films B11 to B10, respectively, in the same manner as in Example 1-32. With respect to the cellulose acylate films B1 to B10, each surface energy of the cellulose acetate films after saponified was measured. The results are shown in Table 2.

With respect to these polarizing plates, the change in degree of polarization was measured in the same manner as in Example 1-32; and the results are shown in Table 3.

TABLE 2

| Cellulose acylate film | Surface energy (mN/m) |
|---|---|
| A1 | 64 |
| A2 | 64 |
| A3 | 64 |
| A4 | 63 |
| A5 | 66 |
| A6 | 62 |
| A7 | 65 |
| A8 | 65 |
| A9 | 63 |
| A10 | 64 |
| A11 | 64 |
| A12 | 57 |
| A13 | 65 |
| A14 | 59 |
| A15 | 68 |

TABLE 2-continued

| Cellulose acylate film | Surface energy (mN/m) |
|---|---|
| A16 | 59 |
| A17 | 62 |
| A18 | 68 |
| A19 | 58 |
| A20 | 60 |
| A21 | 65 |
| A22 | 59 |
| A23 | 64 |
| A24 | 57 |
| A25 | 57 |
| A26 | 60 |
| A27 | 69 |
| A28 | 68 |
| A29 | 63 |
| A30 | 62 |
| A31 | 62 |
| B1 | 66 |
| B2 | 67 |
| B3 | 67 |
| B4 | — |
| B5 | 59 |
| B6 | 59 |
| B7 | 60 |
| B8 | 60 |
| B9 | 67 |
| B10 | 60 |

TABLE 3

| Polarizing plate | Change in polarization degree (%) after 500 hours at 60° C./95% RH |
|---|---|
| A1 | −0.55 |
| A2 | −0.63 |
| A3 | −0.54 |
| A4 | −0.57 |
| A5 | −0.82 |
| A6 | −0.56 |
| A7 | −0.79 |
| A8 | −0.58 |
| A9 | −0.57 |
| A10 | −0.55 |
| A11 | −0.55 |
| A12 | −1.2 |
| A13 | −1.45 |
| A14 | −0.67 |
| A15 | −1.21 |
| A16 | −0.25 |
| A17 | −0.47 |
| A18 | −1.34 |
| A19 | −0.7 |
| A20 | −0.8 |
| A21 | −1.2 |
| A22 | −0.6 |
| A23 | −0.9 |
| A24 | −0.4 |
| A25 | −0.5 |
| A26 | −0.8 |
| A27 | −1.9 |
| A28 | −1.8 |
| A29 | −0.6 |
| A30 | −0.5 |
| A31 | −0.6 |
| B1 | −0.55 |
| B2 | −0.89 |
| B3 | −0.13 |
| B4 | — |
| B5 | −0.63 |
| B6 | −0.88 |
| B7 | −0.72 |
| B8 | −0.93 |
| B9 | −0.92 |
| B10 | −0.11 |

Example 1-33

(Production and Evaluation of Polarizing Plate C1 and Liquid Crystal Display Device)

(Preparation of a Light Scattering Layer Coating Solution)

50 g of a mixture of pentaerythritol triacrylate and pentaerythritol tetraacrylate (trade name: PETA, manufactured by Nippon Kayaku Co., Ltd.) was diluted with 38.5 g of toluene. Then, 2 g of a polymerization initiator (trade name: Irgacure 184, manufactured by Ciba Specialty Chemicals Co., Ltd.) was added, and the resulting was mixed under stirring. When this solution was applied and cured using ultraviolet ray, the resultant coating film had a refractive index of 1.51.

Further, to this solution, were added 1.7 g of a 30% toluene dispersion of crosslinking polystyrene particles (refractive index 1.60, SX-350 (trade name) manufactured by Soken Chemical & Engineering Co., Ltd.) of average particle diameter 3.5 μm, and 13.3 g of a 30% toluene dispersion of crosslinking acryl-styrene particles (refractive index 1.55, manufactured by Soken Chemical & Engineering Co., Ltd.) of average particle diameter 3.5 μm, obtained by dispersing with a Polytron (trade name) dispersing machine at 10,000 rpm for 20 minutes; and then 0.75 g of a fluorine-containing surface modifier (FP-1), and 10 g of a silane coupling agent (trade name: KBM-5103, manufactured by Shin-Etsu Chemical Co., Ltd.), to prepare a finished solution.

The above mixed solution was filtered by a polypropylene filter of pore diameter 30 μm, to prepare a coating solution for a light scattering layer.

(Preparation of a Coating Solution for a Low-refractive-index Layer)

13 g of a thermally crosslinkable fluorine-containing polymer of refractive index 1.42 (JN-7228 (trade name), solid content 6%, manufactured by JSR Corporation), 1.3 g of silica sol (silica, a version of MEK-ST (trade name) changed in particle size, average particle diameter 45 nm, solid content 30%, manufactured by Nissan Chemical Industries, Ltd.), 0.6 g of sol solution a, and 5 g of methyl ethyl ketone, 0.6 g of cyclohexanone were added and stirred. Then, the mixture was filtered through a polypropylene filter having a pore diameter of 1 μm, to prepare Coating solution for a low-refractive-index layer.

(Preparation of Transparent Protective Film 01 Having an Anti-reflection Layer)

A 80-μm thick triacetylcellulose film (TAC-TD80UF, trade name, manufactured by Fuji Photo Film Co., Ltd.) in the form of a roll was unwound, on which the above-mentioned coating solution for functional layer (light scattering layer) was coated by use of a micro gravure roll of 50 mm in diameter having a gravure pattern with a line number of 180 lines/inch and a depth of 40 μm and a doctor blade, under the conditions of a gravure roll rotation number of 30 rpm and a conveying speed of 30 m/minute, and the resultant coating was dried at 60° C. for 150 seconds. Thereafter, UV of an illuminance of 400 mW/cm² and a dose of 250 mJ/cm² was irradiated by use of an air-cooled metal halide lamp of 160 W/cm (manufactured by Eyegraphics Co., Ltd.) under nitrogen purge, to cure the coating layer. Thus, a functional layer with a thickness of 6 nm was formed on the film, which was then wound up.

The triacetylcellulose film on which the functional layer (light scattering layer) was provided by coating was unwound again, and the resultant film was coated with the above-prepared coating solution for low-refractive-index layer, by use of a micro gravure roll of 50 mm in diameter having a gravure pattern with a line number of 180 lines/inch and a depth of 40 μm and a doctor blade, under the conditions of a gravure roll rotation number of 30 rpm and a conveying speed of 15 nm/minute; and the resultant coating was dried at 120° C. for 150 seconds, followed by drying at 140° C. for 8 minutes. Thereafter, UV of an illuminance of 400 mW/cm² and dose of 900 mJ/cm² was irradiated by use of an air-cooled metal halide lamp of 240 W/cm (manufactured by Eyegraphics Co., Ltd.) under nitrogen purge, to cure the coating layer. Thus, a low-refractive-index layer with a thickness of 100 nm was formed on the film, which was then wound up.

(Preparation of Polarizing Plate C1)

Iodine was adsorbed to an oriented polyvinyl alcohol film, to produce a polarizing film.

The manufactured transparent protective film 01 having an anti-reflection layer was saponified in the same manner as in Example 1-32, and then the resultant film was laminated to one surface of the polarizing film by using a polyvinyl alcohol type adhesive.

The cellulose acetate film A1 prepared in Example 1-1 was saponified in the same manner as in Example 1-32, and then the resultant film was laminated to the other surface of the polarizing film by using a polyvinyl alcohol type adhesive.

The polarizing film and the cellulose acetate film produced in Example 1-1 were arranged so as to make the transmitting axis of the polarizing film parallel to the slow axis of the cellulose acetate film. The polarizing film and a commercially available cellulose triacetate film were arranged so as to make the transmitting axis of the polarizing film perpendicular to the slow axis of the cellulose triacetate film. A polarizing plate C1 was produced in this manner.

Spectral reflectance at an incident angle of 5° in a wavelength range from 380 to 780 nm was measured using a spectrophotometer (manufactured by JASCO Corporation), and it was found that the integrated sphere average reflectance at a wavelength of 450 to 650 nm was 2.3%.

Polarizing plates C2 to C18 were manufactured in the same manner as above, except for using, in place of the film produced in Example 1-1, the cellulose triacetate films produced in Examples 1-2 to 1-18, respectively.

Example 1-34

(Preparation of a Hardcoat Layer Coating Solution)

270.0 parts by mass of a poly(glycidyl methacrylate) having a mass average molecular weight of 3,000, 730.0 g of methyl ethyl ketone, 500.0 g of cyclohexanone, and 50.0 g of a photopolymerization initiator (trade name: Irgacure 184, manufactured by Ciba Geigy) were added to 750.0 parts by mass of trimethylolpropane triacrylate (trade name: TMPTA, manufactured by Nippon Kayaku Co., Ltd.), and the mixture was stirred. The mixture was filtered by a polypropylene filter having a pore diameter of 0.4 μM, to prepare a hardcoat layer coating solution.

(Preparation of Titanium Dioxide Fine-particle Dispersion)

As the titanium dioxide fine-particles, titanium dioxide fine-particles (trade name: MPT-129, manufactured by Ishihara Sangyo Kaisha Ltd.) which contained cobalt and was surface-treated using aluminum hydroxide and zirconium hydroxide, were used.

To 257.1 g of the particles, 38.6 g of the following dispersant and 704.3 g of cyclohexanone were added, and the mixture was dispersed using a Dynomill, to prepare a titanium dioxide dispersion having a weight average diameter of 70 nm.

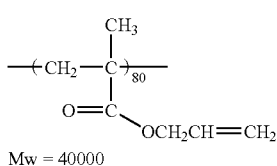
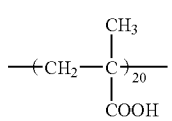

Mw = 40000

(Preparation of a Coating Solution for a Middle-refractive-index Layer)

To 88.9 g of the above-mentioned titanium dioxide dispersion, 58.4 g of a mixture of dipentaerythritol pentaacrylate and dipentaerythritol hexaacrylate (DPHA), 3.1 g of a photopolymerization initiator (Irgacure 907 (trade name), manufactured by Ciba-Geigy), 1.1 g of a photosensitizer (Kayacure-DETX (trade name), manufactured by Nippon Kayaku Co., Ltd.), 482.4 g of methyl ethyl ketone, and 1869.8 g of cyclohexanone were added and stirred. After sufficiently stirred, the resulting mixture was filtered through a polypropylene filter having a mesh (pore diameter) of 0.4 μm, to prepare a coating solution of a middle-refractive-index layer.

(Preparation of a Coating Solution for a High-refractive-index Layer)

To 586.8 g of the above-mentioned titanium dioxide dispersion, 47.9 g of a mixture of dipentaerythritol pentaacrylate and dipentaerythritol hexaacrylate (DPHA (trade name), manufactured by Nippon Kayaku Co., Ltd.); 4.0 g of a photopolymerization initiator (Irgacure 907 (trade name), manufactured by Ciba-Geigy), 1.3 g of a photosensitizer (Kayacure-DETX (trade name), manufactured by Nippon Kayaku Co., Ltd.), 455.8 g of methyl ethyl ketone, and 1427.8 g of cyclohexanone were added and stirred. The resulting mixture was filtered through a polypropylene filter having a mesh of 0.4 μm, to prepare a coating solution of a high-refractive-index layer.

(Preparation of a Low-refractive Index Layer Coating Solution)

The copolymer (P-1) according to the present invention was dissolved in methyl isobutyl ketone in a concentration of 7 mass %, to which were then added a terminal-methacrylate-group-containing silicone resin (trade name: X-22-164C, manufactured by Shin-Etsu Chemical Co., Ltd.) in an amount of 3 mass % based on solid and a photo-radical generator (trade name: Irgacure 907, manufactured by Ciba Geigy Co., Ltd.) in an amount of 5 mass % based on solid, to prepare a low-refractive index layer coating solution.

P-1

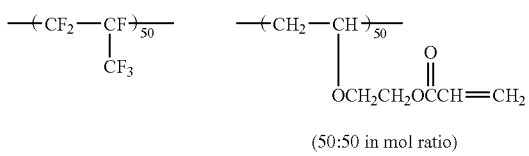

(50:50 in mol ratio)

(Preparation of Transparent Protective Film $O_2$ Having Antireflection Layer)

A 80-μm thick triacetylcellulose film (TD-80UF, trade name, manufactured by Fuji Photo Film Co., Ltd.) was coated with the coating solution for a hard coat layer, by use of a gravure coater. After drying the resultant coated film at 100° C., UV of an illuminance of 400 mW/cm² and a dose of 300 mJ/cm² was irradiated by use of an air-cooled metal halide lamp of 160 W/cm (manufactured by Eyegraphics Co., Ltd.) under nitrogen purge to give an atmosphere of an oxygen concentration of 1.0 volume % or less, to cure the coating layer. Thus, a hard coat layer with a thickness of 8 μm was formed on the film.

The middle-refractive index layer coating solution, the high-refractive index layer coating solution, and the low-refractive index layer coating solution were successively applied to the hardcoat layer, by using a gravure coater having three coating stations.

The drying condition of the middle-refractive index layer was 100° C. and 2 minutes. The condition of curing using ultraviolet rays was as follows: the amount of radiation was 400 mJ/cm² at an illuminance of 400 mW/cm², by using a 180 W/cm air-cooled metal halide lamp (manufactured by Eyegraphics Co., Ltd.), while purging the atmosphere with nitrogen such that the concentration of oxygen in the atmosphere would be 1.0 vol % or less. After cured, the middle-refractive index layer had a refractive index of 1.630 and a film thickness of 67 nm.

The drying conditions of the high-refractive index layer and low-refractive index layer were at 90° C. for 1 minute, and then at 100° C. for 1 minute. The condition of curing using ultraviolet rays was as follows: the amount of radiation was 600 mJ/cm² at an illuminance of 600 mW/cm², by using a 240 W/cm air-cooled metal halide lamp (manufactured by Eyegraphics Co., Ltd.) while purging the atmosphere with nitrogen such that the concentration of oxygen in the atmosphere would be 1.0 vol % or less.

After cured, the high-refractive index layer had a refractive index of 1.905 and a film thickness of 107 nm, and the low-refractive index layer had a refractive index of 1.440 and a film thickness of 85 nm. A transparent protective film $O_2$ with an antireflection layer was produced in this manner.

(Preparation of Polarizing Plate D1)

A polarizing plate D1 was produced in the same manner as in Example 1-33, except that the transparent protective film $O_2$ with an antireflection layer was used in place of the transparent protective film 01 with an antireflection layer.

Spectral reflectance at an incident angle of 5° in a wavelength range from 380 to 780 nm was measured using a spectrophotometer (manufactured by JASCO Corporation), and it was found that the integrated sphere average reflectance at a wavelength of 450 to 650 nm was 0.4%.

Polarizing plates D2 to D18 were manufactured in the same manner as above, except for using, in place of the film produced in Example 1-1, any of the cellulose triacetate films produced in Examples 1-2 to 1-18, respectively.

Comparative Example 1-12

(Preparation of polarizing plate E1)

A polarizing plate was manufactured in the same manner as in Example 1-33, except that the cellulose acetate film B1 manufactured in Comparative Example 1-1 was used in place of the cellulose acetate film A1 manufactured in Example 1-1. Also, polarizing plates E2 to E10 were manufactured in the same manner as above, except for using any of the cellulose acetate films produced in Comparative Examples 1-2 to 1-10, respectively.

Comparative Example 1-13

(Preparation of polarizing plate F1)

A polarizing plate was manufactured in the same manner as in Example 1-34, except that the cellulose acetate film B1 manufactured in Comparative Example 1-1 was used in place of the cellulose acetate film A1 manufactured in Example 1-1. Also, polarizing plates F2 to F10 were manufactured in the same manner as above, except for using any of the cellulose acetate films produced in Comparative Examples 1-2 to 1-10, respectively.

Example 1-35

In a liquid crystal display device (manufactured by Fujitsu Ltd.) which had a vertical orientation type liquid crystal cell, in place of a pair of polarizing plates and a pair of optical compensation sheets provided on the liquid crystal display device, the optical compensation sheet manufactured in Example 1-1 was used and the polarizing plate manufactured in Example 1-32 was used, such that the cellulose acetate film prepared in Example 1-1 would be positioned on the liquid crystal cell side and that each one polarizing plate manufactured in Example 1-32 would be laminated via an adhesive on the both sides of the observer side and the back light side of the display device. These polarizing plates were disposed in cross nicol state such that the transmission axis of the observer side polarizing plate was arranged in a vertical direction and the transmission axis of the back light side polarizing plate was arranged in a horizontal direction.

The manufactured liquid crystal display device was observed, and as a result, a neutral black display from both the front direction and the viewing angle direction was attained. Also, each viewing angle (the range where the contrast ratio was 10 or more and there was no gradation inversion at the black side) was measured in eight stages, i.e. from a black display (L1) to a white display (L8), with a measuring instrument (trade name: EZ-contrast 160D, manufactured by ELDIM).

As shown in Table 4, the liquid crystal display device having the polarizing plate of the present invention attained a wide viewing angle.

The similar results were obtained also in the cases when using the polarizing plates in which the optical compensation sheets prepared in Examples 1-2 to 1-18 were used, respectively.

Example 1-36

In a liquid crystal display device (manufactured by Fujitsu Ltd.) which had a vertical orientation type liquid crystal cell, in place of a pair of polarizing plates and a pair of optical compensation sheets provided on the liquid crystal display device, the optical compensation sheet manufactured in Example 1-1 was used and the polarizing plate manufactured in Example 1-33 was used, such that the cellulose acetate film prepared in Example 1-1 would be positioned on the liquid crystal cell side and that each one polarizing plate manufactured in Example 1-33 would be laminated via an adhesive on the both sides of the observer side and the back light side of the display device. These polarizing plates were disposed in cross nicol state such that the transmission axis of the observer side polarizing plate was arranged in a vertical direction and the transmission axis of the back light side polarizing plate was arranged in a horizontal direction.

The manufactured liquid crystal display device was observed, and as a result, a neutral black display from both the front direction and the viewing angle direction was attained. Also, each viewing angle (the range where the contrast ratio was 10 or more and there was no gradation inversion at the black side) was measured in eight stages, i.e. from a black display (L1) to a white display (L8), with a measuring instrument (trade name: EZ-contrast 160D, manufactured by ELDIM).

As shown in Table 4, the liquid crystal display device having the polarizing plate of the present invention attained a wide viewing angle.

The similar results were obtained also in the cases when using the polarizing plates in which the optical compensation sheets prepared in Examples 1-2 to 1-18 were used, respectively.

Example 1-37

In a liquid crystal display device (manufactured by Fujitsu Ltd.) which had a vertical orientation type liquid crystal cell, in place of a pair of polarizing plates and a pair of optical compensation sheets provided on the liquid crystal display device, the optical compensation sheet manufactured in Example 1-1 was used and the polarizing plate manufactured in Example 1-34 was used, such that the cellulose acetate film prepared in Example 1-1 would be positioned on the liquid crystal cell side and that each one polarizing plate manufactured in Example 1-34 would be laminated via an adhesive on the both sides of the observer side and the back light side of the display device. These polarizing plates were disposed in cross nicol state such that the transmission axis of the observer side polarizing plate was arranged in a vertical direction and the transmission axis of the back light side polarizing plate was arranged in a horizontal direction.

The manufactured liquid crystal display device was observed, and as a result, a neutral black display from both the front direction and the viewing angle direction was attained. Also, each viewing angle (the range where the contrast ratio was 10 or more and there was no gradation inversion at the black side) was measured in eight stages, i.e. from a black display (L1) to a white display (L8), with a measuring instrument (trade name: EZ-contrast 160D, manufactured by ELDIM).

As shown in Table 4, the liquid crystal display device having the polarizing plate of the present invention attained a wide viewing angle.

The similar results were obtained also in the cases when using the polarizing plates in which the optical compensation sheets prepared in Examples 1-2 to 1-18 were used, respectively.

Example 1-38

In a liquid crystal display device (manufactured by Fujitsu Ltd.) which had a vertical orientation type liquid crystal cell, in place of a pair of polarizing plates and a pair of optical compensation sheets provided on the liquid crystal display device, the optical compensation sheet manufactured in Example 1-19 was used and the polarizing plate manufactured in Example 1-32 was used, such that the cellulose acetate film prepared in Example 1-19 would be positioned on the liquid crystal cell side and that one polarizing plate manufactured in Example 1-32 would be laminated via an adhesive on the back light side of the display device. As the polarizing plate on the observer side, one commercially available polarizing plate (trade name: HLC2-5618, manufactured by Sanritz Corporation) which had no plate for compensating a viewing angle was laminated. These polarizing plates were disposed in cross nicol state such that the transmission axis of the observer side polarizing plate was arranged in a vertical direction and the transmission axis of the back light side polarizing plate was arranged in a horizontal direction.

The manufactured liquid crystal display device was observed, and as a result, a neutral black display from both the front direction and the viewing angle direction was attained. Also, each viewing angle (the range where the contrast ratio was 10 or more and there was no gradation inversion at the black side) was measured in eight stages, i.e. from a black display (L1) to a white display (L8), with a measuring instrument (trade name: EZ-contrast 160D, manufactured by ELDIM).

As shown in Table 4, the liquid crystal display device having the polarizing plate of the present invention attained a wide viewing angle.

The similar results were obtained also in the cases when using the polarizing plates in which the optical compensation sheets prepared in Examples 1-20 to 1-31 were used, respectively.

Comparative Example 1-14

With respect to a liquid crystal display device (trade name: VL-1530S, manufactured by Fujitsu Ltd.) using a vertical orientation type liquid crystal cell, each viewing angle was measured in eight stages, i.e. from a black display (L1) to a white display (L8), with a measuring instrument (trade name: EZ-contrast 160D, manufactured by ELDIM). The results are shown in Table 4. It is understood that the viewing angle was conspicuously narrower, as compared with the cases of using the polarizing plates of the present invention.

Comparative Example 1-15

In a liquid crystal display device (manufactured by Fujitsu Ltd.) which had a vertical orientation type liquid crystal cell, in place of a pair of polarizing plates and a pair of optical compensation sheets provided on the liquid crystal display device, the polarizing plate manufactured in Comparative Example 1-11 in which the cellulose acetate film manufactured in Comparative Example 1-1 was used was used, such that the cellulose acetate film prepared in Comparative Example 1-1 would be positioned on the liquid crystal cell side and that each one polarizing plate manufactured in Comparative Example 1-11 would be laminated via an adhesive on the both sides of the observer side and the back light side of the display device. These polarizing plates were disposed in cross nicol state such that the transmission axis of the observer side polarizing plate was arranged in a vertical direction and the transmission axis of the back light side polarizing plate was arranged in a horizontal direction.

The produced liquid crystal display device was observed, and as a result, although a black display was attained in the front direction, it was inferior to the cases of the present invention in the viewing angle direction. Also, each viewing angle (the range where the contrast ratio was 10 or more and there was no gradation inversion at the black side) was measured in eight stages, i.e. from a black display (L1) to a white display (L8), with a measuring instrument (trade name: EZ-contrast 160D, manufactured by ELDIM). The results are shown in Table 4. It is understood that the viewing angle was conspicuously narrower, as compared with the cases of using the polarizing plates of the present invention.

It was also confirmed that the viewing angle was conspicuously narrower in the cases of using the polarizing plates manufactured in Comparative Examples 1-2 to 1-10, respectively, as compared with the cases of using the polarizing plates of the present invention.

Comparative Example 1-16

In a liquid crystal display device (manufactured by Fujitsu Ltd.) which had a vertical orientation type liquid crystal cell, in place of a pair of polarizing plates and a pair of optical compensation sheets provided on the liquid crystal display device, the polarizing plate manufactured in Comparative Example 1-12 in which the cellulose acetate film manufactured in Comparative Example 1-1 was used was used, such that the cellulose acetate film prepared in Comparative Example 1-1 would be positioned on the liquid crystal cell side and that each one polarizing plate manufactured in Comparative Example 1-12 would be laminated via an adhesive on the both sides of the observer side and the back light side of the display device. These polarizing plates were disposed in cross nicol state such that the transmission axis of the observer side polarizing plate was arranged in a vertical direction and the transmission axis of the back light side polarizing plate was arranged in a horizontal direction.

The produced liquid crystal display device was observed, and as a result, although a neutral black display was attained in the front direction, it was inferior to the cases of the present invention in the viewing angle direction. Also, each viewing angle (the range where the contrast ratio was 10 or more and there was no gradation inversion at the black side) was measured in eight stages, i.e. from a black display (L1) to a white display (L8), with a measuring instrument (trade name: EZ-contrast 160D, manufactured by ELDIM). The results are shown in Table 4. It is understood that the viewing angle was conspicuously narrower, as compared with the cases of using the polarizing plates of the present invention.

It was also confirmed that the viewing angle was conspicuously narrower in the cases of using the polarizing plates manufactured in Comparative Examples 1-2 to 1-10, respectively, as compared with the cases of using the polarizing plates of the present invention.

Comparative Example 1-17

In a liquid crystal display device (manufactured by Fujitsu Ltd.) which had a vertical orientation type liquid crystal cell, in place of a pair of polarizing plates and a pair of optical compensation sheets provided on the liquid crystal display device, the polarizing plate manufactured in Comparative Example 1-13 in which the cellulose acetate film manufactured in Comparative Example 1-1 was used was used, such that the cellulose acetate film prepared in Comparative Example 1-1 would be positioned on the liquid crystal cell side and that each one polarizing plate manufactured in Comparative Example 1-13 would be laminated via an adhesive on the both sides of the observer side and the back light side of the display device. These polarizing plates were disposed in cross nicol state such that the transmission axis of the observer side polarizing plate was arranged in a vertical direction and the transmission axis of the back light side polarizing plate was arranged in a horizontal direction.

The produced liquid crystal display device was observed, and as a result, although a neutral black display was attained in the front direction, it was inferior to the cases of the present invention in the viewing angle direction. Also, each viewing angle (the range where the contrast ratio was 10 or more and there was no gradation inversion at the black side) was measured in eight stages, i.e. from a black display (L1) to a white display (L8), with a measuring instrument (trade name: EZ-contrast 160D, manufactured by ELDIM). The results are shown in Table 4. It is understood that the viewing angle was conspicuously narrower, as compared with the cases of using the polarizing plates of the present invention.

It was also confirmed that the viewing angle was conspicuously narrower in the cases of using the polarizing plates manufactured in Comparative Examples 1-2 to 1-10, respectively, as compared with the cases of using the polarizing plates of the present invention.

Comparative Example 1-18

A liquid crystal display device was manufactured in the same manner as in Examples 1-38, except that the cellulose acetate film manufactured in Comparative Example 1-8 was used, in place of the cellulose acetate film manufactured in Example 1-19. The produced liquid crystal display device was observed, and as a result, although a neutral black display was attained in the front direction, it was inferior to the cases of the present invention in the viewing angle direction. Also, each viewing angle (the range where the contrast ratio was 10 or more and there was no gradation inversion at the black side) was measured in eight stages, i.e. from a black display (L1) to a white display (L8), with a measuring instrument (trade name: EZ-contrast 160D, manufactured by ELDIM). The results are shown in Table 4. It is understood that the viewing angle was conspicuously narrower, as compared with the cases of using the polarizing plates of the present invention.

TABLE 4

| Liquid crystal display device | Viewing angle | |
|---|---|---|
| | Direction of transmission axis | Direction at 45° with transmission axis |
| Example 1-35 | >80° | >80° |
| Example 1-36 | >80° | >80° |
| Example 1-37 | >80° | >80° |
| Example 1-38 | >80° | >80° |
| Comparative example 1-14 | >80° | 44° |
| Comparative example 1-15 | 74° | 68° |
| Comparative example 1-16 | 75° | 70° |
| Comparative example 1-17 | 75° | 70° |
| Comparative example 1-18 | 67° | 57° |

Example 1-39

(Production of OCB-type (Bend Orientation) Liquid Crystal Cell)

As an oriented film, a polyimide film was formed on each of two glass substrates each provided with a TET electrode, followed by rubbing the film. The obtained two glass substrates were made to face each other at the positions where rubbing directions are parallel to each other. Then, a fluorine-containing liquid crystal compound (physical properties: Δn=0.16, Δn=9.3, k11=13.4 pN, k22=7.4 pN, and k33=14.7 pN) was injected into a cell gap (the gap between the two glass substrates), to manufacture a bend orientation liquid crystal cell.

(Production of Optically Phase Difference Compensation Film)

An oriented film coating solution having the following composition was applied to the cellulose acetate film A1 prepared in Example 1-1, by using #16 wire bar coater, in an amount of 28 ml/m². The obtained film was dried using 60° C. hot air for 60 seconds, and then 90° C. hot air for 150 seconds. Then, the formed film was rubbed in a direction at angle of 45° with the slow axis (measured at a wavelength of 632.8 nm) of the cellulose acetate film.

TABLE 5

| Composition of an oriented-film coating solution | |
|---|---|
| Modified polyvinyl alcohol, as shown below | 10 mass parts |
| Water | 371 mass parts |
| Methanol | 119 mass parts |
| Glutaraldehyde (crosslinking agent) | 0.5 mass parts |

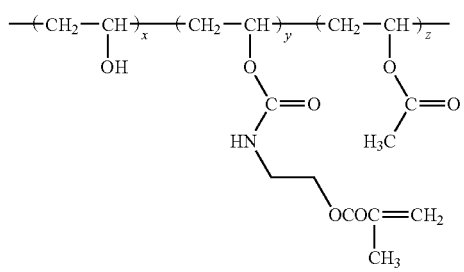

Modified polyvinyl alcohol
$x = 86.33$  $y = 1.67$  $z = 12$

The following discotic liquid crystal TE-1 and ethylene-oxide-modified trimethylolpropane triacrylate (trade name: V#360, manufactured by Osaka Organic Chemical Industry Ltd.) were mixed in a ratio by mass of 9/1, and methyl ethyl ketone was added to the mixture, to prepare a 10 mass % solution as a whole. The resultant solution was applied onto the above oriented film, by a spin coating method at 2,000 rpm, and then the film was heated to 145° C. to carry out heat treatment. The film was then cooled to the room temperature, to form a (discotic) liquid crystal layer 1.4 μm in thickness. The Re retardation value of the optically anisotropic layer measured at a wavelength of 546 nm was 30 nm. Also, the angle formed between the disk surface and the surface of the support (cellulose acetate film) was 36° in an average thereof. An optically phase difference (retardation) compensation film was manufactured in this manner.

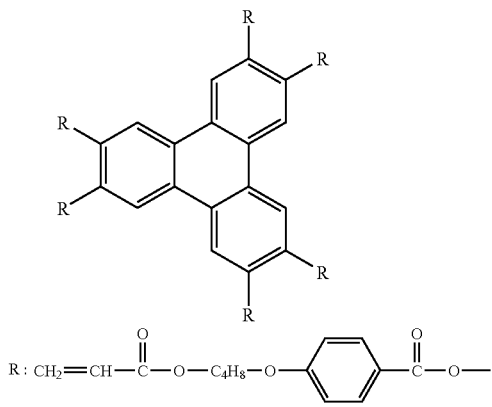

TE-1

Iodine was adsorbed to an oriented polyvinyl alcohol film, to produce a polarizing film. The cellulose acetate film side of the manufactured optically phase difference compensation film was laminated to one side of the polarizing film, by using a polyvinyl alcohol-series adhesive, such that the slow axis of the cellulose acetate film was parallel to the transmission axis of the polarizing film. A commercially available cellulose triacetate film (trade name: FUJITAC TD80UF, manufactured by Fuji Photo Film Co., Ltd.) was subjected to saponification treatment, and then laminated to the other side of the polarizing plate, by using a polyvinyl alcohol type adhesive. A polarizing plate was thus manufactured.

Two plates of the thus-manufactured polarizing plates were laminated to the above obtained bend orientation cell so as to sandwich the cell between them. The polarizing plates and the liquid crystal cell were arranged such that the optically anisotropic layer of the polarizing plate faced the substrate of the cell and that the rubbing direction of the liquid crystal cell was parallel with but reverse to the rubbing direction of the optically anisotropic layer facing to the liquid crystal cell. 55 Hz rectangular wave voltage was applied to the liquid crystal cell. The liquid crystal cell was put in a normally white mode (white display 2 V, and black display 5 V). Also, each viewing angle was measured in eight stages, i.e. from a black display (L1) to a white display (L8), with a measuring instrument (trade name: EZ-contrast 160D, manufactured by ELDIM) assuming the ratio of transmissions (white display/black display) as a contrast ratio. The results are shown in Table 6.

Comparative Example 1-19

A commercially available cellulose acetate film (trade name: FUJITAC TD80, manufactured by Fuji Photo Film Co., Ltd.) was subjected to the surface treatment, the coating treatment to provide the polarizing film and the liquid crystal molecule, the production of the polarizing plate, and the production of the OCB-type liquid crystal display device, in the same manner as in Example 1-36. The viewing angle of the manufactured liquid crystal display device was measured. The results are shown in Table 6.

(Evaluation of Liquid Crystal Display Devices)

The results of evaluation of the viewing angle characteristics of each liquid crystal display device manufactured in Example 1-39 and Comparative Example 1-19 are shown below.

TABLE 6

|  | $\Delta$nd ($\mu$m) | Cell thickness ($\mu$m) | Viewing angle (vertical) (°) | Viewing angle (horizontal) (°) |
| --- | --- | --- | --- | --- |
| Example 1-39 | 1.92 | 12.0 | +80/−80 | +80/−80 |
| Comparative example 1-18 | 1.12 | 7.0 | +60/−55 | +60/−60 |

The liquid crystal display device manufactured in Example 1-39 had a remarkably wider viewing angle, as compared to the liquid crystal display device manufactured in Comparative Example 1-19.

Further, in Example 1-39, when any of the cellulose acetate films prepared in Examples 1-2 to 1-31 was used instead of the cellulose acetate film prepared in Example 1-1, a wide viewing angle was attained similar to Example 1-39.

The examples relating to the second embodiment and the fourth to sixth embodiments based on the second embodiment, will be shown.

Example 2-1

(Preparation of Cellulose Acetate Solution 01)

The following components shown in Table 7 were poured into a mixing tank, and stirred, to dissolve each component. Thus, a cellulose acetate solution 01 was prepared.

TABLE 7

| Composition of a cellulose acetate solution | |
| --- | --- |
| Cellulose acetate (acetylization degree, 60.9) | 100.0 parts by mass |
| Triphenyl phosphate | 6.5 parts by mass |
| Biphenyl phosphate | 5.2 parts by mass |
| Methylene chloride (first solvent) | 403.0 parts by mass |
| Methanol (second solvent) | 60.2 parts by mass |

(Preparation of Matting-agent Solution 01)

The following components shown in Table 8 were poured into a disper, and stirred, to dissolve each component. Thus, a matting-agent solution 01 was prepared.

TABLE 8

| Composition of a matting agent solution | |
| --- | --- |
| Silica particles (average particle diameter, 16 nm) (AEROSIL R972 (trade name), manufactured by Nippon Aerosil Co., Ltd.) | 2.0 mass parts |
| Methylene chloride (first solvent) | 72.4 mass parts |
| Methanol (second solvent) | 10.8 mass parts |
| Cellulose acetate solution 01 | 10.3 mass parts |

(Preparation of Retardation-controlling-agent Solution 01)

The components shown in Table 9 were poured into a mixing tank and stirred under heating, to dissolve each component. Thus, a retardation-controlling-agent solution 01 was prepared.

TABLE 9

| Composition of a retardation-controlling-agent solution | |
| --- | --- |
| Retardation-controlling agent A-2 | 10 mass parts |
| Retardation-controlling agent A-12 | 10 mass parts |
| Methylene chloride (first solvent) | 58.3 mass parts |
| Methanol (second solvent) | 8.7 mass parts |
| Cellulose acetate solution 01 | 12.8 mass parts |

(Preparation of Ultraviolet-absorber Solution 01)

The components shown in Table 10 were poured into a mixing tank, and stirred under heating, to dissolve each component. Thus, an ultraviolet-absorber solution 01 was prepared.

TABLE 10

| Composition of an ultraviolet absorber solution | |
| --- | --- |
| Ultraviolet absorber A | 15 mass parts |
| Methylene chloride (first solvent) | 58.3 mass parts |
| Methanol (second solvent) | 8.7 mass parts |
| Cellulose acetate solution 01 | 12.8 mass parts |

(Preparation of Cellulose Acetate Film)

94.6 mass parts of the above cellulose acetate solution, 1.3 mass parts of the matting agent solution, 6.17 mass parts of the retardation controlling agent solution, and 0.66 mass parts of the UV absorber solution were mixed after these solutions were respectively filtered, and the obtained solution was cast using a band casting machine. The film was peeled off from the band, and then laterally oriented at an orientation ratio of 26% at 130° C. by using a tenter, in which the residual solvent amount at the start of orienting was 35%, followed by retaining the oriented film so as to have the width obtained after oriented, at 140° C. for 30 seconds. Then, the film was released from the clip, and dried at 140° C. for 40 minutes, to produce a cellulose acetate film. The film thickness of the finished cellulose acetate film was 92 $\mu$m.

Cellulose acetate films 2 to 16 were produced in the same manner as above, except that the type of cellulose acetate, the type and amount of retardation controlling agent, the type and amount of ultraviolet absorber, the residual solvent amount at the start of orienting, and the orientation ratio were changed to those shown in Table 11.

The Re retardation value and Rth retardation value of the produced cellulose acetate film at wavelength 590 nm were measured, using KOBRA 21ADH (trade name, manufactured by Oji Scientific Instruments).

Also, the transmittance at a wavelength of 380 nm, transparency, haze, surface state defects, and moisture permeability were measured in the following manner. The results are shown in Table 12.

(Transmittance at a wavelength of 380 nm)

Using an automatic spectrophotometer UV3100 (trade name) manufactured by Shimadzu Corporation, the spectral absorption spectrum of the film was measured, to find the transmittance at a wavelength of 380 nm.

(Transparency)

A sample of 20 mm×70 mm was measured at 25° C.-60% RH, with a transparency measuring instrument (trade name: AKA Photocell Colorimeter, manufactured by KOTAKI Seisakusho) using visual light (615 nm).

(Haze)

Haze was measured with a haze meter (trade name: 1001DP model, manufactured by Nippon Denshoku Industries Co., Ltd.).

(Surface State Defects)

A sample of the cellulose ester film was taken by sampling, to count the number of foreign matters and coagulates which had a size of 30 μm or more and were present on 30-cm-width and 1-m-length areas on both sides of the film, thereby evaluating the surface state.

(Moisture Permeability)

A 70-mmϕ sample was moisture-controlled at 25° C. under a humidity of 90% RH for 24 hours, to calculate the amount of water content per unit area $(g/m^2)$, by using a moisture permeability tester (trade name: KK-709007, manufactured by Toyoseiki Seisaku-sho, Ltd.) according to JIS Z-0208, and the moisture permeability was found according to the following equation.

(Moisture permeability)=(Mass after moisture-conditioning)−(Mass before moisture-conditioning)

Example 2-2

Cellulose acylate films 17 to 20 were produced in the same manner as in Example 2-1, except that the cellulose acetate was changed to a cellulose acetate propionate having the substitution degree of an acetyl group of 1.90 and the substitution degree of a propionyl group of 0.80, and that the type and amount of retardation controlling agent, the type and amount of ultraviolet absorber, the residual solvent amount when the film was peeled off, and the orientation ratio were changed to those shown in Table 11.

The Re retardation value and Rth retardation value of the produced cellulose acylate films at wavelength 590 nm were measured, using KOBRA 21ADH (trade name, manufactured by Oji Scientific Instruments). Also, the transmittance at a wavelength of 380 nm, transparency, haze, surface state defects, and moisture permeability were measured in the same manner as in Example 2-1. The results are shown in Table 12.

Example 2-3

Cellulose acetate films 21 to 25 were produced in the same manner as in Example 2-1, except that the cellulose acetate was changed to a cellulose acetate having the acetalization degree of 2.75 and the substitution rate at the 6-position of 35%, and that the type and amount of retardation controlling agent, the type and amount of ultraviolet absorber, the residual solvent amount when the film was peeled off, and the orientation ratio were changed to those shown in Table 11.

The Re retardation value and Rth retardation value of the produced cellulose acetate films at wavelength 590 nm were measured, using KOBRA 21ADH (trade name, manufactured by Oji Scientific Instruments). Also, the transmittance at a wavelength of 380 nm, transparency, haze, surface state defects, and moisture permeability were measured in the same manner as in Example 2-1. The results are shown in Table 12.

Example 2-4

Cellulose acetate film 26 was produced in the same manner as in Example 2-1, except that the cellulose acetate was changed to a cellulose acetate having the acetalization degree of 2.78 and the substitution rate at the 6-position of 33%, and that the type and amount of retardation controlling agent, the type and amount of ultraviolet absorber, the residual solvent amount when the film was peeled off, and the orientation ratio were changed to those shown in Table 11.

The Re retardation value and Rth retardation value of the produced cellulose acetate film at wavelength 590 nm were measured, using KOBRA 21ADH (trade name, manufactured by Oji Scientific Instruments). Also, the transmittance at a wavelength of 380 nm, transparency, haze, surface state defects, and moisture permeability were measured in the same manner as in Example 2-1. The results are shown in Table 12.

Example 2-5

Cellulose acetate films 27 to 30 were produced in the same manner as in Example 2-1, except that the cellulose acetate was changed to a cellulose acetate having the acetylization degree of 2.85 and the substitution rate at the 6-position was 33%, and that the type and amount of retardation controlling agent, the type and amount of ultraviolet absorber, the residual solvent amount when the film was peeled off, and the orientation ratio were changed to those shown in Table 11.

The Re retardation value and Rth retardation value of the produced cellulose acetate films at wavelength 590 nm were measured, using KOBRA 21ADH (trade name, manufactured by Oji Scientific Instruments). Also, the transmittance at a wavelength of 380 nm, transparency, haze, surface state defects, and moisture permeability were measured in the same manner as in Example 2-1. The results are shown in Table 12.

Comparative Example 2-1

Cellulose acetate films 31 to 35 were produced in the same manner as in Example 2-1, except that the type of cellulose acetate, the type and amount of retardation controlling agent, the type and amount of ultraviolet absorber, the residual solvent amount when the film was peeled off, and the orientation ratio were changed to those shown in Table 11.

The Re retardation value and Rth retardation value of the produced cellulose acetate films at wavelength 590 nm were measured, using KOBRA 21ADH (trade name, manufactured by Oji Scientific Instruments). Also, the transmittance at a wavelength of 380 n, transparency, haze, surface state defects, and moisture permeability were measured in the same manner as in Example 2-5. The results are shown in Table 12.

The cellulose acetate films 31 and 32 using no ultraviolet absorber caused occurrence of coagulation of the matting agent, and deterioration in the values of haze and surface state defects.

Also, the cellulose acetate film 33 using no retardation controlling agent was very low in the values of Re and Rth, and it failed to reach the target values.

Also, the cellulose acetate film 34 oriented at an orientation ratio of 1% was low in the Re value and it failed to reach the target preferable value.

It is understood that the cellulose acetate film 35 having a high film thickness was poor in transparency.

Incidentally, the films 34 and 35 are comparative examples with respect to the invention according to the above items (37) and (29), respectively.

TABLE 11

| | | Saponification degree | Amount in retardation-controlling agent solution (mass parts) | | | | | Amount in UV absorber solution (mass parts) | | | | | | Mixing ratio of solutions | | | |
|---|---|---|---|---|---|---|---|---|---|---|---|---|---|---|---|---|---|
| | | | Retardation-control agent A-2 | Retardation-control agent A-12 | Retardation-control agent B | Retardation-control agent C | Retardation-control agent D | UV absorber A | UV absorber B | UV absorber C | UV absorber D | UV absorber E | UV absorber F | Cellulose acetate solution | Matting agent solution | Retardation-controlling agent solution | UV absorber solution |
| This invention | Cellulose acetate film 1 | 60.9 | 10 | 10 | | | | 4.8 | 10.2 | | | | | 94.6 | 1.2 | 6.2 | 0.8 |
| This invention | Cellulose acetate film 2 | 60.5 | 3 | 3 | 14 | | | 4.8 | 10.2 | | | | | 94.6 | 1.2 | 6.2 | 3.2 |
| This invention | Cellulose acetate film 3 | 60.9 | | | 20 | | | 4.8 | 10.2 | | | | | 94.6 | 1.2 | 4.2 | 1.2 |
| This invention | Cellulose acetate film 4 | 60.5 | | | 20 | | | 4.8 | 10.2 | | | | | 94.6 | 1.2 | 4.2 | 6.4 |
| This invention | Cellulose acetate film 5 | 59.8 | | 20 | | 20 | | 4.8 | 10.2 | | | | | 94.6 | 1.2 | 4.6 | 0.8 |
| This invention | Cellulose acetate film 6 | 60.9 | | 20 | | | | 4.8 | 10.2 | | | | | 94.6 | 1.2 | 6.2 | 1.3 |
| This invention | Cellulose acetate film 7 | 61 | 20 | | | | | 4.8 | 10.2 | | | | | 94.6 | 1.2 | 6.2 | 1.5 |
| This invention | Cellulose acetate film 8 | 60.5 | 20 | | | | | 4.8 | 10.2 | | | | | 94.6 | 1.2 | 6.2 | 10.7 |
| This invention | Cellulose acetate film 9 | 61.3 | 10 | 10 | | | | 15.0 | | | | | | 94.6 | 1.2 | 6.6 | 6.4 |
| This invention | Cellulose acetate film 10 | 60.4 | | | 20 | | | 15.0 | | | | | | 94.6 | 1.2 | 4.1 | 1.1 |
| This invention | Cellulose acetate film 11 | 59.6 | 10 | 10 | | | | | 15.0 | | | | | 94.6 | 1.2 | 6.7 | 1.3 |
| This invention | Cellulose acetate film 12 | 61.3 | | | 20 | | | | 15.0 | | | | | 94.6 | 1.2 | 4.6 | 6.4 |
| This invention | Cellulose acetate film 13 | 60.5 | 10 | 10 | | | | 4.2 | 8.8 | 2.1 | | | | 94.6 | 1.2 | 6.2 | 0.8 |
| This invention | Cellulose acetate film 14 | 60.9 | 10 | 10 | | | | | | | 5 | 10 | | 94.6 | 1.2 | 6.2 | 6.4 |
| This invention | Cellulose acetate film 15 | 60.9 | | | 20 | | | | | | 5 | 10 | | 94.6 | 1.2 | 4.1 | 1.3 |
| This invention | Cellulose acetate film 16 | 60.9 | 5 | 5 | 10 | | | | | | | | 15 | 94.6 | 1.2 | 6.2 | 1.3 |
| This invention | Cellulose acylate film 17 | | 10 | 10 | | | | 10.5 | 4.5 | | | | | 94.6 | 1.2 | 7.1 | 0.8 |
| This invention | Cellulose acylate film 18 | | | | 20 | | | 7.5 | 7.5 | | | | | 94.6 | 1.2 | 4.6 | 0.8 |
| This invention | Cellulose acylate film 19 | | | 20 | | | | 4.8 | 10.2 | | | | | 94.6 | 1.2 | 6.6 | 10.7 |
| This invention | Cellulose acylate film 20 | | 5 | 5 | 10 | | | | | | | | 15 | 94.6 | 1.2 | 6.2 | 1.3 |

TABLE 11-continued

| | | A-2 | A-12 | B | C | D | UV A | UV B | UV C | UV D | UV E | UV F | | | | |
|---|---|---|---|---|---|---|---|---|---|---|---|---|---|---|---|---|
| This invention | Cellulose acetate film 21 | | 10 | 10 | | | | 10.5 | 4.5 | | | | 94.6 | 1.2 | 6.6 | 0.8 |
| This invention | Cellulose acetate film 22 | | | | 20 | | | 7.5 | 7.5 | | | | 94.6 | 1.2 | 4.1 | 8.5 |
| This invention | Cellulose acetate film 23 | | 3 | 3 | 14 | | | | | | | 15 | 94.6 | 1.2 | 6.2 | 1.3 |
| This invention | Cellulose acetate film 24 | | 3 | 3 | 14 | | | | | | | 15 | 94.6 | 1.2 | 7.0 | 1.3 |
| This invention | Cellulose acetate film 25 | | | 6 | 14 | | | | | | | 15 | 94.6 | 1.2 | 6.2 | 1.3 |
| This invention | Cellulose acetate film 26 | | 3 | 3 | 14 | | | | | | | 15 | 94.6 | 1.2 | 7.0 | 3.2 |
| This invention | Cellulose acetate film 27 | | 5 | 5 | 10 | | | | | | | | 94.6 | 1.2 | 6.2 | 0.8 |
| This invention | Cellulose acetate film 28 | 59.8 | | 5 | | | 15 | 4.8 | 10.2 | | | | 94.6 | 1.2 | 6.2 | 0.8 |
| This invention | Cellulose acetate film 29 | | | 10 | | | 10 | 4.8 | 10.2 | | | | 94.6 | 1.2 | 6.2 | 0.8 |
| This invention | Cellulose acetate film 30 | | | | | | 15 | 4.8 | 10.2 | | | | 94.6 | 1.2 | 6.6 | 0 |
| Comparative example | Cellulose acetate film 31 | 60.9 | 10 | 10 | | | | | | | | | 94.6 | 1.2 | 4.1 | 0 |
| Comparative example | Cellulose acetate film 32 | 60.5 | | | 20 | | | | | | | | 94.6 | 1.2 | 0 | 6.3 |
| Comparative example | Cellulose acetate film 33 | 60.9 | | | | | | | | | 5 | 10 | 94.6 | 1.2 | 0 | 6.3 |
| Comparative example | Cellulose acetate film 34 | 60.8 | 10 | 10 | | | | 10.5 | 4.5 | | | | 94.6 | 1.2 | 7.1 | 0.8 |
| Comparative example | Cellulose acetate film 35 | 60.8 | 10 | 10 | | | | 10.5 | 4.5 | | | | 94.6 | 1.2 | 7.1 | 0.8 |

| | | Amount to 100 mass parts of cellulose acetate (%) | | | | | Amount to 100 mass parts of cellulose acetate (%) | | | | | | Orientation ratio (times) | Amount of residual solvent at the start of orienting (%) | Film thickness after orienting (μm) |
|---|---|---|---|---|---|---|---|---|---|---|---|---|---|---|---|
| | | Retardation-control agent A-2 | Retardation-control agent A-12 | Retardation-control agent B | Retardation-control agent C | Retardation-control agent D | UV absorber A | UV absorber B | UV absorber C | UV absorber D | UV absorber E | UV absorber F | | | |
| This invention | Cellulose acetate film 1 | 3.7 | 3.7 | | | | 0.25 | 0.52 | | | | | 26 | 35 | 92 |
| This invention | Cellulose acetate film 2 | 1.3 | 1.3 | 6.0 | | | 0.98 | 2.05 | | | | | 24 | 32 | 80 |
| This invention | Cellulose acetate film 3 | | | 5.1 | | | 0.37 | 0.77 | | | | | 26 | 32 | 92 |
| This invention | Cellulose acetate film 4 | | | 5.0 | | | 1.95 | 4.10 | | | | | 30 | 28 | 82 |
| This invention | Cellulose acetate film 5 | | | | 5.6 | | 0.25 | 0.52 | | | | | 26 | 25 | 92 |

TABLE 11-continued

| | | C1 | C2 | C3 | C4 | C5 | C6 | C7 | C8 | C9 | C10 |
|---|---|---|---|---|---|---|---|---|---|---|---|
| This invention | Cellulose acetate film 6 | 7.5 | | 7.5 | 0.40 | 0.84 | | | 26 | 38 | 92 |
| This invention | Cellulose acetate film 7 | 7.5 | | | 0.46 | 0.97 | | | 32 | 34 | 78 |
| This invention | Cellulose acetate film 8 | 7.4 | | | 3.24 | 6.80 | | | 26 | 34 | 92 |
| This invention | Cellulose acetate film 9 | 3.9 | 3.9 | | 6.04 | | | | 26 | 36 | 91 |
| This invention | Cellulose acetate film 10 | | | 5.0 | 1.05 | | | | 26 | 31 | 90 |
| This invention | Cellulose acetate film 11 | 4.0 | 4.0 | | | 1.23 | | | 26 | 33 | 93 |
| This invention | Cellulose acetate film 12 | | | 5.5 | | 6.05 | | | 26 | 31 | 92 |
| This invention | Cellulose acetate film 13 | 3.7 | 3.7 | | 0.21 | 0.44 | 0.11 | | 26 | 37 | 91 |
| This invention | Cellulose acetate film 14 | 3.7 | 3.7 | 4.9 | | | | | 26 | 37 | 93 |
| This invention | Cellulose acylate film 15 | | | 3.8 | | | | 2.01 | 4.03 | 26 | 28 | 93 |
| This invention | Cellulose acetate film 16 | 1.9 | 1.9 | | 0.53 | 0.23 | | 0.41 | 0.83 | 1.24 | 28 | 35 | 80 |
| This invention | Cellulose acylate film 17 | 4.3 | 4.3 | | 0.38 | 0.38 | | | 26 | 36 | 90 |
| This invention | Cellulose acetate film 18 | | | 5.6 | 3.24 | 6.80 | | | 26 | 26 | 89 |
| This invention | Cellulose acylate film 19 | 7.8 | 1.9 | | 0.53 | 0.23 | | | 26 | 34 | 91 |
| This invention | Cellulose acetate film 20 | 4.0 | 4.0 | 3.8 | 4.01 | 4.01 | | 1.24 | 28 | 35 | 80 |
| This invention | Cellulose acetate film 21 | | | 4.9 | | | | | 26 | 38 | 92 |
| This invention | Cellulose acetate film 22 | 1.1 | 1.1 | 5.3 | | | | 1.24 | 26 | 32 | 90 |
| This invention | Cellulose acetate film 23 | 1.3 | 1.3 | 6.0 | | | | 1.24 | 26 | 36 | 80 |
| This invention | Cellulose acetate film 24 | | 2.2 | 5.3 | | | | 1.24 | 26 | 38 | 92 |
| This invention | Cellulose acetate film 25 | | 1.3 | 6.0 | | | | 3.03 | 23 | 35 | 100 |
| This invention | Cellulose acetate film 26 | 1.9 | 1.9 | 3.8 | | | | 0.77 | 28 | 38 | 80 |
| This invention | Cellulose acetate film 27 | | | | 5.7 | 0.25 | 0.52 | | 26 | 34 | 100 |
| This invention | Cellulose acetate film 28 | | | | 3.8 | 0.25 | 0.52 | | 28 | 34 | 90 |
| This invention | Cellulose acetate film 29 | 3.8 | 3.8 | | | | | | 29 | 34 | 88 |
| This invention | Cellulose acetate film 30 | | | | 5.7 | 0.25 | 0.52 | | 31 | 34 | 86 |

TABLE 11-continued

| | | | | | | | | | |
|---|---|---|---|---|---|---|---|---|---|
| Comparative example | Cellulose acetate film 31 | 4.0 | | | 4.0 | | | 26 | 34 | 93 |
| Comparative example | Cellulose acetate film 32 | | 5.0 | | | | | 26 | 30 | 91 |
| Comparative example | Cellulose acetate film 33 | 4.3 | | 0.53 | | 2.00 | | 26 | 33 | 92 |
| Comparative example | Cellulose acetate film 34 | 4.3 | | 0.53 | 0.23 | | | 1 | 36 | 90 |
| Comparative example | Cellulose acetate film 35 | 4.3 | | | 0.23 | | 4.00 | 26 | 36 | 200 |

TABLE 12

| | | Re (nm) | Rth (nm) | Re/Rth | Amount of variation in Re/Rth (per 1% of orientation ratio) | Transmittance at wavelength of 380 nm (%) | Transparency | Haze | Surface state defects | Moisture permeability at 25° C. 90% (g/m², 24 hrs) |
|---|---|---|---|---|---|---|---|---|---|---|
| This invention | Cellulose acetate film 1 | 49 | 129 | 0.38 | 0.013 | 4.3 | 93.1 | 0.4 | 5 | 180 |
| This invention | Cellulose acetate film 2 | 60 | 200 | 0.30 | 0.012 | 0.1 | 93.3 | 0.3 | 0 | 170 |
| This invention | Cellulose acetate film 3 | 45 | 114 | 0.39 | 0.012 | 4.3 | 92.9 | 0.4 | 4 | 184 |
| This invention | Cellulose acetate film 4 | 55 | 103 | 0.53 | 0.018 | 0 | 93 | 0.3 | 1 | 160 |
| This invention | Cellulose acetate film 5 | 56 | 146 | 0.38 | 0.011 | 4.9 | 92.9 | 0.5 | 5 | 185 |
| This invention | Cellulose acetate film 6 | 52 | 127 | 0.41 | 0.012 | 2 | 93 | 0.4 | 6 | 181 |
| This invention | Cellulose acetate film 7 | 58 | 128 | 0.45 | 0.012 | 1.9 | 93 | 0.5 | 4 | 183 |
| This invention | Cellulose acetate film 8 | 46 | 95 | 0.48 | 0.016 | 0 | 93.1 | 0.3 | 2 | 155 |
| This invention | Cellulose acetate film 9 | 58 | 128 | 0.45 | 0.015 | 0 | 92.8 | 0.4 | 0 | 174 |
| This invention | Cellulose acetate film 10 | 43 | 132 | 0.33 | 0.012 | 6.7 | 92.9 | 0.5 | 6 | 188 |
| This invention | Cellulose acetate film 11 | 55 | 128 | 0.43 | 0.014 | 5.9 | 92.8 | 0.4 | 3 | 168 |
| This invention | Cellulose acetate film 12 | 54 | 106 | 0.51 | 0.017 | 0 | 92.9 | 0.3 | 0 | 151 |
| This invention | Cellulose acetate film 13 | 50 | 115 | 0.43 | 0.014 | 3.8 | 92.6 | 0.6 | 6 | 182 |
| This invention | Cellulose acetate film 14 | 52 | 120 | 0.43 | 0.014 | 0 | 92.4 | 0.7 | 9 | 178 |
| This invention | Cellulose acetate film 15 | 46 | 138 | 0.33 | 0.011 | 1.8 | 92.3 | 0.7 | 14 | 188 |
| This invention | Cellulose acetate film 16 | 58 | 210 | 0.28 | 0.012 | 2 | 92.3 | 0.6 | 10 | 182 |
| This invention | Cellulose acylate film 17 | 62 | 126 | 0.49 | 0.015 | 4.3 | 93 | 0.5 | 2 | 169 |
| This invention | Cellulose acylate film 18 | 55 | 130 | 0.42 | 0.013 | 4.2 | 93.1 | 0.4 | 5 | 171 |
| This invention | Cellulose acylate film 19 | 55 | 108 | 0.51 | 0.017 | 0 | 92.9 | 0.3 | 0 | 153 |
| This invention | Cellulose acylate film 20 | 70 | 210 | 0.33 | 0.013 | 2.3 | 92.6 | 0.7 | 9 | 171 |
| This invention | Cellulose acetate film 21 | 58 | 138 | 0.42 | 0.013 | 4.1 | 92.9 | 0.5 | 5 | 182 |
| This invention | Cellulose acetate film 22 | 52 | 112 | 0.46 | 0.015 | 0 | 92.8 | 0.4 | 0 | 164 |
| This invention | Cellulose acetate film 23 | 58 | 200 | 0.29 | 0.012 | 1.8 | 92.8 | 0.5 | 5 | 178 |
| This invention | Cellulose acetate film 24 | 68 | 220 | 0.31 | 0.012 | 2 | 93 | 0.3 | 3 | 180 |
| This invention | Cellulose acetate film 25 | 75 | 210 | 0.36 | 0.013 | 2.1 | 92.9 | 0.4 | 4 | 176 |
| This invention | Cellulose acetate film 26 | 62 | 205 | 0.30 | 0.012 | 0 | 92.7 | 0.5 | 0 | 171 |
| This invention | Cellulose acetate film 27 | 72 | 215 | 0.33 | 0.013 | 4.5 | 93.4 | 0.5 | 7 | 186 |
| This invention | Cellulose acetate film 28 | 75 | 197 | 0.38 | 0.014 | 4 | 92.9 | 0.5 | 3 | 178 |
| This invention | Cellulose acetate film 29 | 80 | 180 | 0.44 | 0.013 | 4.1 | 92.8 | 0.6 | 2 | 165 |
| This invention | Cellulose acetate film 30 | 90 | 175 | 0.51 | 0.013 | 4 | 92.9 | 0.5 | 4 | 160 |
| Comparative example | Cellulose acetate film 31 | 56 | 132 | 0.42 | 0.012 | 92 | 92 | 1.5 | 77 | 201 |
| Comparative example | Cellulose acetate film 32 | 45 | 143 | 0.31 | 0.011 | 90 | 92.1 | 1.4 | 82 | 204 |
| Comparative example | Cellulose acetate film 33 | 8 | 34 | 0.24 | 0.005 | 0 | 93 | 0.5 | 6 | 172 |
| Comparative example | Cellulose acetate film 34 | 8 | 130 | 0.06 | 0.01 | 0 | 93.1 | 0.4 | 5 | 171 |
| Comparative example | Cellulose acetate film 35 | 118 | 282 | 0.42 | 0.013 | 0 | 90.1 | 0.8 | 15 | 350 |

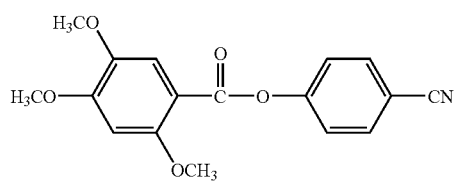

Retardation-controlling agent A-2

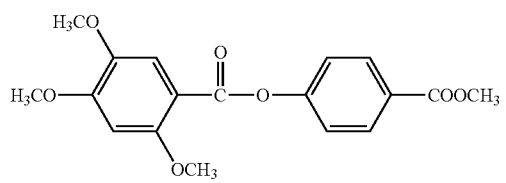

Retardation-controlling agent A-12

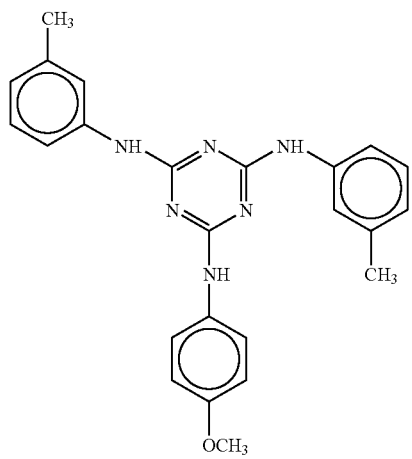

Retardation-controlling agent B

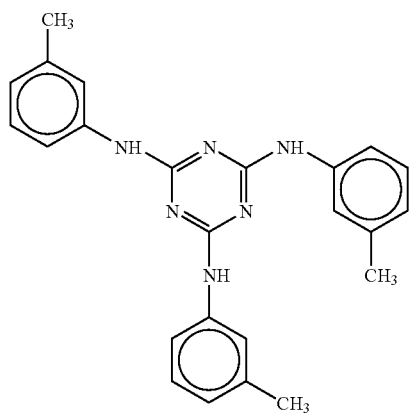

Retardation-controlling agent C

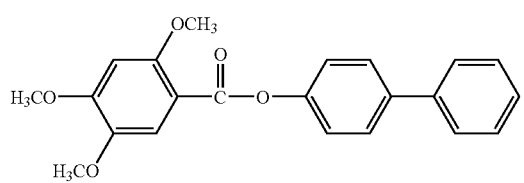

Retardation-controlling agent D

-continued

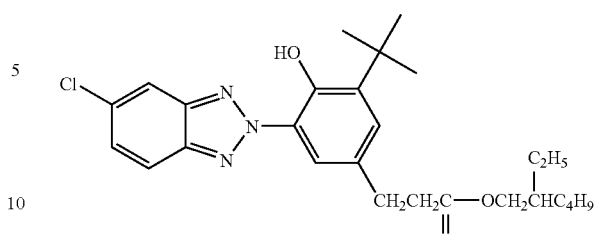

Ultraviolet absorber A

Distribution factor: 9.4
Solidifying point: lower than -50° C.

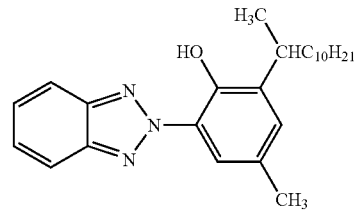

Ultraviolet absorber B

Distribution factor: 11.3
Solidifying point: lower than -50° C.

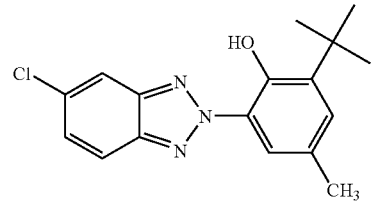

Ultraviolet absorber C

Distribution factor: 6.2
Solidifying point: 137~144° C.

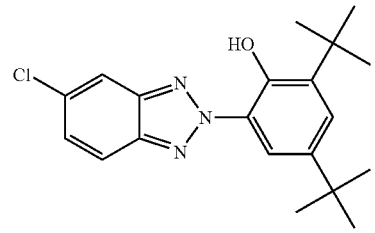

Ultraviolet absorber D

Distribution factor: 7.1
Solidifying point: 158.5° C.

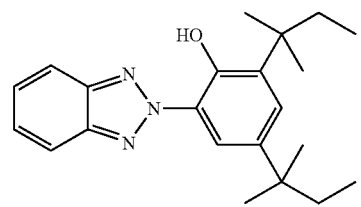

Ultraviolet absorber E

Distribution factor: 7.9
Solidifying point: 78~84° C.

-continued

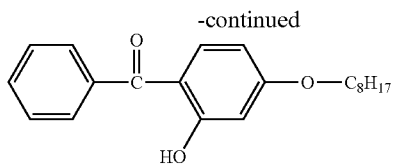

Ultraviolet absorber F

Distribution factor: 7.29
Solidifying point: 46~51° C.

Example 2-6

(Preparation of Polarizing Plate)

Iodine was adsorbed to an oriented polyvinyl alcohol film, to produce a polarizing film.

The manufactured cellulose acylate film 1 was saponified, and then laminated to one surface of the polarizing film, by using a polyvinyl alcohol type adhesive. The saponification treatment was carried out in the following condition.

An aqueous 1.5 N sodium hydroxide solution was prepared and kept at 55° C. An aqueous 0.01 N dilute sulfuric acid solution was prepared and kept at 35° C. The produced cellulose acetate film 1 was dipped in the above aqueous sodium hydroxide solution for 2 minutes, and then dipped in water, to wash away the aqueous sodium hydroxide solution thoroughly. Then, the cellulose acetate film was dipped in the above aqueous dilute sulfuric acid solution for 1 minute, and then dipped in water, to wash away the aqueous dilute sulfuric acid solution thoroughly. Finally, the sample was dried sufficiently at 120° C.

$H_2O$ and $CH_2I_2$ were dripped on the saponified cellulose acetate film. The angle (one including the droplet in the angle) formed between the film surface and the line tangent to the liquid droplet at the point crossing the droplet surface with the film surface, was defined as a contact angle, and the contact angle was measured to find the surface energy of the film by calculation based on the contact angle value. The found results are shown in Table 13.

A commercially available cellulose triacetate film (trade name: FUJITAC TD80UF, manufactured by Fuji Photo Film Co., Ltd.) was subjected to saponification treatment in the same manner as above, and the resultant film was laminated to the polarizing film on the side opposite to the produced cellulose acetate film 1, by using a polyvinyl alcohol type adhesive.

The produced cellulose acetate film was arranged such that the transmission axis of the polarizing film was parallel to the slow axis of the produced cellulose acetate film. Also, the commercially available cellulose triacetate film was arranged such that the transmission axis of the polarizing film was perpendicular to the slow axis of the commercially available cellulose triacetate film.

A polarizing plate A1 was manufactured in this manner. Polarizing plates A2 to 16, A21 to 30 and A17 to 20 were likewise manufactured using the cellulose acetate films 2 to 16, 21 to 30 and the cellulose acylate films 17 to 20, respectively. Each surface energy of the cellulose acetate films 2 to 16, 21 to 30 and the cellulose acylate films 17 to 20 after saponified was measured. The results are shown in Table 13.

Comparative Example 2-2

Polarizing plates A31 to 35 were manufactured using the cellulose acetate films 31 to 35, respectively, in the same manner as in Example 2-6. Each surface energy of the cellulose acetate films 31 to 35 after saponified was measured. The results are shown in Table 13.

TABLE 13

|  |  | Surface energy (mN/m) |
| --- | --- | --- |
| This invention | Cellulose acetate film 1 | 62 |
| This invention | Cellulose acetate film 2 | 65 |
| This invention | Cellulose acetate film 3 | 67 |
| This invention | Cellulose acetate film 4 | 67 |
| This invention | Cellulose acetate film 5 | 64 |
| This invention | Cellulose acetate film 6 | 63 |
| This invention | Cellulose acetate film 7 | 62 |
| This invention | Cellulose acetate film 8 | 67 |
| This invention | Cellulose acetate film 9 | 65 |
| This invention | Cellulose acetate film 10 | 62 |
| This invention | Cellulose acetate film 11 | 59 |
| This invention | Cellulose acetate film 12 | 67 |
| This invention | Cellulose acetate film 13 | 64 |
| This invention | Cellulose acetate film 14 | 65 |
| This invention | Cellulose acetate film 15 | 63 |
| This invention | Cellulose acetate film 16 | 66 |
| This invention | Cellulose acylate film 17 | 62 |
| This invention | Cellulose acylate film 18 | 63 |
| This invention | Cellulose acylate film 19 | 67 |
| This invention | Cellulose acylate film 20 | 68 |
| This invention | Cellulose acetate film 21 | 61 |
| This invention | Cellulose acetate film 22 | 66 |
| This invention | Cellulose acetate film 23 | 65 |
| This invention | Cellulose acetate film 24 | 64 |
| This invention | Cellulose acetate film 25 | 66 |
| This invention | Cellulose acetate film 26 | 66 |
| This invention | Cellulose acetate film 27 | 67 |
| This invention | Cellulose acetate film 28 | 62 |
| This invention | Cellulose acetate film 29 | 60 |
| This invention | Cellulose acetate film 30 | 62 |
| Comparative example | Cellulose acetate film 31 | 60 |
| Comparative example | Cellulose acetate film 32 | 62 |
| Comparative example | Cellulose acetate film 33 | 78 |
| Comparative example | Cellulose acetate film 34 | 63 |
| Comparative example | Cellulose acetate film 35 | 63 |

Example 2-7

(Preparation of Light Scattering Layer Coating Solution)

50 g of a mixture of pentaerythritol triacrylate and pentaerythritol tetraacrylate (trade name: PETA, manufactured by Nippon Kayaku Co., Ltd.) was diluted with 38.5 g of toluene. Then, 2 g of a polymerization initiator (trade name: Irgacure 184, manufactured by Ciba Specialty Chemicals Co., Ltd.) was added, and the resulting mixture was mixed under stirring. When this solution was applied and cured using ultraviolet ray, the resultant coating film had a refractive index of 1.51.

Further, to this solution, were added 1.7 g of a 30% toluene dispersion of crosslinking polystyrene particles (refractive index 1.60, SX-350 (trade name) manufactured by Soken Chemical & Engineering Co., Ltd.) of average particle diameter 3.5 μm, and 13.3 g of a 30% toluene dispersion of crosslinking acryl-styrene particles (refractive index 1.55, manufactured by Soken Chemical & Engineering Co., Ltd.) of average particle diameter 3.5 μm, obtained by dispersing with a Polytron (trade name) dispersing machine at 10,000 rpm for 20 minutes; and then 0.75 g of a fluorine-containing surface modifier (FP-1), and 10 g of a silane coupling agent (trade name: KBM-5103, manufactured by Shin-Etsu Chemical Co., Ltd.), to prepare a finished solution.

The above mixed solution was filtered by a polypropylene filter having a pore diameter of 30 μm, to prepare a coating solution for a light scattering layer.

(Preparation of Coating Solution for a Low-refractive-index Layer)

13 g of a thermally crosslinkable fluorine-containing polymer having a refractive index of 1.42 (JN-7228, trade name, solid content: 6%, manufactured by JSR Corporation), 1.3 g of silica sol (silica, a version of MEK-ST changed in particle size, average particle diameter; 45 μm, solid content: 30%, manufactured by Nissan Chemical Industries, Ltd.), 0.6 g of sol solution a, and 5 g of methyl ethyl ketone, 0.6 g of cyclohexanone were added. After stirring, the mixture was filtered through a polypropylene filter having a pore diameter of 1 μm, to prepare a coating solution for a low-refractive-index layer.

(Preparation of Transparent Protective Film 01 Having an Anti-reflection Layer)

A 80-μm thick triacetylcellulose film (TAC-TD80UF, trade name, manufactured by Fuji Photo Film Co., Ltd.) in the form of a roll was unwound, on which the above-mentioned coating solution for functional layer (light scattering layer) was coated by use of a micro gravure roll of 50 mm in diameter having a gravure pattern with a line number of 180 lines/inch and a depth of 40 μm and a doctor blade, under the conditions of a gravure roll rotation number of 30 rpm and a conveying speed of 30 m/minute, and the resultant coating was dried at 60° C. for 150 seconds. Thereafter, UV of an illuminance of 400 mW/cm$^2$ and a dose of 250 mJ/cm$^2$ was irradiated by use of an air-cooled metal halide lamp of 160 W/cm (manufactured by Eyegraphics Co., Ltd.) under nitrogen purge, to cure the coating layer. Thus, a functional layer with a thickness of 6 μm was formed on the film, which was then wound up.

The triacetylcellulose film on which the functional layer (light scattering layer) was coated was unwound again, and it was coated with the above-mentioned coating solution for low-refractive-index layer, by use of a micro gravure roll of 50 mm in diameter having a gravure pattern with a line number of 180 lines/inch and a depth of 40 μm and a doctor blade, under the conditions of a gravure roll rotation number of 30 rpm and a conveying speed of 15 nm/minute, and the resultant coating was dried at 120° C. for 150 seconds, followed by drying at 140° C. for 8 minutes. Thereafter, UV of an illuminance of 400 mW/cm$^2$ and dose of 900 mJ/cm$^2$ was irradiated by use of an air-cooled metal halide lamp of 240 W/cm (manufactured by Eyegraphics Co., Ltd.) under nitrogen purge, to cure the coating layer. Thus, a low-refractive-index layer with a thickness of 100 nm was formed on the film, which was then wound up.

(Preparation of Polarizing Plate B1)

Iodine was adsorbed to an oriented polyvinyl alcohol film, to produce a polarizing film.

The manufactured transparent protective film 01 having an antireflection layer was saponified in the same manner as in Example 2-6, and then laminated to one surface of the polarizing film, by using a polyvinyl alcohol type adhesive.

The cellulose acetate film 1 prepared in Example 2-1 was saponified in the same manner as in Example 2-6, and then laminated to the other surface of the polarizing film, by using a polyvinyl alcohol type adhesive.

The cellulose acetate film 1 was arranged such that the transmission axis of the polarizing film was parallel to the slow axis of the cellulose acetate film 1. Also, the commercially available cellulose triacetate film was arranged such that the transmission axis of the polarizing film was perpendicular to the slow axis of the commercially available cellulose triacetate film. A polarizing plate B1 was manufactured in this manner.

Spectral reflectance at an incident angle of 5° in a wavelength range from 380 to 780 nm was measured using a spectrophotometer (manufactured by JASCO Corporation), and it was found that the integrated sphere average reflectance at a wavelength of 450 to 650 nm was 2.3%.

Polarizing plates B3 to B15, B22, B17 to B19 and B28 to B30 were manufactured in the same manner as Polarizing plate B1, except for using the cellulose acetate films 3 to 15 and 22, cellulose acylate films 17 to 19, and cellulose acetate films 28 to 30, respectively, in place of the cellulose acetate film 1.

Example 2-8

(Preparation of Hardcoat Layer Coating Solution)

270.0 parts by mass of a poly(glycidyl methacrylate) having mass average molecular weight of 3,000, 730.0 g of methyl ethyl ketone, 500.0 g of cyclohexanone, and 50.0 g of a photopolimerization initiator (trade name: Irgacure 184, manufactured by Ciba Geigy Corp.) were added to 750.0 parts by mass of trimethylolpropane triacrylate (trade name: TMPTA, manufactured by Nippon Kayaku Co., Ltd.), and the mixture was stirred. The resultant mixture was filtered by a polypropylene filter having a pore diameter of 0.4 μm, to prepare a hardcoat layer coating solution.

(Preparation of Titanium Dioxide Fine-particle Dispersion)

As the titanium dioxide fine-particles, titanium dioxide fine-particles (trade name: MPT-129, manufactured by Ishihara Sangyo Kaisha Ltd.) which contained cobalt and which was surface-treated using aluminum hydroxide and zirconium hydroxide, were used.

38.6 g of the following dispersant and 704.3 g of cyclohexanone were added to 257.1 g of the above particles, and the mixture was dispersed using a Dynomill, to prepare a titanium dioxide dispersion having a mass average diameter of 70 nm.

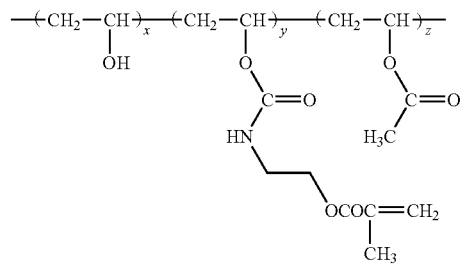

Modified polyvinyl alcohol
x = 86.33  y = 1.67  z = 12

(Preparation of Coating Solution for Middle-refractive-index Layer)

To 88.9 g of the above-mentioned titanium dioxide dispersion, 58.4 g of a mixture of dipentaerythritol pentaacrylate and dipentaerythritol hexaacrylate (DPHA), 3.1 g of a photopolymerization initiator (Irgacure 907 (trade name), manufactured by Ciba-Geigy), 1.1 g of a photosensitizer (Kayacure DETX (trade name), manufactured by Nippon Kayaku Co., Ltd.), 482.4 g of methyl ethyl ketone, and 1869.8 g of cyclohexanone were added and stirred. After sufficiently stirred, the resultant mixture was filtered through a polypropylene filter having a mesh (pore diameter) of 0.4 μm, to prepare a coating solution for a middle-refractive-index layer.

(Preparation of Coating Solution for High-refractive-index Layer)

To 586.8 g of the above-mentioned titanium dioxide dispersion, 47.9 g of a mixture of dipentaerythritol pentaacrylate and dipentaerythritol hexaacrylate (DPHA (trade name), manufactured by Nippon Kayaku Co., Ltd.); 4.0 g of a photopolymerization initiator (Irgacure 907 (trade name), manufactured by Ciba-Geigy), 1.3 g of a photosensitizer (Kayacure-DETX (trade name), manufactured by Nippon Kayaku Co., Ltd.), 455.8 g of methyl ethyl ketone, and 1427.8 g of cyclohexanone were added and stirred. The resultant mixture was filtered through a polypropylene filter having a mesh of 0.4 μm, to prepare a coating solution for a high-refractive-index layer.

(Preparation of Low-refractive Index Layer Coating Solution)

The following copolymer (P-1) was dissolved in methyl isobutyl ketone such that it would be dissolved in a concentration of 7 mass %, to which were then added a silicone resin containing a terminal methacrylate group (trade name: X-22-164C, manufactured by Shin-Etsu Chemical Co., Ltd.) in an amount of 3 mass % based on solid, and a photo-radical generator (trade name: Irgacure 907, manufactured by Ciba Geigy Co., Ltd.) in an amount of 5 mass % based on solid, to prepare a low-refractive index layer coating solution.

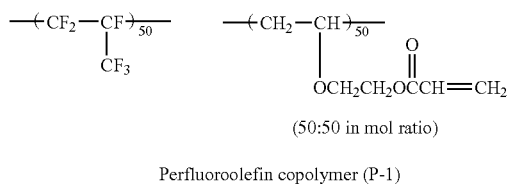

(50:50 in mol ratio)

Perfluoroolefin copolymer (P-1)

(Preparation of Transparent Protective Film $O_2$ Having Antireflection Layer)

A 80-μm thick triacetylcellulose film (TD-80UF, trade name, manufactured by Fuji Photo Film Co., Ltd.) was coated with the above-mentioned coating solution for hard coat layer, by use of a gravure coater. After drying the coated film at 100° C., UV of an illuminance of 400 mW/cm$^2$ and a dose of 300 mJ/cm$^2$ was irradiated, by use of an air-cooled metal halide lamp of 160 W/cm (manufactured by Eyegraphics Co., Ltd.) under nitrogen purge such that an oxygen concentration in the atmosphere would be 1.0 volume % or less, to cure the coating layer. Thus, a hard coat layer with a thickness of 8 μm was formed on the film.

The middle-refractive index layer coating solution, the high-refractive index layer coating solution, and the low-refractive index layer coating solution were successively applied onto the hardcoat layer, by using a gravure coater having three coating stations.

The drying condition of the middle-refractive index layer was 100° C. for 2 minutes. The condition of curing using ultraviolet rays was as follows: the amount of radiation was 400 mJ/cm$^2$ at an illuminance of 400 mW/cm$^2$, by using a 180 W/cm air-cooled metal halide lamp (manufactured by Eyegraphics Co., Ltd.), while purging the atmosphere with nitrogen such that the concentration of oxygen in the atmosphere was 1.0 vol % or less. After cured, the middle-refractive index layer had a refractive index of 1.630 and a film thickness of 67 nm.

The drying condition of the high-refractive index layer and low-refractive index layer was 90° C. for 1 minute, and then 100° C. for 1 minute. The condition of curing using ultraviolet rays was as follows: the amount of radiation was 600 mJ/cm$^2$ at an illuminance of 600 mW/cm$^2$, by using a 240 W/cm air-cooled metal halide lamp (manufactured by Eyegraphics Co., Ltd.) while purging the atmosphere with nitrogen such that the concentration of oxygen in the atmosphere was 1.0 vol % or less.

After cured, the high-refractive index layer had a refractive index of 1.905 and a film thickness of 107 nm, and the low-refractive index layer had a refractive index of 1.440 and a film thickness of 85 nm. A transparent protective film $O_2$ with an antireflection layer was produced in this manner.

(Preparation of Polarizing Plate C1)

A polarizing plate C1 was produced in the same manner as in Example 2-7, except that the transparent protective film $O_2$ with an antireflection layer was used in place of the transparent protective film 01 with an antireflection layer.

Spectral reflectance at an incident angle of 5° in a wavelength range from 380 to 780 nm was measured using a spectrophotometer (manufactured by JASCO Corporation), and it was found that the integrated sphere average reflectance at a wavelength of 450 to 650 nm was 0.4%.

Polarizing plates C3 to C15, C22, C17 to C19 and C28 to C30 were manufactured in the same manner as Polarizing plate C1, except for using the cellulose acetate films 3 to 15, 22, cellulose acylate films 17 to 19, and cellulose acetate films 28 to 30, respectively, in place of the cellulose acetate film 1.

Comparative Example 2-3

(Preparation of Polarizing Plates B)

Polarizing plate B31 was manufactured in the same manner as in Example 2-7, except that the cellulose acetate film 31 prepared in Comparative Example 2-1 was used in place of the cellulose acetate film 1 manufactured in Example 2-1.

Also, polarizing plates B32 to B35 were manufactured in the same manner as above, except for using the cellulose acetate films 32 to 35, respectively.

Comparative Example 2-4

Preparation of Polarizing Plates C

Polarizing plate C31 was manufactured in the same manner as in Example 2-8, except that the cellulose acetate film 31 manufactured in Comparative Example 2-1 was used in place of the cellulose acetate film 1 manufactured in Example 2-1.

Also, polarizing plates C32 to C35 were manufactured in the same manner as above, except for using cellulose acetate films 32 to 35, respectively.

Example 2-9

(Preparation of Polarizing Plate)

Iodine was adsorbed to an oriented polyvinyl alcohol film, to produce a polarizing film.

A commercially available cellulose triacetate film (trade name: FUJITAC TD80UF, manufactured by Fuji Photo Film Co., Ltd.) was subjected to saponification treatment as in Example 2-6, and the both sides of the polarizing film was laminated with the above saponified film, by using a polyvinyl alcohol type adhesive.

The commercially available cellulose triacetate film was arranged such that the transmission axis of the polarizing film intersects at right angle with the slow axis of the commercially available cellulose acetate film.

A polarizing plate D was manufactured in this manner.

Example 2-10

In a liquid crystal display device (manufactured by Fujitsu Ltd.) which had a vertical orientation type liquid crystal cell, in place of a pair of polarizing plates and a pair of optical compensation sheets provided on the liquid crystal display device, the optical compensation sheet manufactured in Example 2-1 was used and the polarizing plate manufactured in Example 2-6 was used, such that the cellulose acetate film 1 prepared in Example 2-1 would be positioned on the liquid crystal cell side and that each one polarizing plate manufactured in Example 2-6 would be laminated via an adhesive on the both sides of the observer side and the back light side of the display device. These polarizing plates were disposed in cross nicol state such that the transmission axis of the observer side polarizing plate was arranged in a vertical direction and the transmission axis of the back light side polarizing plate was arranged in a horizontal direction.

The manufactured liquid crystal display device was observed, and as a result, a neutral black display from both the front direction and the viewing angle direction was attained. Also, each viewing angle (the range where the contrast ratio was 10 or more and there was no gradation inversion at the black side) was measured in eight stages, i.e. from a black display (L1) to a white display (L8), with a measuring instrument (trade name: EZ-contrast 160D, manufactured by ELDIM).

As shown in Table 14, the liquid crystal display device having the polarizing plate of the present invention attained a wide viewing angle.

The similar results were obtained also in the cases when using the polarizing plates in which the cellulose acetate films 3 to 15, 22, the cellulose acylate films 17 to 19, and the cellulose acetate films 28 to 30 were used, respectively.

Example 2-11

In a liquid crystal display device (manufactured by Fujitsu Ltd.) which had a vertical orientation type liquid crystal cell, in place of a pair of polarizing plates and a pair of optical compensation sheets provided on the liquid crystal display device, the optical compensation sheet manufactured in Example 2-1 was used and the polarizing plate manufactured in Example 2-7 was used, such that the cellulose acetate film 1 prepared in Example 2-1 would be positioned on the liquid crystal cell side and that each one polarizing plate manufactured in Example 2-7 would be laminated via an adhesive on the both sides of the observer side and the back light side of the display device. These polarizing plates were disposed in cross nicol state such that the transmission axis of the observer side polarizing plate was arranged in a vertical direction and the transmission axis of the back light side polarizing plate was arranged in a horizontal direction.

The manufactured liquid crystal display device was observed, and as a result, a neutral black display from both the front direction and the viewing angle direction was attained. Also, each viewing angle (the range where the contrast ratio was 10 or more and there was no gradation inversion at the black side) was measured in eight stages, i.e. from a black display (L1) to a white display (L8), with a measuring instrument (trade name: EZ-contrast 160D, manufactured by ELDIM).

As shown in Table 14, the liquid crystal display device having the polarizing plate of the present invention attained a wide viewing angle.

The similar results were obtained also in the cases when using the polarizing plates in which the cellulose acetate films 3 to 15, 22, the cellulose acylate films 17 to 19, and the cellulose acetate films 28 to 30 were used, respectively.

Example 2-12 in a liquid crystal display device (manufactured by Fujitsu Ltd.) which had a vertical orientation type liquid crystal cell, in place of a pair of polarizing plates and a pair of optical compensation sheets provided on the liquid crystal display device, the optical compensation sheet manufactured in Example 2-1 was used and the polarizing plate manufactured in Example 2-8 was used, such that the cellulose acetate film 1 prepared in Example 2-1 would be positioned on the liquid crystal cell side and that each one polarizing plate manufactured in Example 2-8 would be laminated via an adhesive on the both sides of the observer side and the back light side of the display device. These polarizing plates were disposed in cross nicol state such that the transmission axis of the observer side polarizing plate was arranged in a vertical direction and the transmission axis of the back light side polarizing plate was arranged in a holizontal direction.

The manufactured liquid crystal display device was observed, and as a result, a neutral black display from both the front direction and the viewing angle direction was attained. Also, each viewing angle (the range where the contrast ratio was 10 or more and there was no gradation inversion at the black side) was measured in eight stages, i.e. from a black display (L1) to a white display (L8), with a measuring instrument (trade name: EZ-contrast 160D, manufactured by ELDIM).

As shown in Table 14, the liquid crystal display device having the polarizing plate of the present invention attained a wide viewing angle.

The similar results were obtained also in the cases when using the polarizing plates in which the cellulose acetate films 3 to 15, 22, the cellulose acylate films 17 to 19, and the cellulose acetate films 28 to 30 were used, respectively.

Comparative Example 2-5

With respect to a liquid crystal display device (trade name: VL-1530S, manufactured by Fujitsu Ltd.) using a vertical orientation type liquid crystal cell, each viewing angle was measured in eight stages, i.e. from a black display (L1) to a white display (L8), with a measuring instrument (trade name: EZ-contrast 160D, manufactured by ELDIM). The results are shown in Table 14. It is understood that the viewing angle was conspicuously narrower, as compared with the cases of using the polarizing plates of the present invention.

Comparative Example 2-6

In a liquid crystal display device (manufactured by Fujitsu Ltd.) which had a vertical orientation type liquid crystal cell, in place of a pair of polarizing plates and a pair of optical compensation sheets provided on the liquid crystal display device, the polarizing plate manufactured in Comparative Example 2-2 in which the cellulose acetate film 33 or 34 was used was used, such that the cellulose acetate film 33 or 34 would be positioned on the liquid crystal cell side and that each one polarizing plate manufactured in Comparative Example 2-2 would be laminated via an adhesive on the both sides of the observer side and the back light side of the display device. These polarizing plates were disposed in cross nicol state such that the transmission axis of the observer side polarizing plate was arranged in a vertical direction and the transmission axis of the back light side polarizing plate was arranged in a horizontal direction.

The produced liquid crystal display device was observed, and as a result, a black display was attained in both the front direction and the viewing angle direction. Also, each viewing angle (the range where the contrast ratio was 10 or more and there was no gradation inversion at the black side) was measured in eight stages, i.e. from a black display (L1) to a white display (L8), with a measuring instrument (trade name: EZ-contrast 160D, manufactured by ELDIM). The results are shown in Table 14. It is understood that the viewing angle was conspicuously narrower, as compared with the cases of using the polarizing plates of the present invention.

TABLE 14

| Liquid crystal display device | Viewing angle | |
|---|---|---|
| | Direction of transmission axis | Direction at 45° with transmission axis |
| Example 2-10 | >80° | >80° |
| Example 2-11 | >80° | >80° |
| Example 2-12 | >80° | >80° |
| Comparative example 2-5 | >80° | 44° |
| Comparative example 2-6 | 74° | 43° (Cellulose acetate film 33) |
| Comparative example 2-6 | 73° | 48° (Cellulose acetate film 34) |

Comparative Example 2-7

In a liquid crystal display device (manufactured by Fujitsu Ltd.) which had a vertical orientation type liquid crystal cell, in place of a pair of polarizing plates and a pair of optical compensation sheets provided on the liquid crystal display device, the polarizing plate manufactured in Comparative Example 2-3 in which the cellulose acetate film 31 or 32 was used was used, such that the cellulose acetate film 31 or 32 would be positioned on the liquid crystal cell side and that each one polarizing plate manufactured in Comparative Example 2-3 would be laminated via an adhesive on the both sides of the observer side and the back light side of the display device. These polarizing plates were disposed in cross nicol state such that the transmission axis of the observer side polarizing plate was arranged in a vertical direction and the transmission axis of the back light side polarizing plate was arranged in a horizontal direction.

The manufactured liquid crystal display devices were observed to test; and as a result, the luminescence in white display of the display device in which the polarizing plate manufactured by using the cellulose acetate film 31 or 32 (for comparison) was used, was slightly inferior to that of the display device using the polarizing plate of the present invention.

Comparative Example 2-8

In a liquid crystal display device (manufactured by Fujitsu Ltd.) which had a vertical orientation type liquid crystal cell, in place of a pair of polarizing plates and a pair of optical compensation sheets provided on the liquid crystal display device, the polarizing plate manufactured in Comparative Example 2-4 in which the cellulose acetate film 31 or 32 was used was used, such that the cellulose acetate film 31 or 32 would be positioned on the liquid crystal cell side and that each one polarizing plate manufactured in Comparative Example 2-4 would be laminated via an adhesive on the both sides of the observer side and the back light side of the display device. These polarizing plates were disposed in cross nicol state such that the transmission axis of the observer side polarizing plate was arranged in a vertical direction and the transmission axis of the back light side polarizing plate was arranged in a horizontal direction.

The manufactured liquid crystal display devices were observed to test; and as a result, the luminescence in white display of the display device in which the polarizing plate manufactured by using the cellulose acetate film 31 or 32 (for comparison) was used, was slightly inferior to that of the display device using the polarizing plate of the present invention.

Example 2-13

(Production of Liquid Crystal Cell)

A liquid crystal cell was manufactured in the following manner: A cell gap between substrates was set to 3.6 µm, and a liquid crystal material (trade name: MLC 6608, manufactured by Merck Co., Ltd.) having negative dielectric anisotropy was injected dripwise into and sealed in the gap between these substrates, to form a liquid crystal layer between these substrates. The retardation of the liquid crystal layer (namely, the product And of the thickness d (µm) of the liquid crystal layer and the refractive index anisotropy Δn) was set to 300 nm. The liquid crystal material was oriented such that it was vertically oriented.

The polarizing plate D manufactured in Example 2-9 was used, as the upper-side polarizing plate (observer side) of the above liquid crystal display device which had the vertical orientation type liquid crystal cell. As the lower-side polarizing plate (back light side), the polarizing plate A2 manufactured in Example 2-6 using the optical compensation sheet 2 obtained in Example 2-1 was disposed such that the cellulose acylate film 2 manufactured in Example 2-1 was disposed on the liquid crystal cell side. The upper polarizing plate and the lower polarizing plate were laminated to the liquid crystal cell through an adhesive. These polarizing plates were disposed in cross nicol state such that the transmission axis of the upper polarizing plate was arranged in a vertical direction and the transmission axis of the lower polarizing plate was arranged in a horizontal direction.

The manufactured liquid crystal display device was observed, and as a result, a neutral black display in both the front direction and the viewing angle direction was attained. Also, each viewing angle (the range where the contrast ratio was 10 or more and there was no gradation inversion at the black side) was measured in eight stages, i.e. from a black display (L1) to a white display (L8), with a measuring instrument (trade name: EZ-contrast 160D, manufactured by ELDIM).

As shown in Table 15, the liquid crystal display device having the polarizing plates of the present invention attained a wide viewing angle.

When the polarizing plates prepared by using the cellulose acetate films 2, 16, 21, and 23 to 27, and the cellulose acylate film 20, respectively, were used, the similar results were obtained.

Comparative Example 2-9

Liquid crystal display devices were manufactured in the same manner as in Example 2-13, except that the polarizing plates A33 and A34 were used, respectively, in place of the polarizing plate A2.

The produced liquid crystal display devices were observed to test; and as a result, it was understood that when any of the polarizing plates using the cellulose acetate film 33 or 34 was used, the viewing angles in the resultant comparative examples were conspicuously narrower, as compared with the case of using the polarizing plate of the present invention.

TABLE 15

| Liquid crystal display device | Direction of transmission axis | Viewing angle Direction at 45° with transmission axis |
|---|---|---|
| Example 2-13 | >80° | >80° |
| Comparative example 2-9 | 65° | 40° (Cellulose acetate film 33) |
| Comparative example 2-9 | 68° | 45° (Cellulose acetate film 34) |

Example 2-14

(Production of OCB-type (Bend Orientation) Liquid Crystal Cell)

A polyimide film was formed as an oriented film, on each of two glass substrates each provided with a TET electrode, and rubbing treatment of the oriented film was carried out. The obtained two glass substrates were made to face each other at the positions where rubbing directions were parallel to each other. Then, a fluorine-containing liquid crystal compound (physical properties: Δn=0.16, Δεt=9.3, k11=13.4 pN, k22=7.4 pN, and k33=14.7 pN) was injected into a cell gap (the gap between the two glass substrates), to manufacture a bend orientation liquid crystal cell.

(Production of Optically Phase Difference Compensation Film)

An oriented film coating solution having the following composition was applied onto the cellulose acetate film 1 which was prepared in Example 2-1 and which was then subjected to saponifying treatment in the same manner as in Example 2-6, by using a #16 wire bar coater, in an amount of 28 m/m². The obtained film was dried using 60° C. hot air for 60 seconds, and then 90° C. hot air for 150 seconds. Then, the formed film was rubbed in a direction at angle of 45° with the slow axis (measured at a wavelength of 632.8 nm) of the cellulose acetate film.

TABLE 16

| Composition of an oriented-film coating solution | |
|---|---|
| Modified polyvinyl alcohol, as shown below | 10 mass parts |
| Water | 371 mass parts |
| Methanol | 119 mass parts |
| Glutaraldehyde (crosslinking agent) | 0.5 mass parts |

TABLE 16-continued

Composition of an oriented-film coating solution

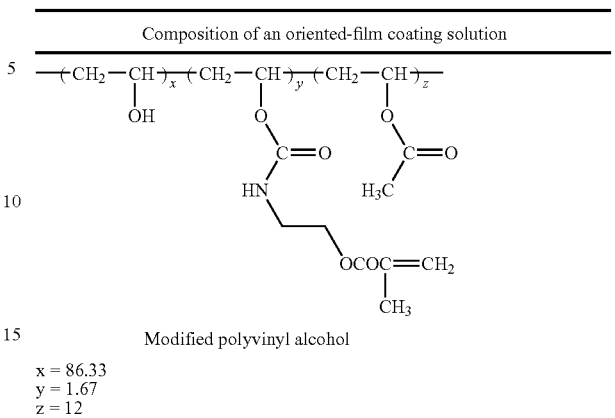

Modified polyvinyl alcohol x = 86.33
y = 1.67
z = 12

(Preparation of Optical Anisotropic Layer)

The following discotic liquid crystals TE-1 and TE-2 were mixed in a ratio by mass of 9/1, and methyl ethyl ketone was added to the mixture, to prepare a 10 mass % solution as a whole. The resultant solution was applied onto the above-obtained oriented film, by a spin coating method at 2,000 rpm, and then the film was heated to 145° C. to carry out heat treatment. The film was then cooled to ambient temperature, to form a (discotic) liquid crystal layer 1.4 μm in thickness. The Re retardation value of the optically anisotropic layer measured at a wavelength of 546 nm was 30 nm. Also, the angle formed between the disk surface and the surface of the support (cellulose acetate film) was in average 36°. An optically phase difference compensation film was manufactured in this manner.

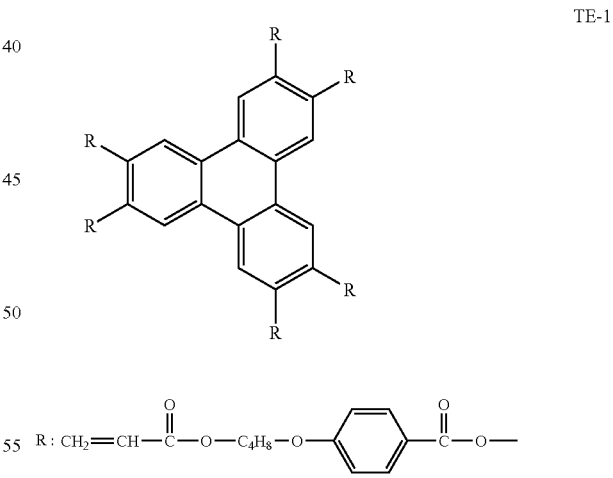

TE-2
Ethylene Oxide-modified Trimethylolpropane Triacrylate (V#360, manufactured by Osaka Organic Chemical Industry Ltd.)

(Preparation of Polarizing Plate)

Iodine was adsorbed to an oriented polyvinyl alcohol film, to produce a polarizing film. The cellulose acetate film side of the manufactured optical phase difference compensation film was laminated to one side of the polarizing film, by using a polyvinyl alcohol type adhesive, such that the slow axis of the cellulose acetate film would be parallel to the transmission axis of the polarizing film. A commercially available cellulose triacetate film (trade name: FUJITAC TD80UF, manufactured by Fuji Photo Film Co., Ltd.) was subjected to saponification treatment, and laminated to the other side of the polarization plate, by using a polyvinyl alcohol type adhesive. A polarizing plate was thus manufactured.

(Preparation of Liquid Crystal Display Device)

Two plates of the thus-manufactured polarizing plates were laminated to the obtained bend orientation cell so as to sandwich the bend orientation cell between them. The polarizing plates and the liquid crystal cell were arranged such that the optically anisotropic layer of the polarizing plate faced the substrate of the cell and that the rubbing direction of the liquid crystal cell was parallel with but reverse to the rubbing direction of the optically anisotropic layer facing the liquid crystal cell. 55 Hz rectangular wave voltage was applied to the liquid crystal cell. The liquid crystal cell was put in a normally white mode (white display 2 V, and black display 5 V). Also, each viewing angle was measured in eight stages, i.e. from a black display (L1) to a white display (L8), with a measuring instrument (trade name: EZ-contrast 160D, manufactured by ELDIM), by using the ratio of transmissions (white display/black display) as a contrast ratio. The results are shown in Table 17.

Comparative Example 2-10

A commercially available cellulose acetate film (trade name: FUJITAC TD80, manufactured by Fuji Photo Film Co., Ltd.) was subjected to the surface treatment, the application to form the oriented film and liquid crystal molecule, the production of the polarizing plate, and the production of an OCB-type liquid crystal display device, in the same manner as in Example 2-14. The viewing angle of the manufactured liquid crystal display device was measured. The results are shown in Table 17.

(Evaluation of Liquid Crystal Display Devices)

The results of evaluation of the viewing angle characteristics of each liquid crystal display device manufactured in Example 2-14 and Comparative Example 2-10 are shown below, in Table 17.

TABLE 17

|  | And (μm) | Cell thickness (μm) | Viewing angle (up and down direction) (°) | Viewing angle (left to right direction) (°) |
|---|---|---|---|---|
| Example 2-14 | 1.92 | 12.0 | +80/−80 | +80/−80 |
| Comparative example 2-10 | 1.12 | 7.0 | +60/−55 | +60/−60 |

The liquid crystal display device manufactured in Example 2-14 had a remarkably wider viewing angle than the liquid crystal device manufactured in Comparative Example 2-10.

When any of the cellulose acetate films 2 to 16, and 21 to 27, the cellulose acylate films 17 to 20, and the cellulose acetate films 28 to 30 was used in Example 2-14, instead of using the cellulose acetate film 1 manufactured in Example 2-1, a wide viewing angle was likewise obtained.

The examples relating to the third embodiment and the fourth to sixth embodiments based on the third embodiment, will be shown.

Example 3-1

(Preparation of Cellulose Acetate Solution)

The following components were poured into a mixing tank, and the resultant was stirred, to dissolve the components each other. Thus, a cellulose acetate solution was prepared.

(Composition of Cellulose Acetate Solution A)

| Cellulose acetate (acetylation degree, 2.75; substitution degree of 6-position, 35%) | 100.0 mass parts |
| Triphenyl phosphate | 8.0 mass parts |
| Biphenyl phosphate | 4.0 mass parts |
| Methylene chloride (first solvent) | 403.0 mass parts |
| Methanol (second solvent) | 60.2 mass parts |

(Preparation of Matting-agent Solution)

The following components were poured into a dispersion machine, and stirred, to dissolve each component. Thus, a matting agent solution was prepared.

(Composition of Matting-agent Solution)

| Silica particles (average particle diameter: 16 nm) (AEROSIL R972 (trade name) manufactured by Nippon Aerosil Co., Ltd.) | 2.0 mass parts |
| Methylene chloride (first solvent) | 72.4 mass parts |
| Methanol (second solvent) | 10.8 mass parts |
| Cellulose acetate solution A | 0.3 mass parts |

(Preparation of Retardation-increasing-agent Solution)

The following components were poured into a mixing tank, and stirred under heating, to dissolve each component. Thus, a retardation-increasing-agent solution was prepared.

(Composition of a Retardation-increasing-agent Solution)

| Retardation-increasing agent A-12 | 20 mass parts |
| Methylene chloride (first solvent) | 58.3 mass parts |
| Methanol (second solvent) | 8.7 mass parts |
| Cellulose acetate solution A | 12.8 mass parts |

(Preparation of Cellulose Acetate Film 1)

94.6 mass parts of the above cellulose acetate solution A, 1.3 mass parts of the matting agent solution, and 4.1 mass parts of the UV absorber solution were mixed after these solutions were respectively filtered, and the obtained solution was cast using a band casting machine. The film was peeled off from the band with the residual solvent amount of 35%, and then the resultant film was laterally oriented at an orientation ratio of 18% at 130° C. with a tenter, followed by retaining the film so as to have the width obtained after oriented, at 140° C. for 30 seconds. Then, the film was released from the clip and dried at 140° C. for 40 minutes (Drying (1)), to produce a cellulose acetate film. The residual solvent amount in the finished cellulose acetate film was 0.2%. The film thickness of the finished cellulose acetate film was 92 μm.

Cellulose acetate films 2 to 7 were produced in the same manner as above, except that the type of cellulose acetate, the type and amount of retardation controlling agent were changed to those shown in Table 18.

TABLE 18

| Sample No. | Cellulose acylate Total acetyl-substitution degree | Cellulose acylate Substitution degree at 6-position | Retardation-increasing agent 1 Kind | Retardation-increasing agent 1 Octanol/water distribution factor | Retardation-increasing agent 1 Amount (g/film-100 g) | Retardation-increasing agent 2 Kind | Retardation-increasing agent 2 Octanol/water distribution factor | Retardation-increasing agent 2 Amount (g/film-100 g) | Remarks |
|---|---|---|---|---|---|---|---|---|---|
| Cellulose acetate film 1 | 2.75 | 0.35 | A-12 | 3.5 | 4.3 | A-2 | 3.0 | 2.7 | This invention |
| Cellulose acetate film 2 | 2.75 | 0.35 | A-21 | 3.9 | 4.0 | A-26 | 4.5 | 4.0 | This invention |
| Cellulose acetate film 3 | 2.75 | 0.35 | A-13 | 5.1 | 4.3 | A-39 | 3.7 | 2.7 | This invention |
| Cellulose acetate film 4 | 2.75 | 0.29 | A-21 | 3.9 | 4.0 | A-26 | 4.5 | 4.0 | Comparative example |
| Cellulose acetate film 5 | 2.75 | 0.35 | B | 9.0 | 5.0 | — | — | — | Comparative example |
| Cellulose acetate film 6 | 2.75 | 0.30 | A-12 | 3.5 | 4.3 | A-2 | 3.0 | 2.7 | Comparative example |

In Table 18, the retardation-increasing agent B is the retardation-increasing agent described in JP-A-2002-182215, and is a compound represented by the following structural formula.

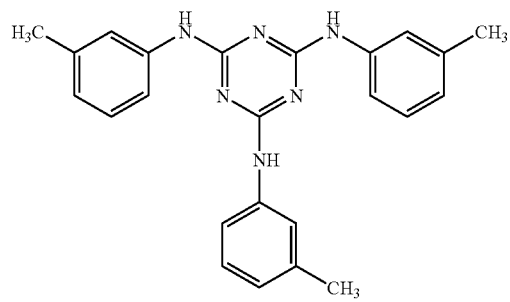

Retardation-increasing agent B

<Measurement of Retardation>

The Re and Rth of the film, and the angle formed between the slow axis and the film-cast direction were measured at 25° C. under 60% RH, at 10 points in the transverse direction, according to the following method, and in-plane uniformity was evaluated by the average, maximum value, and minimum value of these data.

By using an automatic birefringence meter (trade name: KOBRA-21ADH, manufactured by Oji Scientific Instruments), an in-plane retardation Re(0) was measured. Also, the in-plane slow axis was utilized as a swinging axis to swing by an angle of 40° and by an angle of −40°, thereby to measure the retardations Re(40) and Re(−40), respectively. The film thickness and the refractive index nx in the slow axis direction were used as parameters, to find by calculating the refractive index ny in the phase-advancing-axis direction and the refractive index nz in the thickness direction so as to fit them to the above-measured Re(0), Re(40), and Re(−40) values. In this manner, the Rth retardation value was determined. The wavelength in measurement was 590 nm.

Regarding the evaluation of the surface state, the frequency of unevenness occurred when observing the surface state of a 1 m×2 m cellulose acetate film sandwiched between two polarizing plates overlapped on each other in cross nicol state, was classified into the following criteria:

○: No unevenness;
Δ: Two or less places; and
X: Three or more places.

The results are shown in Table 19.

TABLE 19

| Sample No. | Re (nm) Min | Re (nm) Max | Re (nm) Av | Rth (nm) Min | Rth (nm) Max | Rth (nm) Av | Angle of slow axis (°) Min | Angle of slow axis (°) Max | Angle of slow axis (°) Av | Film thickness (μm) Min | Film thickness (μm) Max | Film thickness (μm) Av | Surface state | Remarks |
|---|---|---|---|---|---|---|---|---|---|---|---|---|---|---|
| Cellulose acetate film 1 | 57 | 60 | 59 | 147 | 152 | 150 | 89.6 | 90.5 | 90.1 | 91.6 | 92.6 | 92.1 | ○ | This invention |
| Cellulose acetate film 2 | 58 | 61 | 60 | 150 | 154 | 152 | 89.5 | 90.4 | 90.1 | 91.6 | 92.3 | 92.0 | ○ | This invention |
| Cellulose acetate film 3 | 58 | 60 | 57 | 147 | 152 | 149 | 89.7 | 90.4 | 90 | 91.6 | 92.5 | 92.2 | ○ | This invention |
| Cellulose acetate film 4 | 53 | 62 | 58 | 145 | 157 | 152 | 88.5 | 91 | 90.3 | 90.4 | 94.2 | 92.3 | X | Comparative example |
| Cellulose acetate film 5 | 57 | 65 | 62 | 181 | 192 | 190 | 88.9 | 90.9 | 89.7 | 91.1 | 93.0 | 92.2 | Δ | Comparative example |

TABLE 19-continued

| Sample No. | Re (nm) | | | Rth (nm) | | | Angle of slow axis (°) | | | Film thickness (μm) | | | Surface state | Remarks |
|---|---|---|---|---|---|---|---|---|---|---|---|---|---|---|
| | Min | Max | Av | Min | Max | Av | Min | Max | Av | Min | Max | Av | | |
| Cellulose acetate film 6 | 53 | 64 | 58 | 139 | 161 | 149 | 89.1 | 90.7 | 90.2 | 91.3 | 92.9 | 92 | Δ | Comparative example |

Note:
Min, the minimum value;
Max, the maximum value; and
Av, the average value.

It is understood from the results shown in Table 19 that the cellulose acetate film of the present invention had a high Re/Rth ratio and was less in changes of the film thickness, the retardation, and the angle of slow axis.

Example 3-2

Saponification Treatment

The cellulose acetate film 1 was dipped in an aqueous 1.5N sodium hydroxide solution at 55° C. for 2 minutes. The film was washed at ambient temperature in a water washing bath, and neutralized at 30° C. using 0.1 N sulfuric acid. The film was again washed at ambient temperature in a water washing bath, and dried using 100° C. hot air. Thus, the surface of the cellulose acetate film was saponified.

(Production of Polarizing Plate)

Iodine was absorbed to an oriented polyvinyl alcohol film, to manufacture a polarizing film.

Then, the transparent support side of the produced cellulose acetate film was laminated to one surface of the polarizing plate, by using a polyvinyl alcohol type adhesive. The transparent support and the polarizing film were arranged such that the slow axis of the transparent support was parallel to the transmission axis of the polarizing film.

A commercially available cellulose triacetate film (trade name: FUJITAC TD80UF, manufactured by Fuji Photo Film Co., Ltd.) was subjected to saponification treatment in the same manner as in Example 3-3, and the resultant film was laminated on the other side of the polarizing film, by using a polyvinyl alcohol type adhesive. Thus, a polarizing plate (1-1) was prepared.

Example 3-3

The observer side polarizing plate that was disposed in a 22-inch liquid crystal display device (manufactured by Sharp Corporation) using a VA type liquid crystal cell, was peeled off, and the polarizing plate (1-1) manufactured in Example 3-2 was laminated to the observer side instead through an adhesive such that the cellulose acetate film 1 of the present invention was disposed on the liquid crystal cell side. The polarizing plate on the observer side was disposed such that the transmission axis thereof intersected at right angle with the transmission axis of the back light side polarizing plate.

As a result, it is confirmed that the polarizing plate of the present invention was less in change of contrast and color varying the viewing angle, and also less in displaying unevenness, which are preferable.

Example 3-4

(Saponification Treatment)

5.2 ml/m² of a solution having the following composition was applied onto the cellulose acetate film 3 manufactured in Example 3-1, and the coated film was dried at 60° C. for 10 seconds. The surface of the film was washed in a water stream for 10 seconds, and then dried by blowing 25° C. air.

(Composition of a Solution for Saponification)

| Isopropyl alcohol | 818 mass parts |
|---|---|
| Water | 167 mass parts |
| Propylene glycol | 187 mass parts |
| Potassium hydrate | 68 mass parts |
| Surfactant (1) n-C₁₆H₃₃O(C₂H₄O)₁₀H | 12 mass parts |

(Formation of an Oriented Film)

Onto the thus-saponified cellulose acetate film 3, a coating solution having the following composition was applied in an amount of 24 mL/m², by using a #14 wire bar coater. The coating layer was dried using 60° C. hot air for 60 seconds, and then 90° C. hot air for 150 seconds.

Then, the film formed on the cellulose acetate film 3 was rubbed in the direction slanted at an angle of 45° with the orienting direction (which almost accorded to the direction of the slow axis) of the film.

(Composition of the Oriented-film Coating Solution)

| Modified polyvinyl alcohol, as shown below | 20 mass parts |
|---|---|
| Water | 360 mass parts |
| Methanol | 120 mass parts |
| Glutaraldehyde (crosslinking agent) | 1.0 mass parts |

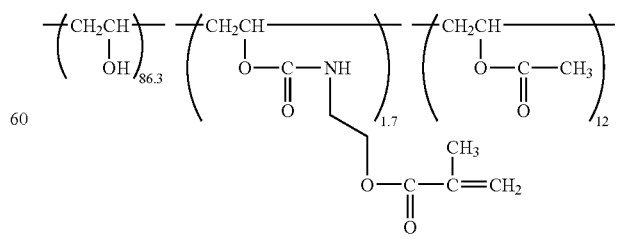

Modified polyvinyl alcohol (Formation of an Optically Anisotropic Layer)

| | |
|---|---|
| Discotic liquid crystal molecule (I) of the following formula | 91 mass parts |
| Ethylene oxide modified trimethylolpropane triacrylate (trade name: V#360, manufactured by Osaka Organic Chemical Industry Ltd.) | 9 mass parts |
| Cellulose acetate butyrate (trade name: CAB531-1, manufactured by Eastman Chemical) | 1.5 mass parts |
| Photopolymerization initiator (trade name: Irgacure-907, manufactured by Ciba Geigy Co., Ltd.) | 3 mass parts |
| Mixture of citrates of the following formula | 1.0 mass parts |

A coating solution prepared by dissolving the above components in 214.2 mass parts of methyl ethyl ketone, was applied in an amount of 6.2 mL/m², by using a #3.6 wire bar coater in the atmosphere of 25° C. The obtained layer was laminated to a metal frame, and heated in a 140° C. thermostat for 2 minutes, to orient the discotic liquid crystal molecule. Then, the resulting layer was irradiated with UV ray, by using a 120-W/cm high-pressure mercury lamp at 90° C. for one minute, to polymerize the discotic liquid crystal molecule. Then, the irradiate layer was allowed to cool to ambient temperature.

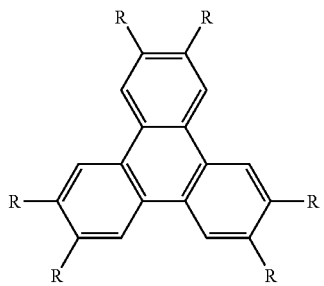

Discotic liquid crystal molecule (I)

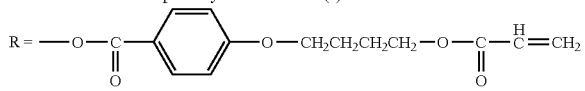

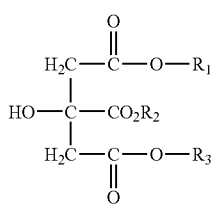

Citrate mixture
$R_1$ = H or $C_2H_5$ (Preparation of Polarizing Plate)

Iodine was absorbed to an oriented polyvinyl alcohol film, to manufacture a polarizing film.

Then, the transparent support side of the produced optical compensation sheet was laminated to one surface of the polarizing film, by using a polyvinyl alcohol type adhesive. The transparent support and the polarizing film were arranged such that the slow axis of the transparent support would be parallel to the transmission axis of the polarizing film.

A commercially available cellulose triacetate film (trade name: FUJITAC TD80UF, manufactured by Fuji Photo Film Co., Ltd.) was subjected to saponification treatment in the same manner as in Example 3-3, and the resultant film was laminated to the other side of the polarizing film, i.e. the side opposite to one on which the optical compensation sheet was laminated, by using a polyvinyl alcohol type adhesive.

Thus, a polarizing plate (2-3) was prepared.

(Production of Bend Orientation-type Liquid Crystal Cell)

A polyimide film was formed as an oriented film, on each of two glass substrates provided with an ITO electrode, and rubbing treatment of the film was carried out. The obtained two glass substrates were made to face each other at the positions where rubbing directions are parallel to each other, and a cell gap was set to 5.7 μm. Then, a liquid crystal compound (ZLI1132, trade name, manufactured by Merck Co., Ltd.) having Δn of 0.1396 was injected into the cell gap, to manufacture a bend orientation liquid crystal cell.

(Preparation of Liquid Crystal Display Device)

Two plates of the thus-manufactured polarizing plates (2-3) were laminated onto the obtained bend orientation cell so as to sandwich the bend orientation cell between them. The polarizing plates and the liquid crystal cell were arranged such that the optically anisotropic layer of the polarizing plate faced the substrate of the cell and that the rubbing direction of the liquid crystal cell was parallel with but reverse to the rubbing direction of the optically anisotropic layer facing the liquid crystal cell.

The liquid crystal display device manufactured in this manner was observed under different temperatures and humidities. As a result, it was found that the liquid crystal display device that employed the polarizing plate (2-3) of the present invention, was advantageous, since it was less in change of the contrast viewing angle and of the chromaticity viewing angle, and was also less in display unevenness.

INDUSTRIAL APPLICABILITY

The optical compensation sheet of the present invention is preferable as an optical compensation sheet that is excellent in optical performance and transparency, and the sheet can compensate a liquid crystal cell optically by using only a cellulose acylate film.

The polarizing plate of the present invention is preferable as a polarizing plate provided with an additional optical compensation function which is fit to a liquid crystal display device, and the plate can impart the function without increasing the number of structural elements.

The liquid crystal display device of the present invention is preferable as a liquid crystal display device which is optically compensated by a cellulose acylate film.

The cellulose acetate film of the present invention is uniform and high in retardation, and it is preferably used in various optical materials. Further, the liquid crystal display device of the present invention is preferably used as a liquid crystal display device having a wide viewing angle and high display quality; and the device can be attained without giving rise to such a problem as light leakage, by use of a polarizing plate which uses a protective film large and uniform in optical anisotropy, in said liquid crystal display device.

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119(a) on Patent Application No. 2004-052562 filed in Japan on Feb. 26, 2004, Patent Application No. 2004-058648 filed in Japan on Mar. 3, 2004, Patent Application No. 2004-072478 filed in Japan on Mar. 15, 2004, Patent Application No. 2004-174028 filed in Japan on Jun. 11, 2004, and Patent Application No. 2004-273996 filed in Japan on Sep. 21, 2004, each of which is entirely herein incorporated by reference.

The invention claimed is:

1. An optical film, comprising a cellulose acylate, at least one compound represented by the following formula (I) in an amount of 0.01 to 20 mass parts to 100 mass parts of the cellulose acylate, and at least one cyclic compound having at least three substituents in an amount of 0.01 to 20 mass parts to 100 mass parts of the cellulose acylate:

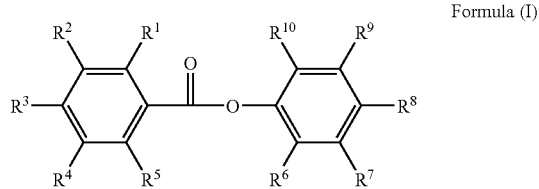

Formula (I)

wherein $R^1$, $R^2$, $R^3$, $R^4$, $R^5$, $R^6$, $R^7$, $R^9$ and $R^{10}$ each independently represent a hydrogen atom or a substituent, in which at least one of $R^1$, $R^2$, $R^3$, $R^4$ and $R^5$ represents an electron-donating group; $R^8$ represents a hydrogen atom, an alkyl group having 1 to 4 carbon atoms, an alkenyl group having 2 to 6 carbon atoms, an alkinyl group having 2 to 6 carbon atoms, an aryl group having 6 to 12 carbon atoms, an alkoxy group having 1 to 12 carbon atoms, an aryloxy group having 6 to 12 carbon atoms, an alkoxycarbonyl group having 2 to 12 carbon atoms, an acylamino group having 2 to 12 carbon atoms, an alkylcarbonyloxy group having 2 to 20 carbon atoms, a cyano group, or a halogen atom, wherein the cyclic compound having at least three substituents is a compound represented by the following formula (II):

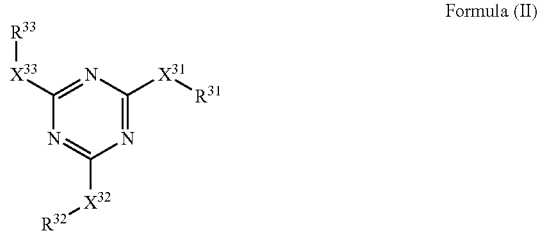

Formula (II)

wherein $X^{31}$ represents a single bond, —$NR^{34}$—, —O—, or —S—; $X^{32}$ represents a single bond, —$NR^{35}$—, —O—, or —S—; $X^{33}$ represents a single bond, —$NR^{36}$—, —O—, or —S—; $R^{31}$, $R^{32}$ and $R^{33}$ each independently represent an alkyl group, an alkenyl group, an aryl group, or a heterocyclic group; and $R^{34}$, $R^{35}$ and $R^{36}$ each independently represent a hydrogen atom, an alkyl group, an alkenyl group, an aryl group, or a heterocyclic group.

2. The optical film as claimed in claim 1, wherein the cellulose acylate is made of a cellulose acylate in which a hydroxyl group of the cellulose is partially substituted with an acetyl group or with an acyl group having 3 to 22 carbon atoms, and a substitution degree A of the acetyl group of the cellulose acylate and a substitution degree B of the acyl group having 3 to 22 carbon atoms of the cellulose acylate satisfy the following expression (3):

$2.0 \leq A+B \leq 3.0$       Expression (3).

3. The optical film as claimed in claim 1, wherein the cellulose acylate is made of a cellulose acylate in which a hydroxyl group of the cellulose is partially substituted with an acetyl group or with an acyl group having 3 to 22 carbon atoms, and a substitution degree A of the acetyl group of the cellulose acylate and a substitution degree B of the acyl group having 3 to 22 carbon atoms of the cellulose acylate satisfy the following expressions (3) and (4):

$2.0 \leq A+B \leq 3.0$       Expression (3):

$0 < B$       Expression (4).

4. The optical film as claimed in claim 3, wherein the acyl group having 3 to 22 carbon atoms is a butanoyl group or a propionyl group.

5. The optical film as claimed in claim 1, wherein the cellulose acylate is one obtained by substituting a hydroxyl group of a glucose unit constituting the cellulose with an acyl group having 2 or more carbon atoms, and wherein when a degree of substitution of an acyl group for a hydroxyl group at the second position, a degree of substitution of an acyl group for a hydroxyl group at the third position, and a degree of substitution of an acyl group for a hydroxyl group at the sixth position in the glucose unit constituting the cellulose are designated to as DS2, DS3, and DS6, respectively, the following expressions (5) and (6) are satisfied:

$2.0 \leq DS2+DS3+DS6 \leq 3.0$       Expression (5):

$DS6/(DS2+DS3+DS6) \geq 0.315$       Expression (6).

6. The optical film as claimed in claim 1, wherein a Re retardation value defined by the following expression (1) is 20 to 200 nm, and a Rth retardation value defined by the following expression (2) is 70 to 400 nm:

$Re=(nx-ny) \times d$       Expression (1):

$Rth=\{(nx+ny)/2-nz\} \times d$       Expression (2):

wherein nx is a refractive index in a direction of a slow axis within a surface of the film; ny is a refractive index in a direction of a fast axis within the surface of the film; nz is a refractive index in a direction of a thickness of the film; and d is the thickness of the film.

7. The optical film as claimed in claim 1, wherein a ratio Re/Rth of the Re retardation value to the Rth retardation value is 0.1 to 0.8, wherein Re is a retardation value defined by Expression (1), and Rth is a retardation value defined by Expression (2):

$Re=(nx-ny) \times d$       Expression (1):

$Rth=\{(nx+ny)/2-nz\} \times d$       Expression (2).

8. The optical film as claimed in claim 1, wherein a difference (Re700–Re400) between the Re retardation value (Re700) at a wavelength of 700 nm and the Re retardation value (Re400) at a wavelength of 400 nm is −25 nm to 10 nm.

9. The optical film as claimed in claim 1, wherein a difference (Rth700–Rth400) between the Rth retardation value (Rth700) at a wavelength of 700 nm and the Rth retardation value (Rth400) at a wavelength of 400 nm is −50 nm to 20 nm.

10. The optical film as claimed in claim 1, wherein a variation of the above Re and Rth in the transverse direction each are within 5%. wherein Re is a retardation value defined by Expression (1), and Rth is a retardation value defined by Expression (2):

$$Re=(nx-ny)\times d \quad \text{Expression (1):}$$

$$Rth=\{(nx+ny)/2-nz\}\times d \quad \text{Expression (2).}$$

11. The optical film as claimed in claim 1, wherein the optical film is composed of only one cellulose acylate film having a film thickness of 20 μm to 160 μm.

12. The optical film as claimed in claim 1, wherein the cellulose acylate is a cellulose acetate having a degree of acetylation of 59.0 to 61.5%, and wherein an amount of variation in Re/Rth is 0.01 to 0.1 per 1% of the orienting ratio, wherein Re is a retardation value defined by Expression (1), and Rth is a retardation value defined by Expression (2):

$$Re=(nx-ny)\times d \quad \text{Expression (1):}$$

$$Rth=\{(nx+ny)/2-nz\}\times d \quad \text{Expression (2).}$$

13. The optical film as claimed in claim 1, wherein a slow axis of the film forms an angle of 85° to 95° with a casting direction, and a variation in the above angle in the transverse direction is 5° or less.

14. The optical film as claimed in claim 1, wherein the film is produced by orienting a cellulose acylate film in a direction perpendicular to the longitudinal direction with carrying the film in the longitudinal direction, wherein an amount of a residual solvent of the cellulose acylate film at the start of the orienting is 2% to 50%, and wherein a slow axis of the film is in a direction perpendicular to the lengthy direction of the film.

15. An optical compensation sheet, comprising the optical film as claimed in claim 1.

16. A polarizing plate, comprising a polarizing film, and two transparent protective films disposed on both sides of the polarizing film, wherein at least one of the transparent protective films is the optical compensation sheet as claimed in claim 15.

17. A liquid crystal display device, comprising a liquid crystal cell, and two polarizing plates disposed on both sides of the liquid crystal cell, wherein at least one of the polarizing plates is the polarizing plate as claimed in claim 16.

18. A liquid crystal display device, comprising a liquid crystal cell, and two polarizing plates disposed on both sides of the liquid crystal cell, said polarizing plate comprising a polarizing film and two transparent protective films disposed on both sides of the polarizing film, wherein the optical compensation sheet as claimed in claim 15 is disposed between the liquid crystal cell and at least one polarizing film, and a slow axis of the optical compensation sheet and a transmission axis of the polarizing film adjacent to the optical compensation sheet are arranged substantially parallel to each other.

19. A VA-mode liquid crystal display device, comprising a liquid crystal cell, and two polarizing plates disposed on both sides of the liquid crystal cell, said polarizing plate comprising a polarizing film and two transparent protective films disposed on both sides of the polarizing film, wherein the optical compensation sheet as claimed in claim 15 is disposed between the liquid crystal cell and at least one polarizing film, and a slow axis of the optical compensation sheet and a transmission axis of the polarizing film adjacent to the optical compensation sheet are arranged substantially parallel to each other.

20. An optical film, comprising a cellulose acylate, at least one compound represented by the following formula (I) in an amount of 0.01 to 20 mass parts and/or at least one compound having a 1,3,5-triazine ring in an amount of 0.01 to 20 mass parts, and at least one ultraviolet absorber in an amount of 0.1 to 20 mass parts, to 100 mass parts of the cellulose acylate:

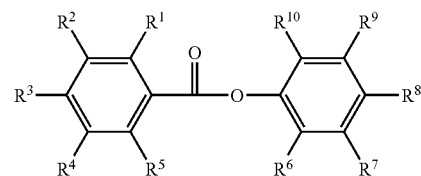

Formula (I)

wherein $R^1$, $R^2$, $R^3$, $R^4$, $R^5$, $R^6$, $R^7$, $R^9$ and $R^{10}$ each independently represent a hydrogen atom or a substituent, in which at least one of $R^1$, $R^2$, $R^3$, $R^4$ and $R^5$ represents an electron-donating group; $R^8$ represents a hydrogen atom, an alkyl group having 1 to 4 carbon atoms, an alkenyl group having 2 to 6 carbon atoms, an alkinyl group having 2 to 6 carbon atoms, an aryl group having 6 to 12 carbon atoms, an alkoxy group having 1 to 12 carbon atoms, an aryloxy group having 6 to 12 carbon atoms, an alkoxycarbonyl group having 2 to 12 carbon atoms, an acylamino group having 2 to 12 carbon atoms, an alkylcarbonyloxy group having 2 to 20 carbon atoms, a cyano group, or a halogen atoms, wherein a Re retardation value defined by the following expression (1) is 20 to 200 nm, and a Rth retardation value defined by the following expression (2) is 70 to 400 nm:

$$Re=(nx-ny)\times d \quad \text{Expression (1):}$$

$$Rth=\{(nx+ny)/2-nz\}\times d \quad \text{Expression (2):}$$

wherein nx is a refractive index in a direction of a slow axis within a surface of the film; ny is a refractive index in a direction of a fast axis within the surface of the film; nz is a refractive index in a direction of a thickness of the film; and d is the thickness of the film, and wherein the ultraviolet absorber is a compound represented by formula (III) or formula (IV):

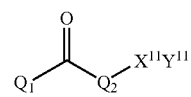

Formula (III)

wherein $Q_1$ and $Q_2$ each independently represent an aromatic ring; $X^{11}$ represents a substituent; $Y^{11}$ represents an oxygen atom, a sulfur atom, or a nitrogen atom; and $X^{11}Y^{11}$ may represent a hydrogen atom;

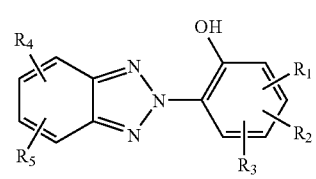

Formula (IV)

wherein $R_1$, $R_2$, $R_3$, $R_4$, and $R_5$ each independently represent a monovalent organic group or a halogen atom, and at least one of $R_1$, $R_2$, and $R_3$ is an unsubstituted, branched or straight-chain alkyl group having 10 to 20 carbon atoms in total.

21. The optical film as claimed in claim 20, wherein the compound having a 1,3,5-triazine ring is a compound represented by formula (II):

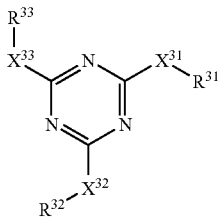

Formula (II)

wherein $X^{31}$ represents a single bond, —$NR^{34}$—, —O—, or —S—; $X^{32}$ represents a single bond, —$NR^{35}$—, —O—, or —S—; $X^{33}$ represents a single bond, —$NR^{36}$—, —O—, or —S—; $R^{31}$, $R^{32}$ and $R^{33}$ each independently represent an alkyl group, an alkenyl group, an aryl group, or a heterocyclic group; and $R^{34}$, $R^{35}$ and $R^{36}$ each independently represent a hydrogen atom, an alkyl group, an alkenyl group, an aryl group, or a heterocyclic group.

22. The optical film as claimed in claim 20, wherein the ultraviolet absorber is a compound represented by formula (III):

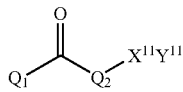

Formula (III)

wherein $Q_1$ and $Q_2$ each independently represent an aromatic ring; $X^{11}$ represents a substituent; $Y^{11}$ represents an oxygen atom, a sulfur atom, or a nitrogen atom; and $X^{11}Y^{11}$ may represent a hydrogen atom.

23. The optical film as claimed in claim 20, wherein the ultraviolet absorber is a compound represented by formula (IV):

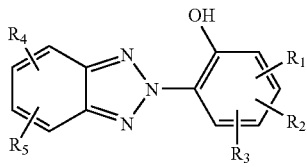

Formula (IV)

wherein $R_1$, $R_2$, $R_3$, $R_4$, and $R_5$ each independently represent a monovalent organic group or a halogen atom, and at least one of $R_1$, $R_2$, and $R_3$ is an unsubstituted, branched or straight-chain alkyl group having 10 to 20 carbon atoms in total.

24. The optical film as claimed in claim 20, which comprises an ultraviolet absorber represented by formula (V):

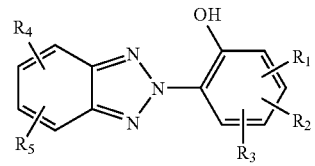

Formula (IV)

wherein $R_1$, $R_2$, $R_4$, and $R_5$ each independently represent a monovalent organic group or a halogen atom, and $R_6$ represents a branched alkyl group.

25. The optical film as claimed in claim 20, wherein a ratio Re/Rth of the Re retardation value to the Rth retardation value is 0.1 to 0.8.

26. The optical film as claimed in claim 20, which is composed of a cellulose acetate film having a surface energy of 55 to 75 mN/m.

27. The optical film as claimed in claim 20, which is composed of a cellulose acylate film produced by orienting at an orienting ratio of 3 to 100%.

28. The optical film as claimed in claim 20, wherein the cellulose acylate is a cellulose acetate having a degree of acetylation of 59.0 to 61.5%, and wherein an amount of variation in Re/Rth is 0.01 to 0.1 per 1% of the orienting ratio.

29. The optical film as claimed in claim 20, wherein the film is produced by orienting a cellulose acylate film in a direction perpendicular to the longitudinal direction with carrying the film in the longitudinal direction, wherein an amount of a residual solvent of the cellulose acylate film at the start of the orienting is 2% to 50%, and wherein a slow axis of the film is in a direction perpendicular to the lengthy direction of the film.

30. An optical compensation sheet, comprising the optical film as claimed in claim 20.

31. A polarizing plate, comprising a polarizing film, and two transparent protective films disposed on both sides of the polarizing film, wherein at least one of the transparent protective films is the optical compensation sheet as claimed in claim 30.

32. A liquid crystal display device, comprising a liquid crystal cell, and two polarizing plates disposed on both sides of the liquid crystal cell, wherein at least one of the polarizing plates is the polarizing plate as claimed in claim 31.

33. A liquid crystal display device, comprising a liquid crystal cell, and two polarizing plates disposed on both sides of the liquid crystal cell, said polarizing plate comprising a polarizing film and two transparent protective films disposed on both sides of the polarizing film, wherein the optical compensation sheet as claimed in claim 30 is disposed between the liquid crystal cell and at least one polarizing film, and a slow axis of the optical compensation sheet and a transmission axis of the polarizing film adjacent to the optical compensation sheet are arranged substantially parallel to each other.

34. A VA-mode liquid crystal display device, comprising a liquid crystal cell, and two polarizing plates disposed on both sides of the liquid crystal cell, said polarizing plate comprising a polarizing film and two transparent protective films disposed on both sides of the polarizing film, wherein the optical compensation sheet as claimed in claim 30 is disposed between the liquid crystal cell and at least one polarizing film, and a slow axis of the optical compensation sheet and a transmission axis of the polarizing film adjacent to the optical compensation sheet are arranged substantially parallel to each other.

35. A cellulose acetate film, comprising a cellulose acetate in which a substitution ratio at the sixth position which ratio is represented by the following expression (8) is 0.32 or more, and at least one retardation-increasing agent which has two or more aromatic rings and an octanol/water distribution factor of 1 or more and 6 or less, wherein the retardation-increasing agent is contained in an amount of 0.1% by mass to 20% by mass to the cellulose acetate:

(Substitution ratio at the sixth position)=(Degree of substitution at the sixth position)/{(Degree of substitution at the second position)+(Degree of substitution at the third position)+(Degree of substitution at the sixth position)}   Expression (8).

36. The optical film as claimed in claim 35, wherein the Re retardation value at a wavelength of 590 nm is 20 to 200 nm, the Rth retardation value at a wavelength of 590 nm is 70 to 400 nm, and the ratio Rth/Re of the Rth retardation value to the Re retardation value is 1 to 10.

37. The optical film as claimed in claim 35, wherein a variation of the above Re and Rth in the transverse direction each are within 5%, wherein Re is a retardation value defined by Expression (1), and Rth is a retardation value defined by Expression (2):

$Re=(nx-ny)\times d$   Expression (1):

$Rth=\{(nx+ny)/2-nz\}\times d$   Expression (2).

38. The optical film as claimed in claim 35, wherein a slow axis of the film forms an angle of 85° to 95° with a casting direction, and a variation in the above angle in the transverse direction is 5° or less.

39. The optical film as claimed in claim 35, wherein the film is produced by orienting a cellulose acylate film in a direction perpendicular to the longitudinal direction with carrying the film in the longitudinal direction, wherein an amount of a residual solvent of the cellulose acylate film at the start of the orienting is 2% to 50%, and wherein a slow axis of the film is in a direction perpendicular to the lengthy direction of the film.

40. An optical compensation sheet, comprising the optical film as claimed in claim 35.

41. A polarizing plate, comprising a polarizing film, and two transparent protective films disposed on both sides of the polarizing film, wherein at least one of the transparent protective films is the optical compensation sheet as claimed in claim 40.

42. A liquid crystal display device, comprising a liquid crystal cell, and two polarizing plates disposed on both sides of the liquid crystal cell, wherein at least one of the polarizing plates is the polarizing plate as claimed in claim 41.

43. A liquid crystal display device, comprising a liquid crystal cell, and two polarizing plates disposed on both sides of the liquid crystal cell, said polarizing plate comprising a polarizing film and two transparent protective films disposed on both sides of the polarizing film, wherein the optical compensation sheet as claimed in claim 40 is disposed between the liquid crystal cell and at least one polarizing film, and a slow axis of the optical compensation sheet and a transmission axis of the polarizing film adjacent to the optical compensation sheet are arranged substantially parallel to each other.

44. A VA-mode liquid crystal display device, comprising a liquid crystal cell, and two polarizing plates disposed on both sides of the liquid crystal cell, said polarizing plate comprising a polarizing film and two transparent protective films disposed on both sides of the polarizing film, wherein the optical compensation sheet as claimed in claim 40 is disposed between the liquid crystal cell and at least one polarizing film, and a slow axis of the optical compensation sheet and a transmission axis of the polarizing film adjacent to the optical compensation sheet are arranged substantially parallel to each other.

* * * * *